United States Patent
Borck et al.

[15] 3,669,956
[45] June 13, 1972

[54] 4-SUBSTITUTEDAMINO-PHENYLACETIC ACIDS AND DERIVATIVES THEREOF

[72] Inventors: Joachim Borck; Johann Dahm; Volker Koppe; Josef Kramer; Gustav Shorre; J. W. Hermann Hovy; Ernst Schorscher, all of Darmstadt, Germany

[73] Assignee: E. Merck A. G., Darmstadt, Germany

[22] Filed: July 22, 1968

[21] Appl. No.: 746,326

[30] Foreign Application Priority Data

| July 22, 1967 | Germany | M 74881 |
| Jan. 8, 1968 | Germany | M 76850 |
| Feb. 23, 1968 | Germany | M 77363 |
| March 1, 1968 | Germany | M 77429 |

[52] U.S. Cl. ............... 260/239 BF, 260/239 A, 260/239 E, 260/243 B, 260/246, 260/247.1, 260/247.2 R, 260/247.2 A, 260/247.2 B, 260/247.5 R, 260/247.7 A, 260/247.7 H, 260/268 C, 260/268 PH, 260/293.62, 260/293.64, 260/293.67, 260/293.68, 260/293.69, 260/293.71, 260/293.72, 260/293.73, 260/293.75, 260/293.76, 260/293.77, 260/293.79, 260/293.81, 260/293.82, 260/293.83, 260/293.84, 260/306.7, 260/306.8 R, 260/307 F, 260/307 H, 260/309.7, 260/326.3, 260/326.5 S, 260/326.5 SF, 260/326.5 E, 260/326.5 G, 260/326.5 L, 260/326.5 N, 260/465 D, 260/465 E, 260/470, 260/471 R, 260/472, 260/516, 260/518 R, 260/518 A, 260/519, 260/556 AR, 260/556 B, 260/558 S, 260/558 A, 260/559 T, 260/559 A, 260/571, 260/574, 260/575, 424/244, 424/246, 424/248, 424/250, 424/267, 424/270, 424/272, 424/273, 424/274, 424/304, 424/309, 424/321, 424/324, 424/330

[51] Int. Cl. ........................................................ C07d 41/04
[58] Field of Search ........ 260/294 X, 293.4, 293.47, 239 BF, 260/326.3, 294.3 E

[56] References Cited

UNITED STATES PATENTS

| 3,252,970 | 5/1966 | Huebner | 260/239 |
| 3,385,852 | 5/1968 | Casadio | 260/246 |

OTHER PUBLICATIONS

Norman et al., J. Chem. Soc. 1963, (Nov.), 5431–6.

Primary Examiner—Henry R. Jiles
Assistant Examiner—G. Thomas Todd
Attorney—Millen, Raptes & White

[57] ABSTRACT

As a group of extraordinarily active anti-inflammatory agents, 4-aminophenyl acetic acids substituted at the nitrogen and phenyl positions, and derivatives thereof, e.g., 3-chloro-4-piperidino-α-methyl acetic acid, 3-methyl-4-piperidino-α-methyl acetic acid, and 4-piperidino-naphthyl acetic acids.

144 Claims, No Drawings

4-SUBSTITUTEDAMINO-PHENYLACETIC ACIDS AND DERIVATIVES THEREOF

This invention relates to substituted 4-aminophenylacetic acids and the derivatives thereof.

According to an object of one aspect of this invention, there are provided a novel group of chemical compounds as well as processes for their manufacture.

According to an object of another aspect of this invention, there are provided novel pharmaceutical compositions for effecting anti-inflammatory, and other therapeutic activities.

Upon further study of the specification and claims, other objects and advantages of the present invention will become apparent.

To attain these compounds, there are provided compounds of the following formula:

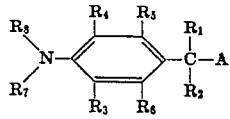

1

In the above formula and in all formulas set out hereinbelow, the variables have the following meanings, unless otherwise expressly indicated in individual formulas:

$R_1$ and $R_2$ being identical or different, represent H or alkyl of one to four carbon atoms;

$R_3$ represents F, Hal, $CF_3$, OH, $NO_2$, CN, $R_9$, $OR_9$, SH, $SR_9$, $NR_1$—$COR_9$, $NR_1R_2$, $SO_2NR_1R_2$, $SOR_9$ or $SO_2R_9$; and under special circumstances, $R_3$ can represent H;

$R_4$, $R_5$ and $R_6$ represent H; with the provisions that one each of these residues can also represent F, Hal, $R_9$, $OR_9$ or $SR_9$; and the residues $R_4$ and $R_5$ together can also represent a tetramethylene optionally containing one to two double bonds; the latter special case wherein $R_4$ and $R_5$ represent tetramethylene optionally containing one to two double bonds, $R_3$ can also be H and $R_6$ can represent H, F, Hal, $CF_3$, OH, $NO_2$, CN, $R_9$, $OR_9$, $SR_9$, $NR_1$—$COR_9$, $NR_1R_2$, $SO_2NR_1R_2$, $SOR_9$ or $SO_2R_9$;

$R_7$ and $R_8$ represent linear or branched alkyl of one to seven carbon atoms, or together a linear or branched alkylene chain of two to 14 carbon atoms which chain can optionally be interrupted by an oxygen or sulfur atom, the residue $R_7$ and $R_8$ being identical or different;

$R_9$ represents alkyl of one to four carbon atoms;

$R_{10}$ is acyl (preferably acetyl) or a hydrocarbon residue (preferably methyl or phenyl);

$R_{11}$ represents

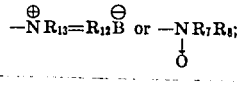

$R_{12}$ represents alkylidene of one to seven carbon atoms; and $R_{13}$ represents alkyl of one to seven carbon atoms, wherein the residues $R_{12}$ and/or $R_{13}$ can contain one or more additional C $=$ C (double) bonds or C $\equiv$ C (triple) bonds, and wherein these residues can also be connected with each other in the form of a ring directly or by way of an oxygen or sulfur atom;

$R_{14}$ is an optionally substituted hydrocarbon residue (preferably alkyl of one to four carbon atoms);

$R_{15}$ and $R_{16}$ represent H or an optionally substituted hydrocarbon residue (preferably alkyl of one to four carbon atoms or phenyl; the residues $R_{15}$ and $R_{16}$ being identical or different);

$R_{17}$ is a —$(CH_2)_3$—$CHX_4X_5$ group which can, if desired, contain an additional double bond; a —$(CH_2)_4$—$X_2$ group which can, if desired, contain one or two additional double bonds; or 3-butenyl, 3-butynyl, 1,3-butadienyl or 1-buten-3-ynyl;

A represents $COOA_1$, $CONA_2A_3$, $CONA_4$, C( = NOH)OH or $C(OR_9)_3$;

$A_1$, $A_2$ and $A_3$ represent H; an alkyl or cycloalkyl group which optionally contains one to two C—C unsaturated bonds and/or an OH group and/or an $NH_2$ group and/or which is interrupted by O once to three times and/or interrupted by Y and/or which is branched, this group being of respectively up to 12 carbon atoms; $A_5$—$NA_4$; phenyl or aralkyl of a total of six to 14 carbon atoms (the residues $A_1$, $A_2$ and $A_3$ being identical or different);

$A_4$ is alkylene of up to six carbon atoms, optionally interrupted by O or Y;

$A_5$ is alkylene of one to six carbon atoms;

$B^\ominus$ is an anion, preferably $Hal^\ominus$;

$B_1$ is OH, esterified OH, OM or Hal;

$B_2$ is alkyl of one to four carbon atoms substituted by $B_1$;

D is COO or $CONA_2$;

E is $= NR_{15}$, $= S$, $= NOR_{15}$ or $= N$—$NR_{15}R_{16}$;

Hal is Cl, Br or I;

L is a group oxidizable to a carboxyl group, such as, advantageously, CHO, $CH_2OH$, $CH_3$, 1-alkenyl, 1-alkynyl, 1,2-dihydroxyalkyl or 1-oxoalkyl of preferably up to four carbon atoms, respectively;

M represents metal, especially alkali metal, preferably Li, Cd—$R_9$, Zn—$R_9$ or MgHal;

$M_1$ is H or metal, advantageously alkali or alkaline earth metal, preferably Na or K;

Q represents H or M;

X represents a residue that can be split off with M as MX, and is preferably Hal or a sulfuric or sulfonic acid residue;

$X_1$ is a residue substitutable by an amino group, especially Hal, OH, acyloxy, a secondary or tertiary amino group, a sulfuric acid residue, an alkylsulfuric acid residue (wherein the alkyl group is of preferably one to four carbon atoms), or a sulfonic acid residue;

$X_2$ represents Hal, OH, acyloxy or alkoxy of preferably respectively up to four carbon atoms, a sulfuric acid residue or a sulfonic acid residue;

$X_3$ is OH, SH, O-acyl or S-acyl of preferably up to four carbon atoms each, or X;

$X_4$ and $X_5$ represent each $OR_{15}$, $SR_{15}$, $NR_{15}R_{16}$, or together also O or E (the residues $X_4$ and $X_5$ being identical or different);

$X_6$ represents a residue which can be split off with H as $HX_6$, especially Hal; or OH, SH or $NH_2$ optionally substituted by alkyl, acyl, alkysulfonyl or alkoxysulfonyl of respectively up to four carbon atoms;

$X_7$ and $X_8$ represent Hal or OH optionally substituted by alkyl, acyl, alkylsulfonyl or alkoxysulfonyl of preferably respectively up to four carbon atoms (the residues $X_7$ and $X_8$ being identical or different);

Y represents S, NH, N-alkyl of one to six carbon atoms optionally substituted by OH, N-phenyl or N-phenyl-alkyl of seven to 10 carbon atoms;

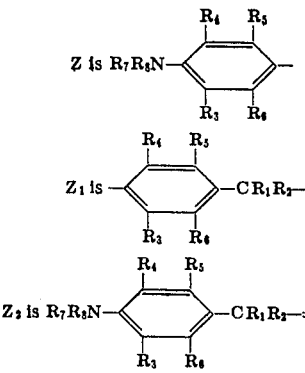

It has been discovered that substituted 4-aminophenylacetic acids and the derivatives thereof, of Formula 1, as well as the salts thereof with acids or bases, the quaternary ammonium salts thereof and the anhydrides thereof exhibit outstanding anti-inflammatory activities, as well as good analgesic and anti-pyretic activities, all the compounds being also physiologically compatible. In addition, these compounds also exhibit bacteriostatic, bactericidal, antiprotozoal, diuretic, blood-sugar-lowering, choleretic, cholesterol-level-lowering, and radiation-protective effects.

Thus, the following effect relationships resulted with respect to several of the compounds of the present invention as compared, for example, with the compound Ibufenac (p-isobutylphenylacetic acid), an antiphlogistic of similar constitution, in a UV erythema test on guinea pigs:

| Substance | Effect Relationship |
|---|---|
| Ibufenac (Comparison Substance) | 1 |
| 3-Chloro-4-piperidino-α-methyl-phenylacetic acid (A) | 300–500 |
| 3-Bromo-4-piperidino-α-methyl-phenylacetic acid (B) | 300–500 |
| 4-Piperidino-α-methyl-naphthyl-1-acetic acid | 300–500 |
| Ethyl ester of 3-chloro-4-piperidino-α-methyl-phenylacetic acid | 100–200 |
| 2'-Diethylaminoethyl ester of 3-chloro-4-piperidino-α-methyl-phenylacetic acid (C) | 100–200 |
| Methyl ester of 4-piperidino-α-methyl-naphthyl-1-acetic acid (D) | 100–200 |
| Ethyl ester of 4-piperidino-α-methyl-naphthyl-1-acetic acid | 100–200 |
| 3-Methyl-4-piperidino-α-methyl-phenylacetic acid (E) | 100–200 |
| 3-Amino-4-piperidino-α-methyl-phenylacetic acid (F) | 100–200 |
| 2'-Diethylaminoethyl ester of 3-chloro-4-piperidino-α-methyl-phenyl-acetic acid fumarate | 100–200 |
| 2'-Ethylbutyl ester of 3-chloro-4-piperidino-α-methyl-phenylacetic acid (G) | 100–200 |
| 2'-Dimethylaminoethyl ester of 3-chloro-4-piperidino-α-methyl-phenylacetic acid fumarate | 100–200 |
| 4-Piperidino-α-ethyl-naphthyl-1-acetic acid | 100–200 |
| 2,3-Dichloro-4-piperidino-α-methyl-phenylacetic acid | 100–150 |
| Methyl ester of 4-piperidino-naphthyl-1-acetic acid hydrochloride | 30–100 |
| Ethyl ester of 4-Piperidino-naphthyl-1-acetic acid | 30–100 |
| 2'-Diethylaminoethyl ester of 4-piperidino-naphthyl-1-acetic acid | 30–100 |
| 2-Methyl-3-chloro-4-piperidino-α-methyl-phenylacetic acid | 30–100 |
| 2'-Diethylaminoethyl ester of 4-piperidino-α-methyl-naphthyl-1-acetic acid | 30–100 |

In this connection, the substances of this invention exhibit approximately the same acute toxicity as the comparison substance (on mice).

The compounds of this invention also show marked advantages over other anti-inflammatories of entirely different structures. Thus, the following comparative relationships were determined with phenylbutazone (1,2-diphenyl-4-n-butyl-3,5-pyrazolidinedione) — with the compounds of this invention exhibiting the same or lower toxicities:

| | Writhing Test (Mouse) | Kaolin-Edema Test (Rat) |
|---|---|---|
| Phenylbutazone (comparison substance) | 1 | 1 |
| A | 16 | 20 |
| B | 4 | 10 |
| C | 7 | 3 |
| D | 5 | |
| E | 10 | 10 |
| F | | 10 |
| G | 5 | |

References to the pharmacological tests are as follows:
UV erythema test: Arch. int. pharmacodyn, 116, 261 (1958);
Writhing test ("analgetischer Schleiftest"):
Proc. Soc. exp. Biol. (N.Y.) 95, 729 (1959);
Kaolin edema test:
Ann. N.Y. Acad. Sci. 86, 263 (1960).

Generally, the compounds of the present invention can be used in all instances where it is customary to employ Ibufenac or Indomethacin. More specifically, diseases such as inflammatory states of the joints and the muscular system, rheumatic fever, chronic rheumatic arthritis, periarthritis, and neuritis, can successfully be treated with the compounds of this invention.

As compared to the conventional antiphlogistic indomethacin (1-p-chlorobenzoyl-2-methyl-5-methoxy-indolyl-3-acetic acid), the compounds of the present invention are distinguished by a generally substantially lower toxicity and a higher therapeutic index. Thus, compound B, for example, is about 10 times as effective as indomethacin on the UV erythema of the guinea pig, but exhibits only about one-thirtieth of the acute toxicity of indomethacin (on mice).

Aside from the compounds of general Formula 1, this invention embraces the following subgeneric preferred groups of compounds of Formula 1, as well as the salts thereof with acids or optionally bases, the quaternary ammonium salts thereof and optionally the anhydrides thereof, wherein the residues not set forth in detail have the above-indicated meanings, but wherein:

1. $R_5$ and $R_6$ represent H, and
   A represents COOH;
2. $R_5$ and $R_6$ represent H, and
   A has the above-indicated meanings, but does not represent COOH;
3. $R_4$ and $R_5$ together represent a tetramethylene optionally containing one to two double bonds, and
   $R_3$ and $R_6$ represent H, and wherein one of the residues $R_3$ and $R_6$ can also be F, Hal, $CF_3$, OH, $NO_2$, CN, $R_9$, $OR_9$, $SR_9$, $NR_1$—$COR_9$, $NR_1R_2$, $SO_2NR_1R_2$, $SOR_9$ or $SO_2R_9$;
4. $R_4$ represents H, and one of the residues $R_5$ and $R_6$ is H and the other one is F, Hal, $R_9$, $OR_9$ or $SR_9$;
5. A represents COOH;
6. $R_1$ is H, methyl, ethyl or propyl;
7. $R_2$ is H;
8. $R_4$, $R_5$ and $R_6$ each represents H;
9. $R_2$, $R_4$, $R_5$ and $R_6$ each represents H;
10. $R_4$ and $R_5$ together represent —CH = CH—CH = CH—;
11. $R_3$ represents $SOR_9$ or $SO_2R_9$;
12. $R_3$ represents F, Cl, Br, $R_9$, $NH_2$ or $NO_2$;
13. $R_7$ and $R_8$ together represent tetramethylene, pentamethylene, hexamethylene or 3-oxapentamethylene;
14. $R_7$ and $R_8$, being identical or different, each represents alkyl of one to six carbon atoms;
15. A represents $COOA_1$;
16. $R_1$ represents H, methyl, ethyl or propyl, and
    A represents $COOA_1$;
17. $R_2$ is H, and
    A represents $COOA_1$;
18. $R_4$, $R_5$ and $R_6$ each represents H, and
    A represents $COOA_1$;
19. $R_2$, $R_4$, $R_5$ and $R_6$ each represents H, and
    A represents $COOA_1$;
20. $R_4$ and $R_5$ together represent —CH = CH—CH = CH—, and
    A represents $COOA_1$;
21. $R_3$ is $SOR_9$ or $SO_2R_9$, and
    A represents $COOA_1$;
22. $R_3$ is F, Cl, Br, $R_9$, $NH_2$, or $NO_2$, and
    A is $COOA_1$;
23. $R_7$ and $R_8$ together represent tetramethylene, pentamethylene, hexamethylene or 3-oxapentamethylene, and
    A represents $COOA_1$;
24. $R_7$ and $R_8$ being identical or different, each represents alkyl of one to six carbon atoms,
    and A represents $COOA_1$;
25. $R_1$ is H, methyl, ethyl or propyl,
    $R_2$ is H or methyl, $R_3$ is Cl, Br, $R_9$, $NH_2$ or $NO_2$ or (if $R_4$ and $R_5$ together are —CH = CH—CH = CH—) H,
$R_4$ and $R_5$ H or together —CH = CH—CH = CH—,
$R_6$ is H, methyl, Cl or Br,
$R_7$ and $R_8$ together represent tetramethylene, pentamethylene, hexamethylene or 3-oxapentamethylene, and
A represents $COOA_1$;

26. $R_1$ is H, methyl, ethyl or propyl,
$R_2$ is H or methyl,
$R_3$ is Cl, Br, $R_9$, $NH_2$ or $NO_2$ or (in case $R_4$ and $R_5$ together are —CH = CH—CH = CH—) H,
$R_4$ and $R_5$ each are H or together —CH = CH—CH = CH—,
$R_6$ represents H, methyl, Cl or Br,
$R_7$ and $R_8$ together are tetramethylene, pentamethylene, hexamethylene or 3-oxapentamethylene,
A is $COOA_1$,
$A_1$ is H, alkyl of one to six carbon atoms, dialkylaminoalkyl of four to nine carbon atoms, or $A_5$—$NA_4$,
$A_4$ is tetramethylene, pentamethylene, 3-oxapentamethylene, 3-(methylaza)-pentamethylene or 3-(2-hydroxyethylaza)-pentamethylene, and
$A_5$ is —$CH_2CH_2$— or —$CH_2CH_2CH_2$—;

27. $R_1$ is H, methyl, ethyl or propyl,
$R_2$ is H or methyl;
$R_3$ is Cl, Br, $R_9$, $NH_2$ or $NO_2$ or (in case $R_4$ and $R_5$ together represent —CH = CH—CH = CH—) H,
$R_4$ and $R_5$ each represents H or together they represent —CH = CH—CH = CH—,
$R_6$ is H, methyl, Cl or Br,
$R_7$ and $R_8$ together represent tetramethylene, pentamethylene, hexamethylene or 3-oxapentamethylene,
A represents $COOA_1$, and
$A_1$ is H or alkyl of one to six carbon atoms;

28. $R_4$, $R_5$ and $R_6$ each is H, and
A is COOH;

29. $R_1$ represents preferably methyl, ethyl or propyl,
$R_2$, $R_4$, $R_5$ and $R_6$ each represents H, and
A is COOH;
$R_3$ is halogen, preferably Cl or Br, $NO_2$, $SCH_3$, $SC_2H_5$ or alkyl of one to four carbon atoms, and
A is COOH;

30. $R_5$ and $R_6$ each is H,
$R_7$ and $R_8$ together represent a pentamethylene chain optionally mono- or disubstituted by alkyl of one to four carbon atoms, and
A represents COOH;

31. $R_4$, $R_5$ and $R_6$ each represents H,
$R_7$ and $R_8$ together represent a pentamethylene chain optionally mono- or disubstituted by alkyl of one to four carbon atoms, and
A represents COOH;

32. $R_1$ is preferably methyl, ethyl or propyl,
$R_2$, $R_4$, $R_5$ and $R_6$ each is H,
$R_3$ halogen, preferably Cl or Br, $NO_2$, $SCH_3$, $SC_2H_5$ or alkyl of one to four carbon atoms,
$R_7$ and $R_8$ together represent a pentamethylene chain optionally mono- or disubstituted by alkyl of one to four carbon atoms, and
A is COOH;

33. $R_5$ and $R_6$ each is H,
$R_7$ and $R_8$ together represent a hexamethylene chain optionally mono- or disubstituted by alkyl of one to four carbon atoms, and
A is COOH;

34. $R_4$, $R_5$ and $R_6$ is H,
$R_7$ and $R_8$ together represent a hexamethylene chain optionally mono- or disubstituted by alkyl of one to four carbon atoms, and
A is COOH;

34. $R_4$, $R_5$ and $R_6$ is H,
$R_7$ and $R_8$ together represent a hexamethylene chain optionally mono- or disubstituted by alkyl of one to four carbon atoms, and
A is COOH;

35. $R_1$ is preferably methyl, ethyl or propyl,
$R_2$, $R_4$, $R_5$ and $R_6$ each is H,
$R_3$ is halogen, preferably Cl or Br, $NO_2$, $SCH_3$, $SC_2H_5$ or alkyl of one to four carbon atoms,
$R_7$ and $R_8$ together represent a hexamethylene chain optionally mono- or disubstituted by alkyl of one to four carbon atoms, and
A is COOH;

36. $R_5$ and $R_6$ each is H,
$R_7$ and $R_8$ together represent a tetramethylene chain optionally mono- or disubstituted by alkyl of one to four carbon atoms, and
A is COOH;

37. $R_4$, $R_5$ and $R_6$ each is H,
$R_7$ and $R_8$ together represent a tetramethylene chain optionally mono- or disubstituted by alkyl of one to four carbon atoms, and
A is COOH;

38. $R_1$ preferably represents methyl, ethyl or propyl,
$R_2$, $R_4$, $R_5$ and $R_6$ each is H,
$R_3$ is halogen, preferably Cl or Br, $NO_2$, $SCH_3$, $SC_2H_5$ or alkyl of one to four carbon atoms,
$R_7$ and $R_8$ together represent a tetramethylene chain optionally mono- or disubstituted by alkyl of one to four carbon atoms, and
A is COOH;

39. $R_5$ and $R_6$ each is H,
$R_7$ and $R_8$ being identical or different, represent alkyl of one to six carbon atoms, and
A is COOH;

40. $R_4$, $R_5$ and $R_6$ each is H,
$R_7$ and $R_8$ being identical or different, represent alkyl of one to six carbon atoms, and
A is COOH;

41. $R_1$ is preferably methyl, ethyl or propyl,
$R_2$, $R_4$, $R_5$ and $R_6$ each is H,
$R_3$ is halogen, preferably Cl or Br, $NO_2$, $SCH_3$, $SC_2H_5$ or alkyl of one to four carbon atoms,
$R_7$ and $R_8$ being identical or different, represent alkyl of one to six carbon atoms, and
A is COOH;

42. $R_4$, $R_5$ and $R_6$ each is H,
A is other than COOH;

43. $R_1$ is preferably methyl, ethyl or propyl,
$R_2$, $R_4$, $R_5$ and $R_6$ each is H,
$R_3$ halogen, preferably Cl or Br, $NO_2$, $SCH_3$, $SC_2H_5$ or alkyl of one to four carbon atoms, and
A is $COOA_1$,
$A_1$ is other than H;

44. $R_5$ and $R_6$ each is H, and
$R_7$ and $R_8$ together represent a pentamethylene chain optionally mono- or disubstituted by alkyl of one to four carbon atoms,
A is other than COOH;

45. $R_4$, $H_5$ and $R_6$ each is H, and
$R_7$ and $R_8$ together represent a pentamethylene chain optionally mono- or disubstituted by alkyl of one to four carbon atoms,
A is other than COOH;

46. $R_1$ is preferably methyl, ethyl or propyl,
$R_2$, $R_4$, $R_5$ and $R_6$ each is H,
$R_3$ is halogen, preferably Cl or Br, $NO_2$, $SCH_3$, $SC_2 H_5$ or alkyl of one to four carbon atoms,
$R_7$ and $R_8$ together represent a pentamethylene chain optionally mono- or disubstituted by alkyl of one to four carbon atoms, and
A is $COOA_1$,
$A_1$ is other than H;

47. $R_5$ and $R_6$ each is H, and $R_7$ and $R_8$ together represent a hexamethylene chain optionally mono 1 or disubstituted by alkyl of one to four carbon atoms, A is other than COOH;

48. $R_4$, $R_5$ and $R_6$ each is H, and $R_7$ and $R_8$ together represent a hexamethylene chain optionally mono- or disubstituted by alkyl one to four carbon atoms, A is other than COOH;

49. $R_1$ is preferably methyl, ethyl or propyl, $R_2$, $R_4$, $R_5$ and $R_6$ each is H, $R_3$ is halogen, preferably Cl or Br, $NO_2$, $SCH_3$, $SC_2H_5$ or alkyl of one to four carbon atoms, $R_7$ and $R_8$ together represent a hexamethylene chain optionally mono- or disubstituted by alkyl of one to four carbon atoms, and A is $COOA_1$, $A_1$ is other than H;

50. $R_5$ and $R_6$ each is H, and $R_7$ and $R_8$ together represent a tetramethylene chain optionally mono- or disubstituted by alkyl of one to four carbon atoms, A is other than COOH;

51. $R_4$, $R_5$ and $R_6$ each is H, and $R_7$ and $R_8$ together represent a tetramethylene chain optionally mono- or disubstituted by alkyl of one to four carbon atoms, A is other than COOH;

52. $R_1$ is preferably methyl, ethyl or propyl, $R_2$, $R_4$, $R_5$ and $R_6$ each is H, $R_3$ is halogen, preferably Cl or Br, $NO_2$, $SCH_3$, $SC_2H_5$ or alkyl of one to four carbon atoms, and $R_7$ and $R_8$ together represent a tetramethylene chain optionally mono- or disubstituted by alkyl of one to four carbon atoms, and A is $COOA_1$, $A_1$ is other than H;

53. $R_5$ and $R_6$ each is H, and $R_7$ and $R_8$ being identical or different, represent alkyl of one to six carbon atoms, A is other than COOH;

54. $R_4$, $R_5$ and $R_6$ each is H, and $R_7$ and $R_8$ being identical or different, represent alkyl of one to six carbon atoms, A is other than COOH;

55. $R_1$ is preferably methyl, ethyl or propyl, $R_2$, $R_4$, $R_5$ and $R_6$ each is H, $R_3$ is halogen, preferably Cl or Br, $NO_2$, $SCH_3$, $SC_2H_5$ or alkyl of one to four carbon atoms, $R_7$ and $R_8$ being identical or different, are alkyl of one to six carbon atoms, and A is $COOA_1$, $A_1$ is other than H;

56. $R_4$ and $R_5$ together represent $-CH=CH-CH=CH-$, and $R_6$ is H;

57. $R_1$ is preferably methyl, ethyl or propyl, $R_2$ and $R_6$ is H, $R_3$ is H, halogen, preferably Cl or Br, $NO_2$, $SCH_3$, $SC_2H_5$ or alkyl of one to four carbon atoms, $R_4$ and $R_5$ together are $-CH=CH-CH=CH-$, and A is $COOA_1$;

58. $R_4$ and $R_5$ together represent $-CH=CH-CH=CH-$, and $R_7$ and $R_8$ together represent a pentamethylene chain optionally mono- or disubstituted by alkyl of one to four carbon atoms;

59. $R_1$ is preferably methyl, ethyl or propyl, $R_2$ is H, $R_3$ is H, halogen, preferably Cl or Br, $NO_2$, $SCH_3$, $SC_2H_5$ or alkyl of one to four carbon atoms, $R_4$ and $R_5$ together represent $-CH=CH-CH=CH-$, $R_7$ and $R_8$ together represent a pentamethylene chain optionally mono- or disubstituted by alkyl of one to four carbon atoms, and A is $COOA_1$;

60. $R_4$ and $R_5$ together represent $-CH=CH-CH=CH-$, and $R_7$ and $R_8$ together represent a hexamethylene chain optionally mono- or disubstituted by alkyl of one to four carbon atoms;

61. $R_1$ is preferably methyl, ethyl or propyl, $R_2$ is H, $R_3$ is H, halogen, preferably Cl or Br, $NO_2$, $SCH_3$, $SC_2H_5$ or alkyl of one to four carbon atoms, $R_4$ and $R_5$ together represent $-CH=CH-CH=CH-$, $R_7$ and $R_8$ together represent a hexamethylene chain optionally mono- or disubstituted by alkyl of one to four carbon atoms, and A is $COOA_1$;

62. $R_4$ and $R_5$ together represent $-CH=CH-CH=CH-$, and $R_7$ and $R_8$ together represent a tetramethylene chain optionally mono- or disubstituted by alkyl of one to four carbon atoms;

(63) $R_1$ is preferably methyl, ethyl or propyl, $R_2$ is H, $R_3$ is H, halogen, preferably Cl or Br, $NO_2$, $SCH_3$, $SC_2H_5$ or alkyl of one to four carbon atoms, $R_4$ and $R_5$ together represent $-CH=CH-CH=CH-$, $R_7$ and $R_8$ together represent a tetramethylene chain optionally mono- or disubstituted by alkyl of one to four carbon atoms, and A is $COOA_1$;

64. $R_4$ and $R_5$ together are $-CH=CH-CH=CH-$, and $R_7$ and $R_8$ being identical or different, represent alkyl of one to six carbon atoms;

65. $R_1$ is preferably methyl, ethyl or propyl, $R_2$ is H, $R_3$ is H, halogen, preferably Cl or Br, $NO_2$, $SCH_3$, $SC_2H_5$, or alkyl of one to four carbon atoms, $R_4$ and $R_5$ together represent $-CH=CH-CH=CH-$, $R_7$ and $R_8$ being identical or different, represent alkyl of one to six carbon atoms, and A is $COOA_1$, 66. $R_4$ is H one of the residues $R_5$ and $R_6$ is H and the other is F, Hal, $R_9$, $OR_9$ or $SR_9$, and A is $COOA_1$;

67. $R_1$ is preferably methyl, ethyl or propyl, $R_2$ and $R_4$ is each H, $R_3$ is halogen, preferably Cl or Br, $NO_2$, $NH_2$, $SCH_3$, $SC_2H_5$ or alkyl of one to four carbon atoms, one of the residues $R_5$ and $R_6$ is H and the other is F, Hal, $R_9$, $OR_9$ or $SR_9$, and A is $COOA_1$;

68. $R_4$ is H, one of the residues $R_5$ and $R_6$ is H and the other is F, Hal, $R_9$, $OR_9$ or $SR_9$, and $R_7$ and $R_8$ together represent a pentamethylene chain optionally mono- or disubstituted by alkyl of one to four carbon atoms;

69. $R_4$ is H, one of the residues $R_5$ and $R_6$ is H and the other is F, Hal, $R_9$, $OR_9$ or $SR_9$, $R_7$ and $R_8$ together represent a pentamethylene chain optionally mono- or disubstituted by alkyl of one to four carbon atoms, and A is $COOA_1$;

70. $R_1$ is preferably methyl, ethyl or propyl, $R_2$ and $R_4$ is H $R_3$ is halogen, preferably Cl or Br, $NO_2$, $NH_2$, $SCH_3$, $SC_2H_5$ or alkyl or one to four carbon atoms, one of the residues $R_5$ and $R_6$ is H and the other is F, Hal, $R_9$, $OR_9$ or $SR_9$, $R_7$ and $R_8$ together represent a pentamethylene chain optionally mono1 or disubstituted by alkyl of one to four carbon atoms, and A is $COOA_1$;

71. $R_4$ is H, one of the residues $R_5$ and $R_6$ is H and the other is F, Hal, $R_9$, $OR_9$ or $SR_9$, and $R_7$ and $R_8$ together represent a hexamethylene chain optionally mono- or disubstituted by alkyl of one to four carbon atoms;

72. $R_4$ is H, one of the residues $R_5$ and $R_6$ is H and the other is F, Hal, $R_9$, $OR_9$ or $SR_9$, $R_7$ and $R_8$ together represent a hexamethylene chain optionally mono- or disubstituted by alkyl of one to four carbon atoms, and A is $COOA_1$;

73. $R_1$ is preferably methyl, ethyl or propyl, $R_2$ and $R_4$ each is H, $R_3$ is halogen, preferably Cl or Br, $NO_2$, $NH_2$, $SCH_3$, $SC_2H_5$ or alkyl of one to four carbon atoms, one of the residues $R_5$ and $R_6$ is H and the other is F, Hal, $R_9$, $OR_9$ or $SR_9$, $R_7$ and $R_8$ together represent a hexamethylene chain optionally mono- or disubstituted by alkyl of one to four carbon atoms, and A is $COOA_1$;

74. $R_4$ is H, one of the residues $R_5$ and $R_6$ is H and the other is F, Hal, $R_9$, $OR_9$ or $SR_9$, and $R_7$ and $R_8$ together represent a tetramethylene chain optionally mono- or disubstituted by alkyl of one to four carbon atoms;

75. $R_4$ is H, one of the residues $R_5$ and $R_6$ is H and the other is F, Hal, $R_9$, $OR_9$ or $SR_9$, $R_7$ and $R_8$ together represent a tetramethylene chain optionally mono- or disubstituted by alkyl of one to four carbon atoms, and A is $COOA_1$;

76. $R_1$ is preferably methyl, ethyl or propyl, $R_2$ and $R_4$ is each H, $R_3$ is halogen, preferably Cl or Br, $NO_2$, $NH_2$, $SCH_3$, $SC_2H_5$ or alkyl of one to four carbon atoms, one of the residues $R_5$ and $R_6$ is H and the other is F, Hal, $R_9$, $OR_9$ or $SR_9$, $R_7$ and $R_8$ together represent a tetramethylene chain optionally mono- or disubstituted by alkyl of one to four carbon atoms, and A is $COOA_1$;

77. $R_4$ is H, one of the residues $R_5$ and $R_6$ is H and the other is F, Hal, $R_9$, $OR_9$ or $SR_9$, and $R_7$ and $R_8$ being identical or different, represent alkyl of one to six carbon atoms;

78. $R_4$ is H, one of the residues $R_5$ and $R_6$ is H and the other is F, Hal, $R_9$, $OR_9$ or $SR_9$, $R_7$ and $R_8$ being identical or different, represent alkyl of one to six carbon atoms, and A is $COOA_1$;

79. $R_1$ is preferably methyl, ethyl, or propyl, $R_2$ and $R_4$ is H, $R_3$ is halogen, preferably Cl or Br, $NO_2$, $NH_2$, $SCH_3$, $SC_2H_5$ or alkyl of one to four carbon atoms, one of the residues $R_5$ and $R_6$ is H and the other is F, Hal, $R_9$, $OR_9$ or $SR_9$, $R_7$ and $R_8$ being identical or different, represent alkyl of one to six carbon atoms, and A is $COOA_1$.

For the preparation of the substituted 4-aminophenylacetic acids and derivatives of Formula 1, as well as the salts thereof with acids or bases and quaternary ammonium salts and optionally the anhydrides thereof, the following steps are conducted:

a. If carboxylic acids of Formula 1 (A = COOH) are to be obtained, functional acid derivatives of such carboxylic acids, such as, in particular, amides, thioamides, thioesters, esters, hydrazides, acid halogenides, azides, anhydrides, iminoesters, amidines, hydroxamic acids, nitriles, trihalogen methanes, acid iminohalogenides, are saponified in a neutral, acidic or alkaline medium, or in particular, tert.-alkyl esters, such as tert.-butyl esters, are thermolytically decomposed, or b. compounds of Formula 2

$$Z_2-L \qquad 2$$

are oxidized, or c. a diazoketone of Formula 3

$$Z-CO-CR_1 = N_2 \qquad 3$$

is rearranged under the conventional conditions of a Wolff rearrangement in the presence of $A_1OH$, $A_2A_3NH$, $A_4NH$ or $NH_2OH$, or d. an organometallic compound of Formula 4

$$Z_2\text{-M} \qquad 4$$

is reacted with carbon dioxide, or e. a haloketone of Formula 5

$$Z-CO-CR_1R_2-Hal \qquad 5$$

is rearranged under the conventional conditions of a Faworskij rearrangement, or f. a compound of Formula 6 or 7

$$Z_2-B_1 \qquad 6$$
$$Z-CHR_2-B_2 \qquad 7$$

is reacted with carbon monoxide, or g. a malonic acid derivative of Formula 8

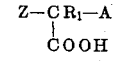

$$\begin{array}{c} Z-CR_1-A \\ | \\ COOH \end{array} \qquad 8$$

is decarboxylated, or h. a β-keto acid derivative of Formula 9

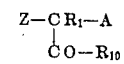

$$\begin{array}{c} Z-CR_1-A \\ | \\ CO-R_{10} \end{array} \qquad 9$$

is subjected to an acid cleavage process, or i. a compound of Formula 1 wherein there are additionally present one or more groups substitutable or reducible by hydrogen and/or C—C multiple bonds, such as, in particular, those compounds of Formula 1 wherein $R_1$ to $R_9$ and A have the previously indicated meanings but wherein at least one of these residues contains one or more halogen atoms and/or one or more OH, SH, $NH_2$ groups and/or OH, SH or $NH_2$ groups substituted by hydrocarbon residues and/or one or more C = O and/or C = S groups and/or one or more C = N and/or C = C double bonds and/or C ≡ C triple bonds and/or wherein $R_1$ and $R_2$ together represent O or S or an alkylidene group of one to four carbon atoms, or wherein $R_1$ is Hal, OH, SH, $NH_2$, or OH, SH or $NH_2$ substituted by hydrocarbon residues and/or wherein the benzene nucleus carries additionally in the 2-, 3-, 5- and/or 6-position halogen atoms or diazonium salt groupings and/or — if $R_4$ and $R_5$ together represent a tetramethylene group optionally containing one to two double bonds — additionally one or more halogen atoms and/or diazonium salt groupings are provided on this tetramethylene group and/or wherein A is represented by a benzyl ester or benzyl amide or a benzyl-equivalent ester or amide group, which can be converted by hydrogenolysis into the carboxyl group or the group $CONHA_1$, or a compound of Formula 10

$$R_{11}-Z_1 \qquad 10$$

is treated with agents giving off hydrogen or with catalytically activated hydrogen, or j. a compound of Formula 11 is reacted with a compound of Formula 12; or a compound of Formula 13 is reacted with a compound of Formula 14;

$$Z-\overset{\overset{M}{|}}{C}R_2-A \quad 11 \qquad R_9X \quad 12$$

$$Z-\overset{\overset{X}{|}}{C}R_2-A \quad 13 \qquad R_9M \quad 14$$

or k. a compound of Formula 15 is reacted with a compound of Formula 16; or a compound of Formula 17 is reacted with a compound of Formula 18, optionally in the presence of a Friedel-Crafts catalyst:

$$Z - X \quad 15$$
$$M-CR_1R_2-A \quad 16$$
$$Z - Q \quad 17$$
$$X-CR_1R_2-A \quad 18$$

or l. a compound of Formula 19 is reacted with an amine of Formula 20, or an amine of Formula 21, 22 or 23 is reacted with a compound of Formula 24 or 25 under N-alkylation conditions, wherein the compounds 24 and 25, when reacted with a compound of Formula 21, in accordance with the meanings indicated hereinabove for $R_7$ and $R_8$, can also represent a single compound.

$$X_1-Z_1 \quad 19$$
$$R_7R_8NH \quad 20$$
$$NH_2-Z_1 \quad 21$$
$$R_7-NH-Z_1 \quad 22$$
$$R_8-NH-Z_1 \quad 23$$
$$R_7-X_1 \quad 24$$
$$R_8-X_1 \quad 25$$

wherein $R_3$ in compound 19 preferably means an electron-attracting group, such as $NO_2$, $CN$, $SO_2NR_1R_2$, $NR_1-COR_9$ or $CF_3$; and both residues $X_1$ of compounds 24 and 25, when reacted with the amine 21, can also represent together an oxygen or sulfur atom;

or m. an amino compound of Formula 21 is reacted with one or two identical or different straight-chain or branched olefins of two to seven carbon atoms or with a straight-chain or branched alkadiene of four to 14 carbon atoms, the chain of which can also be interrupted by an oxygen or sulfur atom; or amino compounds of Formula 22 or 23 are reacted with a straight-chain or branched olefin of two to seven carbon atoms, which olefin can also be connected with the residue $R_7$ or $R_8$ directly or by way of a hetero atom, such as O or S; or n. a compound of Formula 26

$$H-Z_1 \quad 26$$

is reacted with an amine of Formula 27

$$R_7R_8N-Hal \quad 27$$

particularly in the presence of Friedel-Crafts catalysts; or o. the substituent $R_3$ (or $R_6$) is introduced into a compound of Formula 1 containing, instead of $R_3$ hydrogen (or, if $R_3$ is H and $R_4$ and $R_5$ simultaneously represent together a tetramethylene group optionally containing one to two double bonds, containing, in place of $R_6$, hydrogen), as follows:

if $R_3$ (or $R_6$, respectively) represents chlorine, bromine or iodine, the substituent is introduced by means of halogenation, particularly by reaction with elemental halogen, preferably with the addition of catalysts, such as iron-III-, aluminum-, antimony-III-halides, tin-IV-halides, with hypohalous acids, tert.-butyl hypohalogenites, halo-halide compounds, such as CII, ClBr, and BrI, $SO_2$-halogens, preferably with the addition of peracids, and N-halo-carboxylic acid amides, as well as imides or if $R_3$ (or $R_6$, respectively) represents iodine, the substituent is introduced by means of iodization, particularly also by reaction of the 3- (or 6-) Hg acetate compound with iodine, or if $R_3$ (or $R_6$, respectively) represents $NO_2$, the substituent is introduced by nitration, particularly by reaction with nitric oxide, nitronium salts, preferably with the addition of Friedel-Crafts catalysts, $HNO_3$, optionally in a mixture with acetic acid, acetic anhydride, $H_2SO_4$, pyrosulfuric acid, fuming sulfuric acid, $H_2SeO_4$, $HClO_4$, with acyl nitrates, such as acetyl or benzoyl nitrate, with nitric acid esters, such as ethyl nitrate, with nitrosulfonic acid, nitrosylsulfuric acid, nitroguanidine, with metallic nitrates (such as Cu, Fe, Mn, Co or Ni nitrate) in a mixture with acetic anhydride or glacial acetic acid, or if $R_3$ (or $R_6$, respectively) represents $R_9$, $SR_9$, $SOR_9$, $SO_2R_9$ or $NR_1R_2$, the substituent is introduced particularly by reaction with $R_9X_2$ or olefins of up to four carbon atoms, or by reaction with $R_9SX_2$, $R_9SOX_2$, $R_9SO_2X_2$ or $R_1R_2N-X_2$ in the presence of Lewis acids, especially Friedel-Crafts catalysts, optionally under conditions where $HX_2$ is split off, or p. in a compound of Formula 1 wherein $R_3$ represents $NH_2$, the $NH_2$ group is exchanged, after being converted into a diazonium salt, against halogen, $NO_2$, $CN$, $R_9S$, $R_9O$ or $OH$, or wherein $R_3$ represents $CONH_2$, the $CONH_2$ group is converted into a $CN$ group by agents splitting off water, such as, in particular, $P_2O_5$, $POCl_3$, $PCl_5$ or $SOCl_2$, or wherein $R_3$ represents $NO_2$, or $IO$ or $IO_2$ is in place of $R_3$, the $NO_2$ group is reduced to $NH_2$, or the $IO$ or $IO_2$ group is reduced to iodine, or wherein, in place of $R_3$ there is $NH-NH_2$ or $NHNH_2$ substituted by hydrocarbon residues, this hydrazine group is replaced by bromine or iodine, or wherein $R_3$ represents Hal, Hal is exchanged against $NR_1R_2$, or wherein, in place of $R_3$ there is one of the residues $OM_1$, $SM_1$, $N(M_1)_2$ or $SO_2N(M_1)B2$, this substituent taking the place of $R_3$ is reacted with olefins of two to four carbon atoms, diazoalkanes of one to four carbon atoms or with compounds $R_9X_1$, if desired under conditions wherein $M_1X_1$ is split off, or wherein $R_3$ represents $NH-R_1$, the $NHR_1$ group is acylated to the $NR_1-COR_9$ group by treatment with ketenes of two to five carbon atoms, or with carboxylic acid derivatives suitable for acylating reactions, such as carboxylic acid esters, anhydrides, or halogenides derived from carboxylic acids of one to five carbon atoms, or this carbonamide group is hydrolytically liberated from one of the functional derivatives thereof, or wherein $R_3$ represents $SR_9$ or NO is in place of $R_3$, the $SR_9$ group is oxidized to the $SOR_9$ or $SO_2R_9$ group, or the nitroso group is oxidized to the nitro group, or wherein in place of $R_3$ there is a sulfonic acid residue, particularly a sulfonic acid halogenide, a sulfonic acid ester or a sulfonic acid anhydride, this sulfonic acid derivative is reacted with an amine of Formula 28

$$R_1R_2NH \quad 28$$

or in a compound of Formula 1 (wherein $R_3$ represents H and $R_4$ and $R_5$ represent simultaneously together a tetramethylene group optionally containing one to two double bonds) wherein, in place of $R_6$ there are the substituents mentioned above for $R_3$, these substituents are converted in an analogous manner, or q. in a compound of Formula 1 wherein two of the residues $R_4$, $R_5$ and $R_6$ represent H and the third of these residues either represents H; or $NH_2$, OH or SH stands in place thereof, the H atom standing in place of this third residue, or the groups standing in place of this third residue, are replaced, analogously to processes (o) and (p), respectively, by one of the residues F, Hal, $R_9$, $OR_9$ or $SR_9$, or r. compounds of Formula 1 wherein $R_7$ and $R_8$, being identical or different, represent alkyl of one to seven carbon atoms substituted by $OM_1$ or $SM_1$, and wherein one of the substituents $OM_1$ or $SM_1$ can also be replaced by $X_1$, is reacted, under conditions splitting off $H_2O$, $H_2S$ or $M_1X_1$, to O-ring or S-ring containing compounds, or s. compounds of Formula 29

$$A_2-CO-COOH \qquad 29$$

are decarbonylated, or t. compounds of Formula 30

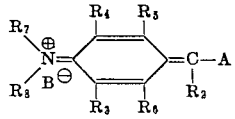

30 are treated with agents giving off hydrogen or with catalytically activated hydrogen, or with a compound of the Formula 14 ($R_9M$), or u. a compound of Formula 1 wherein, in place of A, there is $COOM_1$, $COOR_{14}$, COO-acyl or CO-Hal is optionally reacted with a compound of Formula 31 or with an olefin derived from 31 by formal $H_2O$ splitting-off procedure or with an epoxide derived from 31 by a formal dehydrogenation, or with compounds of Formulas 32 to 36, or with an ethyleneimine derived from 33 by formal dehydrogenation, or with diazomethane, diazoethane, phenyldiazomethane, or hydroxylamine:

$$A_1OH \qquad 31$$
$$A_1OAcyl \qquad 32$$
$$A_2A_3NH \qquad 33$$
$$A_4NH \qquad 34$$
$$A_2-N=C=O \qquad 35$$
$$A_1-X \qquad 36$$

or v. compounds of Formula 1 wherein in place of A there is:

are hydrolyzed to carboxylic acids, esters or amides of Formula 1, or w. $H_2O$ is chemically added to compounds of Formula 1 wherein CN is in place of A, with the formation of amides of Formula 1, or x. compounds of Formula 37 ($Z-CO-CH_3$) are subjected to a Willgerodt reaction in the presence of the amines 33 or 34, particularly with the addition of polysulfides, or compounds of Formula 38 ($Z_2-CA_1=NOH$) are subjected to a Beckmann rearrangement, particularly with the addition of acidic catalysts, or compounds of Formula 39 ($Z_2-CO-A_1$) are subjected to a Schmidt degradation reaction with $HN_3$, or y. an aldehyde of Formula 40

$$Z_2-CHO \qquad 40$$

is reacted with nitrohydroxylamine acid or benzenesulfonyl hydroxylamine, particularly in an alkaline solution, or an aldoxime of an aldehyde of Formula 40 is oxidized, particularly with $H_2O_2$ or peracids, to a hydroxaimic acid of Formula 1, or z. compounds of Formula 1 wherein, in place of A, the group $C(=NR_{15})OR_{14}$ is present, preferably in the form of a salt, are reacted to ortho-esters of Formula 1 with alcohols of Formula 41; or compounds of Formula 42 are reacted with ortho-carbonic acid esters of Formula 43 to ortho-esters of Formula 1:

$$R_9OH \qquad 41$$

$$Z_2-M \qquad 42$$
$$C(OR_9)_4 \qquad 43$$

or za. compounds of Formula 44 are reacted with compounds of Formula 45; or compounds of Formula 46 are reacted with compounds of Formula 47, or compounds of Formula 48 are reacted with compounds of Formula 49 under conditions wherein $M_1X_3$ split off:

$$Z_2-D-A_6-X_3 \qquad 44$$
$$M_1-Y-A_7 \qquad 45$$
$$Z_2-D-A_6-YM_1 \qquad 46$$
$$X_3A_7 \qquad 47$$
$$Z_2-D-A_5-X_3 \qquad 48$$
$$HNA_4 \qquad 49$$

or $M_1X_3$ is split off from compounds of Formulas 50 — 54

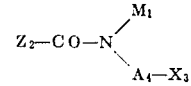

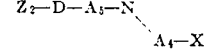

wherein $A_6-Y-A_7$ and $A_8Y$ have the meaning of $A_1$; and $A_9-Y-A_{10}$ has the meaning of $A_4$; or zb. a compound corresponding to Formula 1 except that, in place of at least one double bond of the benzene nucleus or (if $R_4$ and $R_5$ together represent tetramethylene optionally containing one to two double bonds) of the naphthalene nucleus, a saturated C—C bond is present, is treated with dehydrogenating agents, such as, in particular, dehydrogenation or metal oxide catalysts, chloranil, sulfur, selenium or alkyl disulfides; or zc. a compound corresponding to Formula 1 except that, in place of $R_4$ and $R_5$, the residues H and $R_{17}$ are present, is cyclized especially in the presence of acids and/or Lewis acids, such as Friedel-Crafts catalysts or optionally with agents splitting off water, such as $P_2O_5$, $POCl_3$, $PCl_5$ or $COCl_2$ or optionally under other conditions splitting off $HX_4$, $HX_5$ or $HHX_2$; or zd. from a compound corresponding to Formula 1 except that, in place of the residues $R_4$ and $R_5$, there is present a tetramethylene monosubstituted by $X_6$, optionally containing a double bond, or disubstituted by $X_6$, the substituent or substituents $X_6$ is or are eliminated as $HX_6$, with the formation of one or two double bonds; or ze. from a compound corresponding to Formula 1, except that, in place of the residues $R_4$ and $R_5$, there is present a tetramethylene disubstituted by $X_7$ and $X_8$ in the 1,2- or 1,4- or 3,4-position and optionally containing a double bond, the two substituents $X_7$ and $X_8$ are eliminated respectively with the formation of a double bond, especially with metals, such as Zn, Zn—Cu, Na or Li, or with organometallic compounds, such as Grignard compounds or organolithium compounds; and/or zf. a compound of Formula 1 is optionally converted into the physiologically compatible salts thereof with acids or bases or quaternary ammonium salts and/or the derivatives thereof splittable under physiological conditions, particularly the anhydrides; or optionally racemate mixtures of Formula 1 are separated into the individual racemates, and any racemates of Formula 1 present are separated in a conventional manner into their optical antipodes; and/or the compounds of Formula 1 are liberated from their salts with acids or bases.

Suitable alkyl groups in the residues $R_1$ to $R_9$ are: methyl, ethyl, n-propyl, isopropyl, n-butyl, isobutyl, furthermore sec.butyl and tert.butyl. $R_4$ and $R_5$ can represent together — $(CH_2)_4$—, —CH = CH—$(CH_2)_2$—, —$CH_2$—CH = CH—$CH_2$— or —CH = CH—CH = CH—. The residues $R_7$ and $R_8$ moreover represent individually preferably the following:

1-Pentyl, 2-pentyl, 2-methylbutyl, 3-methylbutyl, neopentyl, 3-pentyl, 1-hexyl, 3-methylpentyl, 4-methylpentyl, 3,3-dimethylbutyl, 2,3-dimethylbutyl, heptyl, 4,4-dimethylpentyl, or together, in the form of alkylene residues, optionally in the form of alkylene residues interrupted by O or S, preferably propylene, tetramethylene, pentamethylene, hexamethylene, heptamethylene, octamethylene, 2-oxatetramethylene, 2-oxapentamethylene, 2-oxahexamethylene, 3-oxapentamethylene, 3-oxahexamethylene, 3-oxaheptamethylene, 3-oxaoctamethylene, 4-oxaheptamethylene, 4-oxaoctamethylene, 2-thiatetramethylene, 2-thiapentamethylene, 2-thiahexamethylene, 3-thiapentamethylene, 3-thiahexamethylene, 4-thiaheptamethylene, 4-thiaoctamethylene, 3-thiaheptamethylene, 3-thiaoctamethylene, 1-methyltetramethylene, 2-methyltetramethylene, 1-ethyltetramethylene, 2-ethyltetramethylene, 1-propyltetramethylene, 2-propyltetramethylene, 1-isopropyltetramethylene, 2-isopropyltetramethylene, 1-methylpentamethylene, 2-methylpentamethylene, 3-methylpentamethylene, 1-ethylpentamethylene, 2-ethylpentamethylene, 3-ethylpentamethylene, 1isopropylpentamethylene, 2-isopropylpentamethylene, 3-isopropylpentamethylene, 1-propylpentamethylene, 2-propylpentamethylene, 3-propylpentamethylene, 1,2-dimethylpentamethylene, 1,3-dimethylpentamethylene, 1,4-dimethylpentamethylene, 1,5-dimethylpentamethylene, 1-methyl-2-ethyl-pentamethylene, 1-methyl-3-ethylpentamethylene, 1-methyl-4-ethylpentamethylene, 1-methyl-5-ethylpentamethylene, 1,2-diethylpentamethylene, 1,3-diethylpentamethylene, 1,4-diethylpentamethylene, 1,5-diethylpentamethylene, 2,3-diethylpentamethylene, 2,4-dimethylpentamethylene, 3,3-diethylpentamethylene, 1-methyl-3-oxapentamethylene, 2-methyl-3-oxapentamethylene, 1,2-dimethyl-3-oxapentamethylene, 2,4-dimethyl-3-oxapentamethylene, 1,5-dimethyl-3-oxapentamethylene, 1-ethyl-3-oxapentamethylene, 2-ethyl-3-oxapentamethylene, 1-ethyl-2-methyl-3-oxapentamethylene, 2-ethyl-4-methyl-3-oxapentamethylene, 1-ethyl-5-methyl-3-oxapentamethylene, 1,2-diethyl-3-oxapentamethylene, 2,4-diethyl-3-oxapentamethylene, 2,5-diethyl-3-oxapentamethylene, 1-isopropyl-3-oxapentamethylene, 2-isopropyl-3-oxapentamethylene, 1-isopropyl-2-methyl-3-oxapentamethylene, 2-isopropyl-4-methyl-3-oxapentamethylene, 1-isopropyl-5-methyl-3-oxapentamethylene, 1-methyl-3-thiapentamethylene, 2-methyl-3-thiapentamethylene, 1,2-dimethyl-3-thiapentamethylene, 2,4-dimethyl-3-thiapentamethylene, 1,5-dimethyl-3-thiapentamethylene, 1-ethyl-3-thiapentamethylene, 2-ethyl-3-thiapentamethylene, 1-ethyl-2-methyl-3-thiapentamethylene, 2-ethyl-4-methyl-3-thiapentamethylene, 1-ethyl-5-methyl-3-thiapentamethylene, 1,2-diethyl-3-thiapentamethylene, 2,4-diethyl-3-thiapentamethylene, 1,5-diethyl-3-thiapentamethylene, 1-isopropyl-3-thiapentamethylene, 2-isopropyl-3-thiapentamethylene, 1-isopropyl-2-methyl-3-thiapentamethylene, 2-isopropyl-4 - methyl-3-thiapentamethylene or 1-isopropyl-5-methyl-3-thiapentamethylene.

The residues $A_1$, $A_2$ and $A_3$ represent preferably the following:

Hydrogen, methyl, ethyl, n-propyl, isopropyl, n-butyl, isobutyl, sec.-butyl, tert.-butyl, n-pentyl, isoamyl, n-hexyl, n-heptyl, n-octyl, n-decyl, n-dodecyl, allyl, crotyl, hydroxymethyl, propargyl, 2-hydroxyethyl, 2-hydroxy-n-propyl, 3-hydroxy-n-propyl, 2-methoxyethyl, 2-ethoxyethyl, 3-oxa-5-hydroxypentyl, 3-oxa-5-methoxypentyl, 3-oxa-5-butoxypentyl, 3,6-dioxa-8-hydroxyoctyl, 3,6-dioxa-8-methoxyoctyl, 3-oxa-5-ethoxypentyl, 2-aminoethyl, 3-aminopropyl, 2-dimethylaminoethyl, 2-diethylaminoethyl, 2-di-n-propylaminoethyl, 3-dimethylaminopropyl, 3-diethylaminopropyl, 2-methyl-3-diethylaminopropyl, cyclohexyl, cyclopentyl, 2-cyclohexylethyl, 3-cyclohexyl-propyl, N-methylpiperidyl-(4), (N-methylpiperidyl-3 3)-methyl, 2-(N-methylpiperidyl-2)-ethyl, 2-piperidinoethyl, 2-pyrrolidinoethyl, 2-homopiperidinoethyl, 2-morpholinoethyl, 2-thiomorpholinoethyl, 2-(N-methylpiperazino)-ethyl, 2-(N-ethylpiperazino)-ethyl, 2-(N-phenylpiperazino)-ethyl, 2-(N-2-hydroxy-ethylpiperazino)-ethyl, 2-(N-methylhomopiperazino)-ethyl, 3-piperidinopropyl, 3-pyrrolidinopropyl, 3-(N-methylpiperazino)-propyl, 3-(N-ethylpiperazino)-propyl, 3-(N-phenylpiperazino)-propyl, 3-morpholino-propyl, 3-thiomorpholino-propyl, 2-morpholinopropyl, 2-piperidinopropyl, 2-pyrrolidino-propyl, 2-(N-methylpiperazino)-propyl, 2-methyl-3-morpholino-propyl, 2-methyl-3-piperidino-propyl, 2-methyl-3-pyrrolidino-propyl, 1-dimethylaminobutyl, 1-diethylaminobutyl, 2-mercaptoethyl, 2-methylmercaptoethyl, 2-ethylmercaptoethyl, 3-methylmercaptopropyl, 3-ethylmercaptopropyl, phenyl, benzyl, p-ethylphenyl, p-methylbenzyl, o-tolyl, p-tolyl, 2-phenylethyl, 1-naphthyl, 2-naphthyl or 1-phenylethyl.

In $CONA_4$, —$NA_4$ represents preferably piperidino, pyrrolidino, morpholino, thiomorpholino, N-methylpiperazino, N-ethylpiperazino, N-propylpiperazino, N-phenylpiperazino, N-(2-hydroxyethyl)-piperazino, piperazino, N-methylhomopiperazino or N-phenylhomopiperazino.

$A_5$ represents preferably ethylene, propylene, butylene, methylethylene, 1methylpropylene, 1-methylbutylene or pentylene.

N-alkyl in Y represents preferably methylamino, dimethylamino, ethylamino, diethylamino, n-propylamino, di-n-propylamino, isopropylamino, diisopropylamino, n-butylamino, n-propylmethylamino, isobutylamino, sec.-butylamino, tert.-butylamino or methylethylamino.

In $C(OR_9)_3$, $R_9$ represents preferably methyl, ethyl, n-propyl and n-butyl.

The above-mentioned processes will now be described in greater detail:

a. The saponification of suitable functional acid derivatives of carboxylic acids of Formula 1 can be conducted, as set forth in greater detail in the literature, in a neutral, acidic or alkaline medium at temperatures between —20° and 300°. Acids suitable for hydrolysis are, for example, especially hydrochloric, sulfuric, phosphoric and hydrobromic acid; suitable bases are sodium, potassium or calcium hydroxide, or sodium or potassium carbonate. Preferred solvents are water, ethanol, methanol, dioxane, tetrahydrofuran, dimethyl formamide or mixtures thereof, particularly the mixtures which contain water. However, it is also possible to saponify the acid derivatives to form aminophenylacetic acids of Formula 1, for example, in ether or benzene, with the addition of strong bases, such as potassium carbonate or without solvents by melting together with alkalis, such as potassium and/or sodium hydroxide or alkaline earths.

A particularly preferred embodiment of the invention is the saponification of corresponding thioamides, e.g., the correspondingly substituted phenylthioacetomorpholides, -piperidides,-pyrrolidides, -dimethylamides or -diethylamides. Such thioamides are obtainable by reaction of the correspondingly substituted acetophenones with sulfur and the corresponding amine. Also the amides, obtainable by reacting the acetophenones with ammonium polysulfide in accordance with the method by Willgerodt known from the literature, are highly suitable as starting materials. The thioamides or amides are preferably hydrolyzed by heating with aqueous hydrochoioric acid. The thioamides or amides need not be necessarily isolated, in this connection; rather, it is also possible to subject the reaction mixture to hydrolysis in situ. By the dry heating of suitable esters of Formula 1, such as tertiary alkyl esters in particular, to temperatures between 50° and 350°, the aminophenylacetic acids of Formula 1 are obtained. The thermolysis can also be conducted in inert solvents, such as benzene, water, dimethyl formamide, ethylene glycol, glycerin, dimethyl sulfoxide, cyclohexanol, preferably with the addition of catalytic amounts of acids, such as p-toluenesulfonic acid.

b. The oxidation of suitable preliminary products of Formula 2 containing a group oxidizable to a carboxyl group, to obtain the aminophenylacetic acids of Formula 1 of this invention, can be conducted with various oxidation agents, as set forth in the literature, particularly with air or oxygen, preferably with the addition of catalysts, such as Mn, Co, Fe, Ag, $V_2O_5$; with silver oxide, preferably together with copper oxide; with $H_2O_2$, preferably in the presence of alkalis; with organic peracids, such as peracetic acid, perbenzoic acid or perphthalic acid; with potassium permanganate in an aqueous or acetonic solution and/or in an acidic, neutral or alkaline reaction medium, optionally with the addition of $MgSO_4$; with chromic acid or $CrO_3$, preferably in glacial acetic acid, if desired, with the addition of benzene, or sulfonic acid; with nitrous acid; with preferably 2-68 percent nitric acid, if desired under pressure (up to 100 atmospheres); with nitrogen oxides or with sodium or potassium hydroxide/$O_2$ in a melt; or with hypohalogenites. In these oxidation processes, the reaction is preferably conducted in inert solvents, such as water, glacial acetic acid, dioxane, benzene, acetone, tetrahydrofuran, dimethyl formamide, ethanol, methanol, or in the mixtures of these solvents with one another, and at temperatures between −30° and 300°, suitably at room temperature.

c. ω-Diazoacetophenones of Formula 3, obtained from the corresponding benzoic acids by way of the acid chlorides with diazoalkanes, can be rearranged into the compounds of Formula 1 in accordance with the method of Wolff, as described in grater detail in the literature, for example, by heating and/or exposure to light and/or in the presence of catalysts, such as copper, silver or silver oxide, as well as in the presence of a compound $A_1OH$, an amine $A_2A_3NH$ or $A_4NH$ or hydroxylamine, wherein $A_1$ to $A_4$ have the above-indicated meanings, at temperatures of preferably between 0° and 120°. In order to produce the free aminophenylacetic acids (1, A = COOH), the reaction is suitably conducted in an alkaline solution with the addition of sodium thiosulfate, first at 40° – 60°, and thereafter at 80° – 100°. Advantageously, inert organic solvents are added to the reaction mixture, such as dioxane or tetrahydrofuran.

d. Organometallic compounds of Formula 4 are obtainable by metallizing correspondingly substituted benzyl halogenides, particularly with alkali or alkaline earth metals, preferably with lithium or magnesium, or with dialkylcadmium or dialkylzinc compounds. These compounds yield with solid $CO_2$, in accordance with conventional methods described in the literature, the aminophenylacetic acids of Formula 1. The metallization, such as, for example, the Grignardation, is conducted in solvents, such as ether, tetrahydrofuran, dioxane, or mixtures thereof with aromatic hydrocarbons, such as benzene, at temperatures between preferably −10° and the boiling temperature of the solvents employed. Preferably, a large excess of a mixture of magnesium filings and magnesium powder is employed, and during the Grignardation, a vigorous stream of carbon dioxide is passed through the reaction mixture, in order to suppress an organometallic synthesis of the thus-formed Grignard compounds with still unreacted halogenide. In place of the Grignard compounds, it is also possible to employ other compounds, especially the organometallic compounds described in greater detail above, which are obtainable in an analogous manner.

e. ω-Halogenoacetophenones of Formula 5, producible by halogenating the corresponding acetophenones, or from the ω-diazoacetophenones of Formula 3 with hydrogen halide in ether, can be arranged into acids of Formula 1 in accordance with the method of Faworskij, described in the literature, for example, in boiling xylene in the presence of a strong base, such as sodium hydroxide, or by heating in an aqueous ethanolic silver nitrate solution.

f. Benzyl alcohols of Formula 6, producible by reducing the corresponding benzaldehydes or benzoic acids, can be carbonylated into aminophenylacetic acids of Formula 1, as described in the literature, at high pressures of up to 400 atmospheres and at high temperatures of up to 300°, preferably with the addition of heavy metal catalysts, such as nickel carbonyls or cobalt carbonyls or halogenides. It is also possible to employ the corresponding alcoholates, such as, in particular, alkali metal alcoholates (e.g., sodium ethoxide)or alkaline earth metal alcoholates (e.g., calcium alcoholate, and at lower pressures, without the addition of heavy metal catalysts.

Finally, it is possible to carbonylate alcohols, esterified alcohols or halogenides of Formulas 6 and 7, respectively, to form the compounds of Formula 1 of this invention, in accordance with the method by Koch-Haaf described in the literature; in this connection, a preferred source of carbon monoxide is a mixture of formic acid and mineral acids, particularly concentrated sulfuric acid. The reaction is conducted at −20° to 120°, suitably under cooling at 0° to 30°. In compounds of Formula 7, the respective substituent is exchanged for hydrogen, $B_2$ becomes $R_1$, and, by way of the carbonylation reaction, carboxylic acids of Formula 1 are produced.

g. Malonic acid derivatives of Formula 8, producible by thermal decomposition of correspondingly substituted phenyloxalacetic acid diethyl esters and subsequent partial or complete alkaline saponification, can be decarboxylated to the compounds of Formula 1 as described in the literature, for example, by dry heating, or by heating in solvents, such as water, ethanol, dioxane or xylene, to temperatures of between 50° and 250°. Suitably, the heating is continued until the evolution of carbon dioxide has ceased.

h. Furthermore, substituted 4-aminophenylacetic acids of Formula 1 are obtainable by acid cleavage of a correspondingly substituted α-acyl-phenylacetic acid derivative of Formula 2, as described in greater detail in the literature.

Ketoesters of Formula 9 can be prepared, for example, by condensing esters of acetic or benzoic acid with correspondingly substituted benzyl cyanides to form the α-acetyl- or α-benzoyl-benzyl cyanides, subsequent conversion of the latter compounds with hydroxy compounds of the formula $A_1OH$ wherein $A_1$ has the above indicated meanings (except for hydrogen), into the corresponding imido ether salts (e.g., hydrochlorides), and partial hydrolysis.

Acid cleavage of the keto derivatives of Formula 9 can be accomplished by treatment with a strong base, such as sodium, potassium or calcium hydroxide in solvents, such as water, methanol, ethanol, tetrahydrofuran, dioxane, benzene, ether, or mixtures thereof. The temperature range of the reaction is between −10° and 200°. If it is desired to obtain the free aminophenylacetic acids of Formula 1 (A = COOH), then the reaction mixture is preferably heated for several hours to the boiling temperature of the solvent.

i. It is also possible to obtain a compound of Formula 1 by starting with a preliminary product containing, in addition or in place of hydrogen atoms, one or several groups substitutable by hydrogen and/or —C = N— and/or C = C double bonds and/or C ≡ C triple bonds, and treating this preliminary product with agents evolving hydrogen. Groups substitutable by hydrogen are, in particular: Hal; oxygen in an N-oxy, sulfinyl or carbonyl group; sulfur in a thiocarbonyl group; hydroxyl; mercapto; amino; hydroxyl, mercapto or amino substituted by a hydrocarbon residue; or diazonium salt groups.

Thus, it is possible to reduce, for example, α-hydroxy-, α-chloro-, α-bromo-, α-iodo-, α-mercapto-, α-amino-, α-benzyloxy-, α-benzylamino-, α-oxo- or α-thio-3,5-dimethyl-4-piperidino-phenylacetic acid, or the ethyl ester thereof, to 3,5-dimethyl-4-piperidino-phenylacetic acid or the ethyl ester thereof; or α-hydroxy-, α-chloro-, α-bromo-, α-iodo-, α-mercapto-, α-amino-, α-benzyloxy-, α-benzylamino-, α-oxo- or α-thio-3,6-dimethyl-4-piperidino-phenylacetic acid to 3,6-dimethyl-4-piperidino-phenylacetic acid. It is also possible to reduce 3-butyryl-, 3-thiobutyryl-, 3-(1-hydroxybutyl)-, 3-(1-aminobutyl)-, 3-(1-chlorobutyl)-, 3-(1-bromobutyl)-, 3-(1-iodobutyl)-, 3-(1-benzyloxybutyl)-, 3-(1-benzylaminobutyl)-, 3-(1-mercaptobutyl)-, or 3-(1-benzylmercaptobutyl)-4-pyrrolidino-α-methyl-phenylacetic acid, or the 2- diethylaminoethyl esters thereof, to 3-n-butyl-4-pyrrolidino-α-methyl-phenylacetic acid or the 2-diethylaminoethyl ester thereof, and to reduce 3-butyryl-, 3-thiobutyryl, 3-(1-hydroxybutyl)-, 3-(1-aminobutyl)-, 3-(1-chlorobutyl)-, 3-(1-bromobutyl)-, 3-(1-iodobutyl)-, 3-(1-benzyloxybutyl)-; 3-(1-benzylaminobutyl)-, 3-(1-mercapto-butyl)- or 3-(1-benzylmercaptobutyl)2-ethoxy-4-pyrrolidino-α-methyl-phenylacetic acid 2'-diethylaminoethyl ester to the 2'-diethylaminoethyl ester of 3-n-butyl-2-ethoxy-4-pyrrolidino-α-methyl-phenylacetic acid. Likewise it is possible to reduce 3-vinyl-α-ethyl-, 3-ethynyl-α-ethyl-, 3-ethyl-α-vinyl- or 3-ethyl-α-ethynyl-4-homopiperidino-phenylacetic acid or the 2-piperidinoethyl esters thereof to 3,α-diethyl-4-homopiperidino-phenylacetic acid or the 2-piperidinoethyl ester thereof, or to reduce 3-vinyl-α-ethyl-, 3-ethynyl-α-ethyl-, 3-ethyl-α-vinyl- or 3-ethyl-α-ethynyl-4-homopiperidino-6-isopropyl-mercapto-phenylacetic acid 2'-piperidinoethyl ester to the 2'-piperidinoethyl ester of 3,α-diethyl-4-homopiperidino -6-isopropyl-, mercapto-phenylacetic acid.

Furthermore, 4-(n-butylamino)-3-sulfamoyl-5-ethoxyphenylacetic acid or the isopropyl ester thereof can be alkylated, under hydrogenating conditions, with propionaldehyde, butyraldehyde, acetone, butanone-(2) to obtain 4-(n-butylpropylamino)-, 4-(dibutylamino)-, 4-(n-butylisopropylamino)- or 4-(n-butyl-sec. butylamino)-3-sulfamoyle-5-ethoxy-phenylacetic acid or the isopropyl esters thereof. Also, sulfinyl compounds can be reduced to thioethers, such as, for example, 3-methyl-sulfinyl-, 3-methyl-5-ethylsulfinyl-, 3-isopropyl-5-isopropyl-sulfinyl-, 3-methyl-sulfinyl-2-sec.butoxy-, 3-ethyl-sulfinyl-2-methyl- or 3-isopropyl-sulfinyl-6-methoxy-4-homopiperidino-phenylacetic acid N'-(2diethylamino-ethyl)-amide to the corresponding thioethers. Still further, it is possible, for example, to cleave hydrogenolytically the benzyl-, diphenylmethyl-, triphenylmethyl- or α-picolyl-esters of 3-trifluoromethyl-, 3-tert. butyl-, 3ethylmercapto-, 3-sulfamoyl-, 3-isopropoxy- or 3-hydroxy-4-morpholino-α-ethyl-phenylacetic acid or -6,α-diethyl-phenylacetic acid or -α-ethyl-naphthyl-1-acetic acid to readily obtain the free carboxylic acids, or, for example, to remove the benzyl group in the benzyl amide of 4-piperidino-naphthylacetic acid under hydrogenating conditions.

The hydrogenation of unsaturated quaternary ammonium salts and N-oxides of Formula 10 is important. Thus 3-ethyl-sulfonyl-, 3-methylsulfonyl-5- or -6-ethoxy-, 3-diethylsulfamoyl- or 3-trifluoro-methyl-5-methoxy-4-pyridinium-α-n-propyl-phenylacetic acid bromide or the corresponding ethyl esters thereof, or 3-trifluoromethyl-4-pyridinium-α-n-propyl-naphthyl-1acetic acid ethyl ester bromide, can be reduced to the 4-piperidino derivatives thereof. Likewise, 3-nitro-5- or 6- ethoxy- or 3-nitro-5- or -6-isopropyl-4-pyridinium-α-methyl-phenylacetic acid n-butyl ester chloride or 3-nitro-4-pyridinium-α-methyl-naphthyl-1-acetic acid n-butyl ester chloride can be hydrogenated to the 3-amino-4-piperidino compounds. Also, it is possible without difficulties to reduce, for example, 3,5- or 2,3-dimethyl-4-piperidino-α-methyl-phenylacetic acid N-oxide or 3-methyl-4-piperidino-α-methyl-naphthyl-1-acetic acid dodecyl ester N-oxide to form the N-oxide-free derivatives.

Likewise of importance are the hydrogenation processes involving naphthalene or tetralone derivatives to the 5,6-, 6,7-, 7,8-dihydro- and 5,6,7,8 -tetrahydronaphthalenes. Thus, 4-piperidino-ε-methyl-naphthyl-1-acetic acid and the ethyl ester of 2-ethoxy-4-pyrrolidino-5oxo-5,6,7,8-tetrahydronaphthyl-1-acetic acid can be hydrogenated to the corresponding 5,6,7,8-tetrahydro-naphthlene derivatives, and 4-homopiperidino-naphthyl-1-acetic acid can be hydrogenated to the corresponding 5,6- or 6,7- or 7,8-dihydro- or 5,6,7,8-tetrahydronaphthalene compound.

For catalytic hydrogenation and/or hydrogenolysis reactions suitable catalysts are, for example, noble metal, nickel and cobalt catalysts. The noble metal catalysts can be present on substrates (e.g., palladium on charcoal, calcium carbonate or strontium carbonate), in the form of oxide catalysts (e.g., platinum oxide), or finely distributed metallic catalysts.

Nickel and cobalt catalysts are suitably employed as Raney metals, nickel can also be utilized on kieselguhr or pumice as the support. The hydrogenation can be conducted at room temperature and normal pressure, or also at elevated temperatures and/or elevated pressures. Preferably, pressures of between 1 and 100 atmospheres and temperatures of between $-80°$ and $200°$, particularly between room temperature and $+100°$ are employed. The reaction is suitably conducted in the presence of a solvent, such as water, methanol, ethanol, isopropanol, n-butanol, ethyl acetate, dioxane, acetic acid or tetrahydrofuran; it is also possible to employ mixtures of these solvents with one another. For purposes of hydrogenation, the free compounds or the corresponding salts thereof, e.g., the hydrochlorides or sodium salts, can be employed.

When hydrogenating unsaturated bonds and in the hydrogenolysis of benzyl groups, the process is preferably conducted at normal pressure, in such a manner that the hydrogenation is interrupted after the stoichiometric quantity of hydrogen has been absorbed. Fundamentally, it is possible to operate in an acidic, neutral or basic range. For such commands which contain a C = N double bond, a reaction in a neutral or basic medium is preferred.

Also generally applicable as a reduction method is the reaction with nascent hydrogen. The latter can be produced, for instance, by treating metals with acids or bases. Thus, it is possible to employ, for example, a mixture of zinc with acid or alkali solution; iron with hydrochloric acid or acetic acid; or tin with hydrochloric acid. Likewise suitable is sodium or another alkali metal in a lower alcohol, such as ethanol, isopropanol or butanol. Furthermore, it is possible to use an aluminum-nickel alloy in an alkaline-aqueous solution, optionally with the addition of ethanol. Also, sodium or aluminum amalgam in an aqueous-alcoholic or aqueous solution are suitable for the production of nascent hydrogen. The reaction can also be conducted in a heterogeneous phase; in this connection, an aqueous phase and a benzene or toluene phase are preferred. The reaction temperatures employed generally range between room temperature and the boiling point of the solvent used.

Still further suitable reducing agents are complex metal hydrides, such as, in particular, lithium aluminum hydride, and also sodium borohydride, in the presence of aluminum chloride or lithium bromide. The reaction conditions must be selected so that the group A (A having the previously indicated meanings) remains intact. Suitably, the reaction is conducted in an inert solvent, e.g., ether, tetrahydrofuran, ethylene glycol dimethyl ether. The, reaction is advantageously terminated by boiling the reaction mixture. The thus-formed metal complexes can be decomposed in a conventional manner, for example with an aqueous ammonium chloride solution.

Additional suitable reducing agents are, e.g., sodium dithionite in an alkaline or ammoniacal solution; iron(II)-hydroxide; tin(II)-chloride; hydrogen sulfide, metal hydrogen sulfides, sulfides and polysulfides; hydriodic acid or sodium sulfite.

It is also possible to reduce one or several carbonyl groups to $CH_2$ groups in accordance with methods known from the literature, by Clemmensen or Wolff-Kishner.

The Clemmensen reduction can be conducted, for example, by treating the carbonyl compounds with a mixture of zinc and hydrochloric acid, with amalgamated zinc and hydrochloric acid, or with tin and hydrochloric acid. The reaction is conducted either in an aqueous-alcoholic solution or in a heterogeneous phase with a mixture of water and benzene or toluene. The reaction is terminated by heating the reaction mixture to the boiling point of the solvent employed. The metal can either be provided first, and the acid added dropwise, or, conversely, the acid can be provided and the metal added in incremental portions.

The Wolff-Kishner reduction is conducted by treating the carbonyl compounds with anhydrous hydrazine in absolute ethanol in an autoclave or a bomb tube; the reaction temperatures being as high as $250°$. A preferred catalyst is sodium alcoholate. The reduction can also be varied in accordance with the HuangsMinlon method, by employing hydrazine hydrate as the reducing agent, and conducting the reaction in a high-boiling solvent miscible with water, such as, for example, diethylene glycol or triethylene glycol, as well as in the presence of an alkali, such as, for example, sodium hydroxide. The reaction mixture is normally boiled for about 3–4 hours. Thereafter, the water is distilled off, and the residue is heated for some time to temperatures of up to about 200°, resulting in decomposition of the previously formed hydrazone, and the originally present carbonyl group is converted into a $CH_2$ group during this procedure.

It is further possible to replace Hal atoms, particularly aromatically bound Hal atoms, by hydrogen; this is done by converting the corresponding Hal compounds into the organometallic, e.g., Grignard, compounds associated therewith, and hydrolyzing the latter compounds with water or dilute acids.

Basically, all conventional reducing methods described in the literature can be employed, depending upon which of the above-mentioned starting materials is selected.

j. It is possible to form compounds of Formula 1 from organometallic compounds of Formula 11, particularly with alkyl halogenides, preferably iodides, bromides or chlorides, or with alkylsulfuric or alkylsulfonic acid esters of Formula 12, in inert solvents, such as benzene, xylene, dioxane or tetrahydrofuran. Preferably, Friedel-Crafts catalysts, such as $AlCl_3$, $FeCl_3$ or $ZnCl_2$ are added to the reaction mixtures. These organometallic compounds are especially alkali, alkaline earth, Zn or Cd compounds, or the alkaline earth-, Zn- or Cd-Hal compounds obtained by direct metallization, such as, for example, with butyllithium, phenyllithium, sodium hydride, sodium amide or metallic sodium or magnesium, of the corresponding hydrogen or halogen compounds.

On the other hand, compounds of Formula 13, particularly the correspondingly substituted α-chloro-, α-bromo- or α-iodo-phenylacetic acid derivatives, or the α-hydroxy-phenylacetic acid derivitives esterified with sulfuric acid or sulfonic acid derivatives, can be alkylated under quite analogous conditions, with metallic compounds of Formula 14, particularly alkali metal derivatives, such as butyllithium or methylsodium, or Grignard compounds, such as n-propyl-magnesium chloride.

k. Compounds of Formula 1 can also be obtained by reacting the halogen compounds of Formula 15 with preferably Grignard or organolithium compounds of Formula 16 derived from correspondingly substituted haloacetic acid derivatives. Advantageously, the bromo- or iodoacetic acid derivatives are employed. The reaction is conducted in inert solvents, such as ether, tetrahydrofuran or dioxane, at temperatures between 0° and 180°. Under the same conditions, it is likewise possible to react phenyllithium or Grignard compounds of Formula 17 with substituted haloacetic acid derivatives of Formula 18, preferably with the bromoacetic or iodoacetic acid derivatives, in order to obtain the compounds of Formula 1.

Furthermore, it is possible to react compounds of Formula 17 wherein Q represents hydrogen with compounds of Formula 18, preferably with correspondingly substituted α-iodo-, α-bromo-, α-chloro-, α-hydroxy- or α-acyloxyacetic acid derivatives, under the conditions of a Friedel-Crafts alkylation, to obtain the compounds of Formula 1. Examples for catalysts suitable in this connection are Lewis acids, such as $AlCl_3$, $SbCl_5$, $FeCl_3$, $BF_3$, $ZnCl_2$ or mineral acids, e.g., HF, $H_2SO_4$, $H_3PO_4$, or the anhydrides thereof, such as $P_2O_5$. Preferably, the reaction is conducted in inert solvents, such as carbon disulfide, hexane or nitrobenzene, and at temperatures between 0° and 200°. In general, the methods are employed which are set forth in the literature. 1. The reaction of amines of Formula 20 with compounds of Formula 19, or the reaction of amines of Formula 21, 22 or 23 with alkyl compounds of Formula 24 or 25, respectively, is conducted basically in accordance with the interchange reactions which are conventional and described in the literature. If, as the reaction component, a halogenide of Formula 19, 24 or 25 is selected, the reaction can be conducted in the presence or absence of a solvent. Examples of solvents are lower aliphatic alcohols, benzene or toluene. Depending upon which halogenide is employed as the starting material, the reaction is conducted at low temperatures, e.g., room temperature, or at elevated temperatures up to the boiling temperature of the solvent employed. In individual cases, it may be necessary to conduct the reaction under pressure or at elevated temperatures. The utilization of a catalyst, e.g., a base, is possible, but normally unnecessary. Advantageously, the amines are employed in excess.

If a phenol of Formula 19 ($X_1 = _{OH}$) or an alcohol of the Formula 24 ($X_1 = OH$), or a preferably lower aliphatic carboxylic acid ester of such a phenol or alcohol is employed as the starting substance, then the reaction with the amines is suitably carried out in the presence of a catalyst. A suitable catalyst is either a dehydrating or a dehydrogenating agent, or a mixture of these catalysts. An example of a dehydrating catalyst is aluminum oxide optionally activated with still other suitable oxides. As the dehydrogenation agents, there can be employed, for example, Raney nickel or the conventional noble metal catalysts, such as, e.g., palladium oxide or palladium charcoal.

As the starting material for this reaction, it is also possible to employ a compound of Formula 19 or 24 or 25 wherein $X_1$ represents a secondary or tertiary amino group. Under the reaction conditions of a so-called transamination, such a secondary or tertiary amino group in compounds of Formula 19 is exchanged, by treatment with amines of Formula 20, by the group $R_7R_8N-$.

In a completely analogous manner, it is possible to exchange, by means of a transamination reaction, a secondary or tertiary amino group in compounds of Formula 24 or 25, reaction with amines of Formula 21 or 22 or 23, against the group $-NH-Z_1$ or $-NR_7-Z_1$ or $-NR_8Z_1$, respectively.

The reaction conditions for such a transamination are described in the literature. Advantageously, the amines of Formula 19 or 24 or 25 are employed in an excess, and the reaction is conducted in the presence of catalysts, such as acids, metallic salts, iodine, dehydration agents, hydrogenation-dehydrogenation catalysts, or sodium hydrogen sulfide. However, in isolated cases, such transaminations also take place in the absence of a catalyst. It is suitable to conduct the reactions in the presence of an inert solvent, and it is furthermore advantageous to operate under an elevated pressure as well as at elevated temperatures.

Furthermore, it is possible to reductively alkylate the amines 22 or 23 with aldehydes or ketones of one to seven carbon atoms; in this connection, these aldehydes or ketones can also be bound to the $R_7$ or $R_8$ residues of the amines 22 or 23, respectively, either directly or by way of a hetero-atom, such as O or S. Aldehyde-ammonia compounds are produced as the intermediates in each case, i.e., compounds carrying a hydroxy group in the α-position with respect to the nitrogen, the hydroxy group is then removed by hydrogenolysis in accordance with the reducing methods explained in paragraph (i).

Preferably, the reductive alkylating processes are conducted in the presence of a suitable catalyst, examples of such catalysts being the conventional types, such as noble metal, Raney nickel or Raney cobalt. These catalysts can be present, for example, in the form of oxide catalysts, supported catalysts, or of finely divided metal catalysts. Suitably, the reaction is conducted under an elevated hydrogen pressure, as well as at elevated temperatures (up to about 250°).

Such a reductive alkylation can also be carried out with chemical reducing agents, such as, for example, with formic acid, formamide or ammonium formiate, in accordance with the method of Leuckart-Wallach, as described in detail in the literature.

Preferred compounds of Formula 19 in this connection are p-iodo-, p-bromo- or p-chlorophenylacetic acid derivatives. By the effect of groups strongly attracting electrons, such as, for example, $NO_2$, CN, $SO_2NH_2$, acylamino or $CF_3$, the Hal atom is "loosened" in the 3-position and/or, if applicable, in the 2-, 5- or 6-position which facilitates the reaction with the secondary amines of Formula 20.

The reaction is conducted, depending upon the reactivity of the p-halophenylacetic acid derivatives, preferably between room temperature and 320°, optionally in an autoclave under pressure (up to 200 atmospheres). It is possible, in this connection, to employ the amines of Formula 20 to be reacted in each particular case, such as piperidine, morpholine or pyrrolidine, in a large excess to simultaneously function as the solvent. Otherwise, the reaction is preferably conducted in inert solvents, such as chloroform, benzene, dioxane, tetrahydrofuran, dimethyl formamide, dichlorobenzene or ethylene glycol, using acid-binding additives, such as sodium or potassium carbonate.

Thus, it is simple to produce, for example, form 3-nitro-, 3-cyano-, 3-methylsulfonyl- or 3-sulfamoyl-4-bromo-$\alpha$-methyl-phenylacetic acid or the N'-(2-piperidinoethyl)-amides thereof, or from 3-nitro-, 3-cyano-, 3-methylsulfonyl- or 3-sulfamoyl-4-bromo-6-methylmercapto-$\alpha$-methyl-phenylacetic acid, or from 3-nitro-, 3-cyano-, 3-methylsulfonyl- or 3-sulfamoyl-4-bromo-$\alpha$-methyl-naphthyl-1-acetic acid, by reaction with piperidine, homopiperidine, thiomorpholine or pyrrolidine, the corresponding 4-piperidino-, 4-homopiperidino-, 4-thiomorpholino- or 4-pyrrolidino-phenylacetic acid derivatives or the -naphthyl-1-acetic acid derivatives.

When reacting primary amines of Formula 21 with compounds of Formula 24 or 25, respectively, the latter and former can also be present as one compound (due to the definition of the residues $R_7$ and $R_8$), for example, $\omega,\omega$-dihalogenoalkanes, such as 1,4-dibromobutane, 1,5-dichloropentane, 1,6-diiodohexane, 2,2'-dichloroethyl ether, or 3,3'-dibromo-di-n-propyl sulfide; and especially sulfur- or oxygen-ring compounds, such as tetrahydrofuran, -pyran, -thiophene or -thiopyran. The reaction of such sulfur- or oxygen-ring compounds of amines of Formula 21 is generally conducted under severe conditions, preferably at temperatures above 150° in an autoclave.

m. It is likewise possible to alkylate the primary amines of Formula 21 or the secondary amines of Formula 22 or 23, respectively, to the compounds of Formula 1, with olefines of two to seven carbon atoms. If the alkylation of compounds of Formula 21 is involved, two identical or two different olefins as the alkenyls can also be connected to form alkadienes, such as pentadiene-1,4, or, by way of an oxygen or sulfur atom, to di-unsaturated ethers or thioethers, such as divinyl sulfide or divinyl ether. When alkylating secondary amines of Formula 22 or 23 with an olefin, this alkenyl can also be connected with one of the residues $R_7$ or $R_8$, either directly or by way of an oxygen or sulfur atom.

Such addition reactions of olefins to primary or secondary amines are described in the literature. Suitably, the reaction is conducted at an elevated pressure (up to about 300 atmospheres) and at an elevated temperature (up to about 350°). It is advisable to add a catalyst during this reaction, such as, for example, a cobalt or molybdenum catalyst, or an alkali metal, such as sodium, for example. In these reactions, it is advantageous to employ the amines of Formula 21, 22 or 23 in excess.

n. The reaction of a compound of Formula 26 with a haloamine of Formula 27 is conducted under the conditions of a Friedel-Crafts alkylation of aromatics as described in greater detail in paragraph (k) and in the literature. Thus, it is possible, for example, to react 3,$\alpha$-dimethyl-phenylacetic acid or 3,$\alpha$-dimethyl-naphthyl-1-acetic acid or 2,3,$\alpha$-trimethyl-phenylacetic acid, or the diethylamides thereof, with N-chloropiperidine in nitrobenzene or carbon disulfide in the presence of $AlCl_3$, $BF_3$ or $ZnCl_2$ to 3,$\alpha$-dimethyl-4-piperidino-phenylacetic acid or to 3,$\alpha$-dimethyl-4-piperidino-naphthyl-1-acetic acid or 2,3,$\alpha$-trimethyl-4-piperidino-phenylacetic acid, or the diethylamides thereof.

o. In compounds of Formula 1 wherein hydrogen is, in place of the residue $R_3$ or, if $R_3 = H$, and $R_4$ and $R_5$ simultaneously represent together a tetramethylene group optionally containing one to two double bonds, and hydrogen is in place of $R_6$; the following substituents can be directly introduced in the 3-position (or the 2-position, respectively):

a. Chlorine, by direct reaction with elemental chlorine in an inert solvent, such as water, tetrachloromethane, acetic acid, without or with the addition of specific catalysts, such as, for example, $FeCl_3$, $AlCl_3$, $SbCl_3$ or $SnCl_4$, preferably between −10° and 100° (as described in the literature); or by reaction in a strongly hydrochloric acid solution with $H_2O_2$ or with $NaClO_3$, wherein the chlorination is effected by nascent chlorine (as described in the literature); or by reaction with $SO_2Cl_2$ in an inert solvent, such as chlorobenzene, in the presence of radical-forming catalysts, e.g., peroxides, at preferably 80°–180° (as described in literature); or by reaction with $NO_2Cl$ or $NOCl$ in carbon disulfide or hexane.

$\beta$. Bromine, readily by direct reaction with elemental bromine in an inert solvent, such as, e.g., carbon disulfide, acetic acid or tetrachloromethane, especially with the addition of specific catalysts effective as bromine transfer agents, such as, e.g., iron filings, $AlCl_3$, $AlBr_3$, $FeCl_3$, iodine or pyridine, preferably between −30° and 90° (as described in the literature); or by reaction with hypobromous acid, acyl hypobromites, N-bromoimides, such as N-bromosuccinimide, N-bromophthalimide or other bromine-yielding agents, such as 1,3-dibromo-5,5-dimethyl-hydantoin, in inert solvents, such as nitrobenzene or carbon disulfide, preferably at −10° to 150° (as described in the literature); or by reaction with $NOBr$ or $NO_2Br$ in carbon disulfide or cyclohexane.

$\gamma$. Iodine, by direct reaction with elemental iodine, particularly in the presence of HgO in an inert solvent, such as alcohol, acetic acid or benzene, preferably at temperatures between 0° and 120° (as described in the literature); or by reaction with iodine-alkali iodide solutions, in the presence of carbonates, acetates, alkali metal hydroxide solutions, ammonia or amines (as described in the literature); or by reaction of mixtures of alkali metal iodides and oxidation agents, such as alkali metal iodates, alkali metal nitrates or $H_2O_2$, in inert solvents, such as water, acetic acid or ethanol, wherein the reaction is conducted with nascent iodine; or by reaction with $ClI$ in dilute acetic acid, preferably at 50°–100b$L$ (as described in the literature); or after mercuration, for example, in an aqueous or acetic medium with mercury (II)-acetate to form the 3-Hg-O-$COCH_3$ compound and exchange of the organometallic residue against iodine, e.g., by reaction with iodine or iodine-alkali hydroxide solutions (as described in the literature).

$\delta$. Nitro, by nitration methods as described in detail in the literature.

The actual nitrating reactant is the nitronium ion $NO_2^\oplus$; consequently all nitronium salts, or reaction mixtures wherein this nitronium ion is potentially present, can be employed for the nitration of the aromatic nucleus. For example, there can be used a mixture of anhydrous nitric acid with $BF_3$; metallic nitrates such as Cu-, Fe-, Mn-, Co- or Ni-nitrate, in a mixture with acetic acid or acetic anhydride; metallic nitrates, such as Ag-, Ba-, Na-, K-, $HN_4$- or Pb-nitrate, in a mixture with Friedel-Crafts catalysts, such as $AlCl_3$, $FeCl_3$, $BF_3$ or $SiCl_4$; alkyl nitrates, such as ethyl nitrate, in a mixture with concentrated sulfuric acid, $HBF_4$ or Lewis acids, such as $BCl_3$, $SnCl_4$, $PCl_3$, $AlCl_3$, $SiCl_4$, $SbCl_5$ or $FeCl_3$; nitryl fluoride, chloride, bromide, perchlorate or tetrafluoroborate, preferably in the presence of Freidel-Crafts catalysts, such as $AlCl_3$, $FeCl_3$, $ZrCl_4$ or $AlBr_3$, in solvents, such as carbon disulfide, n-pentane or $CHCl_3$; nitric oxides, such as $N_2O_5$, $N_2O_4$ or $N_2O_3$, in the presence of concentrated $H_2SO_4$, HF or Friedel-Crafts catalysts, such as $F_3$, $AlCl_3$, or $FeCl_3$, optionally in solvents, such as tetramethylene-sulfone or acetic acid. Suitable solvents for these nitration reactions are, e.g., nitromethane, nitroethane, nitropropane or acetonitrile. The reaction is preferably conducted between −20° and +120°.

In addition, the following agents are generally usable for introducing the nitro group into the aromatic nucleus: concentrated nitric acid; mixtures of concentrated sulfuric acid with concentrated or anhydrous nitric acid; alkali nitrates, such as sodium or potassium nitrate, in a mixture with concentrated sulfuric acid; mixtures of concentrated nitric acid with pyrosulfuric acid, fuming sulfuric acid, acetic acid, or acetic anhydride; mixtures of nitric acid, sulfuric acid and acetic acid; acetyl or benzoyl nitrate; nitrosulfonic acid, producible by introducing $SO_2$ into fuming $HNO_3$; nitrosylsulfuric acid, nitroguanidine; highly concentrated nitric acid in the presence of dehydrating agents, such as $P_2O_5$ or anhydrous hydrofluoric acid, optionally in solvents, such as nitrobenzene or polychloroethanes.

A special nitration reaction comprises dissolving the substance to be nitrated in a solvent such as $HCl_3$, $CH_2Cl_2$ or $CCl_4$, introducing concentrated sulfuric acid under the level of the reaction solution, and then adding anhydrous nitric acid in $CHCl_3$, $CH_2Cl_2$, or $CCl_4$. Generally, the reaction is conducted between −20° and 150°.

ε. Alkyl, alkylmercapto, alkylsulfinyl, alkylsulfonyl, amino, alkylamino or dialkylamino.

by reacting with the corresponding chlorine, bromine, iodine, hydroxy or acyloxy compounds, such as, e.g., ethyl iodide, n-propyl bromide, n-butanol, ethyl acetate, isopropyl sulfur chloride, isobutyl sulfinyl bromide, sec.butyl sulfochloride, hydroxylamine, chloramine or diethyl chloramine, in accordance with the conditions of a Friedel-Crafts reaction, as described in greater detail in the literature. Suitable catalysts are Lewis acids, such as $AlCl_3$, $AlBr_3$, $SnCl_4$, $ZnCl_2$, $FeCl_3$, $SbCl_5$ or HF, and suitable solvents are n-hexane, carbon disulfide, nitrobenzene, tetramethylenesulfone or nitroethane. Preferably, the reaction is conducted between 70° and 180°.

In place of alkyl derivatives, the corresponding olefins can also be reacted according to Friedel-Crafts, as set forth in the literature.

Thus, it is possible, for example, to alkylate 4-piperidino-α-methyl-phenylacetic acid or 4-piperidino-α-methyl-naphthyl-1-acetic acid or 4-piperidino-6-ethyl-α-methyl-phenylacetic acetic acid or the di-n-butylamides thereof, with isobutylene, methyl iodide, n-propanol or isopropyl acetate, in accordance with Friedel-Crafts, to obtain the 3-alkyl-4-piperidino-α-methyl-phenylacetic acids or the 3-alkyl-4-piperidino-α-methyl-naphthyl-1-acetic acids or the 3-alkyl-4-piperidino-6-ethyl-α-methyl-phenylacetic acids or the di-n-butylamides thereof. Analogously, it is possible to obtain, from 4-pyrrolidino-phenylacetic acid, 4-pyrrolidino-naphthyl-1-acetic acid or 4-pyrrolidino-6-chloro-phenylacetic acid or the piperidides thereof, and isopropyl sulfur bromide, ethylsulfinyl chloride, n-butyl sulfochloride, hydroxylamine or N,N-dimethyl-hydroxylamine, the 3-isopropylmercapto-, 3-ethylsulfinyl-, 3-n-butylsulfonyl-, 3-amino- and 3-dimethyl-amino-4-pyrrolidino-phenylacetic acid or naphthyl-1-acetic acid or -6-chlorophenylacetic acid, or the piperidides thereof. Additionally, the corresponding compounds substituted in the 2-position are produced from the naphthyl-1-acetic acid derivatives.

p. After diazotization of compounds of Formula 1 wherein the residue $R_3$ represents $NH_2$, the diazonium group can be exchanged for F, Cl, Br, I, $NO_2$, CN, alkylmercapto, alkoxy or OH.

The exchange against fluorine is described in the literature. The diazotization is conducted, for instance, in anhydrous hydrofluoric acid, and the reaction mixture is then heated, or the poorly soluble diazonium tetrafluoroborates, produced in substance, are thermally decomposed, whereby the 3-fluoro-compounds are produced.

Chlorine is preferably exchanged against the diazonium chloride group in an aqueous solution in the presence of CuCl in accordance with the method of Sandmeyer (as described in the literature).

The bromine exchange can be conducted, for example, according to the methods described in the literature. The diazonium bromide can either be decomposed to the bromine compounds in an aqueous solution in the presence of CuBr in accordance with Sandmeyer or by reaction with bromine to form the diazonium perbromide and subsequent boiling in solvents, such as water or lower alcohols. However, it is also possible to convert the diazonium bromides, with $HgBr_2$, into the diazonium mercury bromides, and to decompose the latter thermally to the desired bromo-compounds.

The exchange of the diazonium iodide group against iodine is achieved by just gentle heating. Catalysts, such as CuI, CuBr or CuCl can also be added in order to accelerate the reaction (as described in the literature).

The diazonium group can be exchanged for cyanogen, for example, by following the Sandmeyer method in the presence of CuCN and alkali cyanides, such as NaCN or KCN, already under cold conditions, preferably at 0°–50°, or, in accordance with the variation by Gattermann, with alkali cyanide with the addition of powdered copper. It is also possible to employ a double salt of KCN and nickel cyanide as the catalyst. The preferred pH ranges for the cyanogen exchange range between 4 and 9 (as described in the literature).

The exchange of the diazonium group, preferably the diazonium tetrafluoroborate or diazonium cobalt(III)-nitrite, against the nitro group is described in the literature and can be accomplished, for instance, by reaction with alkali nitrites, such as $NaNO_2$ or $KNO_2$, in the presence of catalysts, such as copper oxide or copper hydroxide, even under cold conditions.

Furthermore, the diazonium salt group can be exchanged against alkoxy- or alkylmercapto groups as described in the literature. For example, the diazonium group is replaced by heating in an aqueous-alcoholic solution by the corresponding alkoxy groups. The exchange against alkylmercapto groups is conducted by reaction with alkyl mercaptans, preferably in an alkaline solution, by heating or even under cold conditions, with the addition of catalysts, such as powdered copper. The diazosulfides, which are formed as intermediates, need not be isolated.

By heating, if necessary by boiling, it is also possible to hydrolyze the aqueous solutions of the diazonium salts to the corresponding phenols (as described in the literature).

Compounds of Formula 1 carrying, in place of $R_3$, a carbonamide group can be converted into the corresponding nitriles by splitting off water. This is done, for example, thermally, preferably between 170° and 300°, especially with the addition of catalysts, such as $Al_2O_3$, pumice, powdered glass, sand, or graphite, or chemically with dehydrating agents, such as, for instance, $P_2O_5$, $P_2S_5$, $PCl_5$, $POCl_3$, $PCl_3$ together with chlorine, $SO_2Cl_2$, $AlCl_3$ as a double salt with NaCl, $BF_3$ (mostly with the addition of an organic acid), $COCl_2$ (with the addition of tertiary amines, such as pyridine, or acylated secondary amines), the trichloromethyl ester of chloroformic acid, benzotrichloride (with the addition of catalysts, such as $ZnCl_2$, $FeCl_3$, $AlCl_3$, concentrated sulfuric acid or phosphoric acid), acid anhydrides (e.g., acetylbenzoic acid), aromatic sulfonic acids or sulfonic acid halogenides (such as p-toluenesulfochloride). The reaction is conducted either with or without the addition of inert solvents, such as benzene, dichlorobenzene, tetrahydrofuran, xylene, or nitrobenzene, preferably between 100° and 250°.

A nitro group present in the 3-position of the compounds of Formula 1 can be converted into the $NH_2$ group in accordance with the reducing method set forth in paragraph (i). Likewise, it is possible to reduce 3-iodoxy-or 3-iodoso-derivatives to 3-iodo compounds of Formula 1, particularly with hydrogen iodide, optionally with the addition of red phosphorus. Also, the 3-iodoso compounds can be disproportioned to the 3- iodoxy- and the 3-iodo- compounds. The iodoso group can be directly introduced into the 3-position, for example, by reaction with $(IO)_2SO_4$ (as described in the literature).

Furthermore, diazotization can be conducted on compounds of Formula 1 carrying, in place of $R_3$, a hydrazino group, or a hydrazino group substituted by hydrocarbon residues. After conversion into the diazonium perbromides or iodides, with bromide or iodine, respectively, preferably in solvents such as methanol, ethanol or acetic acid, a thermolysis reaction at preferably 50°–180° results in the 3-bromo- and 3-iodo- compounds, respectively, of Formula 1.

Compounds of Formula 1 carrying in the 3-position an OH, SH, $NH_2$ or $SO_2NH_2$ group, optionally also present as the salts, particularly alkali or alkaline earth salts, are mono-(or optionally dialkylated), for example, by reaction with olefins, such as isobutylene, alkyl halogenides, such as ethyl iodide, n-propyl bromide, isopropyl chloride, or with equivalent alkyl derivatives, such as, e.g., alkylsulfuric acid esters or alkylsulfonic acid esters, e.g., dimethyl sulfate or isopropyl-p-toluenesulfonic acid esters, and also with aliphatic diazo compounds, such as diazomethane, with nitrogen being split off, also, as the occasion permits, with amines or alcohols. Suitable solvents are, for instance, water, methanol, ethanol, benzene, tetrahydrofuran, xylene, or mixtures thereof. In many cases, alkalis, such as NaOH or KOH are added in equivalent amounts or in an excess. Most frequently, the reaction is conducted under the alkylating conditions described in paragraphs (l) and (m).

Thus, it is possible to produce from 3-hydroxy-, 3-mercapto-, 3-amino- or 3-sulfamoyl-4-homomorpholino-phenylacetic acid or -6-n-butyl-phenylacetic acid, or -naphthyl-1-acetic acid, or the esters of diethyl-amides thereof, by reaction with methyl iodide, the 3-methoxy-, 3-methylmercapto-, 3-methylamino- and 3-dimethylamino- or the 3-methylsulfamoyl- and 3-dimethylsulfamoyl-4-homomorpholino-phenylacetic acids or -6-n-butyl-phenylacetic acids or -naphthyl-1-acetic acids, or the esters or diethylamides thereof. Furthermore, from 3-mercapto- or 3-hydroxy-4-di-n-butylamino-2,α-dimethyl-phenylacetic acid heptyl ester or from the 2'-morpholinoethyl ester of 3-mercapto-, 3-hydroxy-, 3-bromo-5-mercapto- or 3-bromo-5-hydroxy-4-di-n-butylamino-α-methyl-phenylacetic acid, or from the heptyl ester of 3-mercapto- or 3-hydroxy-4-piperidino-naphthyl-1-acetic acid, the corresponding 3-(or 5-, respectively)methylmercapto- and 3-(or 5-, respectively)methoxy-derivatives can be obtained by reaction with diazomethane or dimethyl sulfate.

Compounds of Formula 1 with an amino group or with a monoalkylamino group in the 3-position can be acylated with carboxylic acids or carboxylic acid derivatives, as described in the literature. Examples of carboxylic acid derivatives are carboxylic acid esters, anhydrides or halogenides, such as chlorides, bromides or iodides, and also amides. The carboxylic acid derivatives themselves can be employed as the solvent, or the reaction can be optionally conducted, for instance, in benzene, toluene, dioxane, tetrahydrofuran or chloroform. When acylating with carboxylic acid halogenides, a base is preferably added, such as sodium or potassium carbonate, pyridine, dimethylamine or trimethylamine. However, it is also possible to acylate with ketenes in inert solvents. Also, thioamides, iminoethers, amidoximes, amidines or hydrazidines can be converted into the amides, for example, by heating with water or aqueous solvents (as described in the literature).

The oxidation of compounds of Formula 1 containing an alkyl-mercapto group in the 3-position to obtain the corresponding sulfinyl or sulfonyl compounds is accomplished by oxidation methods as described in paragraph (b) and in the literature. In particular, the following oxidation agents are employed: $H_2O_2$, preferably in the presence of alkalis; organic peracids, such as peracetic acid, perbenzoic acid, m-chloroperbenzoic acid, or perphthalic acid; potassium permanganate in an aqueous or acetone solution and/or in an acidic, neutral or alkaline reaction medium, optionally with the addition of $MgSO_4$; chromium trioxide, preferably in acetic acid (optionally with the addition of benzene) or sulfuric acid; nitric acid, optionally under pressure (up to 100 atmospheres); nitric oxides; nitrogen peroxide; chlorine or bromine (elemental or in the form of hypohalogenites); iodosobenzene. It is also possible to oxidize electrolytically.

In these oxidation reactions, inert solvents are preferably employed, such as water, acetic acid, dioxane, acetone, tetrahydrofuran, methanol, ethanol, dimethyl formamide, benzene, or mixtures of these solvents, and the processes are conducted at temperatures between −30° and 200°, preferably at room temperature.

For oxidizing corresponding 3-nitroso-compounds to the 3-nitro-compounds of Formula 1, there are predominantly employed strong nitric acid or mixtures of $HNO_3$ and $H_2O_2$ in acetic acid (as described in the literature).

Finally, it is possible to obtain the 3-sulfamoyl compounds of Formula 1 from correspondingly substituted reactive 3-sulfonic acid derivatives, such as sulfonic acid chlorides, bromides, iodides, anhydrides or esters, by reaction with ammonia, primary or secondary amines, as described in the literature. Preferably, the reaction is conducted in inert solvents, such as benzene, toluene, tetrahydrofuran, chloroform or dioxane, at temperatures between −20° and 140°.

In the reaction of the sulfonic acid halogenides, bases are preferably added, such as $K_2CO_3$, pyridine or dimethyl aniline. Also, the sulfonamides are obtainable from the corresponding sulfonic acid ammonium salts at temperatures between 180° and 400°, by reduction of sulfonic acid azides, e.g., with zinc dust in acetic acid. Finally, it is possible to convert sulfinic acids with hydroxylamine or with amines, with the addition of halogens, such as chlorine or bromine, or sulfenamides by $KMnO_4$ oxidation, into sulfonamides (as described in the literature).

In those compounds of Formula 1 wherein $R_3 = H$ and $R_4$ and $R_5$ together represent a tetramethylene group containing optionally one to two, preferably two, double bonds, especially a 2-substituted naphthyl-1-acetic acid derivative unsubstituted in the 3-position, an $NH_2$, $CONH_2$, $NO_2$, $IO$, $IO_2$, $NH-NH_2$, the latter optionally substituted by hydrocarbon residues, $Hal$, $OM_1$, $SM_1$, $N(M_1)_2$, $SO_2N(M_1)_2$, $NHR_1$, $SR_9$ or NO group in the 2-position or a sulfonic acid residue present in the 2-position, can be converted into another of the aforementioned substituents, by analogous methods described in paragraph (p) above.

q. In compounds of Formula 1 wherein two of the residues $R_4$, $R_5$ and $R_6$ represent hydrogen and the third of these residues either also represents hydrogen or one of the residues $NH_2$, OH or SH, it is possible to introduce into the 2-, 5- or 6-position, fluorine, chlorine, bromine, iodine, alkyl, alkoxy or alkylmercapto, analogously to the processes set forth in paragraphs (o) and/or (p), wherein the introduction of these residues into the 3-position is described.

Additionally, a diazonium salt group in the 2-, 5- or 6-position can be substituted reductively by hydrogen, optionally with the addition of metallic catalysts, such as copper or copper oxide. Preferred hydrogen donors, in this connection, are alcohols, if desired in the presence of zinc, ether, hypophosphorous acid, sodium stannite, an alkaline formaldehyde solution, or formic acid derivatives. Also, it is possible, for example, to reduce the diazonium tetrafluoroborates with complex metal hydrides, such as sodium borohydride, in a suspension or in a solution (as described in the literature).

r. The cyclization of substituted 4-aminophenylacetic acid derivatives of Formula 1 (wherein, in place of the residues $R_7$ and $R_8$, there are OH- or SH-substituted alkyl groups of one to seven carbon atoms) to O-ring- or S-ring-containing compounds is conducted analogously to the methods conventional for the production of cyclic ethers of the morpholine type, or cyclic thioethers of the thiomorpholine type. Diols or dithiols can preferably be converted into the desired cyclic ethers or thioethers by heating with acidic catalysts. Catalysts predominantly employed in this connection are: hydrogen chloride (e.g., concentrated aqueous hydrochloric acid), hydrogen bromide, phosphoric acid, sulfuric acid (concentration between about 50 and 98 percent), sulfonic acids, such as p-toluenesulfonic acid, acidic ion exchangers, Lewis acids, such as zinc chloride, and acid anhydrides, such as acetic anhydride. The above-mentioned acids can be employed in the anhydrous or aqueous phase. If desired, an additional inert solvent is employed, such as benzene, toluene or xylene. The reaction temperatures of the diol or dithiol cyclization are in the range of about 50°–200°, depending upon the cyclization agent employed; the reaction times are between about 8 and 120 hours. Particularly preferred is the ring closure with 48 percent hydrobromic acid at about 130°.

The oxygen-containing or sulfur-containing rings can also be closed by heating of a salt, e.g., the hydrochloride, of a diol or dithiol, to about 200°–210°, or by splitting off $H_2O$ or $H_2S$ from the free diol or dithiol on $SiO_2/Al_2O_3$ at about 375°–400°.

In place of the diols or dithiols, it is also possible to react, for example, the corresponding dihalogenides, such as the dichlorides, dibromides or diiodides to the desired O- or S-ring-containing compounds, with metallic oxides, such as $Na_2O$, $K_2O$, $MgO$ or $CaO$, or with metallic sulfides, such as $Na_2S$, $K_2S$ or $BaS$, in inert solvents, such as dichlorobenzene, ethylene glycol, dimethyl formamide or xylene at 60°–250°.

Starting compounds of Formula 1 wherein one of the residues $R_7$ and $R_8$ is substituted by OH or SH, and the other residue $R_7$ or $R_8$ is in each case substituted by $X_1$, preferably chlorine, bromine or iodine, are cyclized in accordance with the methods of the Williamson synthesis, wherein suitably the OH or SH group is converted into the corresponding alkali alcoholate or alkali mercaptide. The latter or former compound readily splits off alkali halogenide, thereby forming the desired O- or S-ring. Thus, it is readily possible to react 3-chloro-4-bis-(2-hydroxyethyl)-amino- or 3-chloro-4-bis-(2-chloroethyl)-amino-phenylacetic acid; or 3-chloro-4-bis-(2-hydroxylethyl)-amino- or 3-chloro-4-bis-(2-chloroethyl)-amino-naphthyl-1-acetic acid; or 3-chloro-4-bis-(2-hydroxyethyl)-amino- or 3-chloro-4-bis-(2-chloroethyl)-amino-6-isopropyl-phenylacetic acid; or the cycloheptyl esters thereof to form 3-chloro-4-morpholino-phenylacetic acid; or 3-chloro-4-morpholino-naphthyl-1-acetic acid; or 3-chloro-4-morpholino-6-isopropyl-phenylacetic acid; or the cycloheptyl esters thereof. Furthermore, it is possible to obtain 3-ethyl-mercapto-4-thiomorpholino-α-methyl-phenylacetic acid or the 2'-ethoxyethyl ester of 2-ethylmercapto-3-bromo-4-thiomorpholino-α-methyl-phenylacetic acid from 3-ethylmercapto-4-bis(2-mercaptoethyl)-amino- or from 3-ethylmercapto-4-bis-(2-bromoethyl)-amino-α-methyl-phenylacetic acid, 2-ethylmercapto-3-bromo-4-bis-(2-mercaptoethyl)-amino- or from the 2'-ethoxyethyl ester of 2-ethylmercapto-3-bromo-4-bis-(2-bromoethyl)-amino-α-methyl-phenylacetic acid.

Still further, correspondingly substituted sulfur-ring-containing compounds wherein the sulfur is present as a sulfinyl or sulfonyl group can be reduced to the desired S-ring-containing compounds of Formula 1 in accordance with the methods indicated in paragraph (i).

s. It is possible to obtain compounds of Formula 1 from correspondingly substituted arylpyruvic acids by decarbonylation. This can be done thermally in an analogous manner to the decarboxylation of malonic acids, as described in paragraph (g), or chemically, for example, by heating in concentrated sulfuric acid, or by oxidative decarbonylation in a sulfuric acid or hydrochloric solution in the presence of oxidation agents, such as $H_2O_2$.

Thus, for example, the methyl ester of 3-nitro-4-piperidino-cinnamic acid or the methyl ester of 3-nitro-4-pyrrolidino-6-chloro-cinnamic acid can be brominated in $CS_2$ to form the dibromocinnamic acid derivative, then reacted with piperidine in alcohol, and hydrolyzed with dilute sulfuric acid to 3-nitro-4-piperidino-phenylpyruvic acid or 3-nitro-4-pyrrolidino-6-chloro-phenylpyruvic acid, which latter acids are then oxidatively decarbonylated in a hydrochloric acid solution with $H_2O_2$ to 3-nitro-4-piperidino-phenylacetic acid or 3-nitro-4-pyrrolidino-6-chloro-phenylacetic acid. Analogously, 4-piperidino-naphthyl-1-acetic acid is obtained from 3-(4-piperidino-naphthyl-1)-acrylic acid by way of the dibromide thereof and 4-piperidino-naphthyl-1-pyruvic acid.

t. Compounds of Formula 1 are obtained by hydrogenating quinone methides of Formula 30, producible by splitting off $H_2O$ or hydrogen halide from compounds of Formula 1 wherein OH or halogen is in place of $R_1$, with the aid of, e.g., polyphosphoric acid, concentrated $H_2SO_4$, $Al_2O_3$, or NaOH or KOH, in accordance with the hydrogenation methods described in paragraph (i).

Thus, for example, the quinone methides of Formula 30, obtained from the n-butyl esters of 3,5,α-trimethyl-4-homopiperidino-α-hydroxy-phenylacetic acid or of 3,α-dimethyl-4-homopiperidino-6-methoxy-α-hydroxy-phenylacetic acid by splitting off $H_2O$, can be hydrogenated to the n-butyl esters of 3,5,α-trimethyl-4-homopiperidino-phenylacetic acid or of 3,α-dimethyl-4-homopiperidino-6-methoxy-phenylacetic acid.

Furthermore, in order to form the compounds of Formula 1 of this invention, organometallic compounds of Formula 14, such as, for example, n-butyllithium or methyl magnesium iodide, can be chemically added to quinone methides of Formula 30. The reaction is preferably conducted in inert solvents, such as ether, tetrahydrofuran, benzene, toluene, dichloroethane, and at reaction temperatures between −20° and the boiling temperatures of the solvents. In case of organometallic compounds unstable in air, the reaction is conducted in an inert gas atmosphere, such as nitrogen.

Thus, it is possible, for example, to chemically add methyl, ethyl or isopropyl magnesium iodide to the quinone methides of Formula 30 obtained by splitting off HCl from 3-trifluoromethyl-4-morpholino-α-chloro-phenylacetic acid diethylamide or 2-trifluoromethyl-4-morpholino-α-chloro-naphthyl-1-acetic acid diethylamide or 2,α-dichloro-4-morpholino-6-methyl-phenylacetic acid diethylamide, to obtain the corresponding α-methyl-, α-ethyl- or α-isopropyl-phenylacetic acid derivatives.

u. Esters or ester amides of Formula 1 are obtained by reacting carboxylic acids of Formula 1 (A = COOH), under conditions wherein water is split off, with alcohols of Formula 31 or with amines of Formula 33 or 34.

Thus, the esters are produced in accordance with conventional methods as described in the literature. For example, the respective carboxylic acids can be esterified with alcohols of Formula 31 with or without the addition of catalysts, such as sulfuric acid, hydrogen chloride, phosphoric acid, aromatic sulfonic acids, such as p-toluenesulfonic acid, or with the addition of acidic ion exchange resins and the like, preferably between 10° and the boiling temperature of the respective alcohol, the latter being usually employed in excess. In order to shift the esterification equilibrium, it is possible to operate in the presence of water-binding agents, such as, for example, with molecular sieves or anhydrous heavy metal sulfates, such as copper, iron, nickel, cobalt or zinc sulfate. Also, the water or reaction can be removed by azeotropic distillation, with hydrocarbons, such as benzene or toluene, or chlorinated hydrocarbons, such as chloroform or 1,2-dichloroethane, being the entraining agent.

The esterification and amidation reactions can take place under very gentle conditions if the water of reaction is chemically neutralized by the addition of preferably equimolar quantities of carbodiimides, such as N,N'-dicyclohexyl carbodiimide, in inert solvents, e.g., ether, dioxane, benzene or ethylene glycol dimethyl ether, particularly in the presence of bases, such as pyridine. Thus, for example, the corresponding esters or amides of Formula 1 can be obtained from 3-bromo-4-piperidino-α-methyl-phenylacetic acid, 3-chloro-4-piperidino-α-methyl-phenylacetic acid, 3-chloro-4-piperidino-5-methyl-α-ethyl-phenylacetic acid, 3-chloro-4-piperidino-α-ethyl-naphthyl-1-acetic acid or 3-chloro-4-piperidino-6-bromo-α-ethyl-phenylacetic acid, respectively, by reaction with 3-oxa-5-methoxypentanol, 2-aminoethanol, cyclohexanol, or with 2-phenylethylamine, homopiperidine or 3-(N-ethyl-piperazino)PROPYLAMINE)

Further, the carboxylic acids of Formula 1 (A = COOH) can also be esterified to obtain the esters of Formula 1 of this invention with any desired esters of Formula 32, preferably employed in excess, especially in the presence of basic or acidic catalysts, such as, e.g., sodium alcoholate or sulfuric acid, in accordance with the interesterification methods described in the literature. Thus, it is possible, for example, to prepare the corresponding cyclopentyl, 2-cyclohexylethyl or 4-thiaoctyl esters by reacting 3-bromo-4-piperidino-phenylacetic acid, 3-nitro-4-homomorpholino-α-methyl-phenylacetic acid, 2-nitro-4-homomorpholino-α-methyl-naphthyl-1-acetic acid and 2-iodo-3-nitro-4-homomorpholino-α-methyl-phenylacetic acid, respectively, with cyclopentyl acetate, 2-cyclohexylethyl propionate or 4-thiaoctyl benzoate.

Esters of Formula 1 are also obtained by reacting the respective carboxylic acids with diazoalkanes, such as diazomethane, diazoethane or phenyldiazomethane, in inert solvents, such as ether, benzene or methanol, with nitrogen being split off (as described in the literature); or by chemically adding the carboxylic acids to olefins derived by formal $H_2O$ splitting from alcohols of Formula 31, such as isobutylene or cyclohexene, or to acetylenes. As set forth in the literature, the addition reaction is preferably accomplished in the presence of catalysts, such as $ZnCl_2$, $BF_3$, concentrated sulfuric acid, arylsulfonic acids, pyrophosphoric acid, boric acid or oxalic acid, at 0°–200° and in inert solvents, such as dioxane, tetrahydrofuran, ether, benzene, toluene or xylene. Pressures between 1 and 300 atmospheres are employed. Thus, it is possible for example, to react 3-bromo-4-(2,6-dimethylpiperidino)-phenylacetic acid, 3-bromo-4-piperidino-α-methyl-phenylacetic acid, 3-bromo-4-piperidino-naphthyl-1-acetic or 3,6-dibromo-4-(2,6-dimethylpiperidino)-phenylacetic acid with diazomethane, diazoethane or phenyldiazomethane to obtain the corresponding methyl, ethyl or benzyl esters, and to add same to 3-bromo-4-piperidino-α-methyl-phenylacetic acid, 3,5α-trimethyl-4-piperidino-phenylacetic acid, 3,α-dimethyl-4-piperidino-naphthyl-1-acetic acid or 2,3,α-trimethyl-4-diethylamino-phenylacetic acid, 5,8-dioxa-decene-1, 4-ethyl-4-aza-hexene-1, 5-isopropyl-4-oxaheptene-1, to obtain the corresponding 5,8-dioxadecyl-, 4-ethyl-4-azahexyl- and 5-isopropyl-4-oxaheptyl esters.

The 2-hydroxyethyl- or 2-aminoethyl esters are obtained by adding the respective carboxylic acids to epoxides or to ethylene-imines, the aforementioned being producible from the alcohols 31 or from the amines 33 by dehydrogenation.

Whereas the reaction with epoxides is preferably accomplished in the presence of basic catalysts, such as sodium acetate, and at temperatures of up to 120°, the ethyleneimines react in inert solvents at temperatures between 0° and −30° with the carboxylic acids to form the amides of Formula 1. Thus, for example, it is readily possible to react 3,5-dibromo-4-piper-idino-α-methyl-phenylacetic acid, 2-bromo-4-piperidino-naphthyl-1-acetic acid, 2,3-dichloro-4-piperidino-α-methyl-phenylacetic acid or 2-bromo-3-cyano-4-di-n-propylamino-α-isobutyl-phenylacetic acid with ethyleneimine, propyleneimine, ethylene oxide or propylene oxide to obtain the corresponding 2-hydroxyethyl- or 2-hydroxypropyl-arylacetic acid amides or esters.

The aminoarylacetic acid amides of Formula 1 can also be obtained by boiling carboxylic acids of Formula 1 (A = COOH) with isocyanates of Formula 35 in an inert solvent, such as benzene, toluene or xylene, until the evolution of $CO_2$ has ceased. Thus, the corresponding arylacetic acid amides can be produced, for example, from 3-chloro-4-thiomorpholino-α, α-dimethyl-phenyl or -naphthyl-1 acetic acid by reaction with methyl, ethyl, n-octyl or n-dodecyl isocyanate.

As described in the literature, it is also possible to employ, in place of the isocyanates, the readily accessible azides $A_2$—CO—$N_3$, since these azides are converted, under the reaction conditions, into the isocyanates of Formula 35. Furthermore, esters of Formula 1 of this invention are obtained by reacting metallic salts of Formula 1 wherein A represents COO-metal, with compounds of Formula 36, in accordance with the methods described in the literature. Preferably, the silver or lead salts are employed, which are in most cases of low solubility; however, it is also possible to utilize the alkali or alkaline earth metal salts. The salts are preferably reacted in an inert solvent, such as ether, benzene or petroleum ether, with the compounds of Formula 36, such as, for example,, n-butyl bromide or n-dodecyl iodide, which are preferably employed in excess. Thus, for example, the corresponding arylacetic acid esters are obtained from the silver salts of 3,5-dinitro-4-homothiomorpholino-phenylacetic acid, 3-nitro-4-piperidino-6-chlorophenylacetic acid, or 4-piperidino-5,6,7,8-tetrahydro-naphthyl-1-acetic acid by reaction with butyl bromide, 2-ethyl-3-oxa-hexyl iodide or 2-isopropyl-2-aza-pentyl bromide.

Furthermore, compounds of Formula 1 are obtained by reacting esters of Formula 1 (A = $COOR_{14}$), preferably in the presence of basic catalysts, with alcohols of Formula 31, esters of Formula 32, amines of Formulas 33 and 34, respectively, or with hydroxylamine.

The reaction of the esters of Formula 1 (A = $COOR_{14}$) with alcohols of Formula 31 or esters of Formula 32 takes place in accordance with the interesterification methods described in the literature and is preferably conducted in the presence of basic catalysts, such as sodium methylate or ethylate, in particular so that, after the equilibrium has been established, one reactant is withdrawn from the equilibrium by distillation. Thus, it is possible, for example, to interesterify the methyl ester of 3-ethylmercapto-4-piperidino-α-ethyl-phenylacetic acid, the ethyl ester of 4-piperidino-5,8-dihydro-α-methyl-naphthyl-1-acetic acid or the methyl ester of 3-ethylmercapto-4-piperidino-6-chloro-α-ethyl-phenylacetic acid to the corresponding n-hexyl esters with n-hexanol, or with n-hexyl acetate.

Amides or hydroxamic acids of Formula 1 are obtained likewise by reacting the esters of formula 1 (A = $COOR_{14}$) with amines of Formulas 33 and 34, respectively, or with hydroxylamine. Preferably, readily saponifiable esters are employed, such as methyl or phenyl esters, and the reaction is optionally conducted with the addition of a basic catalyst, such as sodium methylate or ethylate, in suitable solvents, such as water, methanol, benzene or chloroform, the temperature ranging preferably between 20° C and the boiling temperature of the solvent. Thus, it is possible, for example, to react the methyl ester of 3-chloro-4-piperidino-α-methyl-phenylacetic acid, the methyl ester of 3-bromo-4-morpholino-5,6-dihydronaphthyl-1-acetic acid and the ethyl ester of 3-methylmercapto-4-piperidino-6-bromo-phenylacetic acid with hydroxylamine to the corresponding arylacetohydroxamic acid derivatives or, with N'-2-aminoethyl-N-methyl-piperazine or with N-(2-aminopropyl)-piperidine or with morpholine to the corresponding arylacetic acid amides.

Furthermore, compounds of Formula 1 are obtained by reacting acid halides or acid anhydrides of Formula 1 (A = COHal or COO-acyl) with alcohols of Formula 31, with amines of Formulas 33 and 34, respectively, or with hydroxylamine.

Thus, analogous to the methods described in the literature, the acid halogenides or the salts thereof (if amino-acid halogenides are involved), or the acid anhydrides can be reacted with the alcohols of Formula 31 with or without the addition of acid-neutralizing agents, such as, e.g., sodium or potassium hydroxide, sodium or potassium carbonate or pyridine, wherein preferably an excess of the alcohol is employed as the solvent.

The reaction with amines of Formulas 33 and 34, respectively, or with hydroxylamine is conducted as described in the literature. In this connection, the acid-neutralizing agent preferably employed is an excess of the amine, and the inert solvents particularly utilized are ether, benzene, tetrahydrofuran, dioxane, methanol, or toluene.

Thus, it is possible, for example, to react 3-bromo-4-piperidino-α-methyl-phenylacetic acid or 4-homopiperidino-2,3-di-methyl-α,α-di-n-butyl-phenylacetic acid chloride or anhydride with isopropanol or N-methyl-piperazine or with hydroxylamine to obtain the corresponding phenylacetic acid isopropyl ester or N-methyl-piperazide, or to obtain the corresponding phenylacetohydroxamic acid.

In all of these reactions of paragraph (u), the following alcohols $A_1OH$ of Formula 31 or the amines $A_2A_3NH$ of Formula 33 or the isocyanates $A_2N = C = O$ of Formula 35 or the compounds $A_1X$ of Formula 36 are preferably employed:

methyl-, ethyl-, n-propyl-, isopropyl-, n-butyl, isobutyl-, sec.-butyl-, tert.-butyl-, n-pentyl-, isoamyl-, n-hexyl-, n-heptyl-, n-octyl-, n-decyl-, n-dodecyl-, allyl-, crotyl-, propargyl-, 2-hydroxyethyl-, 2-hydroxypropyl-, 3-hydroxypropyl-, 2-methoxyethyl-, 2-ethoxyethyl-, 3-oxa-5-hydroxy-pentyl-, 3-oxa-5-methoxy-pentyl-, 3-oxa-5-butoxy-pentyl-, 3,6-dioxa-8-hydroxy-octyl-, 3,6-dioxa-8-ethoxy-octyl-, 3,6-dioxa-8-methoxy-octyl-, 3-oxa-5-ethoxypentyl-, 2-aminoethyl-, 3-aminopropyl-, 2-dimethylaminoethyl-, 2-diethylaminoethyl-, 2-di-n-propyl-aminoethyl-, 3-dimetylamino- propyl-, 3-diethylaminopropyl-, 2-methyl-3-diethylamino-propyl-, cyclohexyl-, cyclopentyl-, 2-cyclohexylethyl-, 3cyclohexylpropyl-, N-methylpiperidyl-4-, N-methyl-piperidyl-3-methyl-, 2-(N-methyl-piperidyl-2)-ethyl-, 2-piperidinoethyl-, 2-pyrrolidinoethyl-, 2homopiperidino-ethyl-, 2morpholinoethyl-, 2-thiomorpholino-ethyl-, 2(N-methylpiperazino)-ethyl-, 2(N-ethylpiperazino)-ethyl, 2-(N-phenylpiperazino)-ethyl-, 2-(N-2-hydroxyethylpiperazino)-ethyl-, 2-(N-methyl-homopiperazino)-ethyl-, 3-piperidino-propyl-,3-pyrrolidinopropyl-, 3-(N-methylpiperazino)-propyl-, 3-(N-ethylpiperazino)-propyl-, 3-(N-phenylpiperazine)-propyl-, 3-morpholinopropyl-, 3-thiomorpholinopropyl-, 2-morpholinopropyl-, 2-piperidinopropyl-, 2-pyrrolidinopropyl-2-(N-methylpiperazino)-propyl-, 2-methyl-3-morpholinopropyl-, 2-methyl-3-piperidinopropyl-, 2-methyl-3-pyrrolidinopropyl-, 4-dimethylaminobutyl-, 4-diethylaminobutyl-, 2-mercaptoethyl-, phenyl-, benzyl-, o-tolyl-, m-tolyl-, p-tolyl-, p-ethylphenyl-, p-methylbenzyl-, 2-phenylethyl-, 1-naphthyl-, 2-naphthyl-, 1-phenylethyl-alcohol or -amine or -isocyanate or -chloride, -bromide, -iodide or -p-toluenesulfonate.

Esters of Formula 32 are preferably the esterification products of the above alcohols of Formula 31 with formic acid, acetic acid, propionic acid, n-butyric acid, isobutyric acid or benzoic acid.

Preferred amines $A_4NH$ of Formula 34 are piperidine, pyrrolidine, morpholine, thiomorpholine, N-methylpiperazine, N-ethyl-piperazine, N-n-propylpiperazine, N-phenylpiperazine, N-(2-hydroxy-ethyl)-piperazine, piperazine, N-methyl-homopiperazine, or N-phenyl-homopiperazine.

Among the esters of Formula 1 ($A = COOA_1$), those of particular interest are readily cleaved physiologically. In this connection, particularly preferred are the vinyl, tert.-butyl, tetrahydro-2-furtyl and tetrahydro-2-pyranyl esters obtainable, for example, by reacting the free carboxylic acids with acetylene, isobutylene, 2,3-dihydrofuran and 2,3-dihydropyran, particularly with the addition of catalysts, such as $ZnCl_2$, $BF_3$, $H_2SO_4$, arylsulfonic acids, pyrophosphoric acid, boric acid or oxalic acid at 0°–120° in inert solvents, such as dioxane, tetrahydrofuran, ether, benzene or xylene.

v. Compounds of Formula 1 can also be obtained by hydrolyzing derivatives of Formula 1 (carrying, in place of A, corresponding thioester, iminoether, oximinoether, hydrazone ether, thioamide, amidine, amidoxime or amide hydrazone groups) with dilute aqueous bases or acids, such as, e.g., ammonia, NaOH, KOH, $Na_2CO_3$, $K_2CO_3$, HCl, $H_2SO_4$, if desired with the addition of a solubilizer, such as ethanol or methanol, to the corresponding esters or amides, with hydrogen sulfide, ammonia or amines, hydrazine or hydrazine derivatives or hydroxylamine being split off. Whereas, for example, most of the iminoether hydrochlorides are immediately decomposed in an aqueous solution at room temperature into the esters and ammonium chlorides, other derivatives, such as, for example, some amidoximes or thioamides, require temperatures of up to 100° for purposes of hydrolysis.

Thus, it is possible to hydrolyze, for example, 3-bromo-4-piperidino-α-methyl- or 3-bromo-4-piperidino-5-chloro-α-ethyl- or 2-bromo-3-nitro-4-piperidino-ethyl-phenylacetic acid iminoethyl ester · HCl or -oximinoethyl ester · HCl or -hydra-zoniminoethyl ester· HCl to the corresponding phenylacetic acid ethyl esters; and 3-nitro-4-piperidino-6-chloro-phenylacetic acid thioamide, amidoxime or amide hydrazone to the corresponding phenylacetamides.

w. Amides of Formula 1 are obtained by partially saponifying nitriles of Formula 1 (A = CN) in alkaline or acidic media in accordance with methods known from the literature, for example, with an aqueous solution of sodium hydroxide or with concentrated sulfuric acid, at between −20° and 200°, preferably between 0° and 100°.

However, it is also possible to hydrolyze the nitriles to the amides of Formula 1 of the present invention by means of hydrogen peroxide or organic peracids, preferably in aqueous-alcoholic or aqueous-acetonic NaOH, between 20° and 100°.

Thus, the corresponding phenylacetamides of Formula 1 are produced from 3-chloro-4-piperidino- or 3-n-butyl-4-homopiperidino-6-ethoxy-benzyl cyanide. From 4-piperidino-naphthyl-1-acetonitrile, 4-piperidino-naphthyl-1-acetamide is produced.

x. The Willgerodt reaction, by means of which amides of Formula 1 are obtained from ketones of Formula 37, and which is described in the literature, also takes place by way of the hydrolysis of thioamides. The ketones 37 are reacted to the thioamides with sulfur and amines of Formula 33 or 34, optionally in inert solvents, such as, e.g., dioxane or tetrahydrofuran, by boiling the reaction mixture for a longer period of time. The hydrolysis of the thioamides, which need not be isolated, is conducted under such gentle conditions that the saponification is arrested at the amide stage.

Thus, for example, there are obtained from 3,6-dichloro-4-dimethylaminoacetophenone, by reaction with $NH_3/S$, 3,6-dichloro-4-dimethylaminophenyl-acetamide; from 3-fluoro-4-piperidino-acetophenone, 3-fluoro-4-piperidinophenyl-acetamide; from 3-fluoro-4-piperidino-1-acetonaphthone, 3-fluoro-4-piperidinonaphthyl-1-acetamide.

The amides of Formula 1 are also obtained by subjecting oximes of Formula 38, as described in greater detail in the literature, to a Beckmann rearrangement process, preferably at temperatures between 80° and 180°, with acidic agents, such as, for example, concentrated sulfuric acid, phosphorus pentachloride or benzenesulfochloride. Thus, it is possible to rearrange, for example, [4-(2,6-diethylpiperidino)-3,6-diisopropoxy-α-methyl-benzyl]-n-propyl ketone oxime to the corresponding phenylacetic acid n-propylamide derivative. Likewise, from 4-piperidino-naphthyl-1-acetoxime, 4-piperidino-naphthyl-1-acetic acid N-methylamide is obtained.

Finally, ketones of Formula 39 are converted, by the Schmidt degradation of amides of Formula 1, in accordance with the description in the literature, with $HN_3$, preferably in inert solvents, such as benzene or chloroform, and in the presence of acidic catalysts, such as concentrated sulfuric acid, for example, at temperatures between −40° and +100°. Thus, it is possible, for instance, to react 2-methyl-3-chloro-4-piperidino-benzylethyl ketone with $HN_3$ to obtain 2-methyl-3-chloro-4-piperidino-phenylacetic acid N-ethylamide; from (4-piperidino-naphthyl-1methyl)-ethyl ketone, 4-piperidino-naphthyl-1-acetic acid n-ethylamide is obtained.

y. Hydroxamic acids of Formula 1 are also obtained by reacting aldehydes of Formula 40 in accordance with the method by Angeli disclosed in the literature either with a salt, preferably an alkali or alkaline earth salt, of nitrohydroxylamine acid, for example, in an aqueous or alcoholic solution, or with benzenesulfonyl hydroxylamine, particularly in an alkaline-aqueous or alcoholic solution. In both cases, the salts are obtained from which the free hydroxamic acids are obtainable by acidification.

crystalline copper sulphate, 40 parts diethanolamine, 50 parts ammonia (d 0.88) at 95° – 100° C. within 5 hours. The dyestuff is isolated from the coppering solution by the addition of salt and careful acidification.

The coppered amino-disazo dyestuff is then acylated in an aqueous solution at pH 6 – 7 and a temperature of 20° – 30° C. with 20 parts 2,4,6-trifluoro-5-chloropyrimidine, the pH value being kept within the stated range by the addition of sodium carbonate. When the acylation is completed, the dyestuff is isolated with sodium chloride and dried at 35° C. In the form of the free sulphonic acid the dyestuff corresponds to the formula

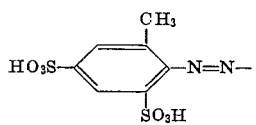
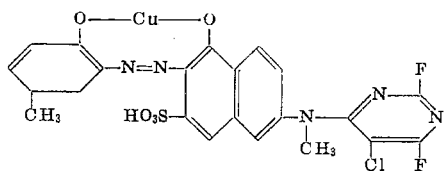

it dyes cellulose fabrics by the methods known for reactive dyestuffs in navy-blue shades fast to wet processing and light.

Other dyestuffs according to the invention can be prepared in a similar manner by combining the above monoazo dyestuff obtained from 2-amino-1-methylbenzene-3,5-disulphonic acid and 1-amino-2-methoxy-5-methylbenzene according to the instructions given above with the aminonaphthol-sulphonic acids stated in the following Table and with 2,4,6-trifluoro-5-chloropyrimidine.

COUPLING COMPONENT 2-amino-5-hydroxynaphthalene-1,7-disulphonic acid 2-amino-8-hydroxynaphthalene-3,6-disulphonic acid.

The resultant dyestuffs have a blue color.

EXAMPLE 296

0.1 Mole 4-ureido-2-amino-1-hydroxybenzene-5-sulphonic acid is diazotized and coupled soda-alkaline with 0.1 mole 1-amino-8-hydroxynaphthalene-2,4-disulphonic acid. The coupling solution is adjusted to a content of 2 moles/liter with caustic soda and then boiled under reflux for 3 hours to hydrolyze the ureido group. After cooling, the mixture is neutralized with hydrochloric acid. The dyestuff is metallized by the addition of 25 parts copper sulphate and 100 parts of a 2N sodium hydroxide solution at 45° C. and a pH value of 4 – 6 and, after 30 minutes, acylated at pH 6 – 7 and temperatures of 20° – 30° C. with 0.1 mole 2,4,6-trifluoro-5-chloropyrimidine. The resultant dyestuff of the formula

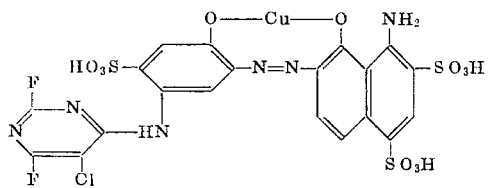

is salted out. A blue dyeing is obtained on cotton.

EXAMPLE 297

A neutral paste of copper-phthalocyanine-3,3',3''-trisulphonic acid chloride, prepared from 600 g of technical 96 percent copper-phthalocyanine, is stirred with a little water, adjusted to 4 liters and reacted at a pH of 3.5 – 60.0 with 216 g N-methyl-N-(4'-amino-2'-sulphobenzyl)-amine, initially at 0° – 3° C. and finally at 20° – 35° C., with the addition of 300 ml (=295 g) pyridine, and the pyridine is subsequently distilled off from the resultant solution of copper-phthalocyanine-disulphonic acid-monosulphonic acid-(3'-sulpho-4'-methyl-aminomethyl-anilide) at pH 9.0 with steam. The solution is brought to 20° – 30° C and 300 g 2,4,6-trifluoro-5-chloro-pyrimidine are added dropwise in portions in the course of 1 to 2 hours, while maintaining a pH of 6 – 7 by the addition of a dilute sodium hydroxide solution. At the same time, the reaction mixture is diluted with water, as required, to such an extent that the dyestuff always remains dissolved.

There are obtained 10 liters of dyestuff solution which is separated from the excess acylating agent, adjusted to pH 7.0 by the addition of acetic acid and reprecipitated by adding 2.5 liters of a concentrated sodium chloride solution with stirring.

After filtering off with suction and drying at 30° C, there is obtained a clear turquoise-blue dyestuff which is fixed on cotton from a soda-alkaline solution at 40° – 60° C. with a very good yield and fastness to washing.

If the NiPc-3,3',3''-trisulphonic acid chloride is used as starting material, then a turquoise blue is obtained which is only slightly more greenish and has equally valuable properties.

EXAMPLE 298

0.1 Mole of the aminoazo dyestuff of the formula

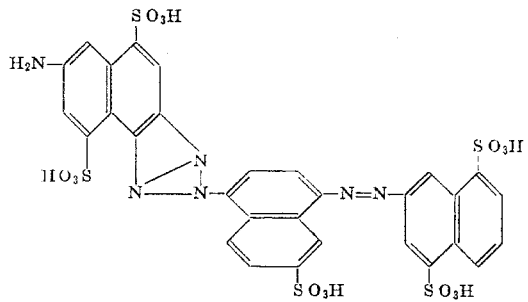

prepared according to the instructions of German Patent specification No. 1,115,865 (application F 27466 IVb/22 a) by coupling the diazonium compound from 2-aminonaphthalene-4,8-disulphonic acid with 1-aminonaphthalene-6-sulphonic acid, further diazotizing the resultant aminoazo dyestuff, coupling with the equivalent amount of 2,5-diaminonapthalene-4,8-disulphonic acid and conversion into the aminotriazole - are dissolved in 1,000 parts by volume of water at pH 6 and mixed at a temperature of 20° – 30° C, while stirring, with 21 parts 2,4,6-trifluoro-5-chloropyrimidine. The hydrofluoric acid which is slowly liberated is neutralized by means of a sodium carbonate solution until the reaction is completed. The dyestuff is subsequently separated by the addition of sodium chloride, isolated and dried at about 50° C. in a vacuum. It is a yellow powder which dissolves in water to give a yellow color.

EXAMPLE 299

38.9 Parts of the dyestuff obtained by soda-alkaline coupling from 6 nitro-2-diazo-1-hydroxybenzene-4-sulphonic acid and 2-hydroxynaphthalene are stirred in 200 parts of water at pH 8 and a temperature of 70° – 80° C. This suspension is admixed with 67.9 parts of the chromium complex compound (containing 1 chromium atom per dyestuff molecule) of the azo dyestuff obtained from 4-chloro-2-diazo-1-hydroxybenzene-6-sulphonic acid and 1-amino-8-hydroxynaphthalene-3,6-disulphonic acid, the pH being kept between 7 and 9 by the dropwise addition of a sodium carbonate solution. A dark-blue solution has formed after 20 minutes at 70° – 80° C. The paper chromatogram shows that a uniform mixed complex has formed. The mixed complex is acylated within 1 hour at 40° C. and pH 6.5 – 7.5 with 22.0 mercapto-4-pyrrolidino-5-cyclohexenyl-1-acetamide, there is obtained 2,3,α-trimethyl-4-piperidino-phenylacetic acid and 3-methylmercapto-4-pyrrolidino-phenylacetamide, respectively.

zc. It is also possible to cyclize compounds corresponding to Formula 1 (except that $R_4$ and $R_5$ are replaced by hydrogen and the residue $R_{17}$, to compounds of Formula 1) under acid-catalyzed reaction conditions in particular, preferably under the conditions of a Friedel-Crafts reaction. In this connection, the residue $R_{17}$ can be present in the 5-position (in which case $R_5 = H$) or in the 6-position (in which case $R_4 = H$). The reaction conditions are described in greater detail above, as well as in the literature. Suitable catalysts are, for example, acids, such as HCl, HBr, $CF_3COOH$, HF, polyphosphoric acid or Lewis acids, such as, e.g., $AlCl_3$, $AlBr_3$, $SnCl_4$, $ZnCl_2$, $BF_3$, $ZrCl_4$, $FeCl_3$, $SbCl_5$ or $TiCl_4$, and suitable solvents are n-hexane, carbon disulfide, carbon tetrachloride, trichloroethylene, nitrobenzene, tetramethylenesulfone, nitroethane, polyphosphoric acid, glacial acetic acid, trifluoroacetic acid and/or acetic anhydride. The cyclization reaction is preferably conducted between 60° and 210°.

The group $-CHX_4X_5$ in the residue $R_{17}$ represents an aldehyde group which can optionally be present in a modified form, e.g., as thioaldehyde, Schiff base, acetal, thioacetal or aminal. The protective groups can be removed before conducting the cyclization. This can be accomplished by deketalization or transketalization in accordance with conventional methods; however, it is also possible to employ the blocked aldehyde component in the reaction, since the protective group is normally split under the acidic reaction conditions utilized during cyclization.

Starting compounds wherein $R_{17}$ represents a $-(CH_2)_4-X_2$ group optionally containing one to two double bonds, or a 3-butenyl, 3-butynyl, 1,3-butadienyl, of 1-buten-3-ynyl group can likewise be alkylated to obtain compounds of Formula 1 intramolecularly under Friedel-Crafts conditions. These cyclization reactions take place rapidly and with good yields when $X_2$ represents chlorine, bromine or iodine. If $X_2$ represents a hydroxy, alkoxy, acyloxy, sulfuric acid or sulfonic acid residue, there are likewise no difficulties in the intramolecular Friedel-Crafts alkylation. In case $X_4$ and $X_5$ in the residue $R_{17}$ represent together O or $X_2$ represents OH, alkylated or acylated OH, the cyclization can also be accomplished with the aid of dehydrating agents, such as, for example, polyphosphoric acid, $P_2O_5$, $POCl_3$, $PCl_5$ or $SOCl_2$, with or without the addition of inert solvents, such as benzene, xylene, nitrobenzene or dichlorobenzene, at temperatures between preferably 80° and 300°.

Thus, it is possible, for example, to cyclize 2-chloro-4-pyrrolidino-6-(3-formylpropyl)-phenylacetic acid to 2-chloro-4-pyrrolidino-7,8-dihydro-naphthyl-1-acetic acid, and 3-(4-bromobutyl)-4-piperidino-α-methyl-phenylacetamide to 4-piperidino-5,6,7,8-tetrahydro-α-methyl-naphthalene-1-acetamide.

zd. Compounds of the general Formula 1 wherein $R_4$ and $R_5$ together represent tetramethylene with one or two double bonds can be produced by eliminating, from compounds which otherwise correspond to Formula 1 (except that there is present a tetramethylene monosubstituted by $X_6$ and optionally containing a double bond, or a tetramethylene disubstituted by $X_6$, in place of the residues $R_4$ and $R_5$) the substituent or substituents $X_6$ in the form of $HX_6$, with the formation of one or two double bonds.

Such elimination reactions can be conducted without any difficulties; the respective dihydronaphthalene or naphthalene derivatives are obtained.

In case $X_6 = Hal$, this substituent can readily be eliminated as hydrogen halide with the formation of a double bond, under basic reaction conditions. Suitable bases are: alkali metal hydroxides, alkali metal carbonates, alcoholates, such as, e.g., potassium-tert.-butylate, amines, such as, e.g., dimethyl aniline, pyridine, collidine or quinoline. Suitable solvents, in this connection, are, for example, benzene, toluene, cyclohexane, methanol, dioxane, tetrahydrofuran, dimethyl formamide or tert.-butanol; however, the amines employed as the bases can also often be employed in excess as the solvent.

If $X_6$ represents a hydroxyl residue, the elimination process represents a step of splitting off water, which can be conducted in accordance with conventional methods. Agents which split off water, preferably employed in this connection, are $POCl_3$, polyphosphoric acid, formic acid, perchloric acid, acetic anhydride, $SOCl_2$, $P_2O_5$, molecular sieves, sintered aluminum oxides, as well as other dehydrating oxides, such as $SiO_2$ or also $KHSO_4$. The addition of a solvent can also be of advantage.

The process of splitting off water can also be conducted under acid catalysis by the azeotropic removal of the water which is formed. The elimination of alkyl, acyl, alkylsulfonyl and alkoxysulfonyloxy, -mercapto or -amino residues can be conducted under similar conditions. On the other hand, the elimination of the sulfonic acid residues, such as, for example, the elimination of the mesylates or tosylates, is conducted in a gentle manner by boiling in dimethyl formamide or dimethyl sulfoxide with alkali metal carbonates, such as, e.g., $Li_2CO_3$, or with potassium acetate.

Thus, it is possible, for example, by splitting off HBr, to obtain from the diethylamide of 3-chloro-4-homopiperidino-5-bromo-5,6-dihydro-naphthalene-1-acetic acid the corresponding 3-chloro-4homopiperidino-naphthalene-1-acetic acid diethylamide. Likewise, 2-nitro-4-piperidino-α-methyl-7,8-dihydro-naphthyl-1-acetic acid can be obtained from 2-nitro-4-piperidino-5-hydroxy-α-methyl-5,6,7,8-tetrahydronaphthyl-1-acetic acid by splitting off $H_2O$. Furthermore, it is possible to produce 4-piperidino-naphthyl-1-acetic acid from 4-piperidino-5,8-dibromo-5,6,7,8-tetrahydro-naphthyl-1-acetic acid, with 2 mols of HBr being split off.

ze. Compounds of Formula 1 are also obtained by eliminating, from a compound corresponding to Formula 1 (except that there is present, in place of the residues $R_4$ and $R_5$, a tetramethylene optionally containing a double bond and disubstituted by $X_7$ and $X_8$ in the 1,2- or 1,4- or 3,4-position) each of the two substituents $X_7$ and $X_8$, with the formation of a double bond. This is done particularly well with metals, such as Zn, Zn-Cu, Na, Li or K, or with organometallic compounds, such as Grignard or organolithium compounds.

In particular, the elimination of vicinal dihalogenides, such as dichlorides, dibromides, or diiodides, as well as halohydrins, such as chloro- or bromohydrin, or of vicinal haloesters, is accomplished as described in the literature, wherein $X_7$ represents, for example, Cl, Br, or I, and $X_8$ represents acyloxy. These vicinal eliminations are preferably conducted with zinc in acetic acid, with the addition of sodium acetate, or in ethanol by boiling. The reaction times vary preferably between 10 minutes and several hours, and the reaction temperatures are between 80° and 300°. Suitable solvents are, for example, benzene, toluene, xylene, dichlorobenzene, ethylene glycol, diethylene glycol dimethyl ether or dimethyl formamide.

Thus, it is possible, for example, to react 4-piperidino-5,6-dichloro-5,6,7,8-tetrahydro-naphthyl-1-acetic acid to 4-piperidino-7,8-dihydro-naphthyl-1-acetic acid; and 4-morpholino-7-chloro-8-hydroxy-7,8 -dihydro-α-ethyl-naphthyl-1-acetic acid to 4-morpholino-α-ethyl-naphthyl-1-acetic acid.

zf. A compound of Formula 1 can be converted into the acid addition salt thereof in a conventional manner by means of an acid. For this reaction, acids are employed which yield physiologically acceptable salts. It is thus possible to employ organic and inorganic acids, such as, for example, aliphatic, alicyclic, araliphatic, aromatic or heterocyclic, mono- or polybasic carboxylic or sulfonic acids, such as formic acid, acetic acid, propionic acid, pivalic acid, diethylacetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicyclic acid, phenylpropionic acid, citric acid, gluconic acid, ascorbic acid, nicotinic acid, isonicotinic acid, methanesulfonic acid, ethanedisulfonic acid, β-hydroxyethanesulfonic acid, p-toluenesulfonic acid, naphthalene-mono- and -disulfonic acids, sulfuric acid, nitric acid, hydrohalic acids, such as hydrochloric acid or hydrobromic acid, or phosphoric acids, such as orthophosphoric acid, etc.

On the other hand, the aminophenylacetic acids of Formula 1 (A=COOH) can be converted, by treatment with a base, into one of the physiologically acceptable metal or ammonium salts thereof. Particularly preferred metal salts are the alkali metal and alkaline earth metal salts. Other preferred salts are, in particular, the sodium, potassium, magnesium, calcium and ammonium salts, such as, for example, the dimethyl- and diethylammonium, monoethanol-, diethanol- and triethanol-ammonium, cyclohexylammonium, and dibenzylethylenediammonium salts.

Conversely, compounds of Formula 1 can be liberated from the acid addition salts thereof by treatment with strong bases, such as sodium or potassium hydroxide, sodium or potassium carbonate, or if desired from the metal and ammonium salts thereof by treatment with acids, especially mineral acids, such as hydrochloric or sulfuric acid.

Finally, a substituted aminophenylacetic acid of Formula 1 can be converted into the quaternary salt associated therewith by treatment with lower alkyl esters. For purposes of quaternization, suitable are, for example, alkyl halogenides, such as methyl bromide or ethyl chloride, or also dialkyl sulfates, such as, e.g., diethyl or dimethyl sulfate. The quaternization conditions are conventional, as described in the literature.

The carboxylic acid anhydrides of compounds of Formula 1 (A = COOH) can also be obtained in accordance with the methods set forth in the literature. It is possible, for example, to convert salts of aminophenylacetic acids, such as sodium, potassium, or magnesium salts, into symmetrical anhydrides by reaction with aminophenylacetic acid halides, such as the chlorides, bromides or iodides; the reaction is preferably conducted at 60°–160° and in inert solvents, such as dioxane, benzene, tetrahydrofuran or dichlorobenzene.

In order to obtain mixed anhydrides, the salts of aminophenylacetic acid or the aminophenylacetic acid halogenides are reacted with other carboxylic acid halogenides, such as acetyl chloride, or with the addition of catalytic amounts of mineral acids, such as concentrated sulfuric acid, or with other carboxylic acid salts, such as sodium propionate. It is particularly easy to convert the free aminophenylacetic acids of Formula 1 into mixed anhydrides by treatment with acetic anhydride or acetyl chloride under heating, optionally with the addition of inert solvents, such as dioxane, benzene, tetrachloromethane or xylene. The anhydride formation can also be accomplished most satisfactorily by mixing, for example, an aminophenylacetic acid chloride - pyridine mixture, prepared in the cold state, with the free aminophenylacetic acid, optionally adding an inert solvent, such as ether, tetrahydrofuran or dioxane. In place of pyridine, trimethylamine can also be employed.

In case the compounds of Formula 1 contain a center of asymmetry, they are usually present in the racemic form. In case they contain two or more centers of asymmetry, such compounds are generally obtained during the synthesis as mixtures of racemates, from which the individual racemates can be conventionally isolated, for example, by recrystallizing the same several times from suitable solvents, thereby being obtainable in pure form.

Such racemates can be separated into their optical antipodes in accordance with a plurality of conventional methods, as set forth in the literature.

Thus, several racemic mixtures can be precipitated as eutectics instead of mixed crystals and rapidly separated in this manner; in these cases, a selectively precipitation can also be possible. However, the method of chemical separation is to be preferred. In accordance with that method, diastereomers are formed from the racemic mixture by reaction with an optically active separating agent. Thus, it is possible, if desired, to react an optically active base with the carboxyl group, or an optically active acid with the amino group of a substituted aminophenylacetic acid of Formula 1. For example, salt diastereomers of the substituted aminophenylacetic acids of Formula 1 can be optionally formed with optically active amines, such as quinine, cinchonidine, brucine, cinchonidine, hydroxyhydrindamine, morphine, 1-phenylethylamine, phenyloxynaphthyl-methylamine, quinidine, 1-fenchylamine, strychnine, basic amino-acids, such as lysine, arginine, amino-acid esters, or with optically active acids, such as D- and L-tartaric acid, dibenzoyl-D- and -L-tartaric acid, diacetyl-D- and -L-tartaric acid, β-camphorsulfonic acid, D- and L-mandelic acid, D- and L-malic acid, or D- and L-lactic acid. In a similar manner, ester-diastereomers of the aminophenylacetic acids of Formula 1 (A = COOH) can be produced with optically active alcohols, such as borneol, menthol or octanol-2. The difference in the solubility of the thus-produced diastereomers permits the selective crystallization of one form, and the regeneration of the respective optically active substituted aminophenylacetic acid from the mixture.

The optical antipodes can also be separated biochemically with the utilization of selective enzymatic reactions. Thus, the racemic substituted aminophenylacetic acids can be subjected to an asymmetrical oxidase or optionally decarboxylase which destroys one form by oxidation or decarboxylation, whereas the other form remains unchanged. It is further possible to employ a hydrolase to treat a derivative of the racemic mixture, for the preferred formation of one form of the substituted aminophenylacetic acids. Thus, esters or amides of the aminophenylacetic acids of Formula 1 can be subjected to the effect of a hydrolase which selectively saponifies one optical antipode and leaves the other one unaltered.

Furthermore, it is, of course, possible to obtain optically active compounds in accordance with the methods described in paragraphs (a) through (ze) by employing starting materials which are already optically active.

The compounds of Formula 1 and/or the physiologically acceptable metal and ammonium as well as acid addition salts thereof can be employed in a mixture with conventional pharmaceutical excipients. Carrier substances can be such organic or inorganic compounds suitable for parenteral, enteral or topical application and which, of course, do not deleteriously react with the novel compounds, such as, for example, water, vegetable oils, polyethylene glycols, gelatin, lactose, amylose, magnesium stearate, talc, vaseline, cholesterol, etc.

For parenteral application, particularly suitable are solutions, preferably oily or aqueous solutions, as well as suspensions, emulsions, or implants. Ampoules are convenient unit dosages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semi-solid forms are used such as liniments, salves, or creams, which are, if desired, sterilized, or mixed with auxiliary agents, such as preservatives, stabilizers, or wetting agents, or salts for influencing the osmotic pressure, or with buffer substances.

The compounds of this invention are preferably administered in dosages of 1 – 2,000 mg per dosage unit to animals, including, but not limited to, mammals and avians, e.g., cattle, cats, dogs and poultry. Preferably, they are administered to mammals in a dosage of 1 to 100, particularly 10 to 50 mg per dosage unit, the mg/kg ratio being about 0.01 to 2 mg/kg. In pharmaceutical compositions, the carrier is usually present in an amount of 1–10,000 mg, preferably 10 to 5,000 mg. The dosages are preferably on a daily basis, in a single daily dose, but can be alternatively administered in divided doses.

The starting compounds for the production of the substances of this invention according to Formula 1, utilizing the methods described in paragraphs (a) to (ze) can be obtained, for example, in accordance with the following processes:

1. The anilines of the following Formula 55, which are extensively known from the literature or can be produced analogously to methods known from the literature,

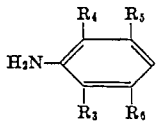

wherein $R_3$ represents preferably Hal, $R_9$, $OR_9$, $SR_9$, $NR_1$—$COR_9$ or $N(R_9)_2$,
are alkylated, for example, with the known alkyl bromides $R_7Br$ and/or $R_8Br$, to obtain the tertiary amines of Formula 56:

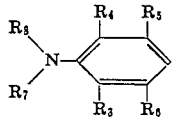

This latter class of compounds is reacted, in accordance with Friedel-Crafts, with acid chlorides of the type A—COCl (e.g., ethoxalyl chloride), to obtain the p-acylanilines of Formula 57:

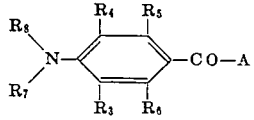

These α-oxo-compounds can be reduced to the α-hydroxy-compounds, or they can be reacted with Grignard compounds, such as $R_9MgI$ to obtain α-alkyl-α-hydroxy esters. The esters, for example, those of Formula 57 (A = e.g., $COOC_2H_5$) can be saponified to the carboxylic acids, and the α-hydroxyphenylacetic acid derivatives can be reacted with HCl, HBr or HI, or other halogenating agents, such as $SOCl_2$, to the corresponding α-halophenyl-acetic acid derivatives or, by splitting off water, e.g., with polyphosphoric acid, to the α-alkylidene compounds.

2. The toluidines of the following Formula 58, extensively known from the literature or analogously produced,

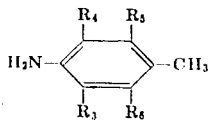

wherein
one of the residues $R_4$, $R_5$ and $R_6$ can also represent $NO_2$, are alkylated to the tertiary amines of Formula 59:

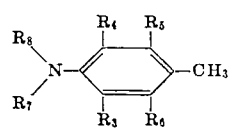

wherein
one of the residues $R_4$, $R_5$ and $R_6$ can also represent $NO_2$.

The $CH_3$ group in 59 can be converted, either directly by halogenation or indirectly by oxidation to COOH, reduction with $LiAlH_4$ to $CH_2OH$ and treatment with HCl or HBr, into a $CH_2Cl$ or $CH_2Br$ group. Subsequently, the reaction product is reacted, for example, with KCN to obtain the nitrile, which is optionally alkylated with $R_9Br/NaNH_2$ in the α-position with respect to the nitrile group to obtain the α-alkyl- or α,α-dialkylbenzyl cyanides; and by acidic or alkaline saponification of the nitrile group, the aminophenylacetic acids of Formula 60 are obtained:

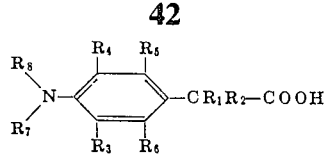

wherein
one of the residues $R_4$, $R_5$ and $R_6$ can also optionally represent $NO_2$.

The $NO_2$ group optionally present in compounds of Formula 60 as $R_4$, $R_5$ or $R_6$ can be reduced to the $NH_2$ group and optionally further modified as described above.

3. By reacting the 4-nitrobromobenzenes of the following Formula 61, well-known from the literature or producible analogously thereto,

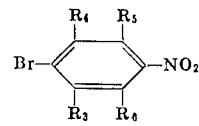

with amines of Formula 20, $R_7R_8NH$, the substituted nitranilines of Formula 62 are obtained:

$$Z - NO_2 \qquad 62$$

The nitro group is reduced to the $NH_2$ group, and is exchanged for CN after diazotization. The benzonitriles of Formula 63:

$$Z - CN \qquad 63$$

can be saponified to the benzoic acids Z—COOH, and can be reduced by way of the acid chlorides by hydrogenation to the aldehydes Z—CHO and/or further to the alcohols Z—$CH_2OH$. With hydrohalic acids, the reaction product is further reacted to the benzyl halogenides and further, for example, with KCN to the nitriles Z—$CH_2CN$ optionally mono- or dialkylated as described above in the α-position to nitriles of the Formula 64:

$$Z—CR_1R_2—CN \qquad 64$$

The benzoic acids Z—COOH can also be converted, by way of the acid chlorides, into diazoketones of Formula 3 ($R_1$ = H). Also, the benzoic acids Z—COOH can be esterified, and from the esters, by reduction, benzyl alcohols of the formula Z—$CH_2OH$ can be produced, and by reaction with organometallic compounds of the formula $R_9M$ either ketones of the formula Z—CO—$R_9$, the latter being obtainable even more readily from the nitriles Z—CN with $R_9M$) or carbinols of the formula Z—$C(R_9)_2$—OH can be produced. Reducing the ketones Z—CO—$R_9$ leads to carbinols Z—CHOH—$R_9$. The hydroxy groups in these carbinols can be exchanged by HCl or HBr against chlorine or bromine. Further reaction with, for example, KCN, results in nitriles of the formula Z—$C(R_9)_2$—CN or Z—$CHR_9$—CN.

4. The 4-bromo-3-nitroacetophenones of the following Formula 65, extensively known from the literature or producible in an analogous manner

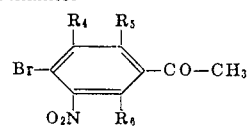

are reacted with the amines of Formula 20, $R_7R_8$—NH to compounds of Formula 66:

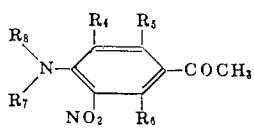

The nitro group in the 3-position can be reduced to the amino group, and the latter can be exchanged, in accordance with the methods described in paragraph (p) against Hal, CN, $R_9S$, $R_9Q$ or OH. Thus, inter alia, acetophenone derivatives of Formula 37 are obtained, which can be converted, under the conditions of a Willgerodt reaction, into the corresponding phenylthioacetamides or — optionally after alkylation at the methyl group — to haloketones of Formula 5.

Finally, the acetophenones 37 can be reacted, with Grignard compounds $R_9MgI$, to the correspondingly substituted methylalkylphenyl carbinols of Formula 6 ($B_1$ = OH).

5. The 4-bromobenzoic acids of Formula 67, well-known from the literature or obtainable analogously thereto,

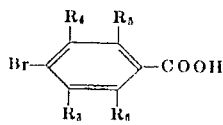

wherein
$R_3$ represents preferably $CF_3$, $NO_2$, $CN$, $SO_2NR_1R_2$, $SOR_9$ or $SO_2R_9$; and one of the residues $R_4$ and $R_5$ can also be $NO_2$, are reacted with amines of Formula 20, $R_7R_8$—NH, to the correspondingly substituted 4-aminobenzoic acids of Formula 68:

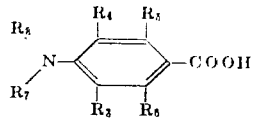

wherein
$R_3$, $R_4$ and $R_5$ have the meanings indicated in Formula 67. The carboxyl group can be modified as described above. The compounds of Formula 68 can be reduced, for example, by way of the acid chlorides, by hydrogenation to the benzaldehydes and further to the benzyl alcohols. The benzyl alcohols can be reacted with hydrohalic acids to the benzyl halogenides and further, with KCN, to the benzyl cyanides, which can be optionally mono- or dialkylated in the α-position, so that compounds of formula 69 are obtained:

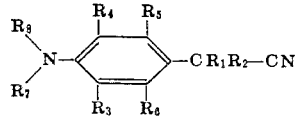

wherein
$R_3$, $R_4$ and $R_5$ have the meanings indicated in Formula 67.
If, in Formula 69, $R_4$ and/or $R_5$ represent $NO_2$, the latter can be exchanged for other substituents after reduction and diazotization, as described above.

From the correspondingly substituted benzyl cyanides, a great variety of phenylacetic acid derivatives are then obtainable in accordance with conventional methods, such as esters, amides, thioamides, amidines, iminochlorides and hydrazides.

It is also possible to esterify the 4-aminobenzoic acids of Formula 68, and the ester groups can be reduced or reacted with organometallic compounds, as described above.

6. By reacting the 4-nitrobromobenzenes of the above Formula 61 with the sodium derivatives of the malonic acid esters $CHR_1(COOC_2d5)_2$ or of the cyanoacetic acid esters $NC$—$CHR_1$—$COOC_2H_5$, nitrophenylacetic acid derivatives of Formula 70 are obtained:

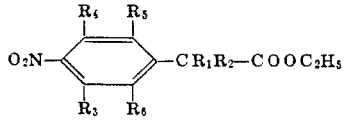

wherein
in place of $R_2$, there is CN or $COOC_2H_5$.

From the above compounds, by saponification and decarboxylation in accordance with the method described in paragraph (g), nitrophenylacetic acids of Formula 71 are obtained:

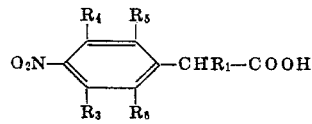

The nitro group in compounds of Formula 71 can be reduced to the amino group.

7. By Friedel-Crafts acylation of the 4-acylamino-phenylacetic acids of the following Formula 72, known, in part, from the literature or producible analogously thereto:

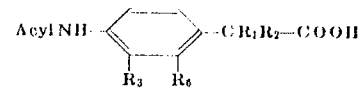

with succinic acid anhydride, compounds of Formula 73 are obtained:

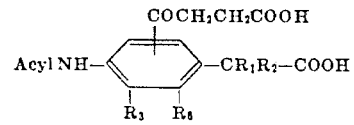

The keto group is reduced to the $CH_2$ group in accordance with Clemmensen or Wolff-Kishner, or also by hydrogenation. Subsequent treatment with polyphosphoric acid results in tetralones of Formulas 74 and 75, respectively:

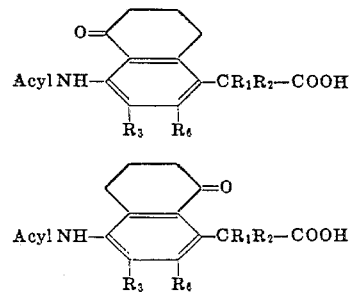

The reduction of these latter compounds yields the corresponding tetralins or hydroxytetralins. From the latter, $H_2O$ can be split off, and dihydroaphthalenes can be obtained. The acyl group is normally removed during the ring closure reaction, or otherwise subsequently, by hydrolysis, and the remaining amino group is alkylated as described above.

Particularly preferred novel intermediates are the following:
3-chloro-4-piperdino-α-methyl-phenylacetyl chloride
3-bromo-4-piperidino-α-methyl-phenylacetyl chloride
3,α-dimethyl-4-piperidino-phenylacetyl chloride
3-chloro-4-piperidino-α-methyl-benzyl cyanide
3-bromo-4-piperidino-α-methyl-benzyl cyanide
3,α-dimethyl-4-piperidino-α-methyl-benzyl cyanide
3-chloro-4-piperidino-α-methylene-phenylacetic acid, its methyl ester and its ethyl ester
3-bromo-4-piperidino-α-methylene-phenylacetic acid, its methyl ester and its ethyl ester
3,α-dimethyl-4-piperidino-α-methylene-phenylacetic acid, its methyl ester and its ethyl ester
4-piperidino-α-methylene-naphthyl-1-acetic acid, its methyl ester and its ethyl ester
4-piperidino-α-ethylidene-naphthyl-1-acetic acid, its methyl ester and its ethyl ester
3-chloro-4-piperidino-α-hydroxy-α-methyl-phenylacetic acid, its methyl ester and its ethyl ester
3-bromo-4-piperidino-α-hydroxy-α-methyl-phenylacetic acid, its methyl ester and its ethyl ester
3,α-dimethyl-4-piperidino-α-hydroxy-phenylacetic acid, its methyl ester and its ethyl ester
4-piperidino-α-hydroxy-α-methyl-naphthyl-1-acetic acid, it methyl ester and its ethyl ester
3-chloro-4-piperidino-α-chloro-α-methyl-phenylacetic acid, its methyl ester and its ethyl ester
3-bromo-4-piperidino-α-chloro-α-methyl-phenylacetic acid, its methyl ester and its ethyl ester
3,α-dimethyl-4-piperidino-α-chloro-phenylacetic acid, its methyl ester and its ethyl ester
4-piperidino-α-chloro-α-methyl-naphthyl-1-acetic acid, its methyl ester and its ethyl ester
3-chloro-4-piperidino-phenylmalonic acid dimethyl ester and diethyl ester
3-bromo-4-piperidino-phenylmalonic acid dimethyl ester and diethyl ester
4-nitro-α-methyl-naphthyl-1-malonic acid dimethyl ester and diethyl ester
4-nitro-2,α-dimethyl-naphthyl-1-malonic acid dimethyl ester and diethyl ester
3-nitro-4-bromo-α-methyl-phenylmalonic acid dimethyl ester and diethyl ester
1-(3-chloro-4-piperidino-phenyl)-1-ethanol
1-(3-bromo-4-piperidino-phenyl)-1-ethanol
1-(3-nitro-4-piperidino-phenyl)-1-ethanol
1-(3-nitro-4-piperidino-1-naphthyl)-ethanol
3-chloro-4-piperidino-phenylglyoxylic acid, its methyl ester and its ethyl ester
3-bromo-4-piperidino-phenylglyoxylic acid, its methyl ester and its ethyl ester
3-methyl-4-piperidino-phenylglyoxylic acid, its methyl ester and its ethyl ester
4-piperidino-naphthyl-1-glyoxylic acid, its methyl ester and its ethyl ester.
3-chloro-4-amino-α-methyl-phenylacetic acid
3-bromo-4-amino-α-methyl-phenylacetic acid
3,α-dimethyl-4-amino-phenylacetic acid
4-amino-α-methyl-naphthyl-1-acetic acid
4-amino-α-ethyl-naphthyl-1-acetic acid
2-methyl-4-amino-naphthyl-1-acetic acid
2,α-dimethyl-4-amino-naphyl-1-acetic acid
2,3-dichloro-4-amino-α-methyl-phenylacetic acid Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

In the following examples, the temperatures are set forth in degrees centigrade. "Worked up as usual" means that the reaction mixture is adjusted to the indicated pH, if necessary by the addition of hydrochloric acid or sodium hydroxide solution, extracted with ethyl acetate or chloroform, dried over sodium sulfate, filtered, the solvent is removed by distillation, and the residue is distilled, or it is crystallized out of the solvent mentioned in each particular case.

($\alpha$) = specific rotation $[\alpha]_D^{20}$, measured at a concentration of 1 g. in 100 ml. of methanol.

EXAMPLE 1

Twelve g. of 3-bromo-4-aminophenylacetic acid and 12.5 g. of 1,5-dibromopentane are mixed with 25 g. of 10 percent aqueous sodium hydroxide solution and boiled under agitation. After 4 hours, another 35 g. of 10 percent aqueous sodium hydroxide solution is added. After boiling for additionally 3–4 hours, the reaction mixture is extracted with ether and worked up as usual (pH 5.4 – 5.6), thus obtaining 3-bromo-4-piperidinophenylacetic acid, m.p. 129°–130° (diisopropyl ether).

Analogously, 3-chloro-4-piperidinophenylacetic acid, m.p. 105°–106°, is obtained from 3-chloro-4-aminophenylacetic acid (m.p. 137°; produced by chlorinating 4-acetamidobenzyl cyanide in glacial acetic acid at 60°–90° to 3-chloro-4-acetamidobenzyl cyanide, m.p. 127°–128°, and subsequent saponification with boiling concentrated hydrochloric acid); and 3-methyl-4-piperidinophenylacetic acid, m.p. 72°, from 3-methyl-4-aminophenylacetic acid [hydrochloride, m.p. 235° with decomposition; produced from 3-methyl-4-nitrobenzyl cyanide by catalytic hydrogenation to 3-methyl-4-aminobenzyl cyanide (hydrochloride, m.p. 260° with decomposition) and subsequent saponification.]

Analogously, from the following 4-aminophenylacetic acids:

3-fluoro-4-amino-
3,5-dimethyl-4-amino-
3, α-dimethyl-4-amino-
3-ethyl-4-amino-α-methyl-
3-propyl-4-amino-α-methyl-
3-isopropyl-4-amino-α-methyl-
3-n-butyl-4-amino-α-methyl-
3-isobutyl-4-amino-α-methyl-
3-sec.butyl-4-amino-α-methyl-
3,5-dichloro-4-amino-α-methyl-
3-iodo-4-amino-α-methyl-
3-trifluoromethyl-4-amino-α-methyl-
3,5,α-trimethyl-4-amino-
3-chloro-4-amino-5-α-dimethyl-
3-methyl- 4-amino-α-ethyl-
3-chloro-4-amino-α-ethyl-
3-bromo-4-amino-α-ethyl-
3, α, α-trimethyl-4-amino-
3-chloro-4-amino-α,α-dimethyl-
3-bromo-4-amino-α,α-dimethyl-
3-methyl-4-amino-α-propyl-
3-chloro-4-amino-α-propyl-
3-chloro-4-amino-α-isopropyl-
3-bromo-4-amino-α-isopropyl-
3-chloro-4-amino-α-n-butyl-
3-bromo-4-amino-α-n-butyl-
3-chloro-4-amino-α-sec.butyl-
3-bromo-4-amino-α-sec.butyl-
3-chloro-4-amino-α-tert.butyl- and
3-bromo-4-amino-α-tert.butyl-phenylacetic acid, respectively, the following compounds are obtained by reaction with 1,5-dibromopentane:

3-fluoro-4-piperidinophenylacetic acid
3,5-dimethyl-4-piperidinophenylacetic acid
3,α-dimethyl-4-piperidinophenylacetic acid
3-ethyl-4-piperidino-α-methyl-phenylacetic acid
3-propyl-4-piperidino-α-methyl-phenylacetic acid
3-isopropyl-4-piperidino-α-methyl-phenylacetic acid
3-n-butyl-4-piperidino-α-methyl-phenylacetic acid
3-isobutyl-4-piperidino-α-methyl-phenylacetic acid
3-sec.butyl-4-piperidino-α-methyl-phenylacetic acid
3,5-dichloro-4-piperidino-α-methyl-phenylacetic acid
3-iodo-4-piperidino-α-methyl-phenylacetic acid
3-trifluoromethyl-4-piperidino-α-methyl-phenylacetic acid
3,5,α-trimethyl-4-piperidino-phenylacetic acid
3-chloro-4-piperidino-5,α-dimethyl-phenylacetic acid
3-methyl-4-piperidino-α-ethyl-phenylacetic acid
3-chloro-4-piperidino-α-ethyl-phenylacetic acid
3-bromo-4-piperidino-α-ethyl-phenylacetic acid
3,α,α-trimethyl-4-piperidino-phenylacetic acid
3-chloro-4-piperidino-α,α-dimethyl-phenylacetic acid
3-bromo-4-piperidino-α,α-dimethyl-phenylacetic acid
3-methyl-4-piperidino-α-propyl-phenylacetic acid
3-chloro-4-piperidino-α-propyl-phenylacetic acid
3-chloro-4-piperidino-α-isopropyl-phenylacetic acid
3-bromo-4-piperidino-α-isopropyl-phenylacetic acid
3-chloro-4-piperidino-α-n-butyl-phenylacetic acid
3-bromo-4-piperidino-α-n-butyl-phenylacetic acid
3-chloro-4-piperidino-α-sec.butyl-phenylacetic acid
3-bromo-4-piperidino-α-sec.butyl-phenylacetic acid
3-chloro-4-piperidino-α-tert.butyl-phenylacetic acid
3-bromo-4-piperidino-α-tert.butyl-phenylacetic acid

EXAMPLE 2

Analogously to Example 1, there is obtained from 3-bromo-4-aminophenylacetic acid, by reaction with 1,4-dibromobutane, 3-bromo-4-pyrrolidinophenylacetic acid, m.p. 92°–93°.

In an analogous manner, by reaction with 1,4-dibromobutane, the following compounds are obtained from the corresponding 4-aminophenylacetic acid.

3,α-dimethyl-4-pyrrolidinophenylacetic acid
3-ethyl-4-pyrrolidino-α-methyl-phenylacetic acid
3-trifluoromethyl-4-pyrrolidino-α-methyl-phenylacetic acid
3-fluoro-4-pyrrolidinophenylacetic acid
3-chloro-4-pyrrolidinophenylacetic acid
3-chloro-4-pyrrolidino-α-methyl-phenylacetic acid, m.p. 95°–96
3-bromo-4-pyrrolidino-α-isopropyl-phenylacetic acid
3-iodo-4-pyrrolidino-α-methyl-phenylacetic acid
3-bromo-4-pyrrolidino-α,α-dimethyl-phenylacetic acid
3-chloro-4-pyrrolidino-α,α-dimethyl-phenylacetic acid
3,5-dimethyl-4-pyrrolidino-phenylacetic acid
3,5,α-trimethyl-4-pyrrolidino-phenylacetic acid 3-chloro-5-α-diethyl-4-pyrrolidino-phenylacetic acid
3-trifluoromethyl-4-pyrrolidino-phenylacetic acid
3-methyl-4-pyrrolidino-phenylacetic acid
3-ethyl-4-pyrrolidino-phenylacetic acid
3-propyl-4-pyrrolidino-phenylacetic acid
3-isopropyl-4-pyrrolidino-phenylacetic acid
3-propyl-4-pyrrolidino-phenylacetic acid
3-isopropyl-4-pyrrolidino-α-methyl-phenylacetic acid

EXAMPLE 3 a. 24.4 g. of 3-bromo-4-amino-phenylacetic acid methyl ester is heated with 25.4 g. of 90 percent formic acid and 19 g. 35 percent aqueous formaldehyde solution to 90°–95° for 10 hours. After cooling, the reaction mixture is worked up as usual (pH 7), thus obtaining the methyl ester of 3-bromo-4-pyrrolidino-phenylacetic acid, b.p. 134°–137°/0.2 mm.

b. 10.7 g. of this ester is boiled for one-half hour with a solution of 4.5 g. of KOH in 80 ml. of ethanol. The alcohol is evaporated, the residue is dissolved in water, and the solution is washed with ether and worked up as usual (pH 4.5 – 5), thus obtaining 3-bromo-4-dimethylamino-phenylacetic acid, m.p. 85° (diisopropyl ether/hexane).

Analogously, from the corresponding 4-amino-phenylacetic acid methyl esters, such as, for example:
3-chloro-4-amino-
3-iodo-4-amino-α-methyl-
3,5,α-trimethyl-4-amino- and
3-chloro-4-amino-5,α-dimethyl-phenylacetic acid methyl ester,
respectively, the following compounds are obtained by reaction with formic acid and formaldehyde and subsequent saponification:
3-chloro-4-dimethylamino-phenylacetic acid
3-iodo-4-dimethylamino-α-methyl-phenylacetic acid
3,5,α-trimethyl-4-dimethylamino-phenylacetic acid
3-chloro-4-dimethylamino-5,α-dimethyl-phenylacetic acid

EXAMPLE 4

Analogously to Example 1, 3-bromo-4-piperidino-α-methyl-phenylacetic acid, m.p. 115°–116°, is obtained from 3-bromo-4-amino-α-methyl-phenylacetic acid (m.p. 114°–115°) with 1,5-bromopentane.

The starting material is obtained from 4-nitro-α-methyl-benzyl cyanide by catalytic hydrogenation to the amino compound (b.p. 140°145°/0.4 mm.), acetylation with acetic anhydride in benzene to the 4-acetamide derivative (m.p. 84°), bromination in water at 70° to 3-bromo-4-acetamide-α-methyl-benzyl cyanide (m.p. 85°) and subsequent saponification in boiling concentrated hydrochloric acid.

Analogously, from the corresponding 4-amino-phenylacetic acids, the following compounds are obtained by reaction with 2,6-dibromoheptane, 1,6-dibromohexane, 2,2'-dichlorodiethyl ether, 1,5-dibromopentane and 2,2'-dichlorodiethyl sulfide, respectively:
3-chloro-4-(2,6-dimethylpiperidino)-α-methyl-phenylacetic acid
3-chloro-4-homopiperidino-phenylacetic acid
3-bromo-4-homopiperidino-phenylacetic acid
3-iodo-4-homopiperidino-phenylacetic acid
3-trifluoromethyl-4-homopiperidino-phenylacetic acid
3-cyano-4-homopiperidino-phenylacetic acid
3-sulfamoyl-4-homopiperidino-phenylacetic acid
3-methyl-4-homopiperidino-phenylacetic acid
3-ethyl-4-homopiperidino-phenylacetic acid
3-propyl-4-homopiperidino-phenylacetic acid
3-isopropyl-4-homopiperidino-phenylacetic acid
3-ethylmercapto-4-homopiperidino-phenylacetic acid
3-chloro-4-homopiperidino-α-methyl-phenylacetic acid
3-bromo-4-homopiperidino-α-methyl-phenylacetic acid
3-sulfamoyl-4-homopiperidino-α-methyl-phenylacetic acid
3,α-dimethyl-4-homopiperidino-phenylacetic acid
3-ethyl-4-homopiperidino-α-methyl-phenylacetic acid
3-propyl-4-homopiperidino-α-methyl-phenylacetic acid
3-isopropyl-4-homopiperidino-α-methyl-phenylacetic acid
3-ethylmercapto-4-homopiperidino-α-methyl-phenylacetic acid
3-iodo-4-morpholino-phenylacetic acid
3-sulfamoyl-4-morpholino-phenylacetic acid
3-methyl-4-morpholino-phenylacetic acid
3-ethyl-4-morpholino-phenylacetic acid
3-n-propyl-4-morpholino-phenylacetic acid
3-isopropyl-4-morpholino-phenylacetic acid
3-methylmarcapto-4-morpholino-phenylacetic acid
3-ethylmercapto-4-morpholino-phenylacetic acid
3-bromo-4-morpholino-α-methyl-phenylacetic acid
3-sulfamoyl-4-morpholino-α-methyl-phenylacetic acid
3,α-dimethyl-4-morpholino-phenylacetic acid
3-ethyl-4-morpholino-α-methyl-phenylacetic acid
3-propyl-4-morpholino-α-methyl-phenylacetic acid
3-isopropyl-4-morpholino-α-methyl-phenylacetic acid
3-ethylmercapto-4-morpholino-αmethyl-phenylacetic acid
2,5,α-trimethyl-4-piperidino-phenylacetic acid
3-sulfamoyl-4-piperidino-phenylacetic acid
3-ethyl-4-piperidino-phenylacetic acid
3-n-propyl-4-piperidino-phenylacetic acid
3-isopropyl-4-piperidino-phenylacetic acid
3-n-butyl-4-piperidino-phenylacetic acid
3-isobutyl-4-piperidino-phenylacetic acid
3-sec.butyl-4-piperidino-phenylacetic acid
3-tert.butyl-4-piperidino-phenylacetic acid
3,α-diethyl-4-piperidino-phenylacetic acid
3-propyl-4-piperidino-α-ethyl-phenylacetic acid
3-isopropyl-4-piperidino-α-ethyl-phenylacetic acid
3-n-butyl-4-piperidino-α-ethyl-phenylacetic acid
3-isobutyl-4-piperidino-α-ethyl-phenylacetic acid
3-sec.butyl-4-piperidino-α-ethyl-phenylacetic acid
3-tert.-butyl-4-piperidino-α-ethyl-phenylacetic acid
3-ethyl-4-piperidino-α,α-dimethyl-phenylacetic acid
3-propyl-4-piperidino-α,α-dimethyl-phenylacetic acid
3-isopropyl-4-piperidino-α,α-dimethyl-phenylacetic acid
3-n-butyl-4-piperidino-α,α-dimethyl-phenylacetic acid
3-isobutyl-4-piperidino-α,α-dimethyl-phenylacetic acid
3-sec.butyl-4-piperidino-α,α-dimethyl-phenylacetic acid
3-tert.butyl-4-piperidino-α,α-dimethyl-phenylacetic acid
3-trifluoromethyl-4-piperidino-α-methyl-α-ethyl-phenylacetic acid
3,α-dimethyl-4-piperidino-α-ethyl-phenylacetic acid
3,α-diethyl-4-piperidino-α-methyl-phenylacetic acid
3-ethyl-4-piperidino-α-propyl-phenylacetic acid
3,α-dipropyl-4-piperidino-phenylacetic acid
3-isopropyl-4-piperidino-α-propyl-phenylacetic acid
3,α-di-n-butyl-4-piperidino-phenylacetic acid
3-isobutyl-4-piperidino-α-propyl-phenylacetic acid
3-sec.butyl-4-piperidino-α-propyl-phenylacetic acid
3-tert.butyl-4-piperidino-α-propyl-phenylacetic acid
3-trifluoromethyl-4-piperidino-α-propyl-phenylacetic acid
3-propyl-4-piperidino-α-methyl-α-ethyl-phenylacetic acid
3-isopropyl-4-piperidino-α-methyl-α-ethyl-phenylacetic acid
3-trifluoromethyl-4-thiomorpholino-phenylacetic acid
3-methyl-4-thiomorpholino-phenylacetic acid
3-ethyl-4-thiomorpholino-phenylacetic acid
3-propyl-4-thiomorpholino-phenylacetic acid
3-isopropyl-4-thiomorpholino-phenylacetic acid
3,α-dimethyl-4-thiomorpholino-phenylacetic acid
3-ethyl-4-thiomorpholino-α-methyl-phenylacetic acid
3-propyl-4-thiomorpholino-α-methyl-phenylacetic acid
3-isopropyl-4-thiomorpholino-α-methyl-phenylacetic acid

EXAMPLE 5

Seventy g. of the methyl ester of 3-nitro-4-amino-phenylacetic acid (m.p. 95°–96°; produced by esterification of the acid with methanol in the presence of HCl and 23 g. of 1,5-dibromopentane are heated for 6 hours to 90°–95° and, after cooling, mixed with 200 ml. of ether. The thus-precipitated 4-piperidino-3-nitro-phenylacetic acid methyl ester hydrobromide is vacuum filtered, and the ether filtrate is concentrated by evaporation. The oily residue is boiled for 90 minutes with a solution of 12 g. of KOH in 120 ml. of absolute ethanol;

thereafter, the alcohol is evaporated. The residual substance is dissolved in 40 ml. of water, the solution washed with ether and worked up as usual (pH 4), thus obtaining 3-nitro-4-piperidino-phenylacetic acid, m.p. 108°–110° (benzene-hexane).

Analogously, from the methyl esters of 4-amino-phenylacetic acid set forth below:
3-nitro-4-amino-
3-nitro-4-amino-α-methyl-
3-nitro-4-amino-α,α-dimethyl-
3-nitro-4-amino-α-ethyl-
3-nitro-4-amino-α-methyl-α-ethyl-
3-nitro-4-amino-α-n-propyl-
3-nitro-4-amino-α-isopropyl-
3-nitro-4-amino-α-n-butyl-
3-nitro-4-amino-α-isobutyl- and
3-nitro-4-amino-α-sec.butyl-phenylacetic acid methyl ester,
the following compounds are obtained by reaction with 1,5-dibromopentane, 1,4-dibromobutane, 1,6-dibromohexane, 1,5-dibromo-3-methylpentane,1,5-dibromo-3-ethylpentane,1,5-dibromo-2-methyl-hexane, 2,2'-dichlorodiethyl ether, 2,2'-dichlorodiethyl sulfide, isopropyl bromide and n-butyl bromide, respectively, and subsequent saponification:
3-nitro-4-piperidino-α-methyl-phenylacetic acid, m.p. 87°–88; cyclohexylamine salt, m.p. 175°–177°
3-nitro-4-piperidino-α,α-dimethyl-phenylacetic acid
3-nitro-4-piperidino-α-ethyl-phenylacetic acid
3-nitro-4-piperidino-α-methyl-α-ethyl-phenylacetic acid
3-nitro-4-piperidino-α-n-propyl-phenylacetic acid
3-nitro-4-piperidino-α-isopropyl-phenylacetic acid
3-nitro-4-piperidino-α-n-butyl-phenylacetic acid
3-nitro-4-piperidino-α-isobutyl-phenylacetic acid
3-nitro-4-piperidino-α-sec.butyl-phenylacetic acid
3-nitro-4-pyrrolidino-phenylacetic acid
3-nitro-4-pyrrolidino-α-methyl-phenylacetic acid, m.p. 129°
3-nitro-4-pyrrolidino-α-propyl-phenylacetic acid
3-nitro-4-pyrrolidino-α-isopropyl-phenylacetic acid
3-nitro-4-homopiperidino--phenylacetic acid
3-nitro-4-homopiperidino-α-methyl-phenylacetic acid; cyclohexylamine salt, m.p. 153°–155°
3-nitro-4-(4-methylpiperidino)-α-methyl-phenylacetic acid
3-nitro-4-(4-ethylpiperidino)-α-methyl-phenylacetic acid
3-nitro-4-(2,5-dimethylpiperidino)-α-methyl-phenylacetic acid
3-nitro-4-morpholino-phenylacetic acid
3-nitro-4-morpholino-60-methyl-phenylacetic acid
3-nitro-4-morpholino-α-ethyl-phenylacetic acid
3-nitro-4-thiomorpholino-phenylacetic acid
3-nitro-4-thiomorpholino-α-methyl-phenylacetic acid
3-nitro-4-diisopropylamino-phenylacetic acid
3-nitro-4-diisopropylamino-α-methyl-phenylacetic acid
3-nitro-4-di-n-butylamino-phenylacetic acid
3-nitro-4-di-n-butylamino-α-methyl-phenylacetic acid

EXAMPLE 6

26.4 g. 3-nitro-4-piperidino-phenylacetic acid is dissolved in 300 ml. of absolute ethanol and hydrogenated on palladium until 6.7 l. of $H_2$ is absorbed (duration: 45 minutes). The catalyst is vacuum filtered and the solvent is evaporated, thus obtaining 3-amino-4-piperidino-phenylacetic acid, m.p. 143°–144° (isopropanol).

Analogously, by catalytic hydrogenation, the following compounds are obtained from the corresponding 3-nitrophenylacetic acids:
3-amino-4-piperidino-α-methyl-phenylacetic acid, m.p. 143°–144°
3-amino-4-piperidino-α,α-ethyl-phenylacetic acid
3-amino-4-piperidino-α-ethyl-phenylacetic acid
3-amino-4-piperidino-α-methyl-α-ethyl-phenylacetic acid
3-amino-4-piperidino-α-propyl-phenylacetic acid
3-amino-4-piperidino-α-isopropyl-phenylacetic acid
3-amino-4-piperidino-α-n-butyl-phenylacetic acid
3-amino-4-piperidino-αisobutyl-phenylacetic acid
3-amino-4-piperidino-α-sec.butyl-phenylacetic acid
3-amino-4-pyrrolidino-phenylacetic acid
3-amino-4-pyrrolidino-α-methyl-phenylacetic acid, cyclohexylamine salt, m.p. 184°–186°
3-amino-4-homopiperidino-phenylacetic acid
3-amino-4-homopiperidino-α-methyl-phenylacetic acid, cyclohexylamine salt, m.p. 185°–186°
3-amino-4-(4-methylpiperidino)-α-methyl-phenylacetic acid
3-amino-4-(4-ethylpiperidino)-α-methyl-phenylacetic acid
3-amino-4-(2,5-dimethylpiperidino)-α-methyl-phenylacetic acid
3-amino-4-morpholino-phenylacetic acid
3-amino-4-morpholino-α-methyl-phenylacetic acid, cyclohexylamine salt, m.p. 184°–185°
3-amino-4-morpholino-α-ethyl-phenylacetic acid
3-amino-4-thiomorpholino-phenylacetic acid
3-amino-4-thiomorpholino-α-methyl-phenylacetic acid
3-amino-4-diisopropylamino-phenylacetic acid
3-amino-4-diisopropylamino-α-methyl-phenylacetic acid
3-amino-4-di-n-butylamino-phenylacetic acid
3-amino-4-di-n-butylamino-α-methyl-phenylacetic acid

EXAMPLE 7

11.7 g. of 3-amino-4-piperidino-phenylacetic acid is dissolved in a mixture of 25 ml. of water and 5 ml. of concentrated $H_2SO_4$; this reaction solution is then diazotized at 3°–6° with a solution of 3.5 g. of $NaHO_2$ in 7 ml. of water. This solution is added dropwise to a boiling solution of 6.3 g. of $CuSO_4 \cdot 5H_2O$, 2 g. of powdered copper, 13 g. of KBr, 1.6 ml. of concentrated $H_2SO_4$ in 100 ml. of water (previously boiled for 3 hours). Thereafter, the reaction solution is further boiled for 30 minutes under agitation. After cooling, the reaction mixture is worked up as usual (pH 5 – 5.5), thus obtaining 3-bromo-4-piperidino-phenylacetic acid, m.p. 129°–130° (diisopropyl ether).

Analogously, after diazotization and exchange of the diazonium group against bromine, the following compounds are obtained from the corresponding 3-amino-phenylacetic acids:
3-bromo-4-pyrrolidino-phenylacetic acid, m.p. 92°–93°
3-bromo-4-morpholino-phenylacetic acid
3-bromo-4-morpholino-α-methyl-phenylacetic acid
3-bromo-4-piperidino-α-methyl-phenylacetic acid, m.p. 115°–116°
3-bromo-4-piperidino-α-ethyl-phenylacetic acid
3-bromo-4-piperidino-α-methyl-α-ethyl-phenylacetic acid
3-bromo-4-piperidino-α-n-propyl-phenylacetic acid
3-bromo-4-piperidino-α-n-butyl-phenylacetic acid
3-bromo-4-piperidino-α-sec.butyl-phenylacetic acid
3-bromo-4-thiomorpholino-phenylacetic acid
3-bromo-4thiomorpholino-α-methyl-phenylacetic acid
3-bromo-4-(4-methylpiperidino)-α-methyl-phenylacetic acid
3-bromo-4-homopiperidino-α-methyl-phenylacetic acid
3-bromo-4-(4-ethylpiperidino)-α-methyl-phenylacetic acid
3-bromo-4-(2,5-dimethylpiperidino)-α-methyl-phenylacetic acid
3-bromo-piperidino-α-isopropyl-phenylacetic acid

EXAMPLE 8

23.4 g. of 3-amino-4-piperidino-phenylacetic acid is dissolved in 100 ml. of water and 45 g. of concentrated hydrochloric acid, and then diazotized at 3°–6° with a solution of 7 g. of $NaNO_2$ in 15 ml. of water. The diazonium salt solution is introduced in a thin stream into a weekly boiling solution of $Cu_2Cl_2$ (produced from 20 g. of copper sulfate and 20 g. of NaCl in 80 ml. of water with $SO_2$); after the addition is terminated, the temperature is maintained at 90°–95° for another 30 minutes. After cooling, the reaction mixture is worked up as usual (pH 5 –5.5), thus obtaining 3-chloro-4-piperidino-phenylacetic acid, m.p. 105°–106° (diisopropyl ether).

In an analogous manner, after diazotization and substitution of the diazonium group of chlorine, the following compounds are obtained from the corresponding 3-aminophenylacetic acids:
- 3-chloro-4-pyrrolidino-phenylacetic acid
- 3-chloro-4-morpholino-phenylacetic acid
- 3-chloro-4-piperidino-α-methyl-phenylacetic acid
- 3-chloro-4-morpholino-α-methyl-phenylacetic acid
- 3-chloro-4-pyrrolidino-α-methyl-phenylacetic acid
- 3-chloro-4-piperidino-α-ethyl-phenylacetic acid
- 3-chloro-4-piperidino-α-n-propyl-phenylacetic acid
- 3-chloro-4-piperidino-α-methyl-α-ethyl-phenylacetic acid
- 3-chloro-4-piperidino-α-n-butyl-phenylacetic acid
- 3-chloro-4-piperidino-α-sec.butyl-phenylacetic acid
- 3-chloro-4-piperidino-α-isopropyl-phenylacetic acid
- 3-chloro-4-di-n-butylamino-α-methyl-phenylacetic acid
- 3-chloro-4-di-n-heptylamino-α-methyl-phenylacetic acid
- 3-chloro-4-thiomorpholino-α-methyl-phenylacetic acid
- 3-chloro-4-(4-methylpiperidino)-α-methyl-phenylacetic acid
- 3-chloro-4-homopiperidino-α-methyl-phenylacetic acid
- 3-chloro-4-(2,5-dimethylpiperidino)-α-methyl-phenylacetic acid
- 3-chloro-4-thiomorpholino-phenylacetic acid

EXAMPLE 9

Twenty-two g. of 3-amino-4-piperidino-phenylacetic acid is diazotized in a mixture of 25 g. of concentrated hydrochloric acid and 75 ml. of water at 3°–6° with a solution of 8 g. of NaNO₂ in 15 ml. of water. This diazonium salt solution is added, within 10–15 minutes, to a CuCN solution heated to 60°–70 (produced by heating 25 g. copper sulfate in 100 ml. of water with 28 g. of KCN). After all of the solution has been added, the reaction mixture is heated for another 20 minutes on a steam bath, cooled to room temperature, and worked up as usual (pH 5 – 5.3), thus obtaining 3-cyano-4-piperidino-phenylacetic acid, m.p. 133°–134° (diisopropyl ether/hexane).

Analogously, after diazotization and exchange of the diazonium group against cyanogen, the following compounds are obtained from the corresponding 3-aminophenylacetic acids:
- 3-cyano-4-pyrrolidino-phenylacetic acid
- 3-cyano-4-morpholino-phenylacetic acid
- 3-cyano-4-piperidino-α-methyl-phenylacetic acid
- 3-cyano-4-piperidino-α,α-dimethyl-phenylacetic acid
- 3-cyano-4-piperidino-α-isopropyl-phenylacetic acid
- 3-cyano-4-piperidino-α-n-butyl-phenylacetic acid
- 3-cyano-4-pyrrolidino-α-methyl-phenylacetic acid
- 3-cyano-4-piperidino-α-ethyl-phenylacetic acid
- 3-cyano-4-piperidino-α-methyl-α-ethyl-phenylacetic acid
- 3-cyano-4-piperidino-α-propyl-phenylacetic acid
- 3-cyano-4-thiomorpholino-phenylacetic acid
- 3-cyano-4-thimorpholino-α-methyl-phenylacetic acid
- 3-cyano-4-morpholino-α-methyl-phenylacetic acid
- 3-cyano-4-homopiperidino-α-methyl-phenylacetic acid
- 3-cyano-4-diisopropylamino-α-methyl-phenylacetic acid and
- 3-cyano-4-diisopropylamino--phenylacetic acid, respectively.

EXAMPLE 10

Thirty-two g. of 3-amino-4-piperidino-phenylacetic acid is dissolved in 140 ml. of 10 percent hydrochloric acid and diazotized at 0°–4° with 7.5 g. of NaNO₂ in 14 ml. of water. Thereafter, 24 g. of 40 percent tetrafluoroboric acid is gradually added, and the reaction mixture is buffered to a pH of 3 – 7 under cooling. The thus-precipitated diazonium tetrafluoroborate is vacuum filtered after 15 minutes, washed with cold water, and dried. The diazonium salt is heated to 150°–155° until no white vapors emanate any more. The residue is treated with dilute solution of sodium hydroxide, filtered, and worked up as usual (pH 5.3 – 5.5), thus obtaining 3-fluoro-4-piperidino-phenylacetic acid, m.p. 91°–93° (diisopropyl ether).

Analogously, the following 3-fluorophenylacetic acids are obtained from the corresponding 3-aminophenylacetic acids after diazotization and substitution of the diazonium group by fluorine:
- 3-fluoro-4-morpholino-phenylacetic acid
- 3-fluoro-4-piperidino-α-methyl-phenylacetic acid
- 3-fluoro-4-piperidino-α-ethyl-phenylacetic acid
- 3-fluoro-4-piperidino-α-n-butyl-phenylacetic acid
- 3-fluoro-4-morpholino-α-methyl-phenylacetic acid
- 3-fluoro-4-morpholino-α-ethyl-phenylacetic acid
- 3-fluoro-4-pyrrolidino-α-methyl-phenylacetic acid
- 3-fluoro-4-piperidino-α-propyl-phenylacetic acid
- 3-fluoro-4-piperidino-α,α-dimethyl-phenylacetic acid

EXAMPLE 11

Twenty-three g. of 3-amino-4-piperidino-phenylacetic acid is dissolved in 120 ml. of 18 percent sulfuric acid and diazotized with 7.5 g. of NaNO₂ in 12 ml. of water. This solution is introduced, under stirring, into a mixture of 25 g. of KI in 50 ml. of 1N H₂SO₄. After continuing the agitation overnight, the reaction mixture is heated on a water bath until the evolution of nitrogen is terminated. (Duration: about 30 minutes.) The solution is decolorized with animal charcoal and worked up as usual (pH 6 – 6.4), thus obtaining 3-iodo-4-piperidino-phenylacetic acid, m.p. 128°–131° (benzene - hexane).

In an analogous manner, the following compounds are produced from the corresponding 3-aminophenylacetic acids after diazotization and exchange against iodine:
- 3-iodo-4-piperidino-α-methyl-phenylacetic acid
- 3-iodo-4-piperidino-α-ethyl-phenylacetic acid
- 3-iodo-4-piperidino-α-methyl-α-ethyl-phenylacetic acid
- 3-iodo-4-piperidino-α-n-propyl-phenylacetic acid
- 3-iodo-4-piperidino-α-n-butyl-phenylacetic acid
- 3-iodo-4-morpholino-α-methyl-phenylacetic acid
- 3-iodo-4-pyrrolidino-phenylacetic acid
- 3-iodo-4-pyrrolidino-α-methyl-phenylacetic acid
- 3-iodo-4-diisopropylamino-α-methyl-phenylacetic acid
- 3-iodo-4-homopiperidino-α-methyl-phenylacetic acid
- 3-iodo-4-thiomorpholino-phenylacetic acid
- 3-iodo-4-thiomorpholino-α-methyl-phenylacetic acid

EXAMPLE 12

11.7 g. of 3-amino-4-piperidino-phenylacetic acid is dissolved in 50 ml. of 10 percent hydrochloric acid; the solution is cooled to 5°–10° and diazotized by the gradual addition of 3.5 g. of sodium nitrite. This diazonium salt solution is slowly dropwise introduced, under stirring at 70°–75°, underneath the surface of a solution of 2.7 g. of methylmercaptan in 40 ml. of 20 percent sodium hydroxide solution. Thereafter, the reaction mixture is heated to 90° until the evolution of nitrogen is terminated, cooled, and acidified with hydrochloric acid to a pH of 4 – 6. The dark precipitate is vacuum filtered and recrystallized from diisopropyl ether, thus obtaining 3-methylmercapto-4 112°–115°.

In an analogous manner, the following compounds are obtained from the corresponding 3-aminophenylacetic acids after diazotization and reaction with methylmercaptan:
- 3-methylmercapto-4-piperidino-α-methyl-phenylacetic acid
- 3-methylmercapto-4-piperidino-α-ethyl-phenylacetic acid
- 3-methylmercapto-4-piperidino-α-propyl-phenylacetic acid
- 3-methylmercapto-4-piperidino-α-methyl-α-ethyl-phenylacetic acid
- 3-methylmercapto-4-piperidino-α-n-butyl-phenylacetic acid
- 3-methylmercapto-4-pyrrolidino-phenylacetic acid
- 3-methylmercapto-4-pyrrolidino-α-methyl-phenylacetic acid
- 3-methylmercapto-4-morpholino-phenylacetic acid
- 3-methylmercapto-4-morpholino-α-methyl-phenylacetic acid
- 3-methylmercapto-4-homopiperidino-phenylacetic acid 3-methylmercapto-4-homopiperidino-α-methyl-phenylacetic acid

EXAMPLE 13

23.4 g. of 3-amino-4-piperidino-phenylacetic acid is diazotized in 100 ml. of 10 percent hydrochloric acid by the addition of 7 g. of NaNO₂ in 14 ml. of water. The diazonium salt solution is added dropwise under stirring to a solution of 16 g. of potassium ethyl xanthogenate in 100 ml. of water, heated to 40°–50°. Upon termination of the evolution of nitrogen, the reaction solution is cooled and adjusted to a pH of 4 – 6. The thus-separated 3-ethylxanthogeno-4-piperidino-phenylacetic acid is vacuum filtered and dissolved in 150 ml. of 4N sodium hydroxide solution. With nitrogen being passed through the reaction mixture, the latter is boiled for 1 hour, cooled, and adjusted to a pH of 4 – 6 with strong hydrochloric acid. The thus-precipitated 3-mercapto-4-piperidino-phenylacetic acid is recrystallized from diisopropyl ether, m.p. 112°–115°.

25.1 g. of 3-mercapto-4-piperidino-phenylacetic acid is dissolved in 250 ml. of 1N sodium hydroxide solution and mixed batchwise, under a nitrogen atmosphere, with 26 g. of dimethyl sulfate. The reaction mixture is then stirred for one-half hour at room temperature, mixed with 100 ml. of 2N NaOH boiled under agitation for one-half hour, cooled to 0°–10 and acidified with concentrated hydrochloric acid to a pH of 4 – 6, thus obtaining 3-methylmercapto-4-piperidino-phenylacetic acid, m.p. 112 –115° (diisopropyl ether).

Analogously, there are obtained, from the corresponding aminophenylacetic acids after diazotization and subsequent reactions with potassium ethyl xanthogenate and dimethyl sulfate, diethyl sulfate, propyl bromide, and diisopropyl sulfate, by way of the following compounds:

3-mercapto-4-piperidino-phenylacetic acid
3-mercapto-4-piperidino-α-methyl-phenylacetic acid
3-mercapto-4-piperidino-α-ethyl-phenylacetic acid
3-mercapto-4-piperidino-α-propyl-phenylacetic acid
3-mercapto-4-piperidino-α,α-dimethyl-phenylacetic acid
3-mercapto-4-piperidino-α-methyl-α-ethyl-phenylacetic acid
3-mercapto-4-piperidino-α-n-butyl-phenylacetic acid
3-mercapto-4-pyrrolidino-phenylacetic acid
3-mercapto-4-pyrrolidino-α-methyl-phenylacetic acid
3-mercapto-4-homopiperidino-phenylacetic acid
3-mercapto-4-homopiperidino-α-methyl-phenylacetic acid
3-mercapto-4-morpholino-phenylacetic acid
3-mercapto-4-morpholino-α-methyl-phenylacetic acid
3-mercapto-4-thiomorpholino-phenylacetic acid
3-mercapto-4-thiomorpholino-α-methyl-phenylacetic acid
3-mercapto-4-diisopropylamino-α-methyl-phenylacetic acid the 3-alkylmercapto-phenylacetic acids set out below:
3-methylmercapto-4-piperidino-α-n-butyl-phenylacetic acid
3-methylmercapto-4-homopiperidino-α-methyl-phenylacetic acid
3-methylmercapto-4-diisopropylamino-α-methyl-phenylacetic acid
3-methylmercapto-4-thiomorpholino-phenylacetic acid
3-methylmercapto-4-thiomorpholino-α-methyl-phenylacetic acid
3-ethylmercapto-4-pyrrolidino-phenylacetic acid
3-ethylmercapto-4-pyrrolidino-α-methyl-phenylacetic acid
3-ethylmercapto-4-morpholino-phenylacetic acid
3-ethylmercapto-4-morpholino-α-methyl-phenylacetic acid
3-ethylmercapto-4-piperidino-phenylacetic acid
3-ethylmercapto-4-piperidino-α-methyl-phenylacetic acid
3-ethylmercapto-4-piperidino-α-ethyl-phenylacetic acid
3-ethylmercapto-4-piperidino-α-propyl-phenylacetic acid
3-ethylmercapto-4-piperidino-α,α-dimethyl-phenylacetic acid
3-ethylmercapto-4-piperidino-α-methyl-α-ethyl-phenylacetic acid
3-ethylmercapto-4-thiomorpholino-phenylacetic acid
3-ethylmercapto-4-thiomorpholino-α-methyl-phenylacetic acid
3-propylmercapto-4-piperidino-phenylacetic acid
3-propylmercapto-4-piperidino-α-methyl-phenylacetic acid
3-propylmercapto-4-piperidino-α-ethyl-phenylacetic acid
3-propylmercapto-4-piperidino-α,α-dimethyl-phenylacetic acid
3-isopropylmercapto-4-piperidino-phenylacetic acid
3-isopropylmercapto-4-piperidino-α-methyl-phenylacetic acid
3-isopropylmercapto-4-piperidino-α-ethyl-phenylacetic acid
3-isopropylmercapto-4-piperidino-α-propyl-phenylacetic acid
3-isopropylmercapto-4-piperidino-α,α-dimethyl-phenylacetic acid

EXAMPLE 14

11.7 g. of 3-amino-4-piperidino-phenylacetic acid is dissolved in 50 ml. of 10 percent sulfuric acid and diazotized at 0°–5° by the addition of 3.5 g. of NaNO₂ in 8 ml. of water. The diazonium salt solution is introduced under stirring into 250 ml. of boiling water. Thereafter, the reaction mixture is boiled for another 30 minutes. Upon cooling and buffering to a pH of 4 – 6, the crude 3-hydroxy-4-piperidino-phenylacetic acid separates; this product is purified by reprecipitation from diisopropyl ether with the addition of activated charcoal.

Analogously, the following compounds are obtained from the corresponding 3-aminophenylacetic acids after diazotization and boiling:

3-hydroxy-4-piperidino-α-methyl-phenylacetic acid
3-hydroxy-4-piperidino-α-ethyl-phenylacetic acid
3-hydroxy-4-piperidino-α-propyl-phenylacetic acid
3-hydroxy-4-piperidino-α,α-dimethyl-phenylacetic acid
3-hydroxy-4-pyrrolidino-α-methyl-phenylacetic acid
3-hydroxy-4-morpholino-phenylacetic acid
3-hydroxy-4-morpholino-α-methyl-phenylacetic acid
3-hydroxy-4-homopiperidino-phenylacetic acid
3-hydroxy-4-homopiperidino-α-methyl-phenylacetic acid

EXAMPLE 15

23.5 g. of 3-hydroxy-4-piperidino-phenylacetic acid is dissolved under a nitrogen atmosphere in 250 ml. of 1N sodium hydroxide solution, and mixed batchwise under agitation with 26 g. of dimethyl sulfate. The methyl ester of 3-methoxy-4-piperidino-phenylacetic acid gradually separates in oily form. After stirring for one-half hour, 100 ml. of 2N sodium hydroxide solution is added, and the reaction solution is boiled under stirring for one-half hour. The clear solution is then cooled to 0°–10 and acidified with hydrochloric acid to a pH of 4 – 6. The thus-precipitated 3-methoxy-4-piperidino-phenylacetic acid is vacuum filtered, washed with water, dried, and recrystallized from diisopropyl ether with the addition of activated charcoal, m.p. 116°–110°.

Analogously, the following compounds are prepared from the corresponding 3-hydroxy-phenylacetic acids by reaction with dimethyl sulfate, diethyl sulfate and diisopropyl sulfate, respectively:

3-methoxy-4-piperidino-α-methyl-phenylacetic acid
3-methoxy-4-piperidino-α-ethyl-phenylacetic acid
3-methoxy-4-piperidino-α-propyl-phenylacetic acid
3-methoxy-4-piperidino-α,α-dimethyl-phenylacetic acid
3-methoxy-4-pyrrolidino-α-methyl-phenylacetic acid
3-methoxy-4-homopiperidino-phenylacetic acid
3-methoxy-4-homopiperidino-α-methyl-phenylacetic acid
3-methoxy-4-morpholino-phenylacetic acid
3-methoxy-4-morpholino-α-methyl-phenylacetic acid
3-ethoxy-4-piperidino-phenylacetic acid
3-ethoxy-4-piperidino-α-methyl-phenylacetic acid
3-ethoxy-4-piperidino-α-ethyl-phenylacetic acid
3-ethoxy-4-piperidino-α-propyl-phenylacetic acid
3-ethoxy-4-piperidino-α,α-dimethyl-phenylacetic acid
3-ethoxy-4-homopiperidino-α-methyl-phenylacetic acid
3-isopropoxy-4-piperidino-phenylacetic acid 3-isopropoxy-4-piperidino-α-methyl-phenylacetic acid
3-isopropoxy-4-piperidino-α-ethyl-phenylacetic acid
3-isopropoxy-4-piperidino-α-propyl-phenylacetic acid
3-isopropoxy-4-piperidino-α,α-dimethyl-phenylacetic acid

EXAMPLE 16

23.5 g. of 4-piperidino-α-methyl-phenylacetic acid (obtainable by hydrolyzing 4-amino-α-methyl-benzyl cyanide with hydrochloric acid and reacting the thus-obtained 4-amino-α-methyl-phenylacetic acid with 1,5-dibromopentane) is dissolved in a mixture of 45 ml. of dioxane, 5.6 g. of KOH and 20 ml. of water, and the solution is mixed dropwise under stirring at 5°–7° with a solution of 15 g. of bromine in 160 ml. of dioxane (duration: about 2 hours). The reaction mixture is concentrated by evaporation, and the residue is dissolved in 50 ml. of water and worked up as usual (pH 5.5 – 6), thus obtaining 3-bromo-4-piperidino-α-methyl-phenylacetic acid, m.p. 115°–116° (diisopropyl ether).

Analogously, from:
4-piperidino-
4-piperidino-α-methyl-
4-piperidino-α-ethyl-
4-morpholino-
4-morpholino-α-methyl-
4-dimethylamino-α-methyl-
4-diisopropylamino-α-methyl-
4-di-n-butylamino-α-methyl-
4-di-n-hexylamino-α-methyl-
4-piperidino-α-isopropyl-
4-piperidino-α-n-butyl- and
4-homopiperidino-α-methyl-phenylacetic acid,
the following compounds are obtained by bromination:
3-bromo-4-piperidino-phenylacetic acid, m.p. 129°–130°
3-bromo-4-piperidino-α-methyl-phenylacetic acid
3-bromo-4-piperidino-α-ethyl-phenylacetic acid
3-bromo-4-morpholino-phenylacetic acid
3-bromo-4-morpholino-α-methyl-phenylacetic acid
3-bromo-4-dimethylamino-α-methyl-phenylacetic acid
3-bromo-4-diisopropylamino-α-methyl-phenylacetic acid
3-bromo-4-di-n-butylamino-α-methyl-phenylacetic acid
3-bromo-4-di-n-hexylamino-α-methyl-phenylacetic acid
3-bromo-4-piperidino-α-isopropyl-phenylacetic acid
3-bromo-4-piperidino-α-n-butyl-phenylacetic acid
3-bromo-4-homopiperidino-α-methyl-phenylacetic acid

EXAMPLE 17

Eighteen g. of 4-piperidino-phenylacetic acid is dissolved in 70 ml. of acetic acid and mixed, under stirring, with 1 g. of HgO and 20 g. finely powdered iodine. The agitation is continued at room temperature for 48 hours. The black solution is poured onto water; the thus-obtained product is taken up in ethanol and treated with sodium thiosulfate solution. The ethanol is removed by evaporation, and the aqueous solution is worked up as usual (pH 4 – 6), thus obtaining 3-iodo-4-piperidino-phenylacetic acid, m.p. 128°–131° (benzene/hexane).

In an analogous manner, the following compounds are produced from the corresponding phenylacetic acids which are unsubstituted in the 3-position, by means of iodization:
3-iodo-4-piperidino-α-methyl-phenylacetic acid
3-iodo-4-piperidino-α-ethyl-phenylacetic acid
3-iodo-4-piperidino-α-isopropyl-phenylacetic acid
3-iodo-4-piperidino-α-n-butyl-phenylacetic acid
3-iodo-4-morpholino-α-methyl-phenylacetic acid
3-iodo-4-dimethylamino-α-methyl-phenylacetic acid
3-iodo-4-di-n-butylamino-α-methyl-phenylacetic acid
3-iodo-4-di-n-hexylamino-α-methyl-phenylactic acid
3-iodo-4-diisopropylamino-α-methyl-phenylacetic acid
3-iodo-4-homopiperidino-α-methyl-phenylacetic acid

EXAMPLE 18

30.0 g. of 2-(3-bromo-4-piperidino-phenyl)-2-propanol (b.p. 148°–153°/0.05 mm.; obtainable from 3-bromo-4-aminobenzoic acid by esterification and reaction with 1,5-dibromopentane to form the 3-bromo-4-piperidino-benzoic acid methyl ester, as well as reaction of the ester with methyl magnesium iodide) is dissolved in 200 ml. of formic acid and added dropwise to 400 g. of concentrated sulfuric acid under vigorous agitation at 5°–10° within 1 – 2 hours. The reaction mixture is then stirred for another hour without cooling and decomposed by pouring onto ice. Sodium carbonate is added to a pH of 4 – 6, thus separating 3-bromo-4-piperidino-α,α-dimethyl-phenylacetic acid; monohydrate, m.p. 107°–109° (from ethanol/water).

Analogously, from:
2-(3-chloro-4-morpholino-phenyl)-2-propanol
2-(3-bromo-4-morpholino-phenyl)-2-propanol
2-(3-chloro-4-pyrrolidino-phenyl)-2-propanol
2-(3-bromo-4-pyrrolidino-phenyl)-2-propanol
2-(3,5-dimethyl-4-piperidino-phenyl)-2-propanol
2-(3-chloro-5-methyl-4-piperidino-phenyl)-2-propanol
2-(3,5-dimethyl-4-dimethylamino-phenyl)-2-propanol
2-(3,5-dimethyl-4-pyrrolidino-phenyl)-2-propanol
2-(3-chloro-5-methyl-4-pyrrolidino-phenyl)-2-propanol
2-(3,5-dimethyl-4-morpholino-phenyl)-2-propanol and
2-(3-chloro-5-methyl-4-morpholino-phenyl)-2-propanol,
respectively, the following compounds are obtainable by reaction with formic acid and concentrated sulfuric acid:
3-chloro-4-morpholino-α,α-dimethyl-phenylacetic acid
3-bromo-4-morpholino-α,α-dimethyl-phenylacetic acid
3-chloro-4-pyrrolidino-α,α-dimethyl-phenylacetic acid
3-bromo-4-pyrrolidino-α,α-dimethyl-phenylacetic acid
3,5-dimethyl-4-piperidino-α,α-dimethyl-phenylacetic acid
3-chloro-5-methyl-4-piperidino-α,α-dimethyl-phenylacetic acid
3,5-dimethyl-4-dimethylamino-α,α-dimethyl-phenylacetic acid
3,5-dimethyl-4-pyrrolidino-α,α-dimethyl-phenylacetic acid
3-chloro-5-methyl-4-pyrrolidino-α,α-dimethyl-phenylacetic acid
3,5-dimethyl-4-morpholino-α,α-dimethyl-phenylacetic acid and
3-chloro-5-methyl-4-morpholino-α,α-dimethyl-phenylacetic acid.

EXAMPLE 19

15 g. of 3-trifluoromethyl-4-piperidino-α,α-dimethylbenzyl cyanide (b.p. 182°–186°/0.02 mm.) is heated for 2.5 hours on a water bath in 100 ml. of 85 percent sulfuric acid, then diluted with 250 ml. of water, and boiled for another 10 hours. The solution is cooled and worked up as usual (pH 4 – 6), thus obtaining 3-trifluoromethyl-4-piperidino-α,α-dimethyl-phenylacetic acid, b.p. 168°–171°/0.05 mm.

The starting material is obtained from 2-bromo-5-nitrotrifluoromethyl benzene, which compound is converted by boiling with piperidine into 2-piperidino-5-nitro-trifluoromethyl benzene (b.p. 173°–178°/0.05 mm.), reduced to the 5-amino derivative with SnCl$_2$ in concentrated hydrochloric acid, diazotized, the diazonium group exchanged for cyanogen, and saponified by boiling with concentrated hydrochloric acid to 3-trifluoromethyl-4-piperidino-benzoic acid. The reduction with LiAlH$_4$/BF$_3$ results in the corresponding benzyl alcohol, b.p. 135°–140°/0.05 mm., which latter is converted into the benzyl bromide with 48% HBr. Reaction with KCN in ethanol/water yields 3-trifluoromethyl-4-piperidino-benzyl cyanide which is reacted successively with NaNH$_2$ and dimethyl sulfate in boiling benzene.

Analogously, from the following benzyl cyanides:
3-trifluoromethyl-4-piperidino-
3-chloro-4-piperidino-α,α-dimethyl-
3-methylmercapto-4-piperidino-α,α-dimethyl-
3-chloro-4-homopiperidino-α,α-dimethyl-
3-bromo-4-homopiperidino-α,α-dimethyl-
3-iodo-4-piperidino-α,α-dimethyl-
3-chloro-4-piperidino-α,α-di-n-butyl-
3-bromo-4-piperidino-α,α-diethyl- 3,5-dimethyl-4-piperidino-α,α-diethyl-
3,5-dimethyl-4-diisopropylamino-α,α-dimethyl-
3,5-dimethyl-4-homopiperidono-α,α-dimethyl-
3-chloro-5-methyl-4-homopiperidino-α,α-dimethyl-
3,5-dimethyl-4-piperidino-α,α-di-n-butyl-
3-chloro-5-methyl-4-dimethylamino-α,α-dimethyl-
3-chloro-5-methyl-4-diisopropylamino-α,α-dimethyl-
3-trifluoromethyl-4-diethylamino-α-methyl-
3-trifluromethyl-4-di-n-propylamino-α-methyl-
3-trifluoromethyl-4-di-n-butylamino-α-methyl-
3-ethylamino-4-piperidino-
3-n-propylamino-4-piperidino-
3-isopropylamino-4-piperidino-
3-diethylamino-4-piperidino-
3-ethylamino-4-piperidino-α-methyl-
3-n-propylamino-4-piperidino-α-methyl-
3-isopropylamino-4-piperidino-α-methyl-
3-diethylamino-4-piperidino-α-methyl-
3-ethylamino-4-piperidino-α-ethyl-
3-n-propylamino-4-piperidino-α-ethyl-
3-isopropylamino-4-piperidino-α-ethyl-
3-diethylamino-4-piperidino-α-ethyl-
3-ethylamino-4-piperidino-α-n-propyl-
3-n-propylamino-4-piperidino-α-n-propyl-
3-isopropylamino-4-piperidino-α-n-propyl-
3-diethylamino-4-piperidino-α-n-propyl-
3-ethylamino-4-piperidino-α,α-dimethyl-
3-n-propylamino-4-piperidino-α,α-dimethyl-
3-isopropylamino-4-piperidino-α,α-dimethyl- and
3-diethylamino-4-piperidino-α,α-dimethyl benzyl cyanide, respectively, the following compounds are obtained by saponification with sulfuric acid:
3-trifluoromethyl-4-piperidino-phenylacetic acid
3-chloro-4-piperidino-α,α-dimethyl-phenylacetic acid
3-methylmercapto-4-piperidino-α,α-dimethyl phenylacetic acid
3-chloro-4-homopiperidino-α,α-dimethyl-phenylacetic acid
3-bromo-4-homopiperidino-α,α-dimethyl-phenylacetic acid
3-iodo-4-piperidino-α,α-dimethyl-phenylacetic acid
3-chloro-4-piperidino-α,α-di-n-butyl-phenylacetic acid
3-bromo-4-piperidino-α,α-diethyl-phenylacetic acid
3,5-dimethyl-4-piperidino-α,α-diethyl-phenylacetic acid
3,5-dimethyl-4-diisopropylamide-α,α-dimethyl-phenylacetic acid
3,5-dimethyl-4-homopiperidino-α,α-dimethyl-phenylacetic acid
3-chloro-5-methyl-4-homopiperidino-α,α-dimethyl-phenylacetic acid
3,5-dimethyl-4-piperidino-α,α-di-n-butyl-phenylacetic acid
3-chloro-5-methyl-4-dimethylamino-α,α-dimethyl-phenylacetic acid
3-chloro-5-methyl-4-diisopropylamino-α,α-dimethyl-phenylacetic acid
3-trifluoromethyl-4-diethylamino-α-methyl-phenylacetic acid
3-triefluoromethyl-4-di-n-propylamino-α-methyl-phenylacetic acid and
3-trifluoromethyl-4-di-n-butylamino-α-methyl-phenylacetic acid
3-ethylamino-4-piperidino-phenylacetic acid
3-n-propylamino-4-piperidino-phenylacetic acid
3-isopropylamino-4-piperidino-phenylacetic acid
3-diethylamino-4-piperidino-phenylacetic acid
3-ethylamino-4-piperidino-α-methyl-phenylacetic acid
3-n-propylamino-4-piperidino-α-methyl-phenylacetic acid
3-isopropylamino-4-piperidino-α-methyl-phenylacetic acid
3-diethylamino-4-piperidino-α-methyl-phenylacetic acid
3-ethylamino-4-piperidino-α-ethyl-phenylacetic acid
3-n-propylamino-4-piperidino-α-ethyl-phenylacetic acid
3-isopropylamino-4-piperidino-α-ethyl-phenylacetic acid
3-diethylamino-4-piperidino-α-ethyl-phenylacetic acid
3-ethylamino-4-piperidino-α-n-propyl-phenylacetic acid
3-n-propylamino-4-piperidino-α-n-propyl-phenylacetic acid
3-isopropylamino-4-piperidino-α-n-propyl-phenylacetic acid
3-diethylamino-4-piperidino-α-n-propyl-phenylacetic acid
3-ethylamino-4-piperidino-α,α-dimethyl-phenylacetic acid
3-n-propylamino-4-piperidino-α,α-dimethyl-phenylacetic acid
3-isopropylamino-4-piperidino-α,α-dimethyl-phenylacetic acid
3-diethylamino-4-piperidino-α,α-dimethyl-phenylacetic acid

EXAMPLE 20

Eleven g. of 3-fluoro-4-piperidino-acetophenone (b.p. 165°–170°/0.05 mm.; obtainable by reacting o-aminofluorobenzene with 1,5-dibromopentane to o-piperidinofluorobenzene and subsequent Friedel-Crafts reaction with acetyl chloride) is boiled with 10.4 g. of morpholine and 1.9 g. of sulfur for 10 hours; during this reaction, 3-fluoro-4-piperidiono-phenylthioacetomorpholide is produced, which is not isolated. To this reaction product, 68 ml. of concentrated hydrochloric acid and 50 ml. of water are added and this reaction mixture is boiled for another 24 hours. Then, the reaction mixture is filtered and worked up as usual (pH 4 – 6), thus obtaining 3-fluoro-4-piperidino-phenylacetic acid, m.p. 91°–93 (methanol/water).

In an analogous manner, from
3-fluoro-4-pyrrolidino-
3-fluoro-4-diisopropylamino-
3-fluoro-4-dimethylamino- and
3-trifluoromethyl-4-morpholino-acetophenone, the following compounds are produced by reaction with morpholine and sulfur and then with hydrochloric acid:
3-fluoro-4-pyrrolidino-phenylacetic acid
3-fluoro-4-diisopropylamino-phenylacetic acid
3-fluoro-4-dimethylamino-phenylacetic acid
3-trifluoromethyl-4-morpholino-phenylacetic acid.

EXAMPLE 21 a. A solution of 5 g. of 3-fluoro-4-piperidino-ω-chloroacetophenone (obtainable from 3-fluoro-4-piperidino-acetophenone and sulfuryl chloride in dichloromethane in the presence of potassium carbonate and azo-bis-isobutyronitrile) in 50 ml. of ether is added to 100 ml. of a saturated solution of KOH in ethanol and heated for 2 hours on a water bath. The ether is distilled off, water is added to the residue, and the reaction mixture is worked up as usual (pH 4 –6), thus obtaining 3-fluoro-4-piperidino-phenylacetic acid, melting at 91°–93° after being purified by chromatography on silica gel.

b. Under cooling and vigorous agitation, 10 g. finely pulverized potassium hydroxide is added in incremental portions to a solution of 5 g. of 3-fluoro-4-piperidino-ω-chloroacetophenone in 100 ml. of absolute ether. The mixture is boiled for 10 hours, mixed with 100 ml. of water, worked up as indicated in (a), and yields 3-fluoro-4-piperidino-phenylacetic acid.

EXAMPLE 22

32.6 g. of 3-bromo-4-piperidino-phenylacetic acid ethyl ester, obtainable by esterifying the free acid, is added to a solution of 2.5 g. of sodium in 100 ml. of absolute ethanol at a temperature below 50°. Under agitation, 15 g. of diethyl oxalate is added dropwise to this solution. The reaction mixture is stirred for 1 hour at 60°, cooled, neutralized with dilute sulfuric acid, and the aqueous solution is extracted with benzene. The benzene extract is dried over sodium sulfate, and the solvent is thereafter evaporated. The oily residue is decarbonylated by heating the same for 2 hours to 190°. By distillation, 3-bromo-4-piperidino-phenyl-malonic acid diethyl ester is obtained, b.p. 150°–155°/0.05 mm.

39.8 g. of the diethyl ester of 3-bromo-4-piperidino-phenyl-malonic acid is added to a solution of 2.5 g. of sodium in 300 ml. of absolute ethanol. At room temperature, under stirring, 15 g. of methyl iodide is added dropwise to this solution. The reaction solution is agitated for 6 hours at 35°, the alcohol is evaporated, the residu diluted with water and worked up as usual (pH 5.5), thus obtaining 3-bromo-4-piperidino-phenyl-α-methylnmalonic acid diethyl ester, b.p. 145°–147° C.0.05 mm.

Forty-one g. of the diethyl ester of 3-bromo-4-piperidino-phenyl-α-methyl-malonic acid is saponified by boiling with 500 ml. of 10 percent ethanolic potassium hydroxide solution. The alcohol is removed; the residue is introduced into 1 liter of water and acidified with hydrochloric acid to a pH of 4 – 6. The precipitate is dried, dissolved in acetone and filtered off from the undissolved potassium chloride. The acetone is distilled off, and the residue is heated to 100°–120°/20 mm. until the evolution of $CO_2$ is terminated. From the residue, 3-bromo-4-piperidino-α-methyl-phenylacetic acid is obtained, m.p. 115°–116°.

Analogously, from the following ethyl esters of phenylacetic acid:
3-chloro-4-piperidino-
3-chloro-4-morpholino-
3-chloro-4-pyrrolidino-
3-chloro-4-thiomorpholino-
3-chloro-4-(4-methyl-piperidino)-
3-chloro-4-homopiperidino-
3-chloro-4-(2,5-dimethylpiperidino)-
3-bromo-4-pyrrolidino-
3-bromo-4-thiomorpholino-
3-bromo-4-(4-methyl-piperidino)-
3-bromo-4-homopiperidino-
3-bromo-4-(4-ethyl-piperidino)-
3-bromo-4-(2,5-dimethyl-piperidino)-
3-trifluoromethyl-4-piperidino-
3-trifluoromethyl-4-pyrrolidino-
3-trifluoromethyl-4-morpholino-
3-trifluoromethyl-4-homopiperidino-
3-trifluoromethyl-4-thiomorpholino-
3-iodo-4-morpholino- and
3-iodo-4-pyrrolidino-phenylacetic acid ethyl ester,
there are obtained, by way of corresponding intermediates and by reaction with methyl iodide, the following compounds:
3-chloro-4-piperidino-α-methyl-phenylacetic acid
3-chloro-4-morpholino-α-methyl-phenylacetic acid
3-chloro-4-pyrrolidino-α-methyl-phenylacetic acid
3-chloro-4-thiomorpholino-α-methyl-phenylacetic acid
3-chloro-4-(4-methyl-piperidino)-α-methyl-phenylacetic acid
3-chloro-4-homopiperidino-α-methyl-phenylacetic acid
3-chloro-4-(2,5-dimethyl-piperidino)-α-methyl-phenylacetic acid
3-bromo-4-pyrrolidino-α-methyl-phenylacetic acid
3-bromo-4-thiomorpholino-α-methyl-phenylacetic acid
3-bromo-4-(4-methyl-piperidino)-α-methyl-phenylacetic acid
3-bromo-4-homopiperidino-α-methyl-phenylacetic acid
3-bromo-4-(4-ethyl-piperidino)-α-methyl-phenylacetic acid
3-bromo-4-(2,5-dimethyl-piperidino)-α-methyl-phenylacetic acid
3-trifluoromethyl-4-piperidino-α-methyl-phenylacetic acid
3-trifluoromethyl-4-pyrrolidino-α-methyl-phenylacetic acid
3-trifluoromethyl-4-morpholino-α-methyl-phenylacetic acid
3-trifluoromethyl-4-homopiperidino-α-methyl-phenylacetic acid
3-trifluoromethyl-4-thiomorpholino-α-methyl-phenylacetic acid
3-iodo-4-morpholino-α-methyl-phenylacetic acid and
3-iodo-4-pyrrolidino-α-methyl-phenylacetic acid
and from:
3-trifluoromethyl-4-piperidino-
3-chloro-4-piperidino-
3-bromo-4-piperidino- and
3-iodo-4-piperidino-phenylacetic acid ethyl ester,
by way of corresponding intermediates and by reaction with ethyl iodide, n-propyl iodide, isopropyl iodide, n-butyl iodide and sec.butyl iodide, respectively, the following compounds are obtained:
3-trifluoromethyl-4-piperidino-α-ethyl-phenylacetic acid
3-trifluoromethyl-4-piperidino-α-n-butyl-phenylacetic acid
3-bromo-4-piperidino-α-ethyl-phenylacetic acid
3-bromo-4-piperidino-α-n-propyl-phenylacetic acid
3-bromo-4-piperidino-α-n-butyl-phenylacetic acid
3-bromo-4-piperidino-α-sec.butyl-phenylacetic acid
3-chloro-4-piperidino-α-ethyl-phenylacetic acid
3-chloro-4-piperidino-α-n-propyl-phenylacetic acid
3-chloro-4-piperidino-α-n-butyl-phenylacetic acid
3-chloro-4-piperidino-α-isopropyl-phenylacetic acid and
3-iodo-4-piperidino-α-n-butyl-phenylacetic acid

EXAMPLE 23 a. 9.2 g. of 3-amino-4-piperidino-phenylacetic acid dihydrochloride is dissolved in 150 ml. of 1N sodium hydroxide solution; under vigorous agitation and cooling, 4.7 g. of acetic anhydride is added dropwise to this solution. The reaction mixture is allowed to stand overnight at room temperature; then, hydrochloric acid is added to obtain a pH of 3 – 6, the reaction mixture is separated from the precipitate, and thus there is obtained 3-acetamido-4-piperidino-phenylacetic acid, m.p. 177°–178° (methanol/water).

b. 9.2 g. of 3-amino-4-piperidino-phenylacetic acid dihydrochloride is mixed in 50 ml. of pyridine, under agitation and ice cooling, with 3.5 g. of acetyl chloride. After 2 hours, 50 ml. of water is added, the reaction mixture is allowed to stand overnight, then mixed with another 500 ml. of water, and hydrochloric acid is added to a pH of 3 – 6. Thus, 3-acetamido-4-piperidino-phenylacetic acid is obtained.

Analogously, by acylation of the corresponding 3-amino-phenylacetic acids with acetyl, propionyl, butyryl, isobutyryl and valeryl chloride, respectively (or the corresponding anhydrides), the following compounds are produced: 3-acetamido-4-piperidino-α-methyl-phenylacetic acid, m.p. 162°–163°
3-acetamido-4-homopiperidino-phenylacetic acid
3-acetamido-4-homopiperidino-α-methyl-phenylacetic acid
3-acetamido-4-pyrrolidino-α-methyl-phenylacetic acid
3-acetamido-4-morpholino-α-methyl-phenylacetic acid
3-acetamido-4-piperidino-α-ethyl-phenylacetic acid
3-acetamido-4-piperidino-α,α-dimethyl-phenylacetic acid
3-acetamido-4-piperidino-α-methyl-α-ethyl-phenylacetic acid
3-acetamido-4-piperidino-α-propyl-phenylacetic acid
3-acetamido-4-piperidino-α-n-butyl-phenylacetic acid
3-propionamido-4-piperidino-phenylacetic acid
3-propionamido-4-piperidino-α-methyl-phenylacetic acid
3-propionamido-4-piperidino-α-ethyl-phenylacetic acid
3-propionamido-4-piperidino-α,α-dimethyl-phenylacetic acid
3-propionamido-4-piperidino-α-propyl-phenylacetic acid
3-butyramido-4-piperidino-phenylacetic acid
3-butyramido-4-piperidino-α-methyl-phenylacetic acid
3-butyramido-4-piperidino-α-ethyl-phenylacetic acid
3-butyramido-4-piperidino-α,α-dimethyl-phenylacetic acid
3-butyramido-4-piperidino-α-propyl-phenylacetic acid
3-isobutyramido-4-piperidino-phenylacetic acid
3-isobutyramido-4-piperidino-α-methyl-phenylacetic acid
3-valeramido-4-piperidino-α-methyl-phenylacetic acid

EXAMPLE 24

24.8 g. of the ethyl ester of 3-amino-4-piperidino-phenylacetic acid (b.p. 142°–145°/0.2 mm.) is heated with 25.4 g. of 90 percent formic acid and 19 g. of 39 percent formaldehyde solution for 10 hours to 90°–95°. The mixture is diluted with water, made strongly alkaline with 25 percent sodium hydroxide solution, 100 ml. of 50 percent ethanol is added, and the reaction mixture is boiled for 2 hours. The alcohol is removed, and the reaction mixture is worked up as usual (pH 5 – 6). The oily crude product is taken up in ethanol. Ethereal hydrochloric acid is added thereto, thus obtaining 3-dimethylamino-4-piperidino-phenylacetic acid dihydrochloride, m.p. 285°–290° (decomposition; isopropanol/ether).

Analogously, from the corresponding 3-amino-phenylacetic acids, the following compounds are obtained by methylation with formaldehyde/formic acid:

3-dimethylamino-4-piperidino-α-methyl-phenylacetic acid
3-dimethylamino-4-pyrrolidino-phenylacetic acid
3-dimethylamino-4-pyrrolidino-α-methyl-phenylacetic acid
3-dimethylamino-4-morpholino-α-methyl-phenylacetic acid
3-dimethylamino-4-piperidino-α-ethyl-phenylacetic acid
3-dimethylamino-4-piperidino-α,α-dimethyl-phenylacetic acid
3-dimethylamino-4-piperidino-α-propyl-phenylacetic acid

EXAMPLE 25

To a mixture of 10.6 g. of 30 percent formaldehyde and 0.1 g. of triethylamine, 24.8 g. of 3-amino-4-piperidino-phenylacetic acid methyl ester is added at 20°–25°; the reaction mixture is agitated for 10 minutes, the organic phase is separated, mixed with 20 ml. of methanol, and 1 ml. of triethylamine is added. This mixture is hydrogenated on nickel-kieselguhr at 60°–85° and 10 atmospheres of hydrogen pressure. After 1.5 hours, the catalyst is filtered off, the solution is evaporated to concentrate same, and the thus-obtained methyl ester of 3-methylamino-4-piperidino-phenylacetic acid is distilled; b.p. 150°–153°/0.2 0.2 mm.

The ester (17 g.) is boiled for 1 hour with a solution of 5 g. of KOH in 100 ml. of 50 percent ethanol. Then, the larger portion of the alcohol is removed by evaporation, the residue is diluted with water, extracted with ether, and brought to a pH of 5 – 6 with hydrochloric acid; thus, 3-methylamino-4-piperidino-phenylacetic acid is obtained.

Analogously, the following compounds are obtained from the corresponding 3-aminophenylacetic acids by reaction with formaldehyde and subsequent hydrogenation:

3-methylamino-4-piperidino-α-methyl-phenylacetic acid
3-methylamino-4-piperidino-α-ethyl-phenylacetic acid
3-methylamino-4-piperidino-α,α-dimethyl-phenylacetic acid
3-methylamino-4-piperidino-α-propyl-phenylacetic acid
3-methylamino-4-homopiperidino-phenylacetic acid
3-methylamino-4-homopiperidino-α-methyl-phenylacetic acid

EXAMPLE 26

25.1 g. of 3-mercapto-4-piperidino-phenylacetic acid is dissolved in 300 ml. of 80 percent acetic acid and treated with chlorine until saturation has set in. The reaction mixture is allowed to stand overnight, and the acetic acid is distilled off. The residue, containing the thus-produced 3-chlorosulfonyl-4-piperidino-phenylacetic acid, is dissolved, without any further purification, in 200 ml. of tetrahydrofuran and added dropwise under agitation and cooling at 0°–10° to a solution of 9 g. of dimethylamine in 100 ml. of absolute ethanol. Subsequently, the alcohol is distilled off, the residue is triturated with water, the insoluble material is vacuum filtered, washed with water, dried, and reprecipitated from isopropanol, thus obtaining 3-dimethylsulfamoyl-4-piperidino-phenylacetic acid.

In an analogous manner, the following compounds are produced from the corresponding 3-mercaptophenylacetic acids after oxidation and subsequent reaction with ammonia, methylamine, ethylamine, dimethylamine, diethylamine and diisopropylamine, respectively:

3-sulfamoyl-4-pyrrolidino-phenylacetic acid
3-sulfamoyl-4-pyrrolidino-α-methyl-phenylacetic acid
3-sulfamoyl-4-thiomorpholino-phenylacetic acid
3-sulfamoyl-4-thiomorpholino-α-methyl-phenylacetic acid
3-sulfamoyl-4-piperidino-phenylacetic acid
3-sulfamoyl-4-piperidino-α-methyl-phenylacetic acid
3-sulfamoyl-4-piperidino-α-ethyl-phenylacetic acid
3-sulfamoyl-4-piperidino-α-propyl-phenylacetic acid
3-sulfamoyl-4-piperidino-α,α-dimethyl-phenylacetic acid
3-sulfamoyl-4-piperidino-α-methyl-α-ethyl-phenylacetic acid
3-methylsulfamoyl-4-piperidino-phenylacetic acid
3-methylsulfamoyl-4-piperidino-α-methyl-phenylacetic acid
3-methylsulfamoyl-4-piperidino-α-ethyl-phenylacetic acid
3-methylsulfamoyl-4-piperidino-α,α-dimethyl-phenylacetic acid
3-methylsulfamoyl-4-piperidino-α-propyl-phenylacetic acid
3-ethylsulfamoyl-4-piperidino-phenylacetic acid
3-ethylsulfamoyl-4-piperidino-α-methyl-phenylacetic acid
3-ethylsulfamoyl-4-piperidino-α-ethyl-phenylacetic acid
3-ethylsulfamoyl-4-piperidino-α-propyl-phenylacetic acid
3-ethylsulfamoyl-4-piperidino-α,α-dimethyl-phenylacetic acid
3-dimethylsulfamoyl-4-piperidino-α-methyl-phenylacetic acid
3-dimethylsulfamoyl-4-piperidino-α-ethyl-phenylacetic acid
3-dimethylsulfamoyl-4-piperidino-α-propyl-phenylacetic acid
3-dimethylsulfamoyl-4-piperidino-α,α-dimethyl-phenylacetic acid
3-dimethylsulfamoyl-4-homopiperidino-α-methyl-phenylacetic acid
3-dimethylsulfamoyl-4-pyrrolidino-α-methyl-phenylacetic acid
3-diethylsulfamoyl-4-piperidino-phenylacetic acid
3-diethylsulfamoyl-4-piperidino-α-methyl-phenylacetic acid
3-diethylsulfamoyl-4-piperidino-α-ethyl-phenylacetic acid
3-diethylsulfamoyl-4-piperidino-α-propyl-phenylacetic acid
3-diethylsulfamoyl-4-piperidino-α,α-dimethyl-phenylacetic acid
3-diisopropylsulfamoyl-4-piperidino-α-methyl-phenylacetic acid

EXAMPLE 27

Twenty-six g. of 3-nitro-4-bromo-phenylacetic acid is boiled with 25.5 g. of piperidine in 200 ml. of ethyl alcohol for 24 hours; the larger portion of the alcohol is distilled off, the residue is taken up in 2N hydrochloric acid, filtered, and the filtrate worked up as usual (pH 4), thus obtaining 3-nitro-4-piperidino-phenylacetic acid, m.p. 108°–110° (benzene/diisopropyl ether).

Analogously, from
3-nitro-4-bromo-α-methyl- (m.p. 75°–76°)
3-nitro-4-bromo-
3-nitro-4-bromo-α-isopropyl-
3-nitro-4-bromo-α,α-dimethyl- and
3-chloro-4-bromo-α,α-diethyl-phenylacetic acid, respectively, the following compounds are obtained by reaction with piperidine, morpholine, thiomorpholine, homopiperidine, pyrrolidine, 2,5-dimethyl-piperidine, di-n-butylamine, di-n-hexylamine, and diisopropylamine, respectively:

3-nitro-4-piperidino-α-methyl-phenylacetic acid, m.p. 87°–88
3-nitro-4-piperidino-α-isopropyl-phenylacetic acid
3-nitro-4-piperidino-α,α-dimethyl-phenylacetic acid
3-chloro-4-piperidino-α,α-diethyl-phenylacetic acid
3-nitro-4-morpholino-α-methyl-phenylacetic acid, m.p. 108°–110°
3-nitro-4-morpholino-phenylacetic acid
3-nitro-4-homopiperidino-phenylacetic acid
3-nitro-4-thiomorpholino-α-methyl-phenylacetic acid
3-nitro-4-homopiperidino-α-methyl-phenylacetic acid
3-nitro-4-pyrrolidino-α-methyl-phenylacetic acid, m.p. 129°
3-nitro-4-(2,5-dimethylpiperidino)-α-methyl-phenylacetic acid
3-nitro-4-di-n-butylamino-α-methyl-phenylacetic acid
3-nitro-4-di-n-hexylamino-α-methyl-phenylacetic acid
3-nitro-4-di-isopropylamino-α-methyl-phenylacetic acid
3-nitro-4-pyrrolidino-α-isopropyl-phenylacetic acid
3-nitro-4-homopiperidino-α,α-dimethyl-phenylacetic acid

EXAMPLE 28

28.8 g. of 3-nitro-4-bromo-phenylacetic acid ethyl ester is boiled in 250 ml. of ethanol with 9.5 g. of pyridine for 12 hours. The solution, containing 3-nitro-4-(pyridinium-1')-phenylacetic acid ethyl ester bromide, is hydrogenated on Raney nickel at 6 atmospheres and 50°–80° until termination of hydrogen absorption, then filtered off from the catalyst, mixed with 50 ml. of concentrated sodium hydroxide solution, and boiled for 2 hours. The alcohol is distilled off, the residue is dissolved in water and worked up as usual (pH 4 – 6), thus obtaining 3-amino-4-piperidino-phenylacetic acid, m.p. 143°–144° (isopropanol).

Analogously, from
3-nitro-4-bromo-α-isopropyl-
3-nitro-4-bromo-α-n-propyl-
3-nitro-4-bromo-α-n-butyl- and
3-nitro-4-bromo-αsec.butyl-phenylacetic acid,
respectively, the following compounds are obtained by reaction with pyridine and subsequent hydrogenation:
3-amino-4-piperidino-α-isopropyl-phenylacetic acid
3-amino-4-piperidino-α-n-propyl-phenylacetic acid
3-amino-4-piperidino-α-n-butyl-phenylacetic acid
3-amino-4-piperidino-α-sec.butyl-phenylacetic acid

EXAMPLE 29

27.3 g. of 3-methyl-4-piperidino-α-methylene-phenylacetic acid ethyl ester is hydrogenated in 500 ml. of methanol on 10 g. of palladium charcoal (5 percent) at 25° and 1 atmosphere of hydrogen pressure until the absorption of hydrogen is terminated. The reaction mixture is filtered off from the catalyst, the methanol is evaporated, and the thus obtained ethyl ester of 3,α-dimethyl-4-piperidino-phenylacetic acid is distilled at 138°–142°/0.05 mm.

Twenty-four g. of this ester is boiled in 300 ml. of methanol with 15 g. of sodium hydroxide in 50 ml. of water for 16 hours. Then, the methanol is distilled off, the residue is diluted with water, and worked up as usual (pH 4 – 6), thus obtaining 3,α-dimethyl-4-piperidino-phenylacetic acid, m.p. 99° (isopropanol/diisopropyl ether).

The hydrogenation can also be conducted in an analogous manner with the free carboxylic acid (instead of the ester), thus obtaining, after the methanol has been evaporated, directly 3,α-dimethyl-4-piperidino-phenylacetic acid.

In order to produce the starting material, o-toluidine is reacted with 1,5-dibromopentane to obtain 2-piperidino-toluene (b.p. 125°–129°/10 mm.), and the latter is acylated with ethoxalyl chloride in the presence of aluminum chloride to the ethyl ester of 3-methyl-4-piperidino-phenylglyoxylic acid (b.p. 166°–170°/0.05 mm.). At room temperature, an ether solution of methyl magnesium iodide is added dropwise to the solution of this ester in absolute ether, thus separating the magnesium iodide alcoholate of 3,α-dimethyl-4-piperidino-mandelic acid ethyl ester. The ethyl ester of 3,α-dimethyl-4-piperidino-mandelic acid (b.p. 138°–142°/0.05 mm.) obtained after hydrolysis and a working-up step is heated with polyphosphoric acid for 30 minutes to 120°–130°, thus obtaining the ethyl ester of 3-methyl-4-piperidino-α-methylene-phenylacetic acid (b.p. 132°–135°/0.05 mm.).

Analogously, from the phenylacetic acid ethyl esters set forth below
3-methyl-4-pyrrolidino-α-methylene-
3-methyl-4-morpholino-α-methylene-
3-ethyl-4-morpholino-α-methylene-
3-methyl-4-homopiperidino-α-methylene-
3-methyl-4-homopiperidino-α-n-butylidene-
3,5-dimethyl-4-piperidino-α-methylene-
3,5-dimethyl-4-pyrrolidino-α-methylene-
3,5-dimethyl-4-homopiperidino-α-methylene-
3,5-dimethyl-4-morpholino-α-methylene-
3,5-dimethyl-4-diisopropylamino-α-methylene-
3-fluoro-4-piperidino-α-methylene-
3-fluoro-4-piperidino-α-ethylidene-
3-fluoro-4-piperidino-α-n-butylidene-
3-fluoro-4-pyrrolidino-α-methylene- and
3-iodo-4-piperidino-α-sec.butylidene-phenylacetic acid ethyl ester,
respectively, the following compounds are produced by catalytic hydrogenation and subsequent saponification:
3,α-dimethyl-4-pyrrolidino-phenylacetic acid
3,α-dimethyl-4-morpholino-phenylacetic acid
3-ethyl-4-morpholino-α-methyl-phenylacetic acid
3,α-dimethyl-4-homopiperidino-phenylacetic acid
3-methyl-4-homopiperidino-α-n-butyl-phenylacetic acid
3,5,α-trimethyl-4-piperidino-phenylacetic acid
3,5,α-trimethyl-4-pyrrolidino-phenylacetic acid
3,5,α-trimethyl-4-homopiperidino-phenylacetic acid
3,5,α-trimethyl-4-morpholino-phenylacetic acid
3,5,α-trimethyl-4-diisopropylamino-phenylacetic acid
3-fluoro-4-piperidino-α-methyl-phenylacetic acid
3-fluoro-4-piperidino-α-ethyl-phenylacetic acid
3-fluoro-4-piperidino-α-n-butyl-phenylacetic acid
3-fluoro-4-pyrrolidino-α-methyl-phenylacetic acid and
3-iodo-4-piperidino-α-sec.butyl-phenylacetic acid

EXAMPLE 30

Two g. of 3-methyl-4-piperidino-phenyglyoxylic acid (obtainable by alkaline saponification of the ethyl ester thereof) is boiled with 0.8 g. of red phosphorus and 40 ml. of 57 percent hydroiodic acid for 30 minutes. The mixture is diluted with 100 ml. of water and worked up as usual (pH 4 – 6). The crude product is taken up in absolute ethanol, and the hydrochloride of 3-methyl-4-piperidino-phenylacetic acid is precipitated with ethereal hydrochloric acid.

From this product, the free 3-methyl-4-piperidino-phenylacetic acid, m.p. 72°, is obtained by the addition of sodium hydroxide solution and ether.

Analogously, from:
3,5-dimethyl-4-pyrrolidino-
3,5-dimethyl-4-diisopropylamino- and
3-fluoro-4-piperidino-phenylglyoxylic acid,
respectively, the following compounds are obtained by reduction with hydrogen iodide:
3,5-dimethyl-4-pyrrolidino-phenylacetic acid
3,5-dimethyl-4-diisopropylamino-phenylacetic acid and
3-fluoro-4-piperidino-phenylacetic acid, m.p. 91°–93°.

EXAMPLE 31

Three g. of 3-methyl-4-piperidino-mandelic acid ethyl ester (obtainable by hydrogenating 3-methyl-4-piperidino-phenylglyoxylic acid ethyl ester on palladium charcoal in methanol) is dissolved in 40 ml. of acetic acid and introduced into a solution of 9 g. of $SnCl_2 \cdot 2H_2O$ in 20 ml. of concentrated hydrochloric acid. The reaction mixture is boiled for 3 hours, the solution is buffered with dilute solution of sodium hydroxide to a pH of 2, hydrogen sulfide is introduced until the precipitation of SnS has terminated; then, the reaction mixture is filtered and worked up as usual (pH 4 – 6), thus obtaining 3-methyl-4-piperidino-phenylacetic acid, m.p. 72°.

Analogously, from:
3,5-dimethyl-4-piperidino-,
3-methyl-4-piperidino-α-tert.butyl-,
3-chloro-4-piperidino-α-tert.butyl-, and
3-bromo-4-piperidino-α-tert.butyl-mandelic acid ethyl ester,
respectively, the following compounds are obtained by reduction with tin(II)chloride and saponification:
3,5-dimethyl-4-piperidino-phenylacetic acid
3-methyl-4-piperidino-α-tert.butyl-phenylacetic acid
3-chloro-4-piperidino-α-tert.butyl-phenylacetic acid
3-bromo-4-piperidino-α-tert.butyl-phenylacetic acid

EXAMPLE 32

18.2 g. of the methyl ester of 3-bromo-4-piperidino-α-methylene-phenylacetic acid is boiled in 70 ml. of 1N sodium hydroxide solution and 200 ml. of ethanol for 3 hours. Then, 300 ml. of water is added, and under agitation at room temperature 280 g. of 2.5 percent sodium amalgam is introduced in incremental portions during the course of 4–6 hours. The reaction mixture is vigorously agitated for another 5 hours, heated on a water bath, decanted from the mercury, the alcohol distilled off, and worked up as usual (pH 4 – 6). Thus, 16.5 g. of 3-bromo-4-piperidino-α-methyl-phenylacetic acid is obtained, m.p. 115°–116° (diisopropyl ether/hexane).

For purposes of reduction, it is also possible to employ, in place of the ester, the equivalent amount of the free acid, with the same result.

Analogously, from the following methyl or ethyl esters of phenylacetic acid, or the free acids:
  3-bromo-4-piperidino-α-ethylidene-
  3-chloro-5-bromo-4-piperidino-α-methylene-
  3-chloro-5-bromo-4-pyrrolidino-α-methylene-
  3-chloro-5-bromo-4-homopiperidino-α-methylene-
  3,5-dichloro-4-piperidino-α-methylene-
  3,5-dichloro-4-homopiperidino-α-methylene-
  3-bromo-4-pyrrolidino-α-methylene-
  3-fluoro-4-piperidino-α-methylene-
  3-fluoro-4-piperidino-α-ethylidene-
  3-fluoro-4-piperidino-α-n-butylidene-
  3-fluoro-4-pyrrolidino-α-methylene-
  3-chloro-4-piperidino-α-methylene-
  3-chloro-4-morpholino-α-methylene-
  3-chloro-4-piperidino-α-n-propylidene- and
  3-chloro-4-piperidino-α-n-butylidiene-phenylacetic acid methyl ester,
respectively, by saponification and reduction with sodium amalgam, the following compounds are obtained:
  3-bromo-4-piperidino-α-ethyl-phenylacetic acid
  3-chloro-4-piperidino-5-bromo-α-methyl-phenylacetic acid
  3-chloro-4-pyrrolidino-5-bromo-α-methyl-phenylacetic acid
  3-chloro-4-homopiperidino-5-bromo-α-methyl-phenylacetic acid
  3,5-dichloro-4-piperidino-α-methyl-phenylacetic acid
  3,5-dichloro-4-homopiperidino-α-methyl-phenylacetic acid
  3-bromo-4-pyrrolidino-α-methyl-phenylacetic acid
  3-fluoro-4-piperidino-α-methyl-phenylacetic acid
  3-fluoro-4-piperidino-α-ethyl-phenylacetic acid
  3-fluoro-4-piperidino-α-n-butyl-phenylacetic acid
  3-fluoro-4-pyrrolidino-α-methyl-phenylacetic acid
  3-chloro-4-piperidino-α-methyl-phenylacetic acid
  3-chloro-4-morpholino-α-methyl-phenylacetic acid
  3-chloro-4-piperidino-α-n-propyl-phenylacetic acid
  3-chloro-4-piperidino-α-n-butyl-phenylacetic acid

EXAMPLE 33

Analogously to the above-described processes, 3-tert.-butyl-4-dimethylamino-phenylacetic acid or 3-tert.butyl-4-dimethylamino-α-methyl-phenylacetic acid is produced from o-tert.-butyl-N,N-dimethylaniline (obtainable by alkylating o-tert.-butylaniline with methyl iodide).

In an analogous manner, from
  o-tert.butyl-piperidinobenzene
  o-tert.butyl-morpholinobenzene
  o-tert.butyl-homopiperidinobenzene
  o-tert.butyl-thiomorpholinobenzene
  1-tert.butyl-2-piperidino-3-chlorobenzene
  1-tert.butyl-2-piperidino-3-fluorobenzene
  1-tert.butyl-2-piperidino-3-bromobenzene and
  1-tert.butyl-2-piperidino-3-iodobenzene,
respectively, the following compounds are produced by analogous reaction sequences:
  3-tert.butyl-4-piperidino-α-methyl-phenylacetic acid
  3-tert.butyl-4-morpholino-α-methyl-phenylacetic acid
  3-tert.butyl-4-homopiperidino-α-methyl-phenylacetic acid
  3-tert.butyl-4-thiomorpholino-α-methyl-phenylacetic acid
  3-tert.butyl-4-piperidino-5-chloro-α-methyl-phenylacetic acid
  3-tert.butyl-4-piperidino-5-fluoro-α-methyl-phenylacetic acid
  3-tert.butyl-4-piperidino-5-bromo-α-methyl-phenylacetic acid
  3-tert.butyl-4-piperidino-5-iodo-α-methyl-phenylacetic acid

EXAMPLE 34

Twenty-three g. of 3-bromo-4-amino-phenylacetic acid is boiled in 120 ml. of n-butanol together with 38 g. of methyl iodide and 30 g. of pulverized potassium carbonate for 2 hours. The reaction solution is mixed with 100 ml. of water and 5 g. of potassium hydroxide, the mixture is heated for 2 hours on a water bath, hydrochloric acid is added to a pH of 4 – 6, and the butanol phase is separated, dried over sodium sulfate, and the butanol distilled off, thus obtaining 3-bromo-4-dimethylamino-phenylacetic acid, m.p. 85° (diisopropyl ether/hexane).

Analogously, from the corresponding 4-aminophenylacetic acids, the following compounds are obtained by reaction with methyl iodide, ethyl iodide, propyl iodide, isopropyl bromide, n-butyl iodide, n-hexyl iodide and n-heptyl iodide:
  3,α-dimethyl-4-di-n-butylamino-phenylacetic acid
  3,α-dimethyl-4-di-n-hexylamino-phenylacetic acid
  3,α-dimethyl-4-diethylamino-phenylacetic acid
  3-bromo-4-dimethylamino-phenylacetic acid
  3-bromo-4-diethylamino-α-methyl-phenylacetic acid
  3-bromo-4-di-n-propylamino-α-methyl-phenylacetic acid
  3-bromo-4-di-n-butylamino-α-methyl-phenylacetic acid
  3-bromo-4-di-n-hexylamino-α-methyl-phenylacetic acid
  3-iodo-4-di-n-butylamino-α-methyl-phenylacetic acid
  3-iodo-4-di-n-heptylamino-α-methyl-phenylacetic acid
  3-chloro-4-dimethylamino-phenylacetic acid
  3-chloro-4-diethylamino-α-methyl-phenylacetic acid
  3-chloro-4-di-n-propylamino-α-methyl-phenylacetic acid
  3-chloro-4-diisopropylamino-α-methyl-phenylacetic acid
  3-chloro-4-di-n-butylamino-α-methyl-phenylacetic acid
  3-chloro-4-di-n-heptylamino-α-methyl-phenylacetic acid

EXAMPLE 35

29.4 g. of potassium dichromate is dissolved in 280 ml. of water and mixed with 200 ml. of concentrated sulfuric acid. The mixture is cooled to 15°; then, a solution of 13.25 g. of 3-methylmercapto-4-piperidino-phenylacetic acid in 60 ml. of acetic acid is gradually added thereto under stirring and cooling to below 20°. The mixture is allowed to stand for 1.5 hour at room temperature, is then poured into 1 liter of water, and worked up as usual (pH 5 – 6), thus obtaining 3-methylsulfonyl-4-piperidino-phenylacetic acid hydrate, m.p. 114°–116° (80 percent ethanol).

Analogously, the following compounds are produced from the corresponding alkylmercapto-phenylacetic acids by oxidation with potassium dichromate:
  3-ethylsulfonyl-4-piperidino-phenylacetic acid
  3-methylsulfonyl-4-piperidino-α-methyl-phenylacetic acid
  3-methylsulfonyl-4-piperidino-α-ethyl-phenylacetic acid
  3-methylsulfonyl-4-piperidino-α-propyl-phenylacetic acid
  3-methylsulfonyl-4-piperidino-α,α-dimethyl-phenylacetic acid
  3-ethylsulfonyl-4-piperidino-α-methyl-phenylacetic acid
  3-ethylsulfonyl-4-piperidino-α-ethyl-phenylacetic acid
  3-ethylsulfonyl-4-piperidino-α-propyl-phenylacetic acid
  3-ethylsulfonyl-4-piperidino-α,α-dimethyl-phenylacetic acid
  3-isopropylsulfonyl-4-piperidino-α-methyl-phenylacetic acid
  3-methylsulfonyl-4-morpholino-α-methyl-phenylacetic acid
  3-ethylsulfonyl-4-morpholino-α-methyl-phenylacetic acid
  3-methylsulfonyl-4-pyrrolidino-α-methyl-phenylacetic acid
  3-methylsulfonyl-4-homopiperidino-α-methyl-phenylacetic acid
  3-methylsulfonyl-4-morpholino-phenylacetic acid
  3-methylsulfonyl-4-pyrrolidino-phenylacetic acid
  3-methylsulfonyl-4-homopiperidino-phenylacetic acid

EXAMPLE 36

13.25 g. of 3-methylmercapto-4-piperidino-phenylacetic acid is mixed in 50 ml. of glacial acetic acid under cooling to 0°–5° with 5.7 g. of 30 percent hydrogen peroxide. The mixture is allowed to stand for 4 days at 0°–10°. Then, the mixture is poured into 250 ml. of water. The semi-solid precipitate crystallizes upon trituration with a small amount of ether and is recrystallized from 70 percent aqueous ethanol, thus obtaining 12.8 g. of 3-methyl-sulfinyl-4-piperidino-phenylacetic acid hydrate, m.p. 108°–111°.

Analogously, the following compounds are obtained from the corresponding 3-alkylmercapto-phenylacetic acids by oxidation with $H_2O_2$:

3-ethylsulfinyl-4-piperidino-phenylacetic acid
3-methylsulfinyl-4-piperidino-α-methyl-phenylacetic acid
3-methylsulfinyl-4-piperidino-α-ethyl-phenylacetic acid
3-methylsulfinyl-4-piperidino-α-propyl-phenylacetic acid
3-methylsulfinyl-4-piperidino-α,α-dimethyl-phenylacetic acid
3-ethylsulfinyl-4-piperidino-α-methyl-phenylacetic acid
3-ethylsulfinyl-4-piperidino-α-ethyl-phenylacetic acid
3-ethylsulfinyl-4-piperidino-α-propyl-phenylacetic acid
3-ethylsulfinyl-4-piperidino-α,α-dimethyl-phenylacetic acid
3-isopropylsulfinyl-4-piperidino-α-methyl-phenylacetic acid
3-methylsulfinyl-4-morpholino-α-methyl-phenylacetic acid
3-ethylsulfinyl-4-morpholino-α-methyl-phenylacetic acid
3-methylsulfinyl-4-pyrrolidino-α-methyl-phenylacetic acid
3-methylsulfinyl-4-homopiperidino-α-methyl-phenylacetic acid
3-methylsulfinyl-4-morpholino-phenylacetic acid
3-methylsulfinyl-4-pyrrolidino-phenylacetic acid
3-methylsulfinyl-4-homopiperidino-phenylacetic acid

EXAMPLE 37

6.2 g. of 3-bromo-4-piperidino-α-methyl-phenylacetic acid is boiled in 30 ml. of acetic anhydride for 10 hours. After removing the acetic acid and the excess acetic anhydride by distillation, 3-bromo-4-piperidino-α-methyl-phenylacetic acid anhydride is obtained.

EXAMPLE 38

18.7 g. of the ethyl ester of 3-iodo-4-piperidino-α-methyl-mandelic acid is dissolved in 50 ml. of dichloromethane, saturated with dry HCl gas, and mixed with 5 ml. of thionyl chloride. Then, the reaction mixture is heated for 2 hours at 50°, and thereafter the dichloromethane is completely removed by distillation. The residue, consisting of 3-iodo-4-piperidino-α-chloro-α-methyl-phenylacetic acid ethyl ester-hydrochloride and N-[2-iodo-4-(α-carbethoxyethylidene)-2,5-cyclohexadienylidene]-piperidinium chloride is dissolved in 500 ml. of ethanol and hydrogenated on 5 g. of platinum oxide at normal pressure and room temperature. Then, the reaction mixture is filtered off from the catalyst, the filtrate is mixed with a solution of 2.2 g. of sodium hydroxide in 3 ml. of water, boiled for 2 hours, evaporated to dryness, and the residue is dissolved in water and worked up as usual (pH 6.5). Thus, 3-iodo-4-piperidino-α-methyl-phenylacetic acid is obtained, m.p. 126°–127° (isopropanol/water).

The starting material can be obtained by way of o-piperidino-iodobenzene, 3-iodo-4-piperidino-phenylglyoxylic acid ethyl ester, and 3-iodo-4-piperidino-α-methyl-mandelic acid ethyl ester.

EXAMPLE 39

Twelve g. of 3-chloro-4-piperidino-α-methyl-benzyl cyanide (b.p. 143°–145°/0.1 mm.) is dissolved in 60 ml. of 25 percent HCl and boiled for one-half hour. The solution is decolorized with charcoal, concentrated by evaporation, the residue dissolved in water, and worked up as usual (pH 4). The oily residue crystallizes upon standing overnight, thus obtaining 3-chloro-4-piperidino-α-methyl-phenylacetic acid, m.p. 96°–97° (diisopropyl ether).

In contrast to the above, if the residue is not stored at room temperature but rather dissolved immediately in 20 ml. of diisopropyl ether, and the solution is allowed to stand thereafter for 1 hour in an ice bath, another form of 3-chloro-4-piperidino-α-methyl-phenylacetic acid is obtained, having the melting point of 106°–107°.

These two forms of differing melting points exhibit in KBr two different IR spectra. X-ray photographs of the fine structure show that there is a well-defined lattice in case of the form having the m.p. of 106°–107°, and a mixture of the aforementioned lattice with another lattice is present in the form with the m.p. of 96°–97°. The IR spectra of the dissolved substances (e.g., in chloroform) are identical.

The starting material is obtained as follows:

4-Nitro-α-methyl-benzyl cyanide, m.p. 76°, is catalytically reduced to 4-amino-α-methyl-benzyl cyanide, b.p. 140°–145°/0.4 mm. The latter is acetylated to 4-acetamido-α-methyl-phenyl-benzyl cyanide (m.p. 84°) and then converted with chlorine gas to 3-chloro-4-acetamido-α-methyl-benzyl cyanide (m.p. 74°–75°). The compound 3-chloro-4-amino-α-methyl-benzyl cyanide obtained from the above compound after splitting off the acetyl residue with 2N HCl is cyclized in butanol with 1,5-dibromopentane in the presence of $K_2CO_3$.

Analogously, from:
3-chloro-4-pyrrolidino-α-methyl-
3-bromo-4-pyrrolidino-α-methyl-
3-bromo-4-piperidino-α-methyl-
3-methyl -4-piperidino-α-methyl-
3-amino-4-piperidino-α-methyl- and
3-fluoro-4-piperidino-α-methyl-benzyl cyanide, respectively, the following compounds are produced by boiling with 25 percent HCl:

3-chloro-4-pyrrolidino-α-methyl-phenylacetic acid, m.p. 95°–96
3-bromo-4-pyrrolidino-α-methyl-phenylacetic acid, m.p. 112°–113°
3-bromo-4-piperidino-α-methyl-phenylacetic acid, m.p. 115°–116°
3,α-dimethyl-4-piperidino-phenylacetic acid, m.p. 99°
3-amino-4-piperidino-α-methyl-phenylacetic acid, m.p. 143°–144°
3-fluoro-4-piperidino-α-methyl-phenylacetic acid

EXAMPLE 40 a. Analogously to Example 1, 3-chloro-4-piperidino-α-methyl-phenylacetic acid, m.p. 106°–107° (diisopropyl ether) is obtained from 3-chloro-4-amino-α-methyl-phenylacetic acid (m.p. 114°–115°; obtainable from 3-chloro-4-amino-α-methyl-benzyl cyanide with 25% HCl) and 1,5-dibromopentane. The cyclohexylammonium salt of this product has a melting point of 199°–200° (methanol); dibenzylethylene diammonium salt, hydrate, m.p. 91° (ethanol/water).

b. By heating 3-chloro-4-piperidino-α-methyl-phenyl-acetic acid with excess methyl iodide or dimethyl sulfate in acetonitrile for 12 hours to 100° in a tube, the methoiodide or metho-methyl sulfate of 3-chloro-4-piperidino-α-methyl-phenylacetic acid is respectively obtained.

EXAMPLE 41

53.5 g. of 3-chloro-4-piperidino-α-methyl-phenylacetic acid and 18.2 g. of L-ephedrine are allowed to stand in 200 ml. of ether for 2 days at room temperature. The thus-precipitated salt is vacuum filtered, then recrystallized three times from ethyl acetate and thereafter twice from acetone, m.p. 125°–126°; (α) −26.8°.

Six g. of this salt is dissolved in a mixture of 150 ml. of methanol and 150 ml. of ethanol. The solution is conducted over a weakly acidic cation exchanger and eluted with methanol/ethanol (1:1) . The eluates are evaporated at 40°. The oily residue (3.12 g.; (α) +35.5°) is dissolved in 50 ml. of ether, filtered over charcoal, and mixed with a solution of 1.15 g. of cyclohexylamine in 10 ml. of ether. The thus-precipitated cyclohexylammonium-3-chloro-4-piperidino-α-methyl-phenylacetate is vacuum filtered, m.p. 197°–198° (methanol); (α) −7.2°.

Two grams of this salt is dissolved in 100 ml. of methanol/ethanol (1:1) under heating, passed over a weakly acidic cation exchanger, and eluted with methanol/ethanol (1:1). The eluates are concentrated by evaporation, thus obtaining 1.2 g. of (+)-3-chloro-4-piperidino-α-methyl-phenylacetic acid, (α) +37.4°.

EXAMPLE 42

26.7 g. of 3-chloro-4-piperidino-α-methyl-phenylacetic acid is allowed to stand in 100 ml. of acetonitrile with 9.1 g. of L-ephedrine for 48 hours at 0°–6°. The thus-precipitated salt is recrystallized twice from ethyl acetate, m.p. 124°–126°; (α) −15.6°. 5 g. of this salt is dissolved in 250 ml. of methanol/ethanol (1:1), passed over a weakly acidic cation exchanger and eluted with methanol/ethanol (1:1). The eluates are concentrated by evaporation. The residue (2 g. of oil, (α) −37.2°) is dissolved in 40 ml. of ether and mixed with a solution of 0.73 g. of cyclohexylamine in 10 ml. of ether. The thus-precipitated cyclohexylamine salt (m.p. 197°–198°; (α) +8.1°) is vacuum filtered, dissolved in 100 ml. of methanol/ethanol (1:1), passed over a weakly acidic cation exchanger, and eluted with methanol/ethanol (1:1). The eluates are concentrated by evaporation, thus obtaining 1.1 g. of (-)-3-chloro-4-piperidino-α-methyl-phenylacetic acid, (α) −41.1°.

EXAMPLE 43

2.98 g. of 3-bromo-4-piperidino-phenylacetic acid and 0.1 g. of anhydrous ZnCl₂ are stirred in 5 ml. of 2,3-dihydropyran for 12 hours at 50°. Then, the reaction mixture is diluted with ether, washed with solution of sodium bicarbonate and water, the ether solution is dried and concentrated by evaporation. The residue is filtered in benzene/acetone 1:1 over silica gel, and the eluate is concentrated by evaporation, thus obtaining 3-bromo-4-piperidino-phenylacetic acid-2′-tetrahydropyranyl ester in the form of a yellow oil.

Analogously, the following compounds are obtained from the corresponding acids by reaction with 2,3-dihydrofuran or 2,3-dihydropyran:

2′-tetrahydrofuryl ester of 3-bromo-4-piperidino-α-methyl-phenylacetic acid;
2′-tetrahydropyranyl ester of 3-chloro-4-piperidino-α-methyl-phenylacetic acid;
2′-tetrahydropyranyl ester of 3-bromo-4-piperidino-α-methyl-phenylacetic acid;
2′-tetrahydropyranyl ester of 3,α-dimethyl-4-piperidino-phenylacetic acid;
2′-tetrahydropyranyl ester of 3-fluoro-4-piperidino-α-methyl-phenylacetic acid.

EXAMPLE 44

Silver oxide, freshly prepared from 6.4 g. of AgNO₃ and 1.6 g. of NaOH in 50 ml. of water, is added to a mixture of 5 g. of 2-(3-chloro-4-piperidinophenyl)-1-propanol and 4 g. of NaOH in 40 ml. of water. The reaction mixture is boiled for 2 hours and the thus-precipitated silver is filtered off. The filtrate is worked up as usual (pH 5.2 – 5.4), thus obtaining 3-chloro-4-piperidino-α-methyl-phenylacetic acid, melting point 106°–107°.

EXAMPLE 45

One gram of 3-chloro-4-piperidino-α-methyl-phenylacetaldehyde is cooled to 0°–4° in a mixture of 20 ml. of acetic acid and 20 ml. of benzene, and mixed within 10 minutes under stirring with a solution of 0.25 g. of CrO₃ in 1 ml. of water and 20 ml. of acetic acid. After allowing the mixture to stand for one hour at room temperature, 10 ml. of methanol is added. Thereafter, the reaction mixture is diluted with water, shaken out with ether, and the ether phase extracted with 4% NaOH. The alkaline extracts are worked up as usual (pH 5.2 – 5.4), thus obtaining 3-chloro-4-piperidino-α-methyl-phenylacetic acid, m.p. 106°–107°.

EXAMPLE 46

Fifty g. of 3-chloro-4-piperidino-α-methyl-phenylacetic acid is dissolved in 500 ml. of methanol, saturated with HCl gas and allowed to stand overnight. The methanol is evaporated, the residue dissolved in water, and worked up as usual (pH 8 – 10). The methyl ester of 3-chloro-4-piperidino-α-methyl-phenylacetic acid is thereby obtained, m.p. 40°–43° (petroleum ether); b.p. 161°–163°/0.1 mm.

In an analogous manner, the following compounds are obtained from 3-chloro-4-piperidino-α-methyl-phenylacetic acid by reaction with ethanol, sec.butanol, crotyl alcohol, isobutanol, amyl alcohol, isoamyl alcohol, cyclopentanol, cyclohexanol, n-hexanol, n-octanol, n-decanol, n-dodecanol, 2-ethyl-n-butanol, and 2-methyl-n-pentanol:

3-chloro-4-piperidino-α-methyl-phenylacetic acid-
  ethyl ester, b.p. 155°–156°/0.1 mm.
  sec.butyl ester, b.p. 162°–165°/0.05 mm.
  crotyl ester, b.p. 172°–176°/0.4 mm.
  isobutyl ester, b.p. 163°–167°/0.2 mm.
  n-amyl ester, b.p. 175°–178°/0.04 mm.
  isoamyl ester, b.p. 176°–178°/0.1 mm.
  cyclopentyl ester, b.p. 180°–185°/0.05 mm.
  cyclohexyl ester, b.p. 203°–204°/0.1 mm.
  n-hexyl ester, b.p. 190°–191°/0.1 mm.
  n-octyl ester, b.p. 200°–202°/0.1 mm.
  n-decyl ester, b.p. 225°/0.1 mm.
  n-dodecyl ester, b.p. 237°–240°/0.1 mm.
  2′-ethyl-n-butyl ester, b.p. 193°/0.1 mm. and
  2′-methyl-n-pentyl ester, b.p. 192°–193°/0.1 mm.

Analogously, the following esters are obtained from the corresponding acids by reaction with the corresponding alcohols:

3-bromo-4-piperidino-α-methyl-phenylacetic acid-
  methyl ester, b.p. 174°–176°/0.2 mm.
  ethyl ester, b.p. 162°–163°/0.1 mm.
  propyl ester, b.p. 170°/0.1 mm.
  n-pentyl ester 3-methyl-4-piperidino-α-methyl-phenylacetic acid-
  methyl ester, b.p. 142°–145°/0.01 mm.
  ethyl ester, b.p. 148°–150°/0.2 mm.
  propyl ester, b.p. 154°–156°/0.05 mm.
  n-hexyl ester 3-fluoro-4-piperidino-α-methyl-phenylacetic acid-
  methyl ester, b.p. 150°–152°/0.3 mm.
  ethyl ester, b.p. 150°–151°/0.05 mm.
  propyl ester, b.p. 155°/0.01 mm.
  2′-methoxyethyl ester 3-trifluoromethyl-4-piperidino-α-methyl-phenylacetic acid-
  methyl ester, b.p. 146°–148°/0.1 mm.
  ethyl ester, b.p. 158°/0.1 mm.
  propyl ester, b.p. 162°–164°/0.2 mm.

3-nitro-4-piperidino-α-methyl-phenylacetic acid-
  methyl ester
  ethyl ester
  propyl ester 3-amino-4-piperidino-α-methyl-phenylacetic acid-
  methyl ester
  ethyl ester
  propyl ester
  n-butyl ester 3,5-dichloro-4-piperidino-α-methyl-phenylacetic acid-
  methyl ester
  ethyl ester
  propyl ester 3-chloro-4-piperidino-5,α-dimethyl-phenylacetic acid-
  methyl ester
  ethyl ester
  propyl ester 3-chloro-4-pyrrolidino-α-methyl-phenylacetic acid-
  methyl ester ethyl ester
propyl ester
3-chloro-4-homopiperidino-α-methyl-phenylacetic acid-
   methyl ester
   ethyl ester
   propyl ester
3-chloro-4-piperidino-α-methyl-phenylacetic acid-
   2'-cyclohexylethyl ester
   2'-cyclohexylpropyl ester
   3'-oxa-5'-hydroxypentyl ester
   3'-oxa-5'-butoxypentyl ester
   3',6'-dioxa-8'-hydroxyoctyl ester
   3',6'-dioxa-8'-methoxyoctyl ester.

EXAMPLE 47

2.67 g. of 3-chloro-4-piperidino-α-methyl-phenylacetic acid and 0.46 g. of ethanol are mixed in 50 ml. of tetrahydrofuran with 2 g. of N,N'-dicyclohexylcarbodiimide and allowed to stand overnight. The thus-precipitated N,N'-dicyclohexylurea is vacuum filtered and washed thereafter with tetrahydrofuran. The combined filtrates are concentrated by evaporation, and the residue is distilled, thus obtaining the ethyl ester of 3-chloro-4-piperidino-α-methyl-phenylacetic acid, b.p. 155°–156°/0.1 mm.

Analogously, the following compounds are obtained from the acids on which they are based by esterification with allyl alcohol, propargyl alcohol, isopropanol, benzyl alcohol, 2-phenylethanol, geraniol, 2-methoxyethanol, 2-(2-methoxyethoxy)-ethanol, phenol or o-cresol:
3-chloro-4-piperidino-α-methyl-phenylacetic acid-
   allyl ester, b.p. 175°–177°/0.1 mm.
   propargyl ester, b.p. 180°–182°/0.05 mm.
   isopropyl ester, b.p. 188°/0.2 mm.
   benzyl ester, b.p. 200°–201°/0.1 mm.
   2'-phenylethyl ester, b.p. 208°–210°/0.01 mm.
   geranyl ester
   2'-methoxyethyl ester
   2'-(2-methoxyethoxy)-ethyl ester
   phenyl ester, b.p. 180°–183°/0.1 mm.
   o-tolyl ester, b.p. 192°–194°/0.05 mm.
3-bromo-4-piperidino-α-methyl-phenylacetic acid-
   allyl ester, b.p. 182°–185°/0.1 mm.
   propargyl ester, b.p. 190°–193°/0.05 mm.
   isopropyl ester, b.p. 197°–199°/0.2 mm.
   benzyl ester, b.p. 206°–208°/0.02 mm.
   2'-phenylethyl ester, b.p. 218°–220°/0.01 mm.
   geranyl ester
   2'-methoxyethyl ester
   2'-(2-methoxyethoxy)-ethyl ester
3,α-dimethyl-4-piperidino-phenylacetic acid-
   allyl ester, b.p. 163°–165°/0.2 mm.
   propargyl ester, b.p. 172°–175°/0.1 mm.
   isopropyl ester, b.p. 180°–182°/0.01 mm.
   benzyl ester, b.p. 190°/0.2 mm.
   2'-phenylethyl ester, b.p. 201°–202°/0.02 mm.
   geranyl ester
   2'-methoxyethyl ester
   2'-(2-methoxyethoxy)-ethyl ester.

EXAMPLE 48

2.7 g. of 3-chloro-4-piperidino-α-methyl-phenylacetic acid is boiled in 50 ml. of chloroform with 1.1 ml. of SOCl₂ for 1 hour and then the solvent is distilled off. The residue is mixed with 30 ml. of n-propanol and heated for 2 hours on a steam bath. The excess propanol is evaporated, and the residue is worked up as usual (pH 8 – 10), thus obtaining the n-propyl ester of 3-chloro-4-piperidino-α-methyl-phenylacetic acid, b.p. 158°–160°/0.05 mm.

Analogously, the following esters are produced from the corresponding acids by way of the chlorides thereof, with n-butanol and n-hexanol, respectively:
3-bromo-4-piperidino-α-methyl-phenylacetic acid-
   n-butyl ester, b.p. 175°–178°/0.1 mm.
   n-hexyl ester, b.p. 180°–182°/0.01 mm.
3-methyl-4-piperidino-α-methyl-phenylacetic acid-
   n-butyl ester, b.p. 161°–163°/0.2 mm.
   n-hexyl ester, b.p. 167°–168°/0.05 mm.
3-fluoro-4-piperidino-α-methyl-phenylacetic acid-
   n-butyl ester, b.p. 162°–165°/0.01 mm.
   n-hexyl ester, b.p. 163°–165°/0.2 mm.

EXAMPLE 49

The acid chloride obtained with SOCl₂ from 2.7 g. of 3-chloro-4-piperidino-α-methyl-phenylacetic acid is dissolved in 20 ml. of diethylene glycol dimethyl ether and stirred overnight at 20° with 1.5 g. of potassium-tert.butylate. The thus-obtained precipitate is vacuum filtered, the filtrate is evaporated and worked up as usual (pH 8 – 10), thus resulting in the tert.butyl ester of 3-chloro-4-piperidino-α-methyl-phenylacetic acid, b.p. 166°–168°/0.2 mm.

Analogously, the following esters are obtained from the corresponding acid chlorides by reaction with potassium-tert.-butylate:
   tert.butyl ester of 3-bromo-4-piperidino-α-methyl-phenylacetic acid, b.p. 175°–177°/0.01 mm.
   tert.butyl ester of 3-methyl-4-piperidino-α-methyl-phenylacetic acid, b.p. 156°–157°/0.2 mm.
   tert.butyl ester of 3-amino-4-piperidino-α-methyl-phenylacetic acid, b.p. 168°–170°/0.05 mm.

EXAMPLE 50

25.5 g. of the n-butyl ester of 4-amino-3-chloro-α-methyl-phenylacetic acid (b.p. 158°–160°; obtainable from 4-amino-3-chloro-α-methyl-phenylacetic acid and n-butanol in the presence of HCl) is boiled for 15 hours with agitation in 180 ml. of n-butanol with 23 g. of 1,5-dibromopentane and 28 g. of extremely finely pulverized K₂CO₃. The reaction mixture is vacuum filtered and washed with n-butanol. The filtrate is concentrated by evaporation, the residue taken up in benzene and boiled for 90 minutes with 15 ml. of acetic anhydride. The benzenic solution is extracted with dilute hydrochloric acid, and the acidic extract is worked up as usual (pH 8 – 10), thus obtaining the n-butyl ester of 3-chloro-4-piperidino-α-methyl-phenylacetic acid, b.p. 160°–162°/0.01 mm.

EXAMPLE 51

Ten g. of 3-chloro-4-piperidino-α-methyl-phenylacetic acid is boiled for 17 hours in 150 ml. of isopropanol and with 5 g. of 2-diethylaminoethyl chloride. The solution is concentrated by evaporation, the residue is mixed with water and worked up as usual (pH 9 – 11), thus producing the 2'-diethylaminoethyl ester of 3-chloro-4-piperidino-α-methyl-phenylacetic acid, b.p. 184°–185°/0.1 mm.; fumarate, m.p. 107°–108° (acetone).

Analogously, the following esters are obtained from 3-chloro-4-piperidino-α-methyl-phenylacetic acid by esterification with 2-dimethylaminoethyl chloride, 2-pyrrolidinoethyl chloride, 2-morpholinoethyl chloride, 3-morpholinopropyl chloride, 3-morpholinopropyl chloride-2, 2-piperidinoethyl chloride, 2-(2-methylpiperidino)-ethyl chloride and 2-chloroethanol, respectively:
3-chloro-4-piperidino-α-methyl-phenylacetic acid-
   2'-dimethylaminoethyl ester, fumarate, m.p. 121°–122° (acetone);
   2'-pyrrolidinoethyl ester, fumarate, m.p. 138°;
   2'-morpholinoethyl ester, b.p. 180°–183°/0.1 mm.;
   3'-morpholinopropyl ester, b.p. 195°–197°/0.05 mm.;
   1'-methyl-2'-morpholinoethyl ester, b.p. 192°–196°/0.05 mm.;
   2'-piperidinoethyl ester, b.p. 184°–186°/0.05 mm.;
   2'-(2-methylpiperidino)-ethyl ester, b.p. 190°–194°/0.05 mm.;
   2'-hydroxyethyl ester, b.p. 190°–200°/0.01 mm.

In an analogous manner, the following esters are obtained from the corresponding acids:
3-bromo-4-piperidino-α-methyl-phenylacetic acid-
   2'-pyrrolidinoethyl ester, b.p. 205°–206°/0.2 mm.
   2'-morpholinoethyl ester, b.p. 191°–194°/0.1 mm.
   3'-morpholinopropyl ester, b.p. 208°–210°/0.01 mm.

1'-methyl-2'-morpholinoethyl ester, b.p. 210°–212°/0.1 mm.
2'-piperidinoethyl ester, b.p. 198°–200°/0.05 mm.
2'-(2-methylpiperidino)-ethyl ester, b.p. 215°–216°/0.3 mm.
2'-hydroxyethyl ester
3,α-dimethyl-4-piperidino-phenylacetic acid-
   2'-pyrrolidinoethyl ester, b.p. 150°–152°/0.01 mm.
   2'-morpholinoethyl ester, b.p. 163°–166°/0.1 mm.
   3'-morpholinopropyl ester, b.p. 182°–184°/0.1 mm.
   1'-methyl-2'-morpholinoethyl ester, b.p. 188°–190°/0.2 mm.
   2'-piperidinoethyl ester, b.p. 170°–172°/0.02 mm.
   2'-(2-methylpiperidino)-ethyl ester, b.p. 190°–192°/1 mm.
3-trifluoromethyl-4-piperidino-α-methyl-phenylacetic acid-
   2'-pyrrolidinoethyl ester, b.p. 160°–161°/0.5 mm.
   2'-morpholinoethyl ester, b.p. 166°–170°/0.1 mm.
   3'-morpholinopropyl ester, b.p. 186°–188°/0.02 mm.
   1'-methyl-2'-morpholinoethyl ester, b.p. 195°–196°/0.1 mm.
   2'-piperidinoethyl ester, b.p. 178°–180°/0.05 mm.
   2'-(2-methylpiperidino)-ethyl ester, b.p. 203°–204°/0.2 mm.
3-amino-4-piperidino-α-methyl-phenylacetic acid-
   2'-pyrrolidinoethyl ester
   2'-morpholinoethyl ester
   3'-morpholinopropyl ester
   1'-methyl-2'-morpholinoethyl ester
   2'-piperidinoethyl ester
   2'-(2-methylpiperidino)-ethyl ester.

In an analogous manner, the following esters are obtained by reaction with the corresponding aminoalkyl chlorides or bromides:
3-chloro-4-piperidino-α-methyl-phenylacetic acid-
   2'-aminoethyl ester
   3'-aminopropyl ester
   2'-di-n-propylaminoethyl ester
   2'-di-n-butylaminoethyl ester
   3'-dimethylaminopropyl ester
   3'-diethylaminopropyl ester
   2'-methyl-3'-diethylaminopropyl ester
   1'-methylpiperidyl-4'-ester
   (1'-methylpiperidyl-3')-methyl ester
   2'-(1-methylpiperidyl-2)-ethyl ester
   2'-homopiperazinoethyl ester
   2'-thiomorpholinoethyl ester
   2'-(N'-methylpiperazino)-ethyl ester
   2'-(N'-ethylpiperazino)-ethyl ester
   2'-(N'-phenylpiperazino)-ethyl ester
   2'-(N'-2-hydroxyethylpiperazino)-ethyl ester
   2'-(N'-methylhomopiperazino)-ethyl ester
   2'-piperidinopropyl ester
   3'-pyrrolidinopropyl ester
   3'-piperidinopropyl ester
   3'-(N'-methylpiperazino)-propyl ester
3-bromo-4-piperidino-α-methyl-phenylacetic acid-
   3'-diethylaminopropyl ester
   3'-pyrrolidinopropyl ester
   3'-piperidinopropyl ester
   3'-(N'-methylpiperazino)-propyl ester
3,5-dichloro-4-piperidino-α-methyl-phenylacetic acid-
   2'-diethylaminoethyl ester
   3'-pyrrolidinopropyl ester
3-chloro-4-piperidino-5,α-dimethyl-phenylacetic acid-
   2'-diethylaminoethyl ester
   3'-piperidinopropyl ester.

EXAMPLE 52

Eight g. of 3-chloro-4-piperidino-α-methyl-phenylacetic acid is heated in 80 ml. of absolute benzene with 5 g. of POCl$_3$ for 15 minutes on a steam bath. After cooling, the reaction mixture is mixed with 40 ml. of concentrated aqueous NH$_3$. The benzenic solution is separated, concentrated, and the thus-precipitated 3-chloro-4-piperidino-α-methyl-phenylacetamide is recrystallized from ethyl acetate; m.p. 146°–148°.

Analogously, the following compounds are obtained from the corresponding acids by reaction with aniline, benzylamine, 2,3-dihydroxybutylamine and 2-methylmercaptoethylamine:
3-chloro-4-piperidino-α-methyl-phenylacetic acid-
   anilide
   benzylamide
   N-(2,3-dihydroxybutyl)-amide
   N-(2-methylmercaptoethyl)-amide
3-bromo-4-piperidino-α-methyl-phenylacetic acid-
   anilide
   benzylamide
   N-(2,3-dihydroxybutyl)-amide
   N-(2-methylmercaptoethyl)-amide
3-fluoro-4-piperidino-α-methyl-phenylacetic acid-
   anilide
   benzylamide
   N-(2,3-dihydroxybutyl)-amide
   N-(2-methylmercaptoethyl)-amide
3,α-dimethyl-4-piperidino-phenylacetic acid-
   anilide
   benzylamide
   N-(2,3-dihydroxybutyl)-amide
   N-(2-methylmercaptoethyl)-amide Analogously, the following compounds are obtained from the corresponding acids by successive reaction with POCl$_3$ or SOCl$_2$ and the corresponding amines:
3-chloro-4-piperidino-α-methyl-phenylacetic acid-
   N-(3-diethylaminopropyl)-amide
   N,N-bis-(2-hydroxyethyl)-amide
   N-methyl-N-(2-dimethylaminoethyl)-amide
   N-ethyl-N-(2-dimethylaminoethyl)-amide
   N-methyl-N-(2-diethylaminoethyl)-amide
   N-ethyl-N-(2-diethylaminoethyl)-amide
   N'-methyl-piperazide
   N'-ethyl-piperazide
   N'-phenyl-piperazide
   N'-(2-hydroxyethyl)-piperazide
   N-(2-pyrrolidinoethyl)-amide
   N-(2-piperidinoethyl)-amide
   N-(2-morpholinoethyl)-amide
   N-(2-N'-methylpiperazinoethyl)-amide
   N-(2-N'-phenylpiperazinoethyl)-amide
   N-(3-pyrrolidinopropyl)-amide
   N-(3-piperidinopropyl)-amide
   N-(3-morpholinopropyl)-amide
   N-(3-N'-methylpiperazinopropyl)-amide
   N-(3-N'-phenylpiperazinopropyl)-amide
3-bromo-4-piperidino-α-methyl-phenylacetic acid-
   N-(3-diethylaminopropyl)-amide.

EXAMPLE 53

13.3 g. of 3-chloro-4-piperidino-α-methyl-phenylacetic acid is dissolved in 7 ml. of triethylamine in 130 ml. of chloroform, cooled to −10°, and added dropwise within 15 minutes to a solution of 4.75 ml. of chloroformic acid ethyl ester in 30 ml. of chloroform. After stirring for one-half hour at −10° to −15°, methylamine is introduced until saturation has set in. After agitating for 1 hour at 0° to −10°, the solvent is removed by evaporation, the residue is mixed with water and worked up as usual (pH 8 – 10), thus obtaining the methylamide of 3-chloro-4-piperidino-α-methyl-phenylacetic acid, b.p. 205°–210°/0.1 mm., m.p. 95°–96° (ethyl acetate-diisopropyl ether).

Analogously, the following compounds are produced from the corresponding acids by reaction with:
2-dimethylaminoethylamine, 2-diethylaminoethylamine, 3-dimethyl-aminopropylamine, ethanolamide, ethylamine, n-propylamine, n-butylamine, cyclohexylamine, piperidine, morpholine and N-(2-hydroxyethyl)-piperazine:
3-chloro-4-piperidino-α-methyl-phenylacetic acid-
   N-(2-dimethylaminoethyl)-amide
   N-(2-diethylaminoethyl)-amide N-(3-dimethylaminopropyl)-amide
N-(2-hydroxyethyl)-amide
ethylamide
n-propylamide
n-butylamide
cyclohexylamide
piperidide
morpholide
N'-(2-hydroxyethyl)-piperazide
3-bromo-4-piperidino-α-methyl-phenylacetic acid-
   N-(2-dimethylaminoethyl)-amide
   N-(2-diethylaminoethyl)-amide
   N-(3-dimethylaminopropyl)-amide
   N-(2-hydroxyethyl)-amide
   ethylamide
   n-propylamide
   n-butylamide
   cyclohexylamide
   piperidide
   morpholide
   N'-(2-hydroxyethyl)-piperazide
3,α-dimethyl-4-piperidino-phenylacetic acid-
   N-(2-dimethylaminoethyl)-amide
   N-(2-diethylaminoethyl)-amide
   N-(3-dimethylaminopropyl)-amide
   N-(2-hydroxyethyl)-amide
   ethylamide
   n-propylamide
   n-butylamide
   cyclohexylamide
   piperidide
   morpholide
   N'-(2-hydroxyethyl)-piperazide.

EXAMPLE 54

A solution of 0.5 g. of sodium in 10 ml. of absolute ethanol is added dropwise to a solution of 1.4 g. of hydroxylamine hydrochloride in 35 ml. of absolute ethanol. The thus-precipitated NaCl is vacuum filtered. To the filtrate are added first 5.6 g. of the methyl ester of 3-chloro-4-piperidino-α-methyl-phenylacetic acid and thereafter a solution of 0.5 g. of sodium in 10 ml. of absolute ethanol. After allowing the reaction solution to stand overnight, the alcohol is distilled off; the residue is dissolved in water and worked up as usual (pH 6.3). There is obtained 3-chloro-4-piperidino-α-methyl-phenylacetohydroxamic acid, m.p. 126° (ethyl acetate).

Analogously, the following compounds are obtained from the corresponding methyl esters by reaction with hydroxylamine:
   3-bromo-4-piperidino-α-methyl-phenylacetohydroxamic acid
   3-fluoro-4-piperidino-α-methyl-phenylacetohydroxamic acid
   3-amino-4-piperidino-α-methyl-phenylacetohydroxamic acid
   3-nitro-4-piperidino-α-methyl-phenylacetohydroxamic acid
   3-chloro-4-pyrrolidino-α-methyl-phenylacetohydroxamic acid
   3-chloro-4-homopiperidino-α-methyl-phenylacetohydroxamic acid

EXAMPLE 55

At 0°, a solution of 3 g. of 3-amino-4-piperidino-phenylacetic acid in 25 ml. of methanol and 20 ml. of ether is slowly added dropwise to a solution of diazomethane in ether. Subsequently, 2 drops of glacial acetic acid are added. Then, the solution is washed with solution of sodium bicarbonate and water and dried over $Na_2SO_4$. After filtration and removal of the solvent, the methyl ester of 3-amino-4-piperidino-phenylacetic acid is obtained, b.p. 174°/0.05 mm.

Analogously, the following esters are obtained from the corresponding acids with diazomethane and diazoethane, respectively:

methyl ester of 3-amino-4-piperidino-α-methyl-phenylacetic acid, m.p. 106°–108°;
   ethyl ester of (+)-3-chloro-4-piperidino-α-methyl-phenylacetic acid;
   ethyl ester of (−)-3-chloro-4-piperidino-α-methyl-phenylacetic acid.

EXAMPLE 56

Ten g. of 3-methyl-4-piperidino-α-chlorophenylacetic acid ethyl ester hydrochloride (m.p. 142°) is hydrogenated with 1 g. of 5 percent palladium charcoal in 250 ml. of dioxane at 60° and 6 atmospheres of hydrogen. After filtration, the solution is concentrated by evaporation, and the residue is worked up as usual (pH 8 – 10), thus obtaining the ethyl ester of 3-methyl-4-piperidino-phenylacetic acid, b.p. 140°–150°/0.1 mm.

In order to produce the starting material, the ethyl ester of 3-methyl-4-piperidino-phenylglyoxylic acid is hydrogenated in ethanol with palladium charcoal at 55° and a hydrogen pressure of 6 atmospheres, to obtain the ethyl ester of 3-methyl-4-piperidino-mandelic acid, b.p. 142°–145°/0.05 mm.; this ester is converted into the α-chlorophenylacetic acid derivative by heating with $SOCl_2$ in $CH_2Cl_2$.

Analogously, it is possible to convert the 3,α-dimethyl-4-piperidino-α-chlorophenylacetic acid ethyl ester hydrochloride, m.p. 115°, produced from 3,α-dimethyl-4-piperidino-mandelic acid ethyl ester hydrochloride with $SOCl_2$, into the ethyl ester of 3,α-dimethyl-4-piperidino-phenylacetic acid, b.p. 138°–142°/0.05 mm., by catalytic hydrogenation.

EXAMPLE 57

Twenty-five g. of 3-chloro-4-piperidino-α-methyl-benzyl cyanide (b.p. 143°–145°/0.1 mm.; obtained by boiling 3-chloro-4-piperidino-α-methyl-phenylacetamide for 2 hours with $POCl_3$) and 4.2 g. of absolute ethanol are dissolved in 300 ml. of absolute ether and saturated with HCl gas at 0°. The iminoether hydrochloride, separated after allowing the reaction mixture to stand at 0° for 8 days, is isolated from the ether, dissolved in 80 ml. of water, neutralized with solution of sodium carbonate, and then heated for 30 minutes on a steam bath. Thereafter, the reaction solution is cooled, worked up as usual (pH 8 – 10), and the ethyl ester of 3-chloro-4-piperidino-α-methyl-phenylacetic acid is obtained, b.p. 160°–162°/0.2 mm.

EXAMPLE 58

Twenty-five g. of 3-chloro-4-piperidino-α-methyl-benzyl cyanide and 4.2 g. of absolute ethanol are dissolved in 300 ml. of absolute ether and saturated with HCl gas at 0°. The iminoether hydrochloride, separated after allowing the reaction solution to stand for 8 days at 0°, is isolated from the ether, allowed to stand over NaOH for 2 days under reduced pressure, then dissolved in 40 ml. of ethanol, and allowed to stand for 8 days at 20°. The reaction mixture is filtered off from the precipitated $NH_4Cl$, the excess alcohol is removed, and the reaction mixture is worked up as usual (pH 7 – 8), thus obtaining the triethyl ester of 3-chloro-4-piperidino-α-methyl-phenylorthoacetic acid, b.p. 210°–212°/0.1 mm.

Analogously, from:
   3-bromo-4-piperidino-α-methyl-
   3,α-dimethyl-4-piperidino-
   3-fluoro-4-piperidino-α-methyl-
   3-chloro-4-pyrrolidino-α-methyl-
   3-chloro-4-homopiperidino-α-methyl- and
   3-amino-4-piperidino-α-methyl-benzyl cyanide, as well as
   3-trifluoromethyl-4-piperidino-α-methyl-benzyl cyanide,
the following esters are obtained by way of the corresponding iminoether hydrochlorides by reaction with ethanol:
   3-bromo-4-piperidino-α-methyl-phenylorthoacetic acid triethyl ester, b.p. 218°–221°/0.2 mm.;
   3,α-dimethyl-4-piperidino-phenylorthoacetic acid triethyl ester, b.p. 201°–202°/0.01 mm.;

3-fluoro-4-piperidino-α-methyl-phenylorthoacetic acid triethyl ester, b.p. 208°–210° /0.05 mm.;

3-chloro-4-pyrrolidino-α-methyl-phenylorthoacetic acid triethyl ester;

3-chloro-4-homopiperidino-α-methyl-phenylorthoacetic acid triethyl ester;

3-amino-4-piperidino-α-methyl-phenylorthoacetic acid triethyl ester;

3-trifluoromethyl-4-piperidino-α-methyl-phenylorthoacetic acid triethyl ester.

EXAMPLE 59

Three g. of the methyl ester of 3-chloro-4-piperidino-α-methyl-phenylacetic acid is heated in a sealed tube with 30 ml. of saturated methanolic $NH_3$ for 16 hours to 80°–100°. The solution is concentrated by evaporation, and the residue is triturated with diisopropyl ether. The thus-precipitated 3-chloro-4-piperidino-α-methyl-phenylacetamide is vacuum filtered and recrystallized from ethyl acetate, m.p. 147°–148°.

Analogously, the following compounds are obtained from the corresponding methyl esters by reaction with methanolic $NH_3$:

3-bromo-4-piperidino-α-methyl-phenylacetamide
3,α-dimethyl-4-piperidino-phenylacetamide
3-amino-4-piperidino-α-methyl-phenylacetamide
3-fluoro-4-piperidino-α-methyl-phenylacetamide
3-trifluoromethyl-4-piperidino-α-methyl-phenylacetamide

EXAMPLE 60

Six g. of 3-chloro-4-piperidino-α-methyl-phenylthioacetamide is heated on a steam bath for one hour with 100 ml. of 60 percent aqueous ethanol. The solution is concentrated by evaporation, and the thus-precipitated 3-chloro-4-piperidino-α-methyl-phenylacetamide is recrystallized from ethyl acetate, m.p. 146°–148°.

Analogously, from:
3-bromo-4-piperidino-α-methyl-phenylthioacetamide and
3,α-dimethyl-4-piperidino-phenylthioacetamide,
the following compounds are obtained by treatment with aqueous ethanol:
3-bromo-4-piperidino-α-methyl-phenylacetamide and
3,α-dimethyl-4-piperidino-phenylacetamide.

EXAMPLE 61

8 g. of 3-chloro-4-piperidino-α-methyl-benzyl cyanide is dissolved in 50 ml. of concentrated $H_2SO_4$ and allowed to stand overnight at room temperature. The solution is poured on ice water, and sodium hydroxide solution is added to a pH of 8, thus obtaining 3-chloro-4-piperidino-α-methyl-phenylacetamide, m.p. 146°–148°.

EXAMPLE 62

16.5 g. of the 2'-chloroethyl ester of 3-chloro-4-piperidino-α-methyl-phenylacetic acid (b.p. 162°–164°/0.05 mm.; obtainable by dissolving 3-chloro-4-piperidino-α-methyl-phenylacetamide in 2-chloroethanol and introducing HCl gas at 90° – 100° for 5 hours) is heated with 7.5 g. of diethylamine in 60 ml. of absolute benzene for 10 hours in a tube to 100°. The thus-precipitated diethylamine hydrochloride is vacuum filtered, the filtrate is concentrated by evaporation, the residue is dissolved in 100 ml. of absolute ethanol, and heated with 6 g. of fumaric acid on a steam bath for one-half hour. The solution is concentrated by evaporation and allowed to stand overnight at 0°. The thus-precipitated fumarate of the 2'-diethylaminoethyl ester of 3-chloro-4-piperidino-α-methyl-phenylacetic acid is recrystallized from acetone, m.p. 107°–108°.

Analogously, from
2'-chloroethyl ester of 3-bromo-4-piperidino-α-methyl-phenylacetic acid (b.p. 175°–176°/0.1 mm.);
2'-chloroethyl ester of 3,α-dimethyl-4-piperidino-phenylacetic acid (b.p. 154°–155°/0.02 mm.);
2'-chloroethyl ester of 3-fluoro-4-piperidino-α-methyl-phenylacet-ic acid (b.p. 170°–171°/0.1 mm.); and
2'-chloroethyl ester of 3-amino-4-piperidino-α-methyl-phenylacetic acid (b.p. 172°–174°/0.02 mm.)
the following esters are obtained by reaction with diethylamine:

3-bromo-4-piperidino-α-methyl-phenylacetic acid-2'-diethylaminoethyl ester, b.p. 194°–196°/0.01 mm.;

3,α-dimethyl-4-piperidino-phenylacetic acid-2'-diethylaminoethyl ester, b.p. 182°–184°/0.01 mm.;

3-fluoro-4-piperidino-α-methyl-phenylacetic acid-2'-diethylaminoethyl ester, b.p. 186°–188°/0.1 mm.; and 3-amino-4-piperidino-α-methyl-phenylacetic acid-2'-diethylaminoethyl ester, b.p. 198°–200°/0.1 mm. (maleate, oily).

EXAMPLE 63

10 g. of 3-chloro-4-piperidino-α-methyl-phenylacetic acid and 25 g. of vinyl acetate are shaken with 0.15 g. of mercury acetate for 30 minutes. Thereafter, the reaction mixture is heated to the boiling point, one drop of $H_2SO_4$ is added, and the mixture is boiled for 3 hours. Then, 150 mg. of sodium acetate is added, and the excess vinyl acetate is distilled off, thus obtaining the vinyl ester of 3-chloro-4-piperidino-α-methyl-phenylacetic acid, b.p. 153°–155°/0.1 mm.

Analogously, the following esters are obtained from the corresponding acids by interesterification with vinyl acetate:

vinyl ester of 3-bromo-4-piperidino-α-methyl-phenylacetic acid, b.p. 168°–170°/0.02 mm.;

vinyl ester of 3,α-dimethyl-4-piperidino-phenylacetic acid, b.p. 158°–160°/0.05 mm.;

vinyl ester of 3-fluoro-4-piperidino-α-methyl-phenylacetic acid, b.p. 155°–156°/0.1 mm.

EXAMPLE 64

3.2 g. of the ethyl ester of 3-chloro-4-piperidino-α-methyl-phenylacetic acid is dissolved in 20 g. of 2-diethylaminoethanol and heated for 20 hours to 160°–165°. The excess alcohol is distilled off, the residue treated with water and ether, the ether solution separated, dried with $K_2CO_3$, filtered, and distilled. The 2'-diethylaminoethyl ester of 3-chloro-4-piperidino-α-methyl-phenylacetic acid is obtained, b.p. 171°–173°/0.02 mm.; fumarate, m.p. 107°–108° (acetone).

Analogously, the following esters are obtained from the corresponding ethyl esters of phenylacetic acid by reaction with 2-diethylaminoethanol:

2'-diethylaminoethyl ester of 3-bromo-4-piperidino-α-methyl-phenylacetic acid, b.p. 184°–185°/0.01 mm.;

2'-diethylaminoethyl ester of 3,α-dimethyl-4-piperidino-phenylacetic acid, b.p. 165°–166°/0.2 mm.; and 2'-diethylaminoethyl ester of 3-fluoro-4-piperidino-α-methyl-phenylacetic acid, b.p. 176°–177°/0.05 mm.

EXAMPLE 65

0.8 g. of butyryl azide is boiled in 40 ml. of absolute benzene with 10 g. of 3-chloro-4-piperidino-α-methyl-phenylacetic acid until the development of gas has ceased (about 6hours). Thereafter, the benzenic solution is washed with soda solution and water, the solvent is evaporated, and the thus-obtained 3-chloro-4-piperidino-α-methyl-phenylacetic acid-n-propylamide is distilled, b.p. 232°–235°/0.1 mm.

Analogously, the following compounds are obtained from the corresponding acids by reaction with butyryl azide:

n-propylamide of 3-bromo-4-piperidino-α-methyl-phenylacetic acid, b.p. 242°–243°/0.01 mm.;

n-propylamide of 3,α-dimethyl-4-piperidino-phenylacetic acid, b.p. 230°–231°/0.2 mm.;

n-propylamide of 3-fluoro-4-piperidino-α-methyl-phenylacetic acid, b.p. 230°–232°/0.1 mm.; and n-propylamide of 3-trifluoromethyl-4-piperidino-α-methyl-phenylacetic acid, b.p. 238°–240°/0.05 mm.

EXAMPLE 66

Analogously to Example 1, 4-piperidino-naphthyl-1-acetic acid, m.p. 142°–143° is obtained from 4-amino-naphthyl-1-acetic acid.

In an analogous manner, there is obtained from 3-chloro-4-amino-naphthyl-1-acetic acid (m.p. 204°–2°; produced by chlorinating 4-acetamido-naphthyl-1-acetic acid in acetic acid at room temperature to form the corresponding 3-chloro compound, m.p. 244°–246° and subsequently splitting off the acetyl group of hydrochloric acid):

3-chloro-4-piperidino-naphthyl-1-acetic acid, m.p. 166°–167°;

from 2-methyl-4-amino-naphthyl-1-acetic acid (m.p. 208°–210°; produced by reducing 2-methyl-4-nitro-naphthyl-1-acetic acid, m.p. 223°–225°):

2-methyl-4-piperidino-naphthyl-1-acetic acid, m.p. 167°–169°;

from 4-amino-α-methyl-naphthyl-1-acetic acid (m.p. 190°–192°; produced from the diethyl ester of 4-nitro-α-methyl-naphthyl-1-malonic acid, m.p. 88°–90°, by catalytic reduction and decarboxylating saponification thereof):

4-piperidino-α-methyl-naphthyl-1-acetic acid, m.p. 181–183°Analogously, from:

3-bromo-4-amino-α-methyl-naphthyl-1-acetic acid
3-chloro-4-amino-α-methyl-naphthyl-1-acetic acid
3,α-dimethyl-4-amino-naphthyl-1-acetic acid
2-chloro-4-amino-α-methyl-naphthyl-1-acetic acid
2,α-dimethyl-4-amino-naphthyl-1-acetic acid
3-chloro-4-amino-α-ethyl-naphthyl-1-acetic acid
3-methyl-4-amino-α-ethyl-naphthyl-1-acetic acid
3-chloro-4-amino-α-n-butyl-naphthyl-1-acetic acid
3-fluoro-4-amino-α-methyl-naphthyl-1-acetic acid
3-trifluoromethyl-4-amino-α-methyl-naphthyl-1-acetic acid
3-ethoxy-4-amino-α-ethyl-naphthyl-1-acetic acid
2-methyl-4-amino-α-ethyl-naphthyl-1-acetic acid
2-methyl-4-amino-α-n-propyl-naphthyl-1-acetic acid
3-methyl-4-amino-αn-propyl-naphthyl-1-acetic acid
4-amino-α-methyl-α-ethyl-naphthyl-1-acetic acid
4-amino-5,6,7,8-tetrahydro-naphthyl-1-acetic acid
4-amino-α-methyl-5,6,7,8-tetrahydro-naphthyl-1-acetic acid
2-methyl-4-amino-5,6,7,8-tetrahydro-naphthyl-1-acetic acid
3-methyl-4-amino-5,6,7,8-tetrahydro-naphthyl-1-acetic acid
2,α-dimethyl-4-amino-5,6,7,8-tetrahydro-naphthyl-1-acetic acid
3,α-dimethyl-4-amino-5,6,7,8-tetrahydro-naphthyl-1-acetic acid
4-amino-α-ethyl-5,6,7,8-tetrahydro-naphthyl-1-acetic acid
2-methyl-4-amino-α-ethyl-5,6,7,8-tetrahydro-naphthyl-1-acetic acid the following compounds are obtained by reaction with 1,5-dibromopentane:

3-bromo-4-piperidino-α-methyl-naphthyl-1-acetic acid
3-chloro-4-piperidino-α-methyl-naphthyl-1-acetic acid
3,α-diemthyl-4-piperidino-naphthyl-1-acetic acid
2-chloro-4-piperidino-α-methyl-naphthyl-1-acetic acid
2,α-dimethyl-4-piperidino-naphthyl-1-acetic acid
3-chloro-4-piperidino-α-ethyl-naphthyl-1-acetic acid
3-methyl-4-piperidino-α-ethyl-naphthyl-1-acetic acid
3-chloro-4-piperidino-α-n-butyl-naphthyl-1-acetic acid
3-fluoro-4-piperidino-α-methyl-naphthyl-1-acetic acid
3-trifluoromethyl-4-piperidino-α-methyl-naphthyl-1-acetic acid
3-ethoxy-4-piperidino-α-ethyl-naphthyl-1-acetic acid
2-methyl-4-piperidino-α-ethyl-naphthyl-1-acetic acid
2-methyl-4-piperidino-α-n-propyl-naphthyl-1-acetic acid
3-methyl-4-piperidino-α-n-propyl-naphthyl-1-acetic acid
4-piperidino-α-methyl-α-ethyl-naphthyl-1-acetic acid
4-piperidino-5,6,7,8-tetrahydro-naphthyl-1-acetic acid
4-piperidino-α-methyl-5,6,7,8-tetrahydro-naphthyl-1-acetic acid
2-methyl-4-piperidino-5,6,7,8-tetrahydro-naphthyl-1-acetic acid
3-methyl-4-piperidino-5,6,7,8-tetrahydro-naphthyl-1-acetic acid
2,α-dimethyl-4-piperidino-5,6,7,8-tetrahydro-naphthyl-1-acetic acid
3,α-dimethyl-4-piperidino-5,6,7,8-tetrahydro-naphthyl-1-acetic acid
4-piperidino-α-ethyl-5,6,7,8-tetrahydro-naphthyl-1-acetic acid
2-methyl-4-piperidino-α-ethyl-5,6,7,8-tetrahydro-naphthyl-1-acetic acid;

and from 3-chloro-4-amino-60 -methyl-naphthyl-acetic acid, by reaction with 1,6-dibromohexane or with 2,6-dibromoheptane, there is obtained 4-homopiperidino- and 4-(2', 6'-dimethyl-piperidino)-3-chloro-α-methyl-naphthylacetic acid, respectively.

EXAMPLE 67

Analogously to Example 1, 4-pyrrolidino-naphthyl-1-acetic acid, m.p. 110°–114°, is obtained from 4-amino-naphthyl-1-acetic acid by reaction with 1,4-dibromobutane.

In an analogous manner, the following compounds are produced from the corresponding 4-amino-naphthyl-1-acetic acids by reaction with 1,4-dibromobutane:

4-pyrrolidino-α-methyl-naphthyl-1-acetic acid
2,α-dimethyl-4-pyrrolidino-naphthyl-1-acetic acid
3,α-dimethyl-4-pyrrolidino-naphthyl-1-acetic acid
3-chloro-4-pyrrolidino-α-ethyl-naphthyl-1-acetic acid
3-bromo-4-pyrrolidino-α-n-butyl-naphthyl-1-acetic acid
2-chloro-4-pyrrolidino-α-methyl-naphthyl-1-acetic acid
2-methyl-4-pyrrolidino-α-ethyl-naphthyl-1-acetic acid
4-pyrrolidino-5,6,7,8-tetrahydro-naphthyl-1-acetic acid
4-pyrrolidino-α-methyl-5,6,7,8-tetrahydro-naphthyl-1-acetic acid
3,α-dimethyl-4-pyrrolidino-5,6,7,8-tetrahydro-naphthyl-1-acetic acid.

EXAMPLE 68

Analogously to Example 29, the ethyl ester of 4-piperidino-α-methyl-naphthyl-1-acetic acid, b.p. 177°–180°/0.2 mm. is produced from 4-piperidino-α-methylene-naphthyl-1-acetic acid ethyl ester (m.p. 63°–65°; b.p. 168°–170°/0.05 mm; obtainable from 1-naphthylamine by way of 1-piperidino-naphthalene, 4-piperidino-naphthyl-1-glyoxylic acid ethyl ester (b.p. 220°–228°/0.05 mm.) and 4-piperidino-α-hydroxy-α-methyl-naphthyl-1-acetic acid ethyl ester, b.p. 181°–182°/0.05 mm.) by hydrogenation. Saponification of this ester, or hydrogenation of the free 4-piperidino-α-methylene-naphthyl-1-acetic acid results in 4-piperidino-α-methyl-naphthyl-1-acetic acid, m.p. 181°–183°.

Analogously, by hydrogenation and saponification of the ethyl ester of 4-piperidino-α-ethylidene-naphthyl-1-acetic acid, there is obtained 4-piperidino-α-ethyl-naphthyl-1-acetic acid, m.p. 145°–146°.

In an analogous manner, from:
3-methyl-4-piperidino-α-methylene-
3-methyl-4-morpholino-α-methylene-
2-methyl-4-homopiperidino-α-methylene-
2-methyl-4-pyrrolidino-α-methylene-
3-chloro-4-piperidino-α-methylene-
2-fluoro-4-piperidino-α-methylene-
3-methoxy-4-piperidino-α-ethylidene-
3-amino-4-piperidino-α-ethylidene- and
2-methyl-4-pyrrolidino-α-butylidene-naphthyl-1-acetic acid ethyl ester, the following compounds are obtained by hydrogenation and subsequent saponification:

3,α-dimethyl-4-piperidino-naphthyl-1-acetic acid
3,α-dimethyl-4-morpholino-naphthyl-1-acetic acid
2,α-dimethyl-4homopiperidino-naphthyl-1-acetic acid
2,α-dimethyl-4-pyrrolidino-naphthyl-1-acetic acid 3-chloro-4-piperidino-α-methyl-naphthyl-1-acetic acid
2-fluoro-4-piperidino-α-methyl-naphthyl-1-acetic acid
3-methoxy-4-piperidino-α-ethyl-naphthyl-1-acetic acid
3-amino-4-piperidino-α-ethyl-naphthyl-1-acetic acid and
2-methyl-4-pyrrolidino-α-n-butyl-naphthyl-1-acetic acid.

EXAMPLE 69

Analogously to Example 22, 4-piperidino-α-methyl-naphthyl-1-acetic acid, m.p. 181-183°, is obtained from the ethyl ester of 4-piperidino-naphthyl-1-acetic acid (obtainable by esterification of the free acid) by way of the diethyl ester of 4-piperidino-naphthyl-1-malonic acid (b.p. 180-185°/0.05 mm.) and the diethyl ester of 4-piperidino-α-methyl-naphthyl-1-malonic acid (b.p. 199-203°/0.05 mm.).

In an analogous manner, from:
3-chloro-4-piperidino-
3-chloro-4-morpholino-
3-chloro-4-homopiperidino-
3-chloro-4-(2,5-dimethyl-piperidino)-
3-bromo-4-homopiperidino-
3-methyl-4-piperidino-
2-chloro-4-homopiperidino-
2-chloro-4-piperidino-
3-chloro-4-piperidino-5,6,7,8-tetrahydro-
3-methyl-4-piperidino-5,6,7,8-tetrahydro-
2-methyl-4-homopiperidino-5,6,7,8-tetrahydro- and
3-methoxy-4-piperidino-5,6,7,8-tetrahydro-naphthyl-1-acetic acid ethyl ester,
the following compounds are obtained by way of corresponding aryl-1-malonic acid derivatives and by reaction with methyl iodide, saponification and decarboxylation:
3-chloro-4-piperidino-α-methyl-naphthyl-1-acetic acid
3-chloro-4-morpholino-α-methyl-naphthyl-1-acetic acid
3-chloro-4-homopiperidino-α-methyl-naphthyl-1-acetic acid
3-chloro-4-(2,5-dimethyl-piperidino)-α-methyl-naphthyl-1-acetic acid
3-bromo-4-homopiperidino-α-methyl-naphthyl-1-acetic acid
3,α-dimethyl-4-piperidino-naphthyl-1-acetic acid
2-chloro-4-homopiperidino-α-methyl-naphthyl-1-acetic acid
2-chloro-4-piperidino-α-methyl-naphthyl-1-acetic acid
3-chloro-4piperidino-α-methyl-5,6,7,8-tetrahydro-naphthyl-1-acetic acid
3,α-dimethyl-4-piperidino-5,6,7,8-tetrahydro-naphthyl-1-acetic acid
2,α-dimethyl-4-homopiperidino-5,6,7,8-tetrahydro-naphthyl-1-acetic acid and
3-methoxy-4-piperidino-α-methyl-5,6,7,8-tetrahydro-naphthyl-1-acetic acid;
and from:
3-methoxy-4-piperidino-
3-chloro-4-piperidino-
3-bromo-4-piperidino-
2-methyl-4-piperidino-
2-methoxy-4-piperidino- and
2-chloro-4-piperidino-naphthyl-1-acetic acid,
the following compounds are produced by way of corresponding naphthyl-1-malonic acid derivatives and by reaction with ethyl iodide, n-propyl iodide, isopropyl iodide, n-butyl iodide, sec.butyl iodide or the corresponding bromides, as well as by saponification and decarboxylation:
3-methoxy-4-piperidino-α-ethyl-naphthyl-1-acetic acid
3-chloro-4-piperidino-α-ethyl-naphthyl-1-acetic acid
3-chloro-4-piperidino-α-n-propyl-naphthyl-1-acetic acid
3-chloro-4-piperidino-α-n-butyl-naphthyl-1-acetic acid
3-chloro-4-piperidino-α-sec.butyl-naphthyl-1-acetic acid
3-bromo-4-piperidino-α-ethyl-naphthyl-1-acetic acid
3-bromo-4-piperidino-α-n-propyl-naphthyl-1-acetic acid
2-methyl-4-piperidino-α-ethyl-naphthyl-1-acetic acid
2-methoxy-4-piperidino-α-n-propyl-naphthyl-1-acetic acid
2-chloro-4-piperidino-α-ethyl-naphthyl-1-acetic acid and
2-chloro-4-piperidino-α-n-butyl-naphthyl-1-acetic acid.

EXAMPLE 70

5.4 g. of 4-piperidino-naphthyl-1-acetic acid id dissolved in 60 ml. of absolute amyl alcohol and heated to the boiling point. Within 90 minutes, 4.5 g. of metallic sodium is then introduced into the reaction solution, agitating the latter for 15 minutes, and then the amyl alcohol is removed. The residue is diluted with water, the aqueous phase is washed with ether, and worked up as usual (pH 5), thus obtaining 4-piperidino-5,6,7,8-tetrahydro-naphthyl-1-acetic acid, m.p. 125°–127° (hexane).

Analogously, the following compounds are obtained from the corresponding naphthyl-1-acetic acids by reduction with sodium:
4-piperidino-α-methyl-5,6,7,8-tetrahydro-naphthyl-1-acetic acid, m.p. 163°–165°;
2,α-dimethyl-4-pyrrolidino-5,6,7,8-tetrahydro-naphthyl-1-acetic acid;
3,α-dimethyl-4-piperidino-5,6,7,8-tetrahydro-naphthyl-1-acetic acid;
2-methoxy-4-piperidino-α-methyl-5,6,7,8-tetrahydro-naphthyl-1-acetic acid;
3-methoxy- 4-piperidino- α-methyl-5,6,7,8-tetrahydro-naphthyl-1-acetic acid;
2-amino-4-piperidino-α-methyl-5,6,7,8-tetrahydro-naphthyl-1-acetic acid;
3-amino- 4-piperidino-α-methyl-5,6,7,8-tetrahydro-naphthyl-1-acetic acid;
4-homopiperidino-α-methyl-5,6,7,8-tetrahydro-naphthyl-1-acetic acid;
4-morpholino-α-methyl-5,6,7,8,-tetrahydro-naphthyl-1-acetic acid;
4-thiomorpholino-α-methyl-5,6,7,8-tetrahydro-naphthyl-1-acetic acid;
3,α-dimethyl-4-thiomorpholino-5,6,7,8-tetrahydro-naphthyl-1-acetic acid.

EXAMPLE 71

Analoguously to Example 20, 4-piperidino-naphthyl-1-acetic acid, m.p. 142°–143° (ethyl acetate/petroleum ether) is produced from 4-piperidino-1-acetonaphthone with sulfur and morpholine by way of the 4-piperidino-naphthyl-1-thioacetomorpholide (which is not isolated).

In an analogous manner, from:
3-chloro-4-piperidino-
3-methyl-4-piperidino-
3-bromo- 4-piperidino-
2-chloro-4-pyrrolidino-
2-methyl-4-pyrrolidino-
2-methyl-4-homopiperidino-
3-methyl-4-homopiperidino- and
4-thiomorpholino-1-acetonaphthone
the following compounds are obtained with morpholine/sulfur:
3-chloro-4-piperidino-naphthyl-1-acetic acid
3-methyl-4-piperidino-naphthyl-1-acetic acid
3-bromo-4-piperidino-naphthyl-1-acetic -acetic acid
2-chloro-4-pyrrolidino-naphthyl-1-acetic acid
2-methyl-4-pyrrolidino-naphthyl-1-acetic acid
2-methyl-4-homopiperidino-naphthyl-1-acetic acid
3-methyl-4-homopiperidino-naphthyl-1-acetic acid and
4-thiomorpholino-naphthyl-1-acetic acid.

EXAMPLE 72

Analogously to Example 21(a) or (b), 3-chloro-4-piperidino-naphthyl-1-acetic acid, m.p. 166°–168° (diisopropyl ether) is produced from 3,ω-dichloro-4-piperidino-1-acetonaphthone (obtainable from 3-chloro-4-piperidino-1-acetonaphthone and sulfuryl chloride).

In an analogous manner, from:
3-chloro-4-di-n-butylamino-
3-fluoro-4-piperidino-
3-methoxy-4-piperidino- and
2-chloro-4-piperidino-ωω-chloro-1-acetonaphthone, the following compounds are obtained with potassium hydroxide:
- 3-chloro-4-di-n-butylamino-naphthyl-1-acetic acid
- 3-fluoro-4-piperidino-naphthyl-1-acetic acid
- 3-methoxy-4-piperidino-naphthyl-1-acetic acid and
- 2-chloro-4-piperidino-naphthyl-1-acetic acid.

EXAMPLE 73

Analogously to Example 3(a), the methyl ester of 4-dimethylamino-naphthyl-1-acetic acid; hydrochloride, m.p. 186°–188°, is produced from the methyl ester of 4-amino-naphthyl-1-acetic acid with formic acid/formaldehyde.

The ester hydrochloride can be converted, with boiling aqueous-ethanolic KOH (1hour) into 4-dimethylamino-naphthyl-1-acetic acid.

Analogously, from:
- 3-chloro-4-amino-α-methyl-
- 3,α-dimethyl-4-amino-
- 2-chloro-4-amino-α-methyl-
- 2-methoxy-4-amino-α-methyl- and
- 3-chloro-4-amino-α-methyl-5,6,7,8-tetrahydro-naphthyl-1-acetic acid methyl or ethyl ester, the following compounds can be produced by reaction with formic acid/formaldehyde and subsequent saponification:
- 3-chloro-4-dimethylamino-α-methyl-naphthyl-1-acetic acid
- 3,α-dimethyl-4-dimethylamino-naphthyl-1-acetic acid
- 2-chloro-4-dimethylamino-α-methyl-naphthyl-1-acetic acid
- 2-methoxy-4-dimethylamino-α-methyl-naphthyl-1-acetic acid and
- 3-chloro-4-dimethylamino-α-methyl-5,6,7,8-tetrahydronaphthyl-1-acetic acid;

and from the corresponding 2- or 3-amino-naphthyl-1-acetic acid methyl or ethyl or esters, the following compounds are obtained:
- 3-dimethylamino- 4-piperidino-α-methyl-naphthyl-1-acetic acid
- 2-dimethylamino-4-piperidino-α-ethyl-naphthyl-1-acetic acid
- 3-dimethylamino-4-piperidino-α-ethyl-naphthyl-1-acetic acid.

EXAMPLE 74

Analogously to Example 46, the methyl ester of 4-piperidino-α-methyl-naphthyl-1-acetic acid, m.p. 81°–83° (methanol) is obtained from 4-piperidino-α-methyl-naphthyl-1-acetic acid with methanol/HCl.

In an analogous manner, the following compounds are produced from the corresponding acids by reaction with the corresponding alcohols:
4-piperidino-α-methyl-naphthyl-1-acetic acid-
- ethyl ester, b.p. 172°–174°/0.1 mm. (hydrochloride, amorphous);
- n-butyl ester, b.p. 201°–205°/0.1 mm.;
- isobutyl ester, b.p. 198°–202°/0.1 mm.;
- isoamyl ester, b.p. 200°–205°/0.01 mm.;
- sec.butyl ester, b.p. 192°–196°/0.05 mm.;
- n-amyl ester, b.p. 210°–215°/0.02 mm.;
- cyclohexyl ester, b.p. 227°–229°/0.01 mm.;
- n-hexyl ester, b.p. 210°–211°/0.1 mm.;
- n-octyl ester, b.p. 194°–196°/0.01 mm.;
- n-decyl ester, b.p. 208°–210°/0.01 mm.;
- n-dodecyl ester, b.p. 229°–235°/0.01 mm.;
- 2'-ethyl-n-butyl ester, b.p. 205°–206°/0.05 mm.;
- 2'-methyl-n-pentyl ester, b.p. 183°–185°/0.01 mm.

3-chloro-4-piperidino-α-methyl-naphthyl-1-acetic acid-
- methyl ester, b.p. 185°–187°/0.01 mm.;
- ethyl ester, b.p. 192°–196°/0.01 mm.;
- propyl ester, b.p. 210°–212°/0.01 mm.

3fluoro-4-piperidino-α-methyl-naphthyl-1-acetic acid-
- methyl ester, b.p. 164°–170°/0.01 mm.;
- ethyl ester, b.p. 181°–183°/0.01 mm.;
- propyl ester, b.p. 195°–205°/0.01 mm.

3-bromo-4-piperidino-α-methyl-naphthyl-1-acetic acid-
- methyl ester, b.p. 190°–195°/0.01 mm.;
- ethyl ester, b.p. 202°–205°/0.01 mm.;
- propyl ester, b.p. 205°–208°/0.1 mm.

3,α-dimethyl-4-piperidino-naphthyl-1-acetic acid-
- methyl ester, b.p. 180°–186°/0.2 mm.;
- ethyl ester, b.p. 201°–203°/0.3 mm.;
- propyl ester, b.p. 196°–198°/0.1 mm.

2-chloro-4-piperidino-α-methyl-naphthyl-1-acetic acid-
- methyl ester, b.p. 185°–187°/0.1 mm.;
- ethyl ester, b.p. 180°–186°/0.03 mm.;
- propyl ester, b.p. 180°–183°/0.05 mm.

2-methoxy-4-piperidino-α-methyl-naphthyl-1-acetic acid-
- methyl ester, b.p. 210°–212°/0.1 mm.;
- ethyl ester, b.p. 205°–208°/0.05 mm.;
- propyl ester, b.p. 220°–223°/0.1 mm.

4-piperidino-α-ethyl-naphthyl-1-acetic acid-
- ethyl ester, b.p. 200°–205°/0.3 mm.;

4-homopiperidino-α-methyl-naphthyl-1-acetic acid-
- ethyl ester, b.p. 190°–200°/0.1 mm.;

4-piperidino-α-methyl-5,6,7,8-tetrahydro-naphthyl-1-acetic acid
- ethyl ester, b.p. 195°205°/0.1 mm;

3-chloro-4-piperidino-α-methyl-5,6,7,8-tetrahydro-naphthyl-1-acetic acid-
- methyl ester, b.p. 170°–178°/0.01 mm.,
- ethyl ester, b.p. 186°–190°/0.01 mm.,
- propyl ester, b.p. 190°–195°/0.01 mm.

EXAMPLE 75

Analogously to Example 47, the n-propyl ester of 4-piperidino-α-methyl-naphthyl-1-acetic acid, b.p. 190°–195°/0.1 mm.; is produced from 4-piperidino-α-methyl-naphthyl-1-acetic acid and propanol with N,N'-dicyclohexyl carbodiimide.

In an analogous manner, the following esters are obtained from the corresponding acids:
4-piperidino-α-methyl-naphthyl-1-acetic -naphthyl-1-acetic acid-
- allyl ester, b.p. 185°–187°/0.1 mm.
- propargyl ester, b.p. 190°–195°/0.05 mm.
- isopropyl ester, b.p. 175°–178°mm.
- benzyl ester, b.p. 205°–207°/0.1 mm.
- crotyl ester, b.p. 200°–206°/0.05 mm.
- 2°-phenylethyl ester, b.p. 225°–227°/0.01 mm. geranyl ester
- 2'-methoxyethyl ester
- 2'-(2-methoxyethoxy)-ethyl ester
- 5'-methoxypentyl ester
- 5'-butoxypentyl ester
- cyclopentyl ester
- 2'-cyclohexylethyl ester
- 3'-cyclohexylpropyl ester
- phenyl ester
- o-tolyl ester;

3-chloro-4-piperidino- α-methyl-naphthyl-1-acetic acid-
- allyl ester, b.p. 190°–193°/0.1 mm.
- propargyl ester, b.p. 220°–225°/0.2 mm.
- isopropyl ester, b.p. 180°185°/0.1 mm.
- benzyl ester, b.p. 220°–224°/0.01 mm.
- 2'-phenylethyl ester, b.p. 230°–232°/0.01 mm.
- geranyl ester
- 2'-methoxyethyl ester
- 2'-(2-methoxyethoxy)-ethyl ester
- 5'-methoxypentyl ester
- crotyl ester
- cyclohexyl ester
- cyclopentyl ester
- 2'-cyclohexylethyl ester
- 3'-cyclohexylpropyl ester
- phenyl ester;

3-bromo-4-piperidino-α-methyl-naphthyl-1-acetic acid-
- crotyl ester
- cyclopentyl ester
- o-tolyl ester;

3-methyl-4-piperidino-α-methyl-naphthyl-1-acetic acid-
- propargyl ester

2'-methoxyethyl ester;
4-piperidino-α-ethyl-naphthyl-1-acetic acid-benzyl ester;
4-homopiperidino-α-methyl-naphthyl-1-acetic acid-2'-phenylethyl ester.

EXAMPLE 76

Analogously to Example 48, the n-propyl ester of 4-piperidino-α-methyl-naphthyl-1-acetic acid, b.p. 190°–195°/0.1 mm., is obtained from 4-piperidino-α-methyl-naphthyl-1-acetic acid by reaction with SOCl₂ and then with n-propanol.

In an analogous manner, the following esters are produced with n-butanol and n-hexanol, respectively:
3-chloro-4-piperidino-α-methyl-naphthyl-1-acetic acid-
   n-butyl ester, b.p. 204°–205°/0.1 mm.
   n-hexyl ester, b.p. 222°–224°/0.1 mm.;
3,α-dimethyl-4-piperidino-naphthyl-1-acetic acid-
   n-butyl ester, b.p. 211°–214°/0.1 mm.
   n-hexyl ester, b.p. 227°–228°/0.05 mm.;
3-chloro-4-piperidino-α-methyl-5,6,7,8,-tetrahydro-naphthyl-1-acetic acid-
   n-butyl ester, b.p. 198°–201°/0.02 mm.
   n-hexyl ester, b.p. 232°–235°/0.1 mm.

EXAMPLE 77

Analogously to Example 49, the tert.butyl ester of 4-piperidino- α-methyl-naphthyl-1-acetic acid is produced from 4-piperidino-α-methyl-naphthyl-1-acetic acid with SOCl₂ and subsequent reaction with potassium-tert.butylate.

In an analogous manner, the following esters are obtained from the corresponding acids:
   tert.butyl ester of 3-chloro- 4-piperidino-α-methyl-naphthyl-1-acetic acid;
   tert.butyl ester of 3,α-dimethyl-4-piperidino-naphthyl-1-acetic acid;
   tert.butyl ester of 3-methyl- 4-piperidino- α-methyl- 5,6,7,8-tetra-hydro-naphthyl-1-acetic acid.

EXAMPLE 78

Analogously to Example 51, the 2'-diethylaminoethyl ester of 4-piperidino-α-methyl-naphthyl-1-acetic acid, b.p. 185°–189°/0.01 mm., is obtained from 4-piperidino-α-methyl-naphthyl-1-acetic acid with 2-diethylaminoethyl chloride.

In an analogous manner, the following esters are produced from the corresponding acids by esterification with 2-dimethylaminoethyl chloride, 2-pyrrolidinoethyl chloride, 3-morpholinopropyl chloride, 3-morpholino- 2-propyl chloride, 2-piperidino-ethyl chloride and 2-(2-methylpiperidino)-ethyl chloride:
4-piperidino-α-methyl-naphthyl-1-acetic acid-
   2'-dimethylaminoethyl ester, b.p. 180°–182°/0.05 mm.
   2'-pyrrolidinoethyl ester, b.p. 227°–229°/0.05 mm.
   3'-morpholinopropyl ester, b.p. 230°–236°/0.02 mm.
   1'-methyl-2'-morpholinoethyl ester, b.p. 228°–230°/0.02 mm.
   2'-piperidinoethyl ester, b.p. 218°–222°/0.02 mm.
   2'-(2-methyl-piperidino)-ethyl ester, b.p. 224°–225°/0.01 mm.;
3-chloro- 4-piperidino-α-methyl-naphthyl-1-acetic acid-
   2'-dimethylaminoethyl ester, b.p. 184°–187°/0.1 mm.
   2'-pyrrolidinoethyl ester, b.p. 207°–212°/0.05 mm.
   3'-morpholinopropyl ester, b.p. 220°–225°/0.01 mm.
   1'-methyl-2'-morpholinoethyl ester, b.p. 233°–235°/0.05 mm.
   2'-piperidinoethyl ester, b.p. 230°–232°/0.02 mm.
   2-(2-methylpiperidino)-ethyl ester, b.p. 235°–237°/0.01 mm.;
3,α-dimethyl- 4-piperidino-naphthyl-1-acetic acid-
   2'-dimethylaminoethyl ester, b.p. 189°–193°/0.05 mm.
   2'-pyrrolidinoethyl ester, b.p. 220°–222°/0.1 mm.
   3'-morpholinopropyl ester, b.p. 230°–232°/0.1 mm.
   1'-methyl-2'-morpholinoethyl ester, b.p. 225°–226°/0.02 mm.
   2'-piperidinoethyl ester, b.p. 217°–218°/0.01 mm.
   2'-(2-methylpiperidino)-ethyl ester, b.p. 223°–226°/0.05 mm.;
2-chloro-4-piperidino-αα-methyl-naphthyl-1-acetic acid-
   2'-pyrrolidinoethyl ester, b.p. 210°–212°/0.1 mm.
   3'-morpholinopropyl ester, b.p. 222°–224°/0.1 mm.
   1'-methyl-2'-morpholinoethyl ester, b.p. 217°–218°/0.1 mm.
   2'-piperidinoethyl ester, b.p. 205°–206°/0.1 mm.
   2'-(2-methylpiperidino)-ethyl ester, b.p. 221°–224°/0.2 mm.;
3-chloro-4-piperidino- α-methyl-5,6,7,8-tetrahydro-naphthyl-1-acetic acid-
   2'-pyrrolidinoethyl ester b.p. 190°–192°/0.1 mm.
   3'-morpholinopropyl ester, b.p. 205°–206°/0.1 mm.
   1'-methyl-2'-morpholinoethyl ester, b.p. 202°–205°/0.1 mm.
   2'-piperidinoethyl ester, b.p. 198°–200°/0.1 mm.
   2'-(2-methylpiperidino)-ethyl ester, b.p. 208°–210°/0.05 mm.

From the corresponding acids and the corresponding substituted alkyl chlorides or bromides, the following esters are produced:
4-piperidino-α-methyl-naphthyl-1-acetic acid-
   2'-hydroxyethyl ester
   5'-hydroxypentyl ester
   3',6'-dioxa-8'-hydroxyoctyl ester
   2'-aminoethyl ester
   3'-aminopropyl ester
   2'-di-n-propylaminoethyl ester
   3'-dimethylaminopropyl ester
   3'-diethylaminopropyl ester
   2'-methyl-3'-diethylaminopropyl ester
   (1-methylpiperidyl-4) ester
   (1-methylpiperidyl-3)-methyl ester
   2'-(1-methylpiperidyl-2)-ethyl ester
   2'-homopiperazinoethyl ester
   2'-morpholinoethyl ester
   2'-thiomorpholinoethyl ester
   2'-(N'-methylpiperazino)-ethyl ester
   2'-(N'-phenylpiperazino)-ethyl ester
   2'-(N'-2-hydroxyethylpiperazino)-ethyl ester
   2'-piperidinopropyl ester
   3'-pyrrolidinopropyl ester
   3'-(N'-methylpiperazino)-propyl ester;
3-chloro-4-piperidino-α-methyl-naphthyl-1-acetic acid-
   2'-hydroxyethyl ester
   3',6'-dioxa-8'-hydroxyoctyl ester
   2'-aminoethyl ester
   3'-diethylaminopropyl ester
   2'-methyl-3'-diethylaminopropyl ester
   2'-morpholinoethyl ester
   2'-(N'-methylpiperazino)-ethyl ester
   3'-pyrrolidinopropyl ester;
3,α-dimethyl-4-piperidino-naphthyl-1-acetic acid-
   2'-aminoethyl ester
   2'-pyrrolidinoethyl ester
   2'-piperidinopropyl ester;
3-bromo-4-piperidino-α-methyl-naphthyl-1-acetic acid-
   2'-hydroxyethyl ester
   2'-dimethylaminoethyl ester
   2'-piperidinoethyl ester
   2'-(N'-phenylpiperazino)-ethyl ester;
4-piperidino-α-ethyl-naphthyl-1-acetic acid-
   2'-dimethylaminoethyl ester
   2'-piperidinoethyl ester;
4-homopiperidino-α-methyl-naphthyl-1-acetic acid-
   2'-dimethylaminoethyl ester
   2'-pyrrolidinoethyl ester;
4-piperidino-α-methyl-5,6,7,8-tetrahydro-naphthyl-1-acetic acid-
   2'-dimethylaminoethyl ester
   2'-pyrrolidinoethyl ester.

EXAMPLE 79

14.2 g. of 4-piperidino-α-methyl-naphthyl-1-acetic acid is dissolved in 200 ml. of absolute benzene, and 8.8 g. of SOCl$_2$ is added thereto. The reaction mixture is heated for 30 minutes on a steam bath and then concentrated by evaporation. The residue is once again mixed with benzene, and the benzene removed. The residue obtained in this manner is mixed with 150 ml. of dioxane and with 50 ml. of 25 percent aqueous ammonia solution, allowed to stand for 20 minutes, thereafter mixed with 200 ml. of water, and worked up as usual (pH 9 – 11), thus obtaining 4-piperidino-α-methyl-naphthyl-1-acetamide, m.p. 133°–138° (ethyl acetate).

Analogously, the following compounds are obtained from the corresponding acids by reaction with SOCl$_2$ and the corresponding amines:

4-piperidino-α-methyl-naphthyl-1-acetic acid-
    anilide
    benzylamide
    N-(2,3-dihydroxybutyl)-amide
    N-(2-methylmercaptoethyl)-amide
    N-(2-diethylaminoethyl)-amide
    N-(3-dimethylaminopropyl)-amide
    N-(3-diethylaminopropyl)-amide
    N-(2-hydroxyethyl)-amide
    N,N-bis-(2-hydroxyethyl)-amide
    N-methyl-N-(2-dimethylaminoethyl)-amide
    N'-methyl-piperazide
    N'-phenyl-piperazide
    N'-(2-hydroxyethyl)-piperazide
    N-(2-pyrrolidinoethyl)-amide
    N-(2-piperidinoethyl)-amide
    N-(2-morpholinoethyl)-amide
    N-(2-N'-methylpiperazinoethyl)-amide
    N-(2-N'-phenylpiperazinoethyl)-amide
    N-(3-pyrrolidinopropyl)-amide
    N-(3-piperidinopropyl)-amide
    N-(3-morpholinopropyl)-amide
    N-(3-N'-phenylpiperazinopropyl)-amide;

3-chloro-4-piperidino-α-methyl-naphthyl-1-acetic acid-
    amide
    anilide
    benzylamide
    N-(2,3-dihydroxybutyl)-amide
    N-(2-methylmercaptoethyl)-amide
    N-(2-dimethylaminoethyl)-amide
    N-(2-diethylaminoethyl)-amide
    N-(3-dimethylaminopropyl)-amide
    N-(2-hydroxyethyl)-amide
    N,N-bis-(2-hydroxyethyl)-amide
    N-methyl-N-(2-dimethylaminoethyl)-amide
    N'-methyl-piperazide
    N'-(2-hydroxyethyl)-piperazide
    N-(2-piperidinoethyl)-amide
    N-(3-piperidinopropyl)-amide;

3,α-dimethyl-4-piperidino-naphthyl-1-acetic acid-
    amide
    anilide
    benzylamide
    N-(2,3-dihydroxybutyl)-amide
    N-(2-methylmercaptoethyl)-amide
    N-(2-hydroxyethyl)-amide
    N'-phenylpiperazide
    N-(2-pyrrolidinoethyl)-amide;

3-bromo-4-piperidino-α-methyl-naphthyl-1-acetic acid-
    amide
    anilide
    N-(2-methylmercaptoethyl)-amide
    N-(2-dimethylaminoethyl)-amide
    N-(3-diethylaminopropyl)-amide
    N'-ethyl-piperazide
    N-(2-morpholinoethyl)-amide
    N-(3-N'-phenylpiperazinopropyl)-amide;

4-homopiperidino-α-ethyl-naphthyl-1-acetamide;
4-piperidino-α-ethyl-naphthyl-1-acetic acid-
    N-(2-diethylaminoethyl)-amide
    N'-phenyl-piperazide;
3-chloro-4-homopiperidino-α-methyl-naphthyl-1-acetic acid-
    N-(2-hydroxyethyl)-amide;
4-piperidino-α-methyl-5,6,7,8-tetrahydro-naphthyl-1-acetic acid-
    N,N-bis-(2-hydroxyethyl)-amide;
3-chloro-4-piperidino-α-methyl-5,6,7,8-tetrahydro-naphthyl-1-acetic acid-
    amide
    anilide
    benzylamide
    N-(2,3-dihydroxybutyl)-amide
    N-(2-methylmercaptoethyl)-amide
    N-(2-diethylaminoethyl)-amide.

EXAMPLE 80

Analogously to Example 54, 4-piperidino-α-methyl-naphthyl-1-acetohydroxamic acid, m.p. 172°–174°, is obtained from 4-piperidino-α-methyl-naphthyl-1-acetic acid ethyl ester with hydroxylamine.

Analogously, the following compounds are produced from the methyl or ethyl esters, respectively, of the corresponding naphthyl-1-acetic acids:

2-chloro-4-piperidino-α-methyl-naphthyl-1-acetohydroxamic acid
    3-chloro-4-piperidino-α-methyl-naphthyl-1-acetohydroxamic acid
    2,α-dimethyl-4-piperidino-naphthyl-1-acetohydroxamic acid
    3,α-dimethyl-4-piperidino-naphthyl-1-acetohydroxamic acid
    3-bromo-4-piperidino-α-methyl-naphthyl-1-acetohydroxamic acid
    3-methoxy-4-piperidino-α-methyl-naphthyl-1-acetohydroxamic acid
    3-chloro-4-piperidino-α-methyl-5,6,7,8-tetrahydro-naphthyl-1-acetohydroxamic acid.

EXAMPLE 81

Analogously to Example 55, the methyl ester of 4-piperidino-naphthyl-1-acetic acid (hydrochloride, m.p. 200°–202°) is obtained from 4-piperidino-naphthyl-1-acetic acid with diazomethane in ether/tetrahydrofuran.

EXAMPLE 82

Analogously to Example 27, 3-nitro-4-piperidino-α-methyl-naphthyl-1-acetic acid, m.p. 197°–199° (isopropanol/water) is produced from 4-bromo-3-nitro-α-methyl-naphthyl-1-acetic acid (obtainable by nitration of 4-bromo-α-methyl-naphthyl-1-acetic acid with anhydrous HNO$_3$ at −20°, or by nitration of 4-acetamido-α-methyl-naphthyl-1-acetic acid and subsequent saponification, diazotization and reaction with CuBr) with piperidine in boiling benzene (40 hours).

In an analogous manner, the following compounds can be produced from the corresponding 2- or 3-nitro-4-bromo-naphthyl-1-acetic acids with piperidine, pyrrolidine, homopiperidine, morpholine, thiomorpholine, 2,6-dimethylpiperidine, di-n-propyl-amine, di-n-butylamine and di-n-hexylamine, respectively:

2-nitro-4-piperidino-naphthyl-1-acetic acid
    2-nitro-4-pyrrolidino-naphthyl-1-acetic acid
    2-nitro-4-homopiperidino-naphthyl-1-acetic acid
    2-nitro-4-piperidino-α-methyl-naphthyl-1-acetic acid
    2-nitro-4-pyrrolidino-α-methyl-naphthyl-1-acetic acid
    2-nitro-4-homopiperidino-α-methyl-naphthyl-1-acetic acid
    2-nitro-4-morpholino-α-methyl-naphthyl-1-acetic acid
    2-nitro-4-thiomorpholino-α-methyl-naphthyl-1-acetic acid
    2-nitro-4-piperidino-α-methyl-naphthyl-1-acetic acid
    2-nitro-4-piperidino-α-n-propyl-naphthyl-1-acetic acid
    2-nitro-4-piperdino-α-n-butyl-naphthyl-1-acetic acid
    2-nitro-4-piperidino-α,α-dimethyl-naphthyl-1-acetic acid 2-nitro-4-piperidino-α-methyl-α-ethyl-naphthyl-1-acetic acid
2-nitro-4-piperidino-5,6,7,8-tetrahydro-naphthyl-1-acetic acid
2-nitro-4-piperidino-α-methyl-5,6,7,8-tetrahydro-naphthyl-1-acetic acid
2-nitro-4-piperidino-α-ethyl-5,6,7,8-tetrahydro-naphthyl-1-acetic acid
2-nitro-4-piperidino-α-methyl-5,6-dihydro-naphthyl-1-acetic acid
2-nitro-4-piperidino-α-methyl-5,8-dihydro-naphthyl-1-acetic acid
2-nitro-4-pyrrolidino-α-methyl-5,6,7,8-tetrahydro-naphthyl-1-acetic acid
2-nitro-4-homopiperidino-α-methyl-5,6,7,8-tetrahydro-naphthyl-1-acetic acid
2-nitro-4-morpholino-α-methyl-5,6,7,8-tetrahydro-naphthyl-1-acetic acid
3-nitro-4-piperidino-naphthyl-1-acetic acid
3-nitro-4-pyrrolidino-naphthyl-1-acetic acid
3-nitro-4-homopiperidino-naphthyl-1-acetic acid
3-nitro-4-morpholino-naphthyl-1-acetic acid
3-nitro-4-thiomorpholino-naphthyl-1-acetic acid
3-nitro-4-pyrrolidino-α-methyl-naphthyl-1-acetic acid
3-nitro-4-homopiperidino-α-methyl-naphthyl-1-acetic acid
3-nitro-4-morpholino-α-methyl-naphthyl-1-acetic acid
3-nitro-4-thiomorpholino-α-methyl-naphthyl-1-acetic acid
3-nitro-4-(2',6'-dimethylpiperidino)-α-methyl-naphthyl-1-acetic acid
3-nitro-4-di-n-pyropylamino-α-methyl-naphthyl-1-acetic acid
3-nitro-4-di-n-butylamino-α-methyl-naphthyl-1-acetic acid
3-nitro-4-di-n-hexylamino-α-methyl-naphthyl-1-acetic acid
3-nitro-4-piperidino-α-ethyl-naphthyl-1-acetic acid
3-nitro-4-pyrrolidino-α-ethyl-naphthyl-1-acetic acid
3-nitro-4-homopiperidino-α-ethyl-naphthyl-1-acetic acid
3-nitro-4-morpholino-α-ethyl-naphthyl-1-acetic acid
3-nitro-4-piperidino-α-n-propyl-naphthyl-1-acetic acid
3-nitro-4-piperidino-α,α-dimethyl-naphthyl-1-acetic acid
3-nitro-4-piperidino-α-methyl-α-ethyl-naphthyl-1-acetic acid
3-nitro-4-piperidino-5,6,7,8-tetrahydro-naphthyl-1-acetic acid
3-nitro-4-piperidino-α-methyl-5,6,7,8-tetrahydro-naphthyl-1-acetic acid
3-nitro-4-piperidino-α-ethyl-5,6,7,8-tetrahydro-naphthyl-1-acetic acid
3-nitro-4-piperidino-α-methyl-5,6-dihydro-naphthyl-1-acetic acid
3-nitro-4-piperidino-α-methyl-5,8-dihydro-naphthyl-1-acetic acid
3-nitro-4-piperidino-α-methyl-7,8-dihydro-naphthyl-1-acetic acid
3-nitro-4-pyrrolidino-α-methyl-5,6,7,8-tetrahydro-naphthyl-1-acetic acid
3-nitro-4-homopiperidino-α-methyl-5,6,7,8-tetrahydro-naphthyl-1acetic acid
3-nitro-4-morpholino-α-methyl-5,6,7,8-tetrahydro-naphthyl-1-acetic acid
3-nitro-4-thiomorpholino-α-methyl-5,6,7,8-tetrahydro-naphthyl-1-acetic acid.

EXAMPLE 83 a. Analogously to Example 6, 3-amino-4-piperidino-α-methyl-naphthyl-1-acetic acid, m.p. 205°–208° (decomposition; isopropanol) is produced by hydrogenating 3-nitro-4-piperidino-α-methyl-naphthyl-1-acetic acid.

In an analogous manner, the following compounds are obtained from the corresponding 2- and 3-nitro-naphthyl-1-acetic acids, respectively:

2-amino-4-piperidino-naphthyl-1-acetic acid
2-amino-4-pyrrolidino-naphthyl-1-acetic acid
2-amino-4-homopiperidino-naphthyl-1-acetic acid
2-amino-4-pipeiridino-α-methyl-naphthyl-1-acetic acid
2-amino-4-pyrrolidino-α-methyl-naphthyl-1-acetic acid
2-amino-4-homopiperidino-α-methyl-naphthyl-1-acetic acid
2-amino-4-morpholino-α-methyl-naphthyl-1-acetic acid
2-amino-4-thiomorpholino-α-methyl-naphthyl-1-acetic acid
2-amino-4-piperidino-α-ethyl-naphthyl-1-acetic acid
2-amino-4-piperidino-α-n-propyl-naphthyl-1-acetic acid
2-amino-4-piperidino-α-n-butyl-naphthyl-1-acetic acid
2-amino-4-piperidino-α,α-dimethyl-naphthyl-1-acetic acid
2-amino-4-piperidino-α-methyl-α-ethyl-naphthyl-1-acetic acid
2-amino-4-piperidino-5,6,7,8-tetrahydro-naphthyl-1-acetic acid
2-amino-4-piperidino-α-methyl-5,6,7,8-tetrahydro-naphthyl-1-acetic acid
2-amino-4-piperidino-α-ethyl-5,6,7,8-tetrahydro-naphthyl-1-acetic acid
2-amino-4-piperidino-α-methyl-5,6-dihydro-naphthyl-1-acetic acid
2-amino-4-piperidino-α-methyl-5,8-dihydro-naphthyl-1-acetic acid
2-amino-4-pyrrolidino-α-methyl-5,6,7,8-tetrahydro-naphthyl-1-acetic acid
2-amino-4-homopiperidino-α-methyl-5,6,7,8-tetrahydro-naphthyl-1-acetic acid
2-amino-4-morpholino-α-methyl-5,6,7,8-tetrahydro-naphthyl-1-acetic acid
3-amino-4-piperidino-naphthyl-1-acetic acid
3-amino-4-pyrrolidino-naphthyl-1-acetic acid
3-amino-4-morpholino-naphthyl-1-acetic acid
3-amino-4-homopiperidino-naphthyl-1-acetic acid
3-amino-4-thiomorpholino-naphthyl-1-acetic acid
3-amino-4-pyrrolidino-α-methyl-naphthyl-1-acetic acid
3-amino-4-homopiperidino-α-methyl-naphthyl-1-acetic acid
3-amino-4-morpholino-α-methyl-naphthyl-1-acetic acid
3-amino-4-thiomorpholino-α-methyl-naphthyl-1-acetic acid
3-amino-4-(2',6'-dimethylpiperidino)-α-methyl-naphthyl-1-acetic acid
3-amino-4-di-n-propylamino-α-methyl-naphthyl-1-acetic acid
3-amino-4-di-n-butylamino-α-methyl-naphthyl-1-acetic acid
3-amino-4-di-n-hexylamino-α-methyl-naphthyl-1-acetic acid
3-amino-4-piperidino-α-ethyl-naphthyl-1-acetic acid
3-amino-4-pyrrolidino-α-ethyl-naphthyl-1-acetic acid
3-amino-4-homopiperidino-α-ethyl-naphthyl-1-acetic acid
3-amino-4-morpholino-α-ethyl-naphthyl-1-acetic acid
3-amino-4-piperidino-α-n-propyl-naphthyl-1-acetic acid
3-amino-4-piperidino-α,α-dimethyl-naphthyl-1-acetic acid
3-amino-4-piperidino-α-methyl-α-ethyl-naphthyl-1-acetic acid
3-amino-4-piperidino-5,6,7,8-tetrahydro-naphthyl-1-acetic acid
3-amino-4-piperidino-α-methyl-5,6,7,8-tetrahydro-naphthyl-1-acetic acid
3-amino-4-piperidino-α-ethyl-5,6,7,8-tetradydro-naphthyl-1-acetic acid
3-amino-4-piperidino-α-methyl-5,6-dihydro-naphthyl-1-acetic acid
3-amino-4-piperidino-α-methyl-5,8-dihydro-naphthyl-1-acetic acid
3-amino-4-piperidino-α-methyl-7,8-dihydro-naphthyl-1-acetic acid
3-amino-4-pyrrolidino-α-methyl-5,6,7,8-tetrahydro-naphthyl-1-acetic acid
3-amino-4-homopiperidino-α-methyl-5,6,7,8-tetrahydro-naphthyl-1-acetic acid
3-amino-4-morpholino-α-methyl-5,6,7,8-tetrahydro-naphthyl-1-acetic acid
3-amino-4-thiomoropholino-α-methyl-5,6,7,8-tetrahydro-naphthyl-1-acetic acid.

b. Analogously to Example 23, the following compounds are obtained by acetylation from the corresponding 2- and 3-amino-compounds, respectively:
2-acetamido-4-piperidino-naphthyl-1-acetic acid
3-acetamido-4-piperidino-naphthyl-1-acetic acid
3-acetamido-4-piperidino-α-methyl-naphthyl-1-acetic acid.

EXAMPLE 84

Analogously to Example 7, 3-bromo-4-piperidino-α-methyl-naphthyl-1-acetic acid, m.p. 186°–187° (diisopropyl ether) is obtained from 3-amino-4-piperidino-α-methyl-naphthyl-1-acetic acid by diazotization and exchange of the diazonium group against bromine.

In an analogous manner, the following compounds are obtained from the corresponding 2- and 3-amino-naphthyl-1-acetic acids, respectively:
2-bromo-4-piperidino-naphthyl-1-acetic acid
2-bromo-4-homopiperidino-naphthyl-1-acetic acid
2-bromo-4-piperidino-α-methyl-naphthyl-1-acetic acid
2-bromo-4-piperidino-α-ethyl-naphthyl-1-acetic acid
2-bromo-4-piperidino-α-n-propyl-naphthyl-1-acetic acid
2-bromo-4-pyrrolidino-α-methyl-naphthyl-1-acetic acid
2-bromo-4-homopiperidino-naphthyl-1-acetic acid
2-bromo-4-piperidino-5,6,7,8-tetrahydro-naphthyl-1-acetic acid
2-bromo-4-piperidino-α-methyl-5,6,7,8-tetrahydro-naphthyl-1-acetic acid
2-bromo-4-piperidino-α-ethyl-5,6,7,8-tetrahydro-naphthyl-1-acetic acid
2-bromo-4-pyrrolidino-α-methyl-5,6,7,8-tetrahydro-naphthyl-1-acetic acid
2-bromo-4-homopiperidino-α-methyl-5,6,7,8-tetrahydro-naphthyl-1-acetic acid
2-bromo-4-morpholino-α-methyl-5,6,7,8-tetrahydro-naphthyl-1-acetic acid
2-bromo-4-piperidino-α-methyl-5,6-dihydro-naphthyl-1-acetic acid
2-bromo-4-piperidino-α-methyl-7,8-dihydro-naphthyl-1-acetic acid
3-bromo-4-pyrrolidino-α-naphthyl-1-acetic acid
3-bromo-4-homopiperidino-α-naphthyl-1-acetic acid
3-bromo-4-morpholino-α-methyl-naphthyl-1-acetic acid
3-bromo-4-thiomorpholino-α-methyl-naphthyl-1-acetic acid
3-bromo-4-di-n-butylamino-α-methyl-naphthyl-1-acetic acid
3-bromo-4-pyrrolidino-α-methyl-naphthyl-1-acetic acid
3-bromo-4-homopiperidino-α-methyl-naphthyl-1-acetic acid
3-bromo-4-di-n-hexylamino-α-methyl-naphthyl-1-acetic acid
3-bromo-4-piperidino-α-ethyl-naphthyl-1-acetic acid
3-bromo-4-homopiperidino-α-ethyl-naphthyl-1-acetic acid
3-bromo-4-piperidino-α,α-dimethyl-naphthyl-1-acetic acid
3-bromo-4-piperidino-5,6,7,8-tetrahydro-naphthyl-1-acetic acid
3-bromo-4-piperidino-α-methyl-5,6,7,8-tetrahydro-naphthyl-1-acetic acid
3-bromo-4-piperidino-α-ethyl-5,6,7,8-tetrahydro-naphthyl-1-acetic acid
3-bromo-4-pyrrolidino-α-methyl-5,6,7,8-tetrahydro-naphthyl-1-acetic acid
3-bromo-4-homopiperidino-α-methyl-5,6,7,8-tetrahydro-naphthyl-1-acetic acid
3-bromo-4-morpholino-α-methyl-5,6,7,8-tetrahydro-naphthyl-1-acetic acid
3-bromo-4-thiomorpholino-α-methyl-5,6,7,8-tetrahydro-naphthyl-1-acetic acid
3-bromo-4-piperidino-α-methyl-5,6-dihydro-naphthyl-1-acetic acid
3-bromo-4-piperidino-α-methyl-5,8-dihydro-naphthyl-1-acetic acid.

EXAMPLE 85

Analogously to Example 8, 3-chloro-4-piperidino-α-methyl-naphthyl-1-acetic acid, m.p. 173°–174° (diisopropyl ether) is obtained from 3-amino-4-piperidino-α-methyl-naphthyl-1-acetic acid by diazotization and reaction with CuCl.

Analogously, the following compounds are obtained from the corresponding 2- and 3-amino-naphthyl-1-acetic acids, respectively:
2-chloro-4-homopiperidino-naphthyl-1-acetic acid
2-chloro-4-piperidino-α-methyl-naphthyl-1-acetic acid
2-chloro-4-morpholino-α-methyl-naphthyl-1-acetic acid
2-chloro-4-thiomorpholino-α-methyl-naphthyl-1-acetic acid
2-chloro-4-piperidino-α-n-propyl-naphthyl-1-acetic acid
2-chloro-4-piperidino-α,α-dimethyl-naphthyl-1-acetic acid
2-chloro-4-piperidino-α-methyl-α-ethyl-naphthyl-1-acetic acid
2-chloro-4-piperidino-5,6,7,8-tetrahydro-naphthyl-1-acetic acid
2-chloro-4-piperidino-α-methyl-5,6,7,8-tetrahydro-naphthyl-1-acetic acid
2-chloro-4-piperidino-α-ethyl-5,6,7,8-tetrahydro-naphthyl-1-acetic acid
2-chloro-4-piperidino-α-methyl-5,6-dihydro-naphthyl-1-acetic acid
2-chloro-4-piperidino-α-methyl-5,8-dihydro-naphthyl-1-acetic acid
2-chloro-4-pyrrolidino-α-methyl-5,6,7,8-tetrahydro-naphthyl-1-acetic acid
2-chloro-4-homopiperidino-α-methyl-5,6,7,8-tetrahydro-naphthyl-1-acetic acid
2-chloro-4-morpholino-α-methyl-5,6,7,8-tetrahydro-naphthyl-1-acetic acid
3-chloro-4-pyrrolidino-naphthyl-1-acetic acid
3-chloro-4-homopiperidino-naphthyl-1-acetic acid
3-chloro-4-morpholino-naphthyl-1-acetic acid
3-chloro-4-thiomorpholino-naphthyl-1-acetic acid
3-chloro-4-di-n-propylamino-α-methyl-naphthyl-1-acetic acid
3-chloro-4-di-n-butylamino-α-methyl-naphthyl-1-acetic acid
3-chloro-4-pyrrolidino-α-methyl-naphthyl-1-acetic acid
3-chloro-4-homopiperidino-α-methyl-naphthyl-1-acetic acid
3-chloro-4-morpholino-α-methyl-naphthyl-1-acetic acid
3-chloro-4-thiomorpholino-α-methyl-naphthyl-1-acetic acid
3-chloro-4-piperidino-α-ethyl-naphthyl-1-acetic acid
3-chloro-4-pyrrolidino-α-ethyl-naphthyl-1-acetic acid
3-chloro-4-piperidino-α,α-dimethyl-naphthyl-1-acetic acid
3-chloro-4-piperidino-α-methyl-α-ethyl-naphthyl-1-acetic acid
3-chloro-4-piperidino-5,6,7,8-tetrahydro-naphthyl-1-acetic acid, m.p. 163°–165°
3-chloro-4-piperidino-α-methyl-5,6,7,8-tetrahydro-naphthyl-1-acetic acid
3-chloro-4-piperidino-α-ethyl-5,6,7,8-tetrahydro-naphthyl-1-acetic acid
3-chloro-4-piperidino-α-methyl-5,6-dihydro-naphthyl-1-acetic acid
3-chloro-4-piperidino-α-methyl-5,8-dihydro-naphthyl-1-acetic acid
3-chloro-4-piperidino-α-methyl-7,8 -dihydro-naphthyl-1-acetic acid
3-chloro-4-pyrrolidino-α-methyl-5,6,7,8-tetrahydro-naphthyl-1-acetic acid
3-chloro-4-homopiperidino-α-methyl-5,6,7,8-tetrahydro-naphthyl-1-acetic acid
3-chloro-4-morpholino-α-methyl-5,6,7,8-tetrahydro-naphthyl-1-acetic acid
3-chloro-4-thiomorpholino-α-methyl-5,6,7,8-tetrahydro-naphthyl-1-acetic acid.

EXAMPLE 86

Analogously to Example 9, 3-cyano-4-piperidino-α-methyl-naphthyl-1-acetic acid, m.p. 196°–198° (diisopropyl ether/hexane) is obtained from 3-amino-4-piperidino-α-methyl-naphthyl-1-acetic acid by diazotization and reaction with CuCN.

Analogously, from the corresponding 3-amino-naphthyl-1-acetic acids, the following compounds are obtained:
3-cyano-4-piperidino-naphthyl-1-acetic acid
3-cyano-4-morpholino-α-ethyl-naphthyl-1-acetic acid
3-cyano-4-pyrrolidino-α-methyl-naphthyl-1-acetic acid
3-cyano-4-homopiperidino-α-methyl-naphthyl-1-acetic acid
3-cyano-4-morpholino-α-methyl-naphthyl-1-acetic acid
3-cyano-4-di-n-propylamino-α-methyl-naphthyl-1-acetic acid
3-cyano-4-piperidino-α-ethyl-naphthyl-1-acetic acid
3-cyano-4-homopiperidino-naphthyl-1-acetic acid.

EXAMPLE 87

Analogously to Example 11, 3-iodo-4-piperidino-α-methyl-naphthyl-1-acetic acid, m.p. 201°–202° (toluene), is obtained from 3-amino-4-piperidino-α-methyl-naphthyl-1-acetic acid by diazotization and reaction with KI.

In an analogous manner, the following compounds are obtained from the corresponding amino-naphthyl-1-acetic acids:
3-iodo-4-morpholino-α-methyl-naphthyl-1-acetic acid
3-iodo-4-homopiperidino-α-methyl-naphthyl-1-acetic acid
3-iodo-4-pyrrolidino-α-methyl-naphthyl-1-acetic acid
3-iodo-4-thiomorpholino-α-methyl-naphthyl-1-acetic acid
3-iodo-4-piperidino-α-ethyl-naphthyl-1-acetic acid
3-iodo-4-morpholino-α-ethyl-naphthyl-1-acetic acid
3-iodo-4-pyrrolidino-α-ethyl-naphthyl-1-acetic acid
3-iodo-4-piperidino-naphthyl-1-acetic acid
3-iodo-4-morpholino-naphthyl-1-acetic acid
3-iodo-4-homopiperidino-naphthyl-1-acetic acid.

EXAMPLE 88

Analogously to Example 12, 3-methylmercapto-4-piperidino-naphthyl-1-acetic acid, m.p. 167°–169° (diisopropyl ether), is produced from 3-amino-4-piperidino-naphthyl-1-acetic acid.

In an analogous manner, the following compounds are obtained from the corresponding 2- and 3-amino-naphthyl-1-acetic acids, respectively, after diazotization and reaction with methyl, ethyl of isopropyl mercaptan:
2-methylmercapto-4-pyrrolidino-naphthyl-1-acetic acid
2-methylmercapto-4-homopiperidino-naphthyl-1-acetic acid
2-methylmercapto-4-piperidino-α-methyl-naphthyl-1-acetic acid
2-methylmercapto-4-piperidino-α-ethyl-naphthyl-1-acetic acid
2-methylmercapto-4-piperidino-α-n-propyl-naphthyl-1-acetic acid
2-methylmercapto-4-piperidino-α-n-butyl-naphthyl-1-acetic acid
3-methylmercapto-4-pyrrolidino-naphthyl-1-acetic acid
3-methylmercapto-4-homopiperidino-naphthyl-1-acetic acid
3-methylmercapto-4-morpholino-naphthyl-1-acetic acid
3-methylmercapto-4-piperidino-α-methyl-naphthyl-1-acetic acid
3-methylmercapto-4-piperidino-α-ethyl-naphthyl-1-acetic acid
3-methylmercapto-4-piperidino-α-n-propyl-naphthyl-1-acetic acid
3-methylmercapto-4-pyrrolidino-α-methyl-naphthyl-1-acetic acid
3-methylmercapto-4-homopiperidino-α-methyl-naphthyl-1-acetic acid
3-methylmercapto-4-morpholino-α-methyl-naphthyl-1-acetic acid
3-ethylmercapto-4-piperidino-5,6,7,8-tetrahydro-naphthyl-1-acetic acid
3-ethylmercapto-4-piperidino-α-methyl-naphthyl-1-acetic acid
3-ethylmercapto-4-morpholino-α-methyl-naphthyl-1-acetic acid
3-ethylmercapto-4-piperidino-5,6,7,8-tetrahydro-α-methyl-naphthyl-1-acetic acid
3-isopropylmercapto-4-piperidino-α-methyl-naphthyl-1-acetic acid.

EXAMPLE 89

In analogy to Example 14, 3-hydroxy-4-piperidino-α-methyl-naphthyl-1-acetic acid is obtained from 3-amino-4-piperidino-α-methyl-naphthyl-1-acetic acid by diazotization and boiling, and therefrom the methyl ester of 3-methoxy-4-piperidino-α-methyl-naphthyl-1-acetic acid (b.p. 192°–196°/0.01 mm.), analogously to Example 15 with dimethyl sulfate. Saponification of the ester results in 3-methoxy-4-piperidino-α-methyl-naphthyl-1-acetic acid.

In an analogous manner, the following compounds can be obtained from the corresponding amino-naphthyl-1-acetic acids by diazotization, boiling, and optionally reaction with dimethyl sulfate and saponification:
2-hydroxy-4-piperidino-α-methyl-naphthyl-1-acetic acid
2-methoxy-4-piperidino-α-methyl-naphthyl-1-acetic acid
2-hydroxy-4-piperidino-α-ethyl-naphthyl-1-acetic acid
2-methoxy-4-piperidino-α-ethyl-naphthyl-1-acetic acid
2-hydroxy-4-pyrrolidino-α-methyl-naphthyl-1-acetic acid
2-methoxy-4-pyrrolidino-α-methyl-naphthyl-1-acetic acid
2-hydroxy-4-piperidino-α-methyl-7,8-dihydro-naphthyl-1-acetic acid
2-methoxy-4-piperidino-α-methyl-7,8-dihydro-naphthyl-1-acetic acid
3-hydroxy-4-pyrrolidino-α-methyl-naphthyl-1-acetic acid
3-hydroxy-4-homopiperidino-α-methyl-naphthyl-1-acetic acid
3-hydroxy-4-morpholino-α-methyl-naphthyl-1-acetic acid
3-hydroxy-4-thiomorpholino-α-methyl-naphthyl-1-acetic acid
3-hydroxy-4-di-n-propylamino-α-methyl-naphthyl-1-acetic acid
3-hydroxy-4-di-n-butylamino-α-methyl-naphthyl-1-acetic acid
3-methoxy-4-pyrrolidino-α-methyl-naphthyl-1-acetic acid methyl ester
3-methoxy-4-homopiperidino-α-methyl-naphthyl-1-acetic acid methyl ester
3-methoxy-4-morpholino-α-methyl-naphthyl-1-acetic acid methyl ester
3-methoxy-4-thiomorpholino-α-methyl-naphthyl-1-acetic acid methyl ester
methyl ester of 3-methoxy-4-di-n-propylamino-α-methyl-naphthyl-1-acetic acid
methyl ester of 3-methoxy-4-di-n-butylamino-α-methyl-naphthyl-1-acetic acid
3-methoxy-4-pyrrolidino-α-methyl-naphthyl-1-acetic acid
3-methoxy-4-homopiperidino-α-methyl-naphthyl-1-acetic acid
3-methoxy-4-morpholino-α-methyl-naphthyl-1-acetic acid
3-methoxy-4-thiomorpholino-α-methyl-naphthyl-1-acetic acid
3-methoxy-4-di-n-propylamino-α-methyl-naphthyl-1-acetic acid
3-methoxy-4-di-n-butylamino-α-methyl-naphthyl-1-acetic acid
3-hydroxy-4-piperidino-α-ethyl-naphthyl-1-acetic acid
3-hydroxy-4-pyrrolidino-α-ethyl-naphthyl-1-acetic acid
3-hydroxy-4-homopiperidino-α-ethyl-naphthyl-1-acetic acid
3-hydroxy-4-morpholino-α-ethyl-naphthyl-1-acetic acid 3-methoxy-4-piperidino-α-ethyl-naphthyl-1-acetic acid
3-methoxy-4-pyrrolidino-α-ethyl-naphthyl-1-acetic acid
3-methoxy-4-homopiperidino-α-ethyl-naphthyl-1-acetic acid
3-methoxy-4-morpholino-α-ethyl-naphthyl-1-acetic acid
methyl ester of 3-methoxy-4-piperidino-α-ethyl-naphthyl-1-acetic acid
methyl ester of 3-methoxy-4-pyrrolidino-α-ethyl-naphthyl-1-acetic acid
methyl ester of 3-methoxy-4-homopiperidino-α-ethyl-naphthyl-1-acetic acid
methyl ester of 3-methoxy-4-morpholino-α-ethyl-naphthyl-1-acetic acid
2-hydroxy-4-piperidino-naphthyl-1-acetic acid
3-hydroxy-4-piperidino-naphthyl-1-acetic acid
3-hydroxy-4-pyrrolidino-naphthyl-1-acetic acid
3-hydroxy-4-homopiperidino-naphthyl-1-acetic acid
3-hydroxy-4-morpholino-naphthyl-1-acetic acid
2-methoxy-4-piperidino-naphthyl-1-acetic acid
3-methoxy-4-piperidino-naphthyl-1-acetic acid
3-methoxy-4-pyrrolidino-naphthyl-1-acetic acid
3-methoxy-4-homopiperidino-naphthyl-1-acetic acid
3-methoxy-4-morpholino-naphthyl-1-acetic acid
2-methoxy-4-piperidino-naphthyl-1-acetic acid methyl ester
3-methoxy-4-piperidino-naphthyl-1-acetic acid methyl ester
3-methoxy-4-pyrrolidino-naphthyl-1-acetic acid methyl ester
3-methoxy-4-homopiperidino-naphthyl-1-acetic acid methyl ester
3-methoxy-4-morpholino-naphthyl-1-acetic acid methyl ester
3-methoxy-4-piperidino-α-n-propyl-naphthyl-1-acetic acid.

EXAMPLE 90

Analogously to Example 19, 4-piperidino-naphthyl-1-acetic acid, m.p. 142°–143°, is obtained from 4-piperidino-naphthyl-1-acetonitrile (obtainable from 1-nitro-4-bromonaphthalene by way of 1-nitro-4-piperidino-naphthalene, 1-amino-4-piperidino-naphthalene, 1-cyano-4-piperidino-naphthalene, 4-piperidino-1-naphthoic acid, 1-hydroxymethyl-4-piperidino-naphthalene, 1-bromomethyl-4-piperidino-naphthalene and 4-piperidino-naphthyl-1-acetonitrile) by hydrolysis with sulfuric acid.

In an analogous manner, from:
2-ethyl-4-piperidino-
3-ethyl-4-piperidino-
4-piperidino-α,α-dimethyl-
4-homopiperidino-α,α-dimethyl-
4-piperidino-α,α-diethyl-
4-diisopropylamino-α,α-dimethyl-
4-piperidino-α,α-di-n-butyl-
4-dimethylamino-α,α-dimethyl-
4-diethylamino-α,α-dimethyl-
3-bromo-4-piperidino-α-methyl-
3,α-dimethyl-4-piperidino-
3-fluoro-4-piperidino-α-methyl-
3-amino-4-piperidino-α-methyl-
3-trifluoromethyl-4-piperidino-α-methyl-
3-sulfamoyl-4-piperidino-α-methyl-
3-methylamino-4-piperidino-α-methyl-
3-methylsulfamoyl-4-piperidino-α-methyl-
3-diethylsulfamoyl-4-piperidino-α-methyl-
3-methylsulfinyl-4-piperidino-α-methyl-
2-methylamino-4-piperidino-α-methyl-
2-diethylamino-4-piperidino-α-methyl-
3-ethylamino-4-piperidino-α-ethyl-
3-diethylamino-4-piperidino-α-n-propyl-
4-homopiperidino-α-methyl-
2,α-dimethyl-4-homopiperidino-
4-morpholino-α-methyl-
2,α-dimethyl-4-morpholino-
4-thiomorpholino-α-methyl-
2,α-dimethyl-4-thiomorpholino-
3,α-dimethyl-4-thiomorpholino-naphthyl-1-acetonitrile, the following compounds are produced by hydrolysis with sulfuric acid:
2-ethyl-4-piperidino-naphthyl-1-acetic acid
3-ethyl-4-piperidino-naphthyl-1-acetic acid
4-piperidino-α,α-dimethyl-naphthyl-1-acetic acid
4-homopiperidino-α,α-dimethyl-naphthyl-1-acetic acid
4-piperidino-α,α-diethyl-naphthyl-1-acetic acid
4-diisopropylamino-α,α-dimethyl-naphthyl-1-acetic acid
4-piperidino-α,α-di-n-butyl-naphthyl-1-acetic acid
4-dimethylamino-α,α-dimethyl-naphthyl-1-acetic acid
4-diethylamino-α,α-dimethyl-naphthyl-1-acetic acid
3-bromo-4-piperidino-α-methyl-naphthyl-1-acetic acid
3,α-dimethyl-4-piperidino-naphthyl-1-acetic acid
3-fluoro-4-piperidino-α-methyl-naphthyl-1-acetic acid
3-amino-4-piperidino-α-methyl-naphthyl-1-acetic acid
3-trifluoromethyl-4-piperidino-α-methyl-naphthyl-1-acetic acid
3-sulfamoyl-4-piperidino-α-methyl-naphthyl-1-acetic acid
3-methylamino-4-piperidino-α-methyl-naphthyl-1-acetic acid
3-methylsulfamoyl-4-piperidino-α-methyl-naphthyl-1-acetic acid
3-diethylsulfamoyl-4-piperidino-α-methyl-naphthyl-1-acetic acid
3-methylsulfinyl-4-piperidino-α-methyl-naphthyl-1-acetic acid
2-methylamino-4-piperidino-α-methyl-naphthyl-1-acetic acid
2-diethylamino-4-piperidino-α-methyl-naphthyl-1-acetic acid
3-ethylamino-4-piperidino-α-methyl-naphthyl-1-acetic acid
3-diethylamino-4-piperidino-α-n-propyl-naphthyl-1-acetic acid
4-homopiperidino-α-methyl-naphthyl-1-acetic acid
2,α-dimethyl-4-homopiperidino-naphthyl-1-acetic acid
4-morpholino-α-methyl-naphthyl-1-acetic acid
4-thiomorpholino-α-methyl-naphthyl-1-acetic acid
2,α-dimethyl-4-morpholino-naphthyl-1-acetic acid
2,α-dimethyl-4-thiomorpholino-naphthyl-1-acetic acid
3,α-dimethyl-4-thiomorpholino-naphthyl-1-acetic acid.

EXAMPLE 31

Analogously to Example 30, 4-piperidino-naphthyl-1-acetic acid, m.p. 142°–143°, is obtained from 4-piperidino-naphthyl-1-glyoxylic acid (obtainable by acylating 1-piperidino-naphthalene with ethoxalyl chloride in the presence of aluminum chloride, and subsequent saponification) by means of phosphorus/HI.

Analogously, from:
4-diisopropylamino-naphthyl-1-glyoxylic acid, by reduction with phosphorus/HI,
4-diisopropylamino-naphthyl-1-acetic acid is obtained.

EXAMPLE 92

Analogously to Example 35, 3-methylsulfonyl-4-piperidino-α-methyl-naphthyl-1-acetic acid is obtained from 3-methylmercapto-4-piperidino-α-methyl-naphthyl-1-acetic acid with potassium dichromate.

In an analogous manner, the following compounds are produced from the corresponding 3-alkylmercapto-naphthyl-1-acetic acids:
3-methylsulfonyl-4-morpholino-α-methyl-naphthyl-1-acetic acid
3-methylsulfonyl-4-pyrrolidino-α-methyl-naphthyl-1-acetic acid
3-methylsulfonyl-4-homopiperidino-α-methyl-naphthyl-1-acetic acid
3-methylsulfonyl-4-piperidino-naphthyl-1-acetic acid
3-methylsulfonyl-4-morpholino-naphthyl-1-acetic acid
3-methylsulfonyl-4-pyrrolidino-naphthyl-1-acetic acid
3-methylsulfonyl-4-homopiperidino-naphthyl-1-acetic acid
3-ethylsulfonyl-4-piperidino-α-methyl-naphthyl-1-acetic acid 3-ethylsulfonyl-4-morpholino-α-methyl-naphthyl-1-acetic acid 3-isopropylsulfonyl-4-piperidino-α-methyl-naphthyl-1-acetic acid.

EXAMPLE 93

In analogy to Example 57, the ethyl ester of 3-chloro-4-piperidino-α-methyl-naphthyl-1-acetic acid, b.p. 185°–187°/0.01 mm. is obtained from 3-chloro-4-piperidino-α-methyl-naphthyl-1-acetonitrile and ethanol.

EXAMPLE 94

Analogously to Example 58, the triethyl ester of 3-chloro-4-piperidino-α-methyl-naphthyl-1-orthoacetic acid, b.p. 210°–212°/0.01 mm., is produced from 3-chloro-4-piperidino-α-methyl-naphthyl-1-acetonitrile by way of the corresponding iminoether hydrochloride.

In an analogous manner, the following compounds are obtained from the corresponding naphthyl-1-acetonitriles:
triethyl ester of 4-piperidino-α-methyl-naphthyl-1-ortho acetic acid, b.p. 190°–195°/0.05 mm.
triethyl ester of 3-bromo-4-piperidino-α-methyl-naphthyl-1-orthoacetic acid, b.p. 218°–221°/0.01 mm.
triethyl ester of 3,α-dimethyl-4-piperidino-naphthyl-1-orthoacetic acid, b.p. 203°–205°/0.01 mm., and
triethyl ester of 3-fluoro-4-piperidino-α-methyl-naphthyl-1-orthoacetic acid, b.p. 200°–203°/0.01 mm.

EXAMPLE 95

Analogously to Example 62, the 2'-diethylaminoethyl ester of 4-piperidino-α-methyl-naphthyl-1-acetic acid, b.p. 185°–189°/0.01 mm. is produced from the 2'-chloroethyl ester of 4-piperidino-α-methyl-naphthyl-1-acetic acid (b.p. 178°–182°/0.01 mm., obtainable from the sodium salt of 4piperidino-α-methyl-naphthyl-1-acetic acid by reaction with 1-bromo-2-chloroethane) with diethylamine.

In an analogous manner, from:
3-chloro-4-piperidino-α-methyl-
3,α-dimethyl-4-piperidino- and
4-pyrrolidino-α-methyl-naphthyl-1-acetic acid 2'-chloroethyl ester,
the following compounds are obtained by reaction with diethylamine:
2'-diethylamino-ethyl ester of 3-chloro-4-piperidino-α-methyl-naphthyl-1-acetic acid;
2'-diethylaminoethyl ester of 3,α-dimethyl-4-piperidino-naphthyl-1-acetic acid; and
2'-diethylaminoethyl ester of 4-pyrrolidino-α-methyl-naphthyl-1-acetic acid.

EXAMPLE 96

Analogously to Example 64, the 2'-diethylaminoethyl ester of 4-piperidino-α-methyl-naphthyl-1-acetic acid, b.p. 185°–189°/0.01 mm., is produced from the ethyl ester of 4-piperidino-α-methyl-naphthyl-1-acetic acid and 2-diethylaminoethanol.

In an analogous manner, from the corresponding ethyl ester, the following compounds are obtained:
2'-diethylaminoethyl ester of 4-morpholino-α-methyl-naphthyl-1-acetic acid, b.p. 191°–194°/0.01 mm.
2'-diethylaminoethyl ester of 4-homopiperidino-α-methyl-napthyl-1-acetic acid, b.p. 192°–195°/0.01 mm.
2'-diethylaminoethyl ester of 3-chloro-4-pyrrolidino-α-methyl-naphthyl-1-acetic acid, b.p. 203°–206°/0.01 mm.

EXAMPLE 97

2.87 g. of 4-piperidino-α-methyl-5,6,7,8-tetrahydro-naphthyl-1-acetic acid is boiled in 100 ml. of toluene with 5 g. of chloranil for 48 hours. Thereafter, the solution is extracted with aqueous solution of sodium bicarbonate. Upon acidifying the aqueous extract, 4-piperidino-α-methyl-naphthyl-1-acetic acid is produced, m.p. 181°–183° (ethanol).

EXAMPLE 98

30 g. of the methyl ester of 3-(4'-hydroxybutyl)-4-piperidino-phenylacetic acid (b.p. 150°–154°/0.01 mm.; obtainable from m-(4-acetoxybutyl)-toluene by nitrating same to the 3-(4-acetoxybutyl)-4-nitrotoluene, catalytic hydrogenation to obtain the 4-amino-compound, acetylation to 3-(4-acetoxybutyl)-4-acetamidotoluene, chlorination to 3-(4-acetoxybutyl)-4-acetamidobenzyl chloride with sulfuryl chloride, reaction with KCN in dimethyl sulfoxide to the benzyl cyanide, saponification to 3-(4-hydroxy-butyl)- 4-aminophenylacetic acid, and reaction with 1,5-dibromopentane) is mixed with 180 g. of polyphosphoric acid and heated for 2 ½ hours to 150°. The reaction mixture is worked up as usual (pH 7– 8), thus obtaining the methyl ester of 4 -piperidino-5,6,7,8-tetrahydro-naphthyl-1-acetic acid, b.p. 155°–158°/0.05 mm. Alkaline saponification results in 4-piperidino-5,6,7,8-tetrahydro-naphthyl-1-acetic acid, m.p. 125°–127°.

Analogously, the following compounds are obtained from the corresponding starting materials:
methyl ester of 4-pyrrolidino-5,6,7,8-tetrahydro-naphthyl-1-acetic acid, b.p. 144°–148°/0.01 mm.
methyl ester of 4-piperidino-5,6,7,8-tetrahydro-α-methyl-naphthyl-1-acetic acid, b.p. 153°–156°/0.01 mm.
4-piperidino-5,6,7,8-tetrahydro-α-methyl-naphthyl-1-acetic acid, m.p. 163°–165°.

EXAMPLE 99

3.63 g. of the methyl ester of 3-(4,4-dimethoxybutyl)-4-piperidino-phenylacetic acid (obtainable from the methyl ester of 3-(4-hydroxybutyl)-4-piperidino-phenylacetic acid by oxidation with aluminum isopropoxide in acetone to the corresponding aldehyde and acetalization with methanol/HCl) is heated for 5 hours with 50 ml. of anhydrous hydrofluoric acid to 70°–80°. After cooling, the reaction solution is poured into ice water, and worked up as usual (pH 6 – 8), thus obtaining the methyl ester of 4-piperidino-7,8-dihydro-naphthyl-1-acetic acid, b.p. 152°–156°/0.01 mm.

Analogously, the following compounds are produced from the corresponding starting materials:
methyl ester of 4-pyrrolidino-7,8-dihydro-naphthyl-1-acetic acid, b.p. 148°–153°/0.05 mm.;
methyl ester of 4-homopiperidino-7,8-dihydro-naphthyl-1-acetic acid, b.p. 153°–155°/0.02 mm.;
4-piperidino-α-methyl-7,8-dihydro-naphthyl-1-acetic acid
4-piperidino-α-ethyl-7,8-dihydro-naphthyl-1-acetic acid
2,α-dimethyl-4-piperidino-7,8-dihydro-naphthyl-1-acetic acid
3,α-dimethyl-4-piperidino-7,8-dihydro-naphthyl-1-acetic acid.

EXAMPLE 100

5 g. of 4-piperidino-6,7-dibromo-α-methyl-5,6,7,8-tetrahydro-naphthyl-1-acetamide and 3 g. of zinc dust are boiled in 80 ml. of 96 percent ethanol for 3 hours under agitation. The reaction mixture is filtered in the hot phase, the residue is washed several times with hot ethanol, the combined filtrates are concentrated by evaporation, and 4-piperidino-α-methyl-5,8-dihydro-naphthyl-1-acetamide is obtained, m.p. 126°–128° (ethyl acetate).

Analogously, from:
4-pyrrolidino-6,7-dibromo-α-methyl-
4-pyrrolidino-6,7-dibromo-α-ethyl-
4-pyrrolidino-6,7-dibromo-
4-piperidino-6,7-dibromo-α-methyl-
4-piperidino-6,7-dibromo-α-ethyl-
4-piperidino-6,7-dibromo-, as well as
2,α- and 3,α-dimethyl-4-piperidino-6,7-dibromo-5,6,7,8-tetrahydro-naphthyl-1-acetic acid,
by reaction with zinc dust, the following compounds are obtained:
4-pyrrolidino-α-methyl-5,8-dihydro-naphthyl-1-acetic acid
4-pyrrolidino-α-ethyl-5,8-dihydro-naphthyl-1-acetic acid 4-pyrrolidino-5,8-dihydro-naphthyl-1-acetic acid
4-piperidino-α-methyl-5,8-dihydro-naphthyl-1-acetic acid
4-piperidino-α-ethyl-5,8-dihydro-naphthyl-1-acetic acid
4-piperidino-5,8-dihydro-naphthyl-1-acetic acid
2,α-dimethyl-4-piperidino-5,8-dihydro-naphthyl-1-acetic acid
3,α-dimethyl-4-piperidino-5,8-dihydro-naphthyl-1-acetic acid.

EXAMPLE 101

5 g. of 4-piperidino-6,7-dibromo-α-methyl-5,6,7,8-tetrahydro-naphthyl-1-acetic acid (obtained from 4-piperidino-α-methyl-5,8-dihydro-naphthyl-1-acetic acid with bromine in glacial acetic acid) is heated with 15 g. of quinoline for 30 minutes to 150°–160 . Then, the reaction mixture is mixed with 50 ml. of 2N NaOH, the aqueous phase is separated, and worked up as usual (pH 4 – 5), thus obtaining 4-piperidino-α-methyl-naphthyl-1-acetic acid, m.p. 181°–182°.

Analogously, the following compounds are obtained from the corresponding 6,7-dibromo-5,6,7,8-tetrahydro-naphthyl-1-acetic acids with quinoline:
3-chloro-4-piperidino-α-ethyl-naphthyl-1-acetic acid
2-chloro-4-piperidino-α-ethyl-naphthyl-1-acetic acid
3-chloro-4-pyrrolidino-α-ethyl-naphthyl-1-acetic acid
2-chloro-4-pyrrolidino-α-ethyl-naphthyl-1-acetic acid
3-bromo-4-piperidino-α,α-dimethyl-naphthyl-1-acetic acid
2-bromo-4-piperidino-α,α-dimethyl-naphthyl-1-acetic acid
3-nitro-4-piperidino-α-methyl-naphthyl-1-acetic acid
2-nitro-4-piperidino-α-methyl-naphthyl-1-acetic acid
3-methoxy-4-piperidino-α-methyl-naphthyl-1-acetic acid
2-methoxy-4-piperidino-α-methyl-naphthyl-1-acetic acid
3-methylmercapto-4-piperidino-α-methyl-naphthyl-1-acetic acid
2-methylmercapto-4-piperidino-α-methyl-naphthyl-1-acetic acid.

EXAMPLE 102

A solution of 2.7 g. of 4-piperidino-naphthyl-1-acetic acid and 1.6 g. of diethylamine in absolute tetrahydrofuran is added to 0.2 g. of lithium. After 2 hours of agitation at room temperature, the solvent is distilled off, the residue is dissolved in dilute sulfuric acid, and worked up as usual (pH 4 – 6), thus obtaining 4-piperidino-5,8-dihydro-naphthyl-1-acetic acid.

Analogously, the following compounds are obtained from the corresponding naphthylacetic acids by reduction with lithium:
4-piperidino-α-methyl-5,8-dihydro-naphthyl-1-acetic acid
4-piperidino-α-ethyl-5,8-dihydro-1-acetic acid
2,α-dimethyl-4-piperidino-5,8-dihydro-naphthyl-1-acetic acid
3,α-dimethyl-4-piperidino-5,8-dihydro-naphthyl-1-acetic acid
2-methoxy-4-piperidino-5,8-dihydro-naphthyl-1-acetic acid
3-methoxy-4-piperidino-5,8-dihydro-naphthyl-1-acetic acid
2-ethyl-4-piperidino-5,8-dihydro-naphthyl-1-acetic acid
3-ethyl-4-piperidino-5,8-dihydro-naphthyl-1-acetic acid
2-acetamido-4-piperidino-5,8-dihydro-naphthyl-1-acetic acid
3-acetamido-4-piperidino-5,8-dihydro-naphthyl-1-acetic acid.

EXAMPLE 103

6.2 g. of the sodium salt of 4-piperidino-8-oxo-5,6,7,8-tetrahydro-naphthyl-1-acetic acid is dissolved in 100 ml. of ethanol and mixed, under stirring, with 0.8 g. of NaBH₄ in 25 ml. of ethanol. After continuing the agitation for 2 hours, the alcohol is distilled off. The residue is dissolved in 100 ml. of 2N HCl, briefly heated to 60°, and neutralized with sodium carbonate. The thus-separated crude acid is heated with 30 ml. of 85 percent phosphoric acid for 30 minutes to 120°. After cooling, the reaction mixture is diluted with water, neutralized with sodium carbonate, and there is produced 4-piperidino-5,6-dihydro-naphthyl-1-acetic acid, m.p. 134°–136° (ethanol).

In order to produce the starting compound, γ-(2-acetamido-5-methoxymethylphenyl)-butyric acid (obtained from 6-methoxymethyl-1,4-naphthoquinone by Schmidt reaction with HN₃, reduction of the resultant unsaturated seven-ring lactam to the lactam of γ-(2-amino-5-methoxymethylphenyl)-butyric acid, saponification of this compound, and subsequent acetylation of the amino group) is converted with polyphosphoric acid to 5-acetamido-8-methoxymethyl-1-tetralone. From this latter compound, the desired acid is obtained after ether cleavage, chlorination, reaction with KCN and saponification with KOH.

Analogously, the following compounds are produced from the corresponding 8-oxo-5,6,7,8-tetrahydro-naphthyl-1-acetic acids by reduction and splitting off water:
4-piperidino-5,6-dihydro-naphthyl-1-acetic acid
4-morpholino-5,6-dihydro-naphthyl-1-acetic acid
4-di-n-isobutylamino-5,6-dihydro-naphthyl-1-acetic acid
4-di-n-isopropylamino-5,6-dihydro-naphthyl-1-acetic acid
4-thiomorpholino-5,6-dihydro-naphthyl-1-acetic acid
4-piperidino-α-methyl-5,6-dihydro-naphthyl-1-acetic acid
4-piperidino-α-ethyl-5,6-dihydro-naphthyl-1-acetic acid
2,α-dimethyl-4-piperidino-5,6-dihydro-naphthyl-1-acetic acid
3,α-dimethyl-4-piperidino-5,6-dihydro-naphthyl-1-acetic acid.

EXAMPLE 104

Analogously to Example 61, 3-chloro-4-piperidino-α-methyl-naphthyl-1-acetamide, m.p. 153°–155° (ethyl acetate) is obtained from 3-chloro-4-piperidino-α-methyl-naphthyl-1-acetonitrile with H₂SO₄.

Analogously, the following compounds are produced from the corresponding nitriles:
3-bromo-4-piperidino-α-methyl-naphthyl-1-acetamide
3,α-dimethyl-4-piperidino-naphthyl-1-acetamide
3-amino-4-piperidino-α-methyl-naphthyl-1-acetamide
3-trifluoromethyl-4-piperidino-α-methyl-naphthyl-1-acetamide.

EXAMPLE 105

A solution of 6 g. of 4-piperidino-1-naphthoyl-diazomethane (obtainable by converting 4-piperidino-1-naphthoic acid with thionyl chloride in benzene into the acid chloride and reaction with diazomethane in ether) in 100 ml. of dioxane is added dropwise under agitation to a mixture of 0.66 g. freshly precipitated silver oxide, 1.67 g. of sodium carbonate and 1.56 g. of sodium thiosulfate in 200 ml. of water having the temperature of 50°–55°. The reaction mixture is stirred for 1 hour at this temperature, and 15 minutes at 90°–100°. Then, the reaction mixture is cooled, filtered, and worked up as usual (pH 4 – 6), thus obtaining 4-piperidino-naphthyl-1-acetic acid, m.p. 142°–143°.

Analogously, the following compounds are produced from the corresponding 1-naphthoyl-diazomethanes:
3-methyl-4-pyrrolidino-naphthyl-1-acetic acid
4-homopiperidino-naphthyl-1-acetic acid
4-morpholino-naphthyl-1-acetic acid.

EXAMPLE 106

280 mg. of the crude ethyl ester of α-(4-piperidino-naphthyl-1)-α-methyl-acetoacetic acid (obtainable by condensing ethyl acetate with 4-piperidino-1-naphthyl-acetonitrile to form the α-acetyl-4-piperidino-1-naphthyl-acetonitrile, methylation with methyl iodide, reaction with ethanolic hydrochloric acid to obtain the iminoether hydrochloride and hydrolysis with aqueous sulfuric acid) and 4ml. of 0.5N ethanolic potassium hydroxide are boiled for 2 ½ hours and concentrated by evaporation. The residue is dissolved in water and worked up as usual (pH 4 – 6), thus obtaining 4-piperidino-α-methyl-naphthyl-1-acetic acid, m.p. 181°–183°.

EXAMPLE 107

1.85 g. of magnesium filings and 1.85 g. of magnesium powder are heated under stirring in 100 ml. of absolute ether; a moderate dry stream of carbon dioxide is introduced, a grain of iodine is added, and 6 g. of 4-piperidino-1-naphthylmethyl chloride (obtainable by hydrogenating 4-piperidino-1-naphthaldehyde on Raney nickel at 50° and 6 atmospheres in ethanol and reacting with hydrogen chloride in benzene in the presence of calcium chloride) in 25 ml. of absolute ether is added dropwise. The reaction mixture is boiled for another 20 minutes, cooled, filtered, concentrated by evaporation, water is added, and the mixture is worked up as usual (pH 4 – 6), thus obtaining 4-piperidino-naphthyl-1-acetic acid, m.p. 142°–143°.

EXAMPLE 108

Under agitation, 23.2 g. of the potassium salt of iodoacetic acid is made to react with 0.85 g. of magnesium filings with the addition of traces of iodine by boiling the reaction mixture for 6 hours in 350 ml. of absolute tetrahydrofuran; then, 8 g. of 1-bromo-4-piperidino-naphthalene is added, and the mixture is boiled for another 24 hours. Thereafter, the reaction mixture is evaporated to dryness and worked up as usual (pH 4 – 6), thus obtaining 4-piperidino-naphthyl-1-acetic acid, m.p. 142°–143°.

EXAMPLE 109

Under heating, 8 g. of 1-bromo-4-piperidino-naphthalene is made to react with 0.84 g. of magnesium filings in 150 ml. of absolute tetrahydrofuran, with the addition of a trace of iodine; 23.3 g. of the potassium salt of iodoacetic acid is added thereto in incremental portions, and the reaction mixture is boiled under agitation for 20 hours. Thereafter, the mixture is evaporated to dryness and worked up as usual, thus obtaining 4-piperidino-naphthyl-1-acetic acid, m.p. 142°–143°.

EXAMPLE 110

Analogously to Example 1, 2,5-dichloro-4-piperidino-α-methyl-phenylacetic acid, m.p. 119°–121° (benzene/petroleum ether) is obtained from 2,5-dichloro-4-amino-α-methyl-phenylacetic acid (obtainable by nitrating 2,5-dichloro-α-methyl-phenylacetic acid to 2,5-dichloro-4-nitro-α-methyl-phenylacetic acid and reducing same with $FeSO_4$ and aqueous ammonia) and 1,5-dibromopentane.

Analogously, from:
2-chloro-3,α-dimethyl-4-amino-
2-chloro-4-amino-5,α-dimethyl-
2,α-dimethyl-4-amino-5-chloro-
2,5-dibromo-4-amino-α-methyl-
2-chloro-4-amino-5-bromo-α-methyl-
2-ethyl-4-amino-5-chloro-α-methyl-
2-chloro-4-amino-5-fluoro-α-methyl-
2-bromo-4-amino-5-chloro-α-methyl-
2,5-dichloro-4-amino-
2,3-dichloro-4-amino-
2,3-dibromo-4-amino-
2-methyl-3-chloro-4-amino-phenylacetic acid,
the following compounds are obtained by reaction with 1,5-dibromopentane:
2-chloro-3,α-dimethyl-4-piperidino-phenylacetic acid, m.p. 137°
2-chloro-4-piperidino-5,α-dimethyl-phenylacetic acid
2,α-dimethyl-4-piperidino-5-chloro-phenylacetic acid
2,5-dibromo-4-piperidino-α-methyl-phenylacetic acid
2-chloro-4-piperidino-5-bromo-α-methyl-phenylacetic acid
2-ethyl-4-piperidino-5-chloro-α-methyl-phenylacetic acid
2-chloro-4-piperidino-5-fluoro-α-methyl-phenylacetic acid
2-bromo-4-piperidino-5-chloro-α-methyl-phenylacetic acid
2,5-dichloro-4-piperidino-phenylacetic acid
2,3-dichloro-4-piperidino-phenylacetic acid
2,3-dibromo-4-piperidino-phenylacetic acid
2-methyl-3-chloro-4-piperidino-phenylacetic acid.

EXAMPLE 111

Analogously to Example 1, 2,5-dichloro-4-pyrrolidino-α-methyl-phenylacetic acid, m.p. 116°–118°, is obtained from 2,5-dichloro-4-amino-α-methyl-phenylacetic acid with 1,4-dibromobutane.

Analogously, the following compounds are produced:
2,3-dichloro-4-pyrrolidino-α-methyl-phenylacetic acid
2-chloro-3,α-dimethyl-4-pyrrolidino-phenylacetic acid
2,5,α-trimethyl-4-pyrrolidino-phenylacetic acid
2,3,α-trimethyl-4-pyrrolidino-phenylacetic acid
2,5-dimethoxy-4-pyrrolidino-α-methyl-phenylacetic acid
2,3-dimethoxy-4-pyrrolidino-α-methyl-phenylacetic acid
2,3-dibromo-4-pyrrolidino-α-methyl-phenylacetic acid
2,5-dibromo-4-pyrrolidino-α-methyl-phenylacetic acid
2-bromo-4-pyrrolidino-5-chloro-α-methyl-phenylacetic acid
2-chloro-4-pyrrolidino-5-bromo-α-methyl-phenylacetic acid
2,5-dichloro-4-pyrrolidino-α-ethyl-phenylacetic acid
2,α-dimethyl-3-chloro-4-pyrrolidino-phenylacetic acid
2-chloro-4-pyrrolidino-5,α-dimethyl-phenylacetic acid
2,α-dimethyl-4-pyrrolidino-5-chloro-phenylacetic acid
2-fluoro-4-pyrrolidino-5-chloro-α-methyl-phenylacetic acid
2-methoxy-3-chloro-4-pyrrolidino-α-methyl-phenylacetic acid
2-methoxy-3-bromo-4-pyrrolidino-α-methyl-phenylacetic acid
2-methoxy-3,α-dimethyl-4-pyrrolidino-phenylacetic acid
2,α-dimethyl-3-methoxy-4-pyrrolidino-phenylacetic acid
2-chloro-3-methoxy-4-pyrrolidino-α-methyl-phenylacetic acid
2-methoxy-4-pyrrolidino-5-chloro-α-methyl-phenylacetic acid
2-methoxy-4-pyrrolidino-5-bromo-α-methyl-phenylacetic acid
2-chloro-4-pyrrolidino-5-methoxy-α-methyl-phenylacetic acid
2,α-dimethyl-4-pyrrolidino-5-bromo-phenylacetic acid
2-methoxy-4-pyrrolidino-5,α-dimethyl-phenylacetic acid
2,α-dimethyl-4-pyrrolidino-5-methoxy-phenylacetic acid.

By reaction with 1,6-dibromohexane or 2,6-dibromoheptane, the corresponding 4-homopiperidino- or 4-(2′,6′-dimethyl-piperidino)-phenylacetic acids are obtained.

EXAMPLE 112

Analogously to Example 3, the methyl ester of 2,5-dichloro-4-dimethylamino-α-methyl-phenylacetic acid (b.p. 130° – 133°/0.05 mm.) is obtained from the methyl ester of 2,5-dichloro-4-amino-α-methyl-phenylacetic acid with formic acid/formaldehyde, and from this reaction product, 2,5-dichloro-4-dimethylamino-α-methyl-phenylacetic acid is obtained by saponification.

Analogously, the following compounds are obtained:
methyl ester of 2,3-dichloro-4-dimethylamino-α-methyl-phenylacetic acid
methyl ester of 2,α-dimethyl-4-dimethylamino-5-chloro-phenylacetic acid
methyl ester of 2,α-dimethyl-3-chloro-4-dimethylamino-phenylacetic acid
2,3-dichloro-4-dimethylamino-α-methyl-phenylacetic acid
2,α-dimethyl-4-dimethylamino-5-chloro-phenylacetic acid
2,α-dimethyl-3-chloro-4-dimethylamino-phenylacetic acid.

EXAMPLE 113

Analogously to Example 27, 2,α-dimethyl-4-piperidino-5-nitro-phenylacetic acid is obtained from 2,α-dimethyl-4-bromo-5-nitro-phenylacetic acid (producible, in addition to 2,α-di-methyl-3-nitro-4-bromo-phenylacetic acid, by nitration of 2,α-dimethyl-4-bromo-phenylacetic acid with $H_2SO_4/HNO_3$ at 0°–5°, and separation of the mixture of isomers by crystallizing the cyclohexylamine salts from ethanol) with piperidine.

In an analogous manner, from:
2,α-dimethyl-3-nitro-4-bromo-phenylacetic acid 2-methoxy-4-bromo-5-nitro-α-methyl-phenylacetic acid
2-methoxy-3-nitro-4-bromo-α-methyl-phenylacetic acid
2-chloro-4-bromo-5-nitro-α-methyl-phenylacetic acid
2-chloro-3-nitro-4-bromo-α-methyl-phenylacetic acid
2-methylmercapto-4-bromo-5-nitro-α-methyl-phenylacetic acid, by reaction with piperidine, the corresponding 4-piperidino-phenylacetic acids are obtained, and by reaction with pyrrolidine, homopiperidine, morpholine, thiomorpholine, 2,6-dimethylpiperidine, di-n-butylamine, di-n-hexylamine and diisopropylamine, there are obtained the corresponding 4-pyrrolidino-, 4-homopiperidino-, 4-morpholino-, 4-thiomorpholino-, 4-(2',6'-dimethylpiperidino)-, 4-di-n-butylamino-, 4-di-n-hexylamino- and 4-diisopropylamino-phenylacetic acids, for example:

2,α-dimethyl-3-nitro-4-piperidino-phenylacetic acid
2-methoxy-4-piperidino-5-nitro-α-methyl-phenylacetic acid
2-methoxy-3-nitro-4-piperidino-α-methyl-phenylacetic acid
2-chloro-4-piperidino-5-nitro-α-methyl-phenylacetic acid
2-chloro-3-nitro-4-piperidino-α-methyl-phenylacetic acid
2-methylmercapto-4-piperidino-5-nitro-α-methyl-phenylacetic acid.

EXAMPLE 114

Analogously to Example 6, by hydrogenating the ethyl ester of 2,α-dimethyl-3-nitro-4-piperidino-phenylacetic acid, the ethyl ester of 2,α-dimethyl-3-amino-4-piperidino-phenylacetic acid is obtained, b.p. 188°–190°/0.01 mm. The alkaline saponification of this last-mentioned ester results in 2,α-dimethyl-3-amino-4-piperidino-phenylacetic acid.

In an analogous manner, the following compounds are produced by hydrogenating the corresponding 3- or 5-nitrophenylacetic acid ethyl esters and saponification of the thus-obtained ethyl esters of 3- or 5-aminophenylacetic acid, or also by hydrogenation of the free nitro-acids:

2,α-dimethyl-4-piperidino-5-amino-phenylacetic acid
2-methoxy-3-amino-4-piperidino-α-methyl-phenylacetic acid
2-methoxy-4-piperidino-5-amino-α-methyl-phenylacetic acid
2-chloro-3-amino-4-piperidino-α-methyl-phenylacetic acid
2-chloro-4-piperidino-5-amino-α-methyl-phenylacetic acid.

EXAMPLE 115

Analogously to Example 7, 2,α-dimethyl-3-bromo-4-piperidino-phenylacetic acid, m.p. 165°–168° (benzene/petroleum ether) is produced from 2,α-dimethyl-3-amino-4-piperidino-phenylacetic acid.

In an analogous manner, the following compounds are prepared:

2,α-dimethyl-4-piperidino-5-bromo-phenylacetic acid
2-methoxy-3-bromo-4-piperidino-α-methyl-phenylacetic acid
2-methoxy-3-bromo-4-homopiperidino-α-methyl-phenylacetic acid
2-methoxy-4-piperidino-5-bromo-α-methyl-phenylacetic acid
2-methoxy-4-piperidino-5-bromo-α-ethyl-phenylacetic acid
2-methoxy-4-homopiperidino-5-bromo-α-methyl-phenylacetic acid
2-chloro-3-bromo-4-piperidino-α-methyl-phenylacetic acid
2-chloro-3-bromo-4-piperidino-α-ethyl-phenylacetic acid
2-chloro-4-piperidino-5-bromo-α-methyl-phenylacetic acid
2-chloro-4-piperidino-5-bromo-α-ethyl-phenylacetic acid
2-methyl-3-bromo-4-piperidino-α-ethyl-phenylacetic acid
2-methyl-4-piperidino-5-bromo-α-ethyl-phenylacetic acid from the corresponding 3- or 5-aminophenylacetic acids, respectively.

EXAMPLE 116

Analogously to Example 8, 2,α-dimethyl-3-chloro-4-piperidino-phenylacetic acid, m.p. 156°–157° (benzene/petroleum ether) is prepared from 2,α-dimethyl-3-amino-4-piperidino-phenylacetic acid.

In an analogous manner, the following compounds are produced from the corresponding 3- and 5-aminophenylacetic acids, respectively:

2,α-dimethyl-4-piperidino-5-chlor-phenylacetic acid
2-methoxy-3-chloro-4-piperidino-α-methyl-phenylacetic acid
2-methoxy-4-piperidino-5-chloro-α-methyl-phenylacetic acid
2,3-dichloro-4-piperidino-α-methyl-phenylacetic acid
2,5-dichloro-4-piperidino-α-methyl-phenylacetic acid.

EXAMPLE 117

Analogously to Example 9, 2,α-dimethyl-3-cyano-4-piperidino-phenylacetic acid is obtained from 2,α-dimethyl-3-amino-4-piperidino-phenylacetic acid.

In an analogous manner, the following compounds are produced from the corresponding 3- and 5-aminophenylacetic acids, respectively:

2,α-dimethyl-5-cyano-4-piperidino-phenylacetic acid
2-methoxy-3-cyano-4-piperidino-α-methyl-phenylacetic acid
2-methoxy-5-cyano-4-piperidino-α-methyl-phenylacetic acid
2-chloro-3-cyano-4-piperidino-α-methyl-phenylacetic acid
2-chloro-4-piperidino-5-cyano-α-methyl-phenylacetic acid.

EXAMPLE 118

Analogously to Example 11, 2,α-dimethyl-3-iodo-4-piperidino-phenylacetic acid (cyclohexylamine salt, hydrate, m.p. 114°–116°) is prepared from 2,α-dimethyl-3-amino-4-piperidino-phenylacetic acid by diazotization and reaction with KI.

In an analogous way, the following compounds are obtained from the corresponding 3- and 5-aminophenylacetic acids, respectively:

2,α-dimethyl-4-piperidino-5-iodo-phenylacetic acid
2-methoxy-3-iodo-4-piperidino-α-methyl-phenylacetic acid
2-methoxy-4-piperidino-5-iodo-α-methyl-phenylacetic acid
2-chloro-3-iodo-4-piperidino-α-methyl-phenylacetic acid
2-chloro-4-piperidino-5-iodo-α-methyl-phenylacetic acid.

EXAMPLE 119

Analogously to Example 14, 2,α-dimethyl-3-hydroxy-4-piperidino-phenylacetic acid is obtained from 2,α-dimethyl-3-amino-4-piperidino-phenylacetic acid by diazotization and boiling, and from the above reaction product, analogously to Example 15, the methyl ester of 2,α-dimethyl-3-methoxy-4-piperidino-phenylacetic acid, b.p. 166°–169°/0.05 mm., is prepared with dimethyl sulfate. Alkaline saponification results in the free 2,α-dimethyl-3-methoxy-4-piperidino-phenylacetic acid.

In an analogous manner, the following compounds are prepared from the corresponding 3- and 5-aminophenylacetic acids:

2,α-dimethyl-5-hydroxy-4-piperidino-phenylacetic acid
2,α-dimethyl-5-methoxy-4-piperidino-phenylacetic acid and the methyl ester thereof
2-chloro-3-hydroxy-4-piperidino-α-methyl-phenylacetic acid
2-chloro-3-methoxy-4-piperidino-α-methyl-phenylacetic acid and the methyl ester thereof
2-chloro-5-hydroxy-4-piperidino-α-methyl-phenylacetic acid
2-chloro-5-methoxy-4-piperidino-α-methyl-phenylacetic acid and the methyl ester thereof.

EXAMPLE 120

9.3 g. of the ethyl ester of 2,3-dichloro-4-piperidino-α-methylene-phenylacetic acid (b.p. 145°–150°/0.01 mm.; obtainable from 2,3-dichloraniline by was of 2,3-dichloro-piperidino-benzene (b.p. 140°–145°/12 mm.), the ethyl ester of 2,3-dichloro-4-piperidino-phenylglyoxylic acid (b.p.

190°–195°/0.05 mm.) and the ethyl ester of 2,3-dichloro-4-piperidino-α-methylmandelic acid [b.p. 170°–172°/0.01 mm.]) is hydrogenated in 100 ml. of ethanol with 1 g. of PtO₂ at normal pressure and 23° for about 30 minutes. The reaction product is filtered off from the catalyst, the alcohol is evaporated, and the residue dissolved in ether. After washing with dilute solution of sodium bicarbonate, drying over Na₂SO₄ and removing the ether by evaporation, the residue is distilled, thus producing the ethyl ester of 2,3-dichloro-4-piperidino-α-methyl-phenylacetic acid, b.p. 155-160°/0.1 mm.

In an analogous manner, from the following compounds, after catalytic hydrogenation:

2,5-dichloro-4-piperidino-α-methylene- (b.p. 140°–142°/0.01 mm.)
2-chloro-3-methyl-4-piperidino-α-methylene- (b.p. 136°–138°/0.01 mm.)
2,5-dimethyl-4-piperidino-α-methylene- (b.p. 135°–140°/0.01 mm.)
2-methyl-3-chloro-4-piperidino-α-methylene- (b.p. 146°–148°/0.01 mm.)
2,3-dimethyl-4-piperidino-α-methylene- (b.p. 142°–144°/0.01 mm.)
2,5-dimethoxy-4-piperidino-α-methylene- (b.p. 178°–180°/0.01 mm.)
2-methyl-3-chloro-4-pyrrolidino-α-methylene- (b.p. 142°–145°/0.01 mm.)
2,5-dichloro-4-pyrrolidino-α-methylene- (b.p. 145°–150°/0.05 mm.)
2,3-dichloro-4-pyrrolidino-α-methylene-phenylacetic acid ethyl ester (b.p. 138°–142°/0.01 mm.), the following compounds are produced:

ethyl ester of 2,5-dichloro-4-piperidino-α-methyl-phenylacetic acid, b.p. 140°–142°/0.01 mm.;
ethyl ester of 2-chloro-3,α-dimethyl-4-piperidino-phenylacetic acid, b.p. 140°–141°/0.01 mm.;
ethyl ester of 2,5,α-trimethyl-4-piperidino-phenylacetic acid, b.p. 134°–138°/0.01 mm.;
ethyl ester of 2,α-dimethyl-3-chloro-4-piperidino-phenylacetic acid, b.p. 140°–141°/0.01 mm.;
ethyl ester of 2,3,α-trimethyl-4-piperidino-phenylacetic acid, b.p. 142°–145°/0.05 mm.;
ethyl ester of 2,5-dimethoxy-4-piperidino-α-methyl-phenylacetic acid, b.p. 180°–185°/0.01 mm.;
ethyl ester of 2,α-dimethyl-3-chloro-4-pyrrolidino-phenylacetic acid, b.p. 140°–143°/0.01 mm.;
ethyl ester of 2,5-dichloro-4-pyrrolidino-α-methyl-phenylacetic acid, b.p. 143°–148°/0.01 mm.;
ethyl ester of 2,3-dichloro-4-pyrrolidino-α-methyl-phenylacetic acid, b.p. 139°–141°/0.01 mm.

EXAMPLE 121

6.5 g. of the ethyl ester of 2,3-dichloro-4-piperidino-α-methyl-phenylacetic acid is boiled for 2 hours in 50 ml. of ethanol, with the addition of 0.8 g. of sodium hydroxide and 0.8 ml. of water; the alcohol is distilled off and the residue is dissolved in water and worked up as usual (pH 4 – 6), thus obtaining 2,3-dichloro-4-piperidino-α-methyl-phenylacetic acid, m.p. 115°–116° (benzene/petroleum ether).

Analogously, from:

2,5-dichloro-4-piperidino-α-methyl-
2-chloro-3,α-dimethyl-4-piperidino-
2,5,α-trimethyl-4-piperidino-
2,α-dimethyl-3-chloro-4-piperidino-
2,3,α-trimethyl-4-piperidino-
2,5-dimethoxy-4-piperidino-α-methyl-
2,α-dimethyl-3-chloro-4-pyrrolidino-
2,5-dichloro-4-pyrrolidino-α-methyl-
2,3-dichloro-4-pyrrolidino-α-methyl-
2,5-dibromo-4-piperidino-α-methyl-
2,3-dibromo-4-piperidino-α-methyl-
2-chloro-4-piperidino-5-bromo-α-methyl-
2-chloro-3-bromo-4-piperidino-α-methyl-
2-bromo-4-piperidino-5-chloro-α-methyl-
2-bromo-3-chloro-4-piperidino-α-methyl-
2,3-dichloro-4-piperidino-α-ethyl-
2,5-dichloro-4-piperidino-α-ethyl-
2-methyl-3-chloro-4-piperidino-α-ethyl- and
2-methyl-4-piperidino-5-chloro-α-ethyl-phenylacetic acid ethyl ester, respectively, the corresponding free acids are obtained by alkaline saponification:

2,5-dichloro-4-piperidino-α-methyl-phenylacetic acid, m.p. 119°–121°;
2-chloro-3,α-dimethyl-4-piperidino-phenylacetic acid, m.p. 137°;
2,5,α-trimethyl-4-piperidino-phenylacetic acid, m.p. 189°–190°;
2,α-dimethyl-3-chloro-4-piperidino-phenylacetic acid, m.p. 156°–157°;
2,3,α-trimethyl-4-piperidino-phenylacetic acid, m.p. 189°–192°;
2,5-dimethoxy-4-piperidino-α-methyl-phenylacetic acid, m.p. 165°–167°;
2,α-dimethyl-3-chloro-4-pyrrolidino-phenylacetic acid, m.p. 138°–140°;
2,5-dichloro-4-pyrrolidino-α-methyl-phenylacetic acid, m.p. 118°–122°;
2,3-dichloro-4-pyrrolidino-α-methyl-phenylacetic acid, m.p. 112°–115°;
2,5-dibromo-4-piperidino-α-methyl-phenylacetic acid;
2,3-dibromo-4-piperidino-α-methyl-phenylacetic acid;
2-chloro-4-piperidino-5-bromo-α-methyl-phenylacetic acid;
2-chloro-3-bromo-4-piperidino-α-methyl-phenylacetic acid;
2-bromo-4-piperidino-5-chloro-α-methyl-phenylacetic acid;
2-bromo-3-chloro-4-piperidino-α-methyl-phenylacetic acid;
2,3-dichloro-4-piperidino-α-ethyl-phenylacetic acid;
2,5-dichloro-4-piperidino-α-ethyl-phenylacetic acid;
2-methyl-3-chloro-4-piperidino-α-ethyl-phenylacetic acid; and
2-methyl-4-piperidino-5-chloro-α-ethyl-phenylacetic acid, respectively.

EXAMPLE 122

Analogously to Example 22, 2,3-dichloro-4-piperidino-α-methyl-phenylacetic acid, m.p. 115°–116°, is produced from 2,3-dichloro-4-piperidino-phenylacetic acid ethyl ester (b.p. 148°–152°/0.1 mm.) by way of the diethyl esters of 2,3-dichloro-4-piperidino-phenylmalonic acid (b.p. 180°–184°/0.01 mm.) and 2,3-dichloro-4-piperidinophenyl-α-methylmalonic acid (b.p. 185°–190°/0.01 mm.).

In an analogous manner, the following compounds are obtained by way of the corresponding intermediates, by reaction with methyl iodide:

2,5-dichloro-4-piperidino-α-methyl-phenylacetic acid
2,3-dichloro-4-morpholino-α-methyl-phenylacetic acid
2,5-dichloro-4-morpholino-α-methyl-phenylacetic acid
2,3-dichloro-4-homopiperidino-α-methyl-phenylacetic acid
2,5-dichloro-4-homopiperidino-α-methyl-phenylacetic acid
2,3-dichloro-4-(2',6'-dimethylpiperidino)-α-methyl-phenylacetic acid
2,5-dichloro-4-(2',6'-dimethylpiperidino)-α-methyl-phenylacetic acid
2,3-dichloro-4-thiomorpholino-α-methyl-phenylacetic acid
2,5-dichloro-4-thiomorpholino-α-methyl-phenylacetic acid
2,α-dimethyl-3-chloro-4-pyrrolidino-phenylacetic acid
2,α-dimethyl-4-pyrrolidino-5-chloro-phenylacetic acid
2,α-dimethyl-3-chloro-4-morpholino-phenylacetic acid
2,α-dimethyl-3-chloro-4-homopiperidino-phenylacetic acid
2,α-dimethyl-3-chloro-4-(2',6'-dimethylpiperidino)-phenylacetic acid
2,α-dimethyl-3-chloro-4-thiomorpholino-phenylacetic acid
2,α-dimethyl-4-morpholino-5-chloro-phenylacetic acid
2,α-dimethyl-4-homopiperidino-5-chloro-phenylacetic acid 2,α-dimethyl-4-(2',6'-dimethylpiperidino)-5-chloro-phenylacetic acid
2,α-dimethyl-4-thiomorpholino-5-chloro-phenylacetic acid;
and by reaction with ethyl iodide, n-propyl iodide, isopropyl iodide, n-butyl iodide or sec.butyl iodide, respectively, the following compounds are produced:
2,5-dichloro-4-piperidino-α-ethyl-phenylacetic acid
2,5-dichloro-4-piperidino-α-n-propyl-phenylacetic acid
2,5-dichloro-4-piperidino-α-isopropyl-phenylacetic acid
2,5-dichloro-4-piperidino-α-n-butyl-phenylacetic acid
2,5-dichloro-4-piperidino-α-sec.butyl-phenylacetic acid
2,3-dichloro-4-piperidino-α-ethyl-phenylacetic acid
2,3-dichloro-4-piperidino-α-n-propyl-phenylacetic acid
2,3-dichloro-4-piperidino-α-isopropyl-phenylacetic acid
2,3-dichloro-4-piperidino-α-n-butyl-phenylacetic acid
2,3-dichloro-4-piperidino-α-sec.butyl-phenylacetic acid
2-methyl-3-chloro-4-piperidino-α-ethyl-phenylacetic acid
2-methyl-3-chloro-4-piperidino-α-n-propyl-phenylacetic acid
2-methyl-3-chloro-4-piperidino-α-isopropyl-phenylacetic acid
2-methyl-3-chloro-4-piperidino-α-n-butyl-phenylacetic acid
2-methyl-3-chloro-4-piperidino-α-sec.butyl-phenylacetic acid
2-methyl-4-piperidino-5-chloro-α-ethyl-phenylacetic acid
2-methyl-4-piperidino-5-chloro-α-n-propyl-phenylacetic acid
2-methyl-4-piperidino-5-chloro-α-isopropyl-phenylacetic acid
2-methyl-4-piperidino-5-chloro-α-n-butyl-phenylacetic acid
2-methyl-4-piperidino-5-chloro-α-sec.butyl-phenylacetic acid.

EXAMPLE 123

Analogously to Example 30, 2,3-dimethyl-4-piperidino-phenylacetic acid (purified by way of the hydrochloride thereof) is prepared from 2,3-dimethyl-4-piperidino-phenylglyoxylic acid (obtainable by alkaline saponification of the ethyl ester of this glyoxylic acid [b.p. 180°–184°/0.01 mm.]) with phosphorus/hydrogen iodide.
Analogously, the following compounds are prepared from the corresponding phenylglyoxylic acids:
2,3-dichloro-4-piperidino-phenylacetic acid
2,5-dichloro-4-piperidino-phenylacetic acid
2-methyl-3-chloro-4-piperidino-phenylacetic acid
2-methyl-4-piperidino-5-chlorophenylacetic acid.

EXAMPLE 124

Analogously to Example 20, 2-methyl-3-fluoro-4-piperidino-phenylacetic acid, m.p. 110°–113° (methanol/water), is obtained from 2-methyl-3-fluoro-4-piperidino-acetophenone (producible from 2-methyl-6-nitraniline by way of 2-fluoro-3-nitrotoluene, 2-fluoro-3-aminotoluene and 2-fluoro-3-piperidinotoluene) (b.p. 175°–180°/0.05 mm.) with morpholine/sulfur by way of 2-methyl-3-fluoro-4-piperidinophenyl-thioacetomorpholide (which is not isolated).
In an analogous manner, the following compounds are obtained from 2,3-dimethoxy- and 2,5-dimethoxy-4-piperidino-acetophenone with morpholine/sulfur:
2,3-dimethoxy-4-piperidino-phenylacetic acid and
2,5-dimethoxy-4-piperidino-phenylacetic acid.

EXAMPLE 125

Analogously to Example 19, 2,α-dimethyl-3-chloro-4-piperidino-phenylacetic acid, m.p. 156°–157°, is prepared from 2,α-dimethyl-3-chloro-4-piperidinobenzyl cyanide (b.p. 178°–183°/0.01 mm.; obtainable from 2-methyl-3-chloro-4-piperidino-acetophenone by way of 1-(2-methyl-3-chloro-4-piperidinophenyl)-ethanol and 1-(2-methyl-3-chloro-4-piperidinophenyl)-1-chloroethane) with sulfuric acid.
In an analogous manner, the following compounds are produced by saponification of the corresponding benzyl cyanides:
2-methoxy-3-chloro-4-piperidino-α-methyl-phenylacetic acid
2-bromo-3-chloro-4-piperidino-α-methyl-phenylacetic acid
2,α-dimethyl-3-bromo-4-piperidino-phenylacetic acid
2-chloro-3-bromo-4-piperidino-α-methyl-phenylacetic acid
2-methylmercapto-3-chloro-4-piperidino-α-methyl-phenylacetic acid
2-bromo-4-piperidino-5-chloro-α-methyl-phenylacetic acid
2-chloro-4-piperidino-5-chloro-α-methyl-phenylacetic acid
2,α-dimethyl-4-piperidino-5-fluoro-phenylacetic acid
2-methylmercapto-4-piperidino-5-chloro-α-methyl-phenylacetic acid
2,α-dimethyl-3-bromo-4-pyrrolidino-phenylacetic acid
2-chloro-3-bromo-4-pyrrolidino-α-methyl-phenylacetic acid
2,α-dimethyl-4-pyrrolidino-5-chloro-phenylacetic acid
2,5-dichloro-4-pyrrolidino-α-methyl-phenylacetic acid
2,α-dimethyl-3-chloro-4-homopiperidino-phenylacetic acid
2,α-dimethyl-4-homopiperidino-5-chloro-phenylacetic acid
2-methoxy-3-chloro-4-homopiperidino-α-methyl-phenylacetic acid
2,3-dichloro-4-homopiperidino-α-methyl-phenylacetic acid
2,5-dichloro-4-homopiperidino-α-methyl-phenylacetic acid
2-chloro-3-bromo-4-homopiperidino-α-methyl-phenylacetic acid
2,α-dimethyl-3-bromo-4-homopiperidino-phenylacetic acid
2,α-dimethyl-4-homopiperidino-5-bromo-phenylacetic acid
2,α-dimethyl-3-methoxy-4-homopiperidino-phenylacetic acid
2,α-dimethyl-4-homopiperidino-5-methoxy-phenylacetic acid
2-methoxy-4-homopiperidino-5-chloro-α-methyl-phenylacetic acid
2-chloro-4-homopiperidino-5-bromo-α-methyl-phenylacetic acid
2-chloro-3,α-dimethyl-4-homopiperidino-phenylacetic acid
2-chloro-4-homopiperidino-5,α-dimethyl-phenylacetic acid
2-methoxy-3,α-dimethyl-4-homopiperidino-phenylacetic acid
2-methoxy-4-homopiperidino-5,α-dimethyl-phenylacetic acid
2,3,α-trimethyl-4-homopiperidino-phenylacetic acid
2,5,α-trimethyl-4-homopiperidino-phenylacetic acid
2-chloro-3-methoxy-4-homopiperidino-α-methyl-phenylacetic acid
2,3-dimethoxy-4-homopiperidino-α-methyl-phenylacetic acid
2,5-dimethoxy-4-homopiperidino-α-methyl-phenylacetic acid
2-chloro-4-homopiperidino-5-methoxy-α-methyl-phenylacetic acid
2-methoxy-3,α-dimethyl-4-piperidino-phenylacetic acid
2,α-dimethyl-3-fluoro-4-piperidino-phenylacetic acid
2,3-dimethoxy-4-piperidino-α-methyl-phenylacetic acid
2,α-dimethyl-3-methylmercapto-4-piperidino-phenylacetic acid
2-chloro-3-methylmercapto-4-piperidino-α-methyl-phenylacetic acid
2-methoxy-3-methylmercapto-4-piperidino-α-methyl-phenylacetic acid
2-methoxy-4-piperidino-5,α-dimethyl-phenylacetic acid
2,α-dimethyl-4-piperidino-5-methylmercapto-phenylacetic acid
2-chloro-4-piperidino-5-methylmercapto-α-methyl-phenylacetic acid
2-methoxy-4-piperidino-5-methylmercapto-α-methyl-phenylacetic acid
2,5-bis-methylmercapto-4-piperidino-α-methyl-phenylacetic acid
2,3-dimethyl-4-piperidino-α-ethyl-phenylacetic acid
2-methyl-3-methoxy-4-piperidino-α-ethyl-phenylacetic acid
2-chloro-3-methyl-4-piperidino-α-ethyl-phenylacetic acid
2-chloro-3-methoxy-4-piperidino-α-ethyl-phenylacetic acid
2-methoxy-3-chloro-4-piperidino-α-ethyl-phenylacetic acid
2-methoxy-3-bromo-4-piperidino-α-ethyl-phenylacetic acid 2-methoxy-3-methyl-4-piperidino-α-ethyl-phenylacetic acid
2,3-dimethoxy-4-piperidino-α-ethyl-phenylacetic acid
2,5-dimethyl-4-piperidino-α-ethyl-phenylacetic acid
2-methyl-4-piperidino-5-methoxy-α-ethyl-phenylacetic acid
2-chloro-4-piperidino-5-methyl-α-ethyl-phenylacetic acid
2-chloro-4-piperidino-5-methoxy-α-ethyl-phenylacetic acid
2-methoxy-4-piperidino-5-chloro-α-ethyl-phenylacetic acid
2-methoxy-4-piperidino-5-methyl-α-ethyl-phenylacetic acid
2,5-dimethoxy-4-piperidino-α-ethyl-phenylacetic acid
2-methoxy-3-chloro-4-morpholino-α-methyl-phenylacetic acid
2-methoxy-4-morpholino-5-chloro-α-methyl-phenylacetic acid
2-methylmercapto-4-morpholino-5-chloro-α-methyl-phenylacetic acid
2,α-dimethyl-3-chloro-4-diisopropylamino-phenylacetic acid
2,3-dichloro-4-diisopropylamino-α-methyl-phenylacetic acid
2,α-dimethyl-4-di-n-propylamino-5-chloro-phenylacetic acid
2,5-dichloro-4-di-n-propylamino-α-methyl-phenylacetic acid
2,α-dimethyl-3-chloro-4di-n-butylamino-phenylacetic acid
2,3-dichloro-4-di-n-butylamino-α-methyl-phenylacetic acid
2,α-dimethyl-4-di-sec.butylamino-5-chloro-phenylacetic acid
2,5-dichloro-4-di-sec.butylamino-α-methyl-phenylacetic acid.

EXAMPLE 126

Analogously to Example 46, the methyl ester of 2-chloro-3,α-dimethyl-4-piperidino-phenylacetic acid, b.p. 137°–140°/0.02 mm., is produced from 2-chloro-3,α-dimethyl-4-piperidino-phenylacetic acid with methanol/HCl.

In an analogous manner, the following compounds are obtained from the corresponding phenylacetic acids by esterification with the corresponding alcohols:
2,3-dichloro-4-piperidino-α-methyl-phenylacetic acid-
   methyl ester, b.p. 172°–174°/1 mm.
   ethyl ester, b.p. 174°–175°/1 mm.
   n-propyl ester, b.p. 178°–180°/1 mm.
   n-butyl ester, b.p. 177°–179°/0.5 mm.
   n-hexyl ester, b.p. 190°–191°/1 mm.;
2,5-dichloro-4-piperidino-α-methyl-phenylacetic acid-
   methyl-ester, b.p. 176°–178°/2 mm.
   ethyl ester, b.p. 180°–182°/1 mm.
   n-propyl ester, b.p. 181°–183°/0.5 mm.
   n-butyl ester, b.p. 184°–186°/1 mm.
   amyl ester, b.p. 193°–196°/1 mm.;
2,α-dimethyl-3-chloro-4-piperidino-phenylacetic acid-
   methyl ester, b.p. 166°–169°/1 mm.;
2,α-dimethyl-3-cyano-4-piperidino-phenylacetic acid-
   methyl ester, b.p. 174°–180°/1 mm.
   ethyl ester, b.p. 185°–190°/3 mm.

EXAMPLE 127

Analogously to Example 47, the ethyl ester of 2,3,α-trimethyl-4-piperidino-phenylacetic acid, b.p. 142°–145°/0.05 mm., is obtained from 2,3,α-trimethyl-4-piperidino-phenylacetic acid with ethanol.

In an analogous manner, the following compounds are produced from the corresponding phenylacetic acids:
2,α-dimethyl-3-chloro-4-piperidino-phenylacetic acid-
   ethyl ester, b.p. 169°–171°/1 mm.
   isoamyl ester, b.p. 184°–186°/1 mm.
   n-propyl ester, b.p. 178°–181°/1 mm.
   isobutyl ester, b.p. 173°–175°/1 mm.
   n-butyl ester, b.p. 176°–177°/1 mm.;
2,α-dimethyl-4-piperidino-5-chloro-phenylacetic acid-
   methyl ester, b.p. 162°–163°/0.5 mm.
   ethyl ester, b.p. 163°–166°/0.1 mm.
   crotyl ester, b.p. 163°–164°/0.5 mm.
   isopropyl ester, b.p. 163°–165°/0.5 mm.
   phenyl ester;
o-tolyl ester of 2,5-dichloro-4-piperidino-α-methyl-phenylacetic acid;
ethyl ester of 2,α-dimethyl-3-chloro-4-homopiperidino-phenylacetic acid;
ethyl ester of 2,α-dimethyl-4-homopiperidino-5-chloro-phenylacet-ic acid.

EXAMPLE 128

Analogously to Example 48, the isopropyl ester of 2,5-dichloro-4-piperidino-α-methyl-phenylacetic acid, b.p. 136°–140°/0.02 mm., is produced from 2,5-dichloro-4-piperidino-α-methyl-phenylacetic acid with SOCl₂ and then with isopropanol.

In an analogous manner, the following compounds are obtained from the corresponding phenylacetic acids with the corresponding alcohols:
2,α-dimethyl-4-piperidino-5-chloro-phenylacetic acid-
   sec.butyl ester, b.p. 178°–180°/1 mm.
   n-pentyl ester, b.p. 184°–187°/1 mm.;
2,5-dimethoxy-4-piperidino-α-methyl-phenylacetic acid-
   methyl ester, b.p. 177°–179°/0.01 mm.
   ethyl ester, b.p. 180°–185°/0.01 mm.;
2,3,α-trimethyl-4-piperidino-phenylacetic acid-
   methyl ester, b.p. 154°–156°/0.1 mm.
   ethyl ester, b.p. 142°–145°/0.01 mm.
   n-butyl ester, b.p. 167°–170°/0.01 mm.;
2,5α-trimethyl-4-piperidino-phenylacetic acid-
   methyl ester, b.p. 155°–158°/0.1 mm.
   ethyl ester, b.p. 134°–138°/0.01 mm.

EXAMPLE 129

Analogously to Example 50, the n-butyl ester of 2,5-dichloro-4-piperidino-α-methyl-phenylacetic acid, b.p. 150°–155°/0.01 mm., is prepared from 2,5-dichloro-4-amino-α-methyl-phenyl-acetic acid n-butyl ester with 1,5-dibromopentane.

In an analogous manner, the following compounds are produced from the corresponding phenylacetic acid n-butyl esters:
   n-butyl ester of 2-methoxy-3-chloro-4-piperidino-α-methyl-phenylacetic acid, b.p. 168°–171°/0.01 mm.;
   n-butyl ester of 2-bromo-3-chloro-4-piperidino-α-methyl-phenyl-acetic acid, b.p. 180°–181°/0.01 mm.;
   n-butyl ester of 2,α-dimethyl-3-bromo-4-piperidino-phenylacetic acid, b.p. 174°–177°/0.01 mm.;
   n-butyl ester of 2-chloro-3-bromo-4-piperidino-α-methyl-phenyl-acetic acid, b.p. 180°–181°/0.01 mm.;
   n-butyl ester of 2-methoxy-3-bromo-4-piperidino-α-methyl-phenyl-acetic acid, b.p. 182°–184°/0.1 mm.;
   n-butyl ester of 2,α-dimethyl-3-iodo-4-piperidino-phenylacetic acid, b.p. 179°–183°/0.05 mm.;
   n-butyl ester of 2-methoxy-3-iodo-4-piperidino-α-methyl-phenyl-acetic acid, b.p. 181°–184°/0.1 mm.;
   n-butyl ester of 2-chloro-3,α-dimethyl-4-piperidino-phenylacetic acid, b.p. 174°–177°/0.05 mm.;
   n-butyl ester of 2-methoxy-3,α-dimethyl-4-piperidino-phenylacet-ic acid, b.p. 163°–165°/0.01 mm.;
   n-butyl ester of 2,α-dimethyl-3fluoro-4-piperidino-phenylacetic acid, b.p. 170°–172°/0.2 mm.;
   n-butyl ester of 2-chloro-3-methoxy-4-piperidino-α-methyl-phenyl-acetic acid, b.p. 174°–176°/0.05 mm.;
   n-butyl ester of 2,α-dimethyl-3-methoxy-4-piperidino-phenylacetic acid, b.p. 164°–165°/0.05 mm.; n-butyl ester of 2,3-dimethoxy-4-piperidino-α-methyl-phenylacetic acid, b.p. 165°–167°/0.05 mm.;
   n-butyl ester of 2-methylmercapto-3-chloro-4-piperidino-α-methyl-phenylacetic acid, b.p. 177°–179°/0.01 mm.

EXAMPLE 130

Analogously to Example 51, from 2,5-dimethoxy-4-piperidino-α-methyl-phenylacetic acid with 2-diethylaminoethyl chloride, there is obtained the 2'- diethylaminoethyl ester of 2,5-dimethoxy-4-piperidino-α-methyl-phenylacetic acid, b.p. 197°–202°/0.01 mm.; fumarate-hydrate, m.p. 112°–114° (from aqueous acetone).

In an analogous manner, the following compounds are produced from the corresponding acids and substituted alkyl chlorides and bromides, respectively:

2,3-dichloro-4-piperidino-α-methyl-phenylacetic acid-
  2′-hydroxyethyl ester
  2′-dimethylaminoethyl ester, b.p. 210°–214°/0.01 mm.
  2′-pyrrolidinoethyl ester, b.p. 198°–201°/0.01 mm.
  2′-morpholinoethyl ester, b.p. 195°–198°/0.01 mm.
  3′-morpholinopropyl ester, b.p. 215°–218°/0.01 mm.
  2′-piperidinoethyl ester, b.p. 210°–213°/0.01 mm.
  2′-(N-methylpiperazino)-ethyl ester, b.p. 231°–233°/0.02 mm.
  2′-propoxyethyl ester
  3′-oxa-5′-butoxypentyl ester
  3′,6′-dioxa-8′-hydroxyoctyl ester
  cyclopentyl ester
  (1-methyl-4-piperidyl) ester
  2′-homopiperazinoethyl ester
  3′-pyrrolidinopropyl ester
  2′-phenylethyl ester;
2,5-dichloro-4-piperidino-α-methyl-phenylacetic acid-
  2′-dimethylaminoethyl ester, b.p. 210°–214°/0.01 mm.
  2′-pyrrolidinoethyl ester, b.p. 202°–204°/0.01 mm.
  3′-morpholinopropyl ester, b.p. 224° 226°/0.01 mm.
  2′-piperidinoethyl ester, b.p. 213°–216°/0.01 mm.
  2′-(N-methylpiperazino)-ethyl ester, b.p. 234°–236°/0.01 mm.
  2′-hydroxyethyl ester
  2′-n-butoxyethyl ester
  3′,6′-dioxa-8′-ethoxyoctyl ester
  2′-di-n-butylaminoethyl ester
  2′-cyclohexylethyl ester
  2′-(1-methyl-2-piperidyl)-ethyl ester
  2′-(N′-2-hydroxyethylpiperazino)-ethyl ester
  2′-(N′-methylhomopiperazino)-ethyl ester
  3′-(N′-methylpiperazino)-propyl ester
  3′-pyrrolidinopropyl ester;
2,α-dimethyl-3-chloro-4-piperidino-phenylacetic acid-
  2′-dimethylaminoethyl ester, b.p. 203°–206°/0.01 mm.
  2′-pyrrolidinoethyl ester, b.p. 193°–196°/0.01 mm.
  3′-morpholinopropyl ester, b.p. 209°–212°/0.01 mm.
  2′-piperidinoethyl ester, b.p. 203°–205°/0.01 mm.
  2′-(N-methylpiperazino)-ethyl ester, b.p. 222°–225°/0.01 mm.
  2′-hydroxyethyl ester
  propargyl ester
  2′-methoxyethyl ester
  3′-oxa-5′-hydroxypentyl ester
  2′-aminoethyl ester
  3′-aminopropyl ester
  2′-methyl-3′-diethylaminopropyl ester
  3′-cyclohexylpropyl ester
  2′-(1-methylpiperidyl-2)-ethyl ester
  2′-morpholinoethyl ester
  2′-(N′-phenylpiperazino)-ethyl ester
  3′-piperidinopropyl ester
  benzyl ester
  2′-methylmercaptoethyl ester;
2,α-dimethyl-5-chloro-4-piperidino-phenylacetic acid-
  2′-dimethylaminoethyl ester, b.p. 204°–206°/0.01 mm.
  2′-pyrrolidinoethyl ester, b.p. 195°–197°/0.02 mm.
  3′-morpholinopropyl ester, b.p. 206°–208°/0.02 mm.
  2′-piperidinoethyl ester, b.p. 198°–203°/0.01 mm.
  2′-(N-methylpiperazino)-ethyl ester, b.p. 223°–225°/0.01 mm.
  2′-ethoxyethyl ester
  3′-oxa-5′-methoxypentyl ester
  cyclohexyl ester
  (1-methylpiperidyl-3)-methyl ester
  2′-thiomorpholinoethyl ester
  2′-(N′-ethylpiperazino)-ethyl ester
  3′-pyrrolidinopropyl ester
  2′-methylmercaptoethyl ester;
2,3,α-trimethyl-4-piperidino-phenylacetic acid-
  2′-morpholinoethyl ester
  2′-dimethylaminoethyl ester.

EXAMPLE 131

Analogously to Example 52, 2,5,α-trimethyl-4-piperidino-phenylacetamide, b.p. 175°–178°/0.01 mm., is obtained from 2,5,α-trimethyl-4-piperidino-phenylacetic acid with $POCl_3$ and then $NH_3$.

In an analogous manner, the following compounds are obtained from the corresponding phenylacetic acids by reaction with $POCl_3$, then with ammonia or the corresponding amines:

2,3-dichloro-4-piperidino-α-methyl-phenylacetic acid-
  amide
  anilide
  benzylamide
  N-(2-methylmercaptoethyl)-amide
  N-methyl-N-(2-dimethylaminoethyl)-amide
  N′-phenylpiperazide
  N-(2-morpholinoethyl)-amide
  N-(3-pyrrolidinopropyl)-amide
  N-(3-N′-methylpiperazinopropyl)-amide;
2,5-dichloro-4-piperidino-α-methyl-phenylacetic acid-
  amide
  anilide
  benzylamide
  N-(2-methylmercaptoethyl)-amide
  N-(2-dimethylaminoethyl)-amide
  N-(3-diethylaminopropyl)-amide
  N-ethyl-N-(2-dimethylaminoethyl)-amide
  N′-(2-hydroxyethyl)-piperazide
  N-(2-N′-methylpiperazinoethyl)-amide
  N-(2-morpholinoethyl)-amide
  N-(3-piperidinopropyl)-amide;
2,3,α-trimethyl-4-piperidino-phenylacetic acid-
  amide
  anilide
  benzylamide
  N-(2-methylmercaptoethyl)-amide;
2,α-dimethyl-3-chloro-4-piperidino-phenylacetic acid-
  amide
  anilide
  benzylamide
  N-(2-methylmercaptoethyl)-amide
  N-(3-diethylaminopropyl)-amide
  N′-methylpiperazide
  N-(2-pyrrolidinoethyl)-amide
  N-(3-morpholinopropyl)-amide;
2,α-dimethyl-4-piperidino-5-chloro-phenylacetic acid-
  amide
  anilide
  benzylamide
  N-(2-methylmercaptoethyl)-amide
  N,N-bis-(2-hydroxyethyl)-amide
  N′-ethylpiperazide
  N-(2-piperidinoethyl)-amide
  N-(3-piperidinopropyl)-amide.

EXAMPLE 132

Analogously to Example 53, 2,α,N-trimethyl-3-chloro-4-piperidino-phenylacetamide, b.p. 195°–198°/0.01 mm., is prepared from 2,α-dimethyl-3-chloro-4-piperidino-phenylacetic acid with the ethyl ester of chloroformic acid and then methylamine.

In an analogous manner, the following compounds are obtained from the corresponding phenylacetic acids by reaction with 2-diethylaminoethylamine, 2-dimethylaminoethylamine, 3-dimethylaminopropylamine, ethanolamine, ethylamine, n-propylamine, n-butylamine, cyclohexylamine, piperidine, morpholine and N-(2-hydroxyethyl)-piperazine:

2,α-dimethyl-3-chloro-4-piperidino-phenylacetic acid-
  N-(2-diethylaminoethyl)-amide N-(2-dimethylaminoethyl)-amide
N-(3-dimethylaminopropyl)-amide
N-(2-hydroxyethyl)-amide
N-ethylamide
N-n-propylamide
N-n-butylamide
N-cyclohexylamide
piperidide
morpholide
N'-(2-hydroxyethyl)-piperazide;

2,α-dimethyl-4-piperidino-5-chloro-phenylacetic acid-
N-(2-diethylaminoethyl)-amide
N-(2-dimethylaminoethyl)-amide
N-(3-dimethylaminopropyl)-amide
N-(2-hydroxyethyl)-amide
N-ethylamide
N-n-propylamide
N-n-butylamide
N-cyclohexylamide
piperidide
morpholide
N'-(2-hydroxyethyl)-piperazide;

2,3-dichloro-4-piperidino-α-methyl-phenylacetic acid-
N-(2-diethylaminoethyl)-amide
N-(2-dimethylaminoethyl)-amide
N-(3-dimethylaminopropyl)-amide
N-(2-hydroxyethyl)-amide
N-ethylamide
N-n-propylamide
N-n-butylamide
N-cyclohexylamide
piperidide
morpholide
N'-(2-hydroxyethyl)-piperazide.

EXAMPLE 133

Analogously to Example 54, 2,3-dichloro-4-piperidino-α-methyl-phenylacetohydroxamic acid is produced from 2,3-dichloro-4-piperidino-α-methyl-phenylacetic acid methyl ester with hydroxylamine.

In an analogous manner, the following compounds are obtained from the corresponding methyl esters of phenylacetic acid:
2,5-dichloro-4-piperidino-α-methyl-phenylacetohydroxamic acid
2,α-dimethyl-4-piperidino-5-chloro-phenylacetohydroxamic acid
2,α-dimethyl-3-chloro-4-piperidino-phenylacetohydroxamic acid
2,3,α-trimethyl-4-piperidino-phenylacetohydroxamic acid
2,5,α-trimethyl-4-piperidino-phenylacetohydroxamic acid
2,5-dimethoxy-4-piperidino-α-methyl-phenylacetohydroxamic acid.

EXAMPLE 134

In analogy to Example 55, the methyl ester of 2-chloro-4-piperidino-5-amino-α-methyl-phenylacetic acid, b.p. 170°–174°/0.01 mm., is obtained from 2-chloro-4-piperidino-5-amino-α-methyl-phenylacetic acid with diazomethane.

Analogously, the following compounds are produced from the corresponding phenylacetic acids with diazomethane:
methyl ester of 2,α-dimethyl-3-amino-4-piperidino-phenylacetic acid;
methyl ester of 2-methoxy-3-amino-4-piperidino-α-methyl-phenyl-acetic acid, b.p. 167°–170°/0.01 mm.;
methyl ester of 2,α-dimethyl-4-piperidino-5-amino-phenylacetic acid, b.p. 164°–168°/0.01 mm.;
methyl ester of 2-chloro-4-piperidino-5-amino-α-methyl-phenyl-acetic acid, b.p. 175°–177°/0.01 mm.;
methyl ester of 2, α-dimethyl-3-chloro-4-pyrrolidino-phenylacetic acid;
methyl ester of 2-methoxy-4-piperidino-5-amino-α-methyl-phenyl-acetic acid, b.p. 170°–172°/0.01 mm.

EXAMPLE 135

10 g. of 2,3-dimethyl-4-piperidino-α-chloro-phenylacetic acid ethyl ester hydrochloride (obtainable by hydrogenating the ethyl ester of 2,3-dimethyl-4-piperidino-phenylglyoxylic acid (b.p. 180°–184°/0.01 mm.) and reacting the thus-obtained 2,3-dimethyl-4-piperidino-mandelic acid ethyl ester (b.p. 148°–152°/0.05 mm.) with $SOCl_2$ in $CH_2Cl_2$) is hydrogenated with 1 g. of palladium-charcoal (5 percent) in 250 ml. of dioxane at 60° and 6 atmospheres until 1 mol equivalent of hydrogen has been absorbed. After filtration, the solution is concentrated by evaporation, the residue is mixed with solution of sodium hydroxide and worked up as usual (pH 8 – 10), thus obtaining the ethyl ester of 2,3-dimethyl-4-piperidino-phenylacetic acid, b.p. 136°–139°/0.01 mm.

EXAMPLE 136

Analogously to Example 57, the ethyl ester of 2,α-dimethyl-3-chloro-4-piperidino-phenylacetic acid, b.p. 140°–141°/0.01 mm., is produced from 2,α-dimethyl-3-chloro-4-piperidino-benzyl cyanide by way of the iminoether hydrochloride.

In an analogous manner, the following compounds are obtained from the corresponding benzyl cyanides:
ethyl ester of 2,3-dichloro-4-piperidino-α-methyl-phenylacetic acid, b.p. 155°–160°/0.01 mm.;
ethyl ester of 2,5-dichloro-4-piperidino-α-methyl-phenylacetic acid, b.p. 140°–142°/0.01 mm.;
ethyl ester of 2,α-dimethyl-4-piperidino-5-chloro-phenylacetic acid, b.p. 162°–164°/1 mm.;
ethyl ester of 2,5-dimethoxy-4-piperidino-α-methyl-phenylacetic acid, b.p. 180°–185°/0.01 mm.;
ethyl ester of 2,3-dimethoxy-4-piperidino-α-methyl-phenylacetic acid, b.p. 160°–162°/0.1 mm.;
ethyl ester of 2,3,α-trimethyl-4-piperidino-phenylacetic acid, b.p. 142°–145°/0.05 mm.; and
ethyl ester of 2,5,α-trimethyl-4-piperidino-phenylacetic acid, b.p. 134°–138°/0.01 mm.

EXAMPLE 137

Analogously to Example 58, the triethyl ester of 2,α-dimethyl-3-chloro-4-piperidino-phenylorthoacetic acid, b.p. 206°–210°/0.01 mm., is produced from 2,α-dimethyl-3-chloro-4-piperidino-benzyl cyanide by way of the iminoether hydrochloride.

Analogously, from the corresponding benzyl cyanides, the following compounds are prepared:
triethyl ester of 2,3-dichloro-4-piperidino-α-methyl-phenylorthoacetic acid, b.p. 225°–226°/0.01 mm.;
triethyl ester of 2,5-dichloro-4-piperidino-α-methyl-phenylorthoacetic acid, b.p. 230°–231°/0.01 mm.;
triethyl ester of 2,α-dimethyl-4-piperidino-5-chloro-phenylorthoacetic acid, b.p. 212°–214°/0.01 mm.;
triethyl ester of 2,5-dimethoxy-4-piperidino-α-methyl-phenylorthoacetic acid, b.p. 202°–206°/0.01 mm.;
triethyl ester of 2,3-dimethoxy-4-piperidino-α-methyl-phenylorthoacetic acid, b.p. 204°–208°/0.01 mm.;
triethyl ester of 2,3,α-trimethyl-4-piperidino-phenylorthoacetic acid, b.p. 202°–203°/0.01 mm.; and
triethyl ester of 2,5,α-trimethyl-4-piperidino-phenylorthoacetic acid, b.p. 204°–205°/0.01 mm.

EXAMPLE 138

Analogously to Example 61, 2,α-dimethyl-3-chloro-4-piperidino-phenylacetamide is obtained from 2,α-dimethyl-3-chloro-4-piperidino-benzyl cyanide with $H_2SO_4$.

EXAMPLE 139

Analogously to Example 62, the 2'-diethylaminoethyl ester of 2,α-dimethyl-3-chloro-4-piperidino-phenylacetic acid (isolated in the form of the fumarate) is produced from 2,α-dimethyl-3-chloro-4-piperidino-phenylacetic acid 2'-chloroethyl ester (b.p. 175°–178°/0.01 mm.; obtainable by reacting 2,α-di-methyl-3-chloro-4-piperidino-phenylacetamide with ethylene chlorhydrin/HCl gas at 90°–100°) with diethylamine.

Analogously, the following compounds are obtained from the corresponding 2'-chloroethyl esters:

2'-diethylaminoethyl ester of 2,3-dichloro-4-piperidino-α-methyl-phenylacetic acid, b.p. 210°–213°/0.01 mm.;

2'-diethylaminoethyl ester of 2,5-dichloro-4-piperidino-α-methyl-phenylacetic acid, b.p. 214°–216°/0.05 mm.;

2'-diethylaminoethyl ester of 2,α-dimethyl-4-piperidino-5-chloro-phenylacetic acid, b.p. 202°–204°/0.01 mm.;

2'-diethylaminoethyl ester of 2,3,α-trimethyl-4-piperidino-phenylacetic acid, b.p. 204°–206°/0.01 mm.; and 2'-diethylaminoethyl ester of 2,5,α-trimethyl-4-piperidino-phenyl-acetic acid, b.p. 194°–197°/0.02 mm.

EXAMPLE 140

Analogously to Example 64, the 2'-diethylaminoethyl ester of 2,3-dichloro-4-piperidino-α-methyl-phenylacetic acid, b.p. 210°–213°/0.01 mm., is produced from 2,3-dichloro-4-piperidino-α-methyl-phenylacetic acid ethyl ester with 2-diethylamino-ethanol.

In an analogous manner, the following compounds are obtained from the corresponding ethyl esters of phenylacetic acid by interesterification with the corresponding amino-alcohols:

2,α-dimethyl-3-chloro-4-homopiperidino-phenylacetic acid-
  2'-diethylaminoethyl ester;
2,α-dimethyl-4-pyrrolidino-5-chloro-phenylacetic acid-
  2'-morpholinoethyl ester;
2,3-dichloro-4-piperidino-α-methyl-phenylacetic acid-
  3'-diethylaminopropyl ester
  3'-dimethylaminopropyl ester
  2'-diethylaminopropyl ester
  2'-dimethylaminopropyl ester;
2,5-dichloro-4-piperidino-α-methyl-phenylacetic acid-
  3'diethylaminopropyl ester
  3'-dimethylaminopropyl ester
  2'-diethylaminopropyl ester
  2'-dimethylaminopropyl ester;
2,α-dimethyl-4-piperidino-3-chloro-phenylacetic acid-
  3'-diethylaminopropyl ester
  3'-dimethylaminopropyl ester
  2'-diethylaminopropyl ester
  2'-dimethylaminopropyl ester;
2,α-dimethyl-4-piperidino-5-chloro-phenylacetic acid-
  3'-diethylaminopropyl ester
  3'-dimethylaminopropyl ester
  2'-diethylaminopropyl ester
  2'-dimethylaminopropyl ester;
2,3,α-trimethyl-4-piperidino-phenylacetic acid-
  3'-diethylaminopropyl ester
  3'-dimethylaminopropyl ester
  2'-diethylaminopropyl ester
  2'-dimethylaminopropyl ester;
2,5,α-trimethyl-4-piperidino-phenylacetic acid-
  2'-dimethylaminoethyl ester
  3'-diethylaminopropyl ester
  3'-dimethylaminopropyl ester
  2'-diethylaminopropyl ester
  2'-dimethylaminopropyl ester;
2,5-dimethoxy-4-piperidino-α-methyl-phenylacetic acid-
  2'-dimethylaminoethyl ester
  2'-pyrrolidinoethyl ester
  2'-piperidinoethyl ester
  3'-diethylaminopropyl ester;
2,α-dimethyl-3-chloro-4-pyrrolidino-phenylacetic acid-
  2'-diethylaminoethyl ester
  3'-diethylaminopropyl ester;
2,α-dimethyl-4-homopiperidino-5-chloro-phenylacetic acid-
  2'-diethylaminoethyl ester
  3'-dimethylaminopropyl ester.

EXAMPLE 141

Analogously to Example 44, 2,5-dichloro-4-piperidino-α-methyl-phenylacetic acid, m.p. 119°–121° (diisopropyl ether), is obtained from 1-(2,5-dichloro-4-piperidinophenyl)-1-methyl-ethanol-2with silver oxide.

EXAMPLE 142

Analogously to Example 45, 2,5-dichloro-4-piperidino-α-methyl-phenylacetic acid, m.p. 119°–121°, is produced from 2,5-dichloro-4-piperidino-α-methyl-phenylacetaldehyde with CrO₃.

EXAMPLE 143

Under agitation and cooling, 11.9 g. of N-chloropiperidine in 50 ml. of trichloroethylene, and then 19.8 g. of 3-chlorophenylacetic acid ethyl ester in 30 ml. of trichloroethylene are added dropwise to 27 g. of aluminum chloride in 30 ml. of trichloroethylene. The reaction mixture is stirred for another 2 hours, poured on ice, and worked up as usual (pH 4 – 5). The crude product, which boils at 130°–160°/1 mm., is chromatographed on silica gel with chloroform, thus obtaining the ethyl ester of 3-chloro-4-piperidino-phenylacetic acid, b.p. 140°–145°/0.01 mm.

EXAMPLE 144

Under a nitrogen atmosphere, a solution of 14.15 g. of the methyl ester of 4-piperidino-naphthyl-1-acetic acid in 20 ml. of dimethyl sulfoxide is added dropwise, with stirring and cooling, to 1.3 g. of NaH in 10 ml. of dimethyl sulfoxide. The reaction mixture is agitated for 1 hour at room temperature; then, under stirring, 7.3 g. of methyl iodide in 10 ml. of dimethyl sulfoxide is added dropwise at 20°–30°. The reaction mixture is agitated overnight at room temperature, mixed with dilute acetic acid and worked up as usual (pH 8 – 9), thus obtaining 4-piperidino-α-methyl-naphthyl-1-acetic acid methyl ester, m.p. 81°–83° (hexane).

EXAMPLE 145

A solution of 0.9 g. of CH₃Li in 40 ml. of absolute tetrahydrofuran is added dropwise to a solution of 4 g. of 4-piperidino-α-bromo-naphthyl-1-acetic acid tert.butyl ester in 50 ml. of absolute tetrahydrofuran. Thereafter, the reaction mixture is boiled for 1 hour, cooled, decomposed with a saturated NH₄Cl solution, and extracted with ethyl acetate. The solvent is distilled off, the residue (consisting of the tert.butyl ester of 4-piperidino-α-methyl-naphthyl-1-acetic acid) is boiled with 10 percent hydrochloric acid on a steam bath, and worked up as usual (pH 5 – 6), thus obtaining 4-piperidino-α-methyl-naphthyl-1-acetic acid, m.p. 182°–184°.

EXAMPLE 146

29.7 g. of 4-piperidino-naphthyl-1-pyruvic acid (obtainable by condensing 4-piperidino-naphthyl-1-aldehyde with acetyl glycine and subjecting the thus-produced 2-methyl-4-(4-piperidino-1-naphthylidene)-5-oxazolone to alkaline hydrolysis) is dissolved in 280 ml. of 5 percent solution of sodium hydroxide. The reaction solution is cooled to 0°–5°, a solution of 150 ml. of 10 percent H₂O₂ is added dropwise under stirring at 5°–10°, the reaction mixture is agitated for 2 hours at 5° and for 24 hours at room temperature, and worked up as usual (pH 4.5 – 5.5), thus obtaining 4-piperidino-naphthyl-1-acetic acid, m.p. 142°.

EXAMPLE 147

13.3 g. of 3-chloro-4-piperidinophenylacetone oxime (obtainable from 3-chloro-4-piperidinobenzyl cyanide by reaction with methyl magnesium iodide and oximation of the thus-produced 3-chloro-4-piperidinophenylacetone) is introduced in 500 g. of polyphosphoric acid. The reaction mixture is heated under stirring for 25 minutes to 130°, poured into water, and worked up as usual. The crude product is chromatographed on silica gel. The N-methylamide of 3-chloro-4-piperidino-phenylacetic acid is obtained (m.p. 95°–96°) and, as a by-product, N-(3-chloro-4-piperidinobenzyl)-acetamide.

EXAMPLE 148

A solution of 12 g. of 3-chloro-4-piperidinophenyl-acetone and 2.5 g. of hydrazoic acid in 100 ml. of benzene is added dropwise under stirring and cooling to a mixture of 25 ml. of sulfuric acid and 50 ml. of benzene. Thereafter, the reaction mixture is agitated for another 30 minutes, chopped ice is added, and the mixture is worked up as usual (pH 7 – 9). After the residue has been chromatographed on silica gel, the methylamide of 3-chloro-4-piperidino-phenylacetic acid is obtained, m.p. 95°–96°, as well as the by-product N-(3-chloro-4-piperidino-benzyl)-acetamide.

EXAMPLE 149

6.4 g. of the ethyl ester of 4-diethanolamino-naphthyl-1-acetic acid (obtainable from the ethyl ester of 4-amino-naphthyl-1-acetic acid with ethylene oxide) in 50 ml. ethanol is mixed with a small excess of ethereal hydrochloric acid; the reaction mixture is concentrated by evaporation, the residue is heated for 5 hours to 220°–240°, and after cooling the reaction mixture is taken up in dilute hydrochloric acid and filtered, after activated charcoal has been added. The solution is heated for 10 minutes on a steam bath and then neutralized with ammonia. The reaction mixture is extracted with dichloromethane, the extract is dried, concentrated by evaporation, and there is thus obtained 4-morpholino-naphthyl-1-acetic acid.

EXAMPLE 150 a. Analogously or similarly to Examples 41 and 42, the following compounds are obtained by optical separation of the racemic acids:

(+)-3-bromo-4-piperidino-α-methyl-phenylacetic acid
(−)-3-bromo-4-piperidino-α-methyl-phenylacetic acid
(+)-3,α-dimethyl-4-piperidino-phenylacetic acid
(−)-3,α-dimethyl-4-piperidino-phenylacetic acid
(+)-3-amino-4-piperidino-α-methyl-phenylacetic acid
(−)-3-amino-4-piperidino-α-methyl-phenylacetic acid
(+)-3-trifluoromethyl-4-piperidino-α-methyl-phenylacetic acid
(−)-3-trifluoromethyl-4-piperidino-α-methyl-phenylacetic acid
(+)-3-chloro-4-pyrrolidino-α-methyl-phenylacetic acid
(−)-3-chloro-4-pyrrolidino-α-methyl-phenylacetic acid
(+)-3-chloro-4-homopiperidino-α-methyl-phenylacetic acid
(−)-3-chloro-4-homopiperidino-α-methyl-phenylacetic acid
(+)-4-piperidino-α-methyl-naphthyl-1-acetic acid
(−)-4-piperidino-α-methyl-naphthyl-1-acetic acid
(+)-2,3-dichloro-4-piperidino-α-methyl-phenylacetic acid
(−)-2,3-dichloro-4-piperidino-α-methyl-phenylacetic acid.

b. By esterifying the optically active acids with diazomethane, diazoethane of 2-diethylaminoethyl chloride, the corresponding esters are produced, e.g.:

(+)-3-chloro-4-piperidino-α-methyl-phenylacetic acid-
  methyl ester
  2-diethylaminoethyl ester;
(+)-3-chloro-4-piperidino-α-methyl-phenylacetic acid-
  methyl ester
  2-diethylaminoethyl ester;
(+)-3-bromo-4-piperidino-α-methyl-phenylacetic acid-
  methyl ester
  ethyl ester
  2-diethylaminoethyl ester;
(−)-3-bromo-4-piperidino-α-methyl-phenylacetic acid-
  methyl ester
  ethyl ester
  2-diethylaminoethyl ester.

The following examples include pharmaceutical compositions of the novel compounds which can be produced according to conventional standards:

EXAMPLE A - Tablets:

Each tablet contains

| | |
|---|---|
| 3-chloro-4-piperidino-α-methyl-phenylacetic acid | 25 mg. |
| lactose | 100 mg. |
| corn starch | 33 mg. |
| magnesium stearate | 2 mg. |

EXAMPLE B - Coated Tablets:

Each tablet contains

| | |
|---|---|
| 3-chloro-4-piperidino-α-methyl-phenylacetic acid | 25 mg. |
| lactose | 100 mg. |
| potato starch | 23 mg. |
| talc | 2 mg. |

The coating is a conventional mixture of corn starch, sugar, talc, and tragacanth and amounts to 150 mg.

EXAMPLE C - Solution for Injection:

A solution of 2 kg. of the sodium salt of 3-chloro-4-piperidino-α-methyl-phenylacetic acid in 198 kg. of distilled water is prepared and filled into 2 ml. ampoules in such a manner that each ampoule contains 20 mg. of said sodium salt.

EXAMPLE D - Syrup:

A mixture of

| | |
|---|---|
| 3-chloro-4-piperidino-α-methyl-phenylacetic acid hydrochloride | 0.4 kg. |
| glycerol (twice distilled) | 7.5 kg. |
| cane sugar | 56.0 kg. |
| methyl p-hydroxybenzoate | 0.07 kg. |
| n-propyl p-hydroxybenzoate | 0.03 kg. |
| ethanol | 10.0 kg. |
| flavorings | as desired | is prepared and mixed with distilled water in such a manner that the volume of the entire preparation is 100 l. A dosage unit (5ml.) contains 20 mg. of active substance.

EXAMPLE E - Hard Gelatin Capsules

Each hard gelatin capsule is filled with a fine powder consisting of

| | |
|---|---|
| 3-chloro-4-piperidino-α-methyl-phenylacetic acid | 20 mg. |
| lactose | 180 mg. |
| talc | 18 mg. |
| magnesium stearate | 2 mg. |

Instead of the sodium salt or hydrochloride, respectively, other physiologically compatible acid or base addition salts, respectively, of 3-chloro-4-piperidino-α-methyl-phenylacetic acid or other compounds covered by Formula 1, as well as the physiologically compatible acid or base addition salts thereof, can be incorporated into similar compositions.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A member selected from the group consisting of a compound of the following formula, a physiologically acceptable salt thereof and an anhydride thereof:

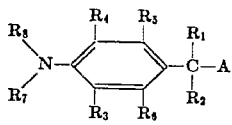

wherein
$R_1$ and $R_2$ each is H or alkyl of one to four carbon atoms;
$R_3$ is F, Hal, $CF_3$, OH, $NO_2$, CN, $R_9$, $OR_9$, SH, $SR_9$, $NR_1$—$COR_9$, $NR_1R_2$, $SO_2NR_1R_2$, $SOR_9$, or $SO_2R_9$; or when $R_4$ and $R_5$ together represent tetramethylene containing zero to two double bonds, $R_3$ can also represent H;
$R_4$, $R_5$ and $R_6$ each is H, or one of these residues is F, Hal, $R_9$, $OR_9$ or $SR_9$, or the residues $R_4$ and $R_5$ together represent a tetramethylene optionally containing one to two double bonds, and in the latter case, when $R_3$ is hydrogen; $R_6$ is H, F, Hal, $CF_3$, OH, $NO_2$, CN, $R_9$, $OR_9$, $SR_9$, $NR_1COR_9$, $NR_1R_2$, $SO_2NR_1R_2$, $SOR_9$ or $SO_2R_9$;
$R_7$ and $R_8$ together are tetramethylene, pentamethylene or hexamethylene, unsubstituted, monosubstituted or disubstituted with alkyl of one to four carbon atoms;
$R_9$ is alkyl of one to four carbon atoms; and
A represents $COOA_1$ in which $A_1$ is H; alkyl or cycloalkyl of respectively up to 12 carbon atoms and containing zero to two carbon-to-carbon unsaturated bonds; or phenyl or aralkyl of a total of six to 14 carbon atoms.

2. A member as defined by claim 1 wherein $R_5$ and $R_6$ represent H; and A represents COOH.

3. A member as defined by claim 1 wherein
$R_4$ and $R_5$ together represent tetramethylene containing zero to two double bonds; and
$R_3$ and $R_6$ each is H, or one of the residues $R_3$ and $R_6$ is F, Hal, OH, $NO_2$, CN, $R_9$, $OR_9$, $SR_9$, $NR_1$—$COR_9$, $NR_1R_2$, $SO_2NR_1R$, $SOR_9$ or $SO_2R_9$.

4. A member as defined by claim 1 wherein
$R_4$ is H;
one of the residues $R_5$ and $R_6$ is H and the other is F, Hal, $R_9$, $OR_9$ or $SR_9$.

5. A member as defined by claim 1 wherein
A is COOH.

6. A member as defined by claim 1 wherein
$R_1$ is H, methyl, ethyl or propyl.

7. A member as defined by claim 1 wherein
$R_2$ is H.

8. A member as defined by claim 1 wherein
$R_4$, $R_5$ and $R_6$ represent H.

9. A member as defined by claim 1 wherein
$R_2$, $R_4$, $R_5$ and $R_6$ represent H.

10. A member as defined by claim 1 wherein
$R_4$ and $R_5$ together represent —CH = CH—CH = CH—.

11. A member as defined by claim 1 wherein
$R_3$ is $SOR_9$ or $SO_2R_9$.

12. A member as defined by claim 1 wherein
$R_3$ represents F, Cl, Br, $R_9$, $NH_2$ or $NO_2$.

13. A member as defined by claim 1 wherein
$R_7$ and $R_8$ together represent tetramethylene, pentamethylene or hexamethylene.

14. A member as defined in claim 1 wherein
$R_1$ is H, methyl, ethyl or propyl;
$R_2$ is H or methyl;
$R_3$ is Cl, Br, $R_9$, $NH_2$, $NO_2$ or, when $R_4$ and $R_5$ together represent —CH = CH—CH = CH—, H;
$R_4$ and $R_5$ represent H or together —CH = CH—CH = CH—;
$R_6$ is H, methyl, Cl or Br;
$R_7$ and $R_8$ together represent tetramethylene, pentamethylene or hexamethylene and;
$A_1$ is H.

15. A member as defined by claim 1 wherein
$R_1$ represents H, methyl, ethyl or propyl;
$R_2$ represents H or methyl;
$R_3$ represents Cl, Br, $R_9$, $NH_2$, $NO_2$ or when $R_4$ and $R_5$ together represent —CH = CH—CH = CH—, H;
$R_4$ and $R_5$ represent H or together —CH = CH—CH = CH—;
$R_6$ is H, methyl, Cl or Br;
$R_7$ and $R_8$ together represent tetramethylene, pentamethylene or hexamethylene and,
$A_1$ is alkyl of one to six carbon atoms.

16. A compound of claim 1, 3-methyl-4-piperidino-phenylacetic acid.

17. A compound of claim 1, 3,α-dimethyl-4-piperidino-phenylacetic acid.

18. A compound of claim 1, 2,3,α-trimethyl-4-piperidino-phenylacetic acid.

19. A compound of claim 1, 2,3,α-trimethyl-4-piperidino-phenylacetic acid ethyl ester.

20. A compound of claim 1, 3-fluoro-4-piperidino-α-methyl-phenylacetic acid.

21. A compound of claim 1, 3-chloro-4-pyrrolidino-α-methyl-phenylacetic acid.

22. A compound of claim 1, 3-chloro-4-piperidino-phenylacetic acid.

23. A compound of claim 1, 3-chloro-4-piperidino-α-methyl-phenylacetic acid.

24. A compound of claim 1, 3-chloro-4-piperidino-α-methyl-phenylacetic acid methyl ester.

25. A compound of claim 1, 3-chloro-4-piperidino-α-methyl-phenylacetic acid ethyl ester.

26. A compound of claim 1, 3-chloro-4-piperidino-α-methyl-phenylacetic acid n-propyl ester.

27. A compound of claim 1, 3-chloro-4-piperidino-α-methyl-phenylacetic acid n-butyl ester.

28. A compound of claim 1, 3-chloro-4-piperidino-α-methyl-phenylacetic acid sec.-butyl ester.

29. A compound of claim 1, 3-chloro-4-piperidino-α-methyl-phenylacetic acid n-hexyl ester.

30. A compound of claim 1, 3-chloro-4-piperidino-α-methyl-phenylacetic acid 2-hexyl ester.

31. A compound of claim 1, 3-chloro-4-piperidino-α-methyl-phenylacetic acid 3-hexyl ester.

32. A compound of claim 1, 3-chloro-4-piperidino-α-methyl-phenylacetic acid n-octyl ester.

33. A compound of claim 1, 3-chloro-4-piperidino-α-methyl-phenylacetic acid n-decyl ester.

34. A compound of claim 1, 3-trifluoromethyl-4-piperidino-α-methyl-phenylacetic acid.

35. A compound of claim 1, 3-chloro-4-piperidino-α-methyl-phenylacetic acid cyclohexyl ester.

36. A compound of claim 1, 3-chloro-4-piperidino-α-methyl-phenylacetic acid allyl ester.

37. A compound of claim 1, 2-chloro-3,α-dimethyl-4-piperidino-phenylacetic acid.

38. A compound of claim 1, 2,α-dimethyl-3-chloro-4-piperidino-phenylacetic acid.

39. A compound of claim 1, 2,α-dimethyl-3-chloro-4-piperidino-phenylacetic acid ethyl ester.

40. A compound of claim 1, 3-bromo-4-pyrrolidino-α-methyl-phenylacetic acid.

41. A compound of claim 1, 3-bromo-4-piperidino-phenylacetic acid.

42. A compound of claim 1, 3-methylmercapto-4-piperidino-α-methyl-phenylacetic acid.

43. A compound of claim 1, 3-bromo-4-piperidino-α-methyl-phenylacetic acid.

44. A compound of claim 1, 3-bromo-4-piperidino-α-ethyl-phenylacetic acid.

45. A compound of claim 1, 3-iodo-4-piperidino-α-methyl-phenylacetic acid.

46. A compound of claim 1, 3-nitro-4-pyrrolidino-α-methyl-phenylacetic acid.

47. A compound of claim 1, 3-nitro-4-piperidino-α-methyl-phenylacetic acid.

48. A compound of claim 1, 3-nitro-4-homopiperidino-α-methyl-phenylacetic acid, cyclohexylamine salt.

49. A compound of claim 1, 3-amino-4-pyrrolidino-α-methyl-phenylacetic acid, cyclohexylamine salt.
50. A compound of claim 1, 3-amino-4-piperidino-phenylacetic acid methyl ester.
51. A compound of claim 1, 3-amino-4-piperidino-α-methyl-phenylacetic acid.
52. A compound of claim 1, 3-amino-4-piperidino-α-methyl-phenylacetic acid methyl ester.
53. A compound of claim 1, 3-amino-4-homopiperidino-α-methyl-phenylacetic acid, cyclohexylamine salt.
54. A compound of claim 1, 3-acetamido-4-piperidino-α-methyl-phenylacetic acid.
55. A compound of claim 1, 2,3-dichloro-4-piperidino-α-methyl-phenylacetic acid.
56. A compound of claim 1, 2,3-dichloro-4-piperidino-α-methyl-phenylacetic acid ethyl ester.
57. A compound of claim 1, 4-piperidino-naphthyl-1-acetic acid.
58. A compound of claim 1, 4-piperidino-naphthyl-1-acetic acid methyl ester hydrochloride.
59. A compound of claim 1, 4-piperidino-naphthyl-1-acetic acid ethyl ester.
60. A compound of claim 1, 4-piperidino-α-methyl-naphthyl-1-acetic acid.
61. A compound of claim 1, 4-piperidino-α-methyl-naphthyl-1-acetic acid methyl ester.
62. A compound of claim 1, 4-piperidino-α-methyl-naphthyl-1-acetic acid ethyl ester.
63. A compound of claim 1, 4-piperidino-α-methyl-naphthyl-1-acetic acid n-propyl ester.
64. A compound of claim 1, 4-piperidino-α-methyl-naphthyl-1-acetic acid n-hexyl ester.
65. A compound of claim 1, 4-piperidino-α-methyl-naphthyl-1-acetic acid 2-hexyl ester.
66. A compound of claim 1, 4-piperidino-α-methyl-naphthyl-1-acetic acid 3-hexyl ester.
67. A compound of claim 48, 4-piperidino-α-methyl-naphthyl-1-acetic acid amide.
68. A compound of claim 1, 2-methyl-4-piperidino-naphthyl-1-acetic acid.
69. A compound of claim 1, 4-piperidino-α-ethyl-naphthyl-1-acetic acid.
70. A compound of claim 1, 2,α-dimethyl-4-piperidino-naphthyl-1-acetic acid.
71. A compound of claim 1, 4-piperidino-α-methyl-5,6,7,8-tetrahydronaphthyl-1-acetic acid.
72. A compound of claim 1, 3-chloro-4-piperidino-naphthyl-1-acetic acid.
73. A compound of claim 1, (+)-3-chloro-4-piperidino-α-methyl-phenylacetic acid.
74. A compound of claim 1, (−)-3-chloro-4-piperidino-α-methyl-phenylacetic acid.
75. A compound of claim 1, 3-hydroxy-4-piperidino-α-methyl-phenylacetic acid.
76. A compound of claim 1, 3-cyano-4-piperidino-α-methyl-phenylacetic acid.
77. A compound of claim 1, 3-sulfamoyl-4-piperidino-α-methyl-phenylacetic acid.
78. A compound of claim 1, 3-methoxy-4-piperidino-α-methyl-phenylacetic acid.
79. A compound of claim 1, 3-ethoxy-4-piperidino-α-methyl-phenylacetic acid.
80. A compound of claim 1, 3-ethylmercapto-4-piperidino-α-methyl-phenylacetic acid.
81. A compound of claim 1, 3-methylamino-4-piperidino-α-methyl-phenylacetic acid.
82. A compound of claim 1, 3-dimethylamino-4-piperidino-α-methyl-phenylacetic acid.
83. A compound of claim 1, 3-methylsufamoyl-4-piperidino-α-methyl-phenylacetic acid.
84. A compound of claim 1, 3-dimethylsulfamoyl-4-piperidino-α-methyl-phenylacetic acid.
85. A compound of claim 1, 3-methylsulfinyl-4-piperidino-α-methyl-phenylacetic acid.
86. A compound of claim 1, 3-ethylsulfinyl-4-piperidino-α-methyl-phenylacetic acid.
87. A compound of claim 1, 3-methylsulfonyl-4-piperidino-α-methyl-phenylacetic acid.
88. A compound of claim 1, 3-ethylsulfonyl-4-piperidino-α-methyl-phenylacetic acid.
89. A compound of claim 1, 3-chloro-4-piperidino-α-ethyl-phenylacetic acid.
90. A compound of claim 1, 3-amino-4-piperidino-α-ethyl-phenylacetic acid.
91. A compound of claim 1, 3-methyl-4-piperidino-α-ethyl-phenylacetic acid.
92. A compound of claim 1, 3-chloro-4-piperidino-α-n-propyl-phenylacetic acid.
93. A compound of claim 1, 3-bromo-4-piperidino-α-n-propyl-phenylacetic acid.
94. A compound of claim 1, 3-chloro-4-piperidino-α,α-dimethyl-phenylacetic acid.
95. A compound of claim 1, 3-bromo-4-piperidino-α,α-dimethyl-phenylacetic acid.
96. A compound of claim 1, 3-trifluoromethyl-4-pyrrolidino-α-methyl-phenylacetic acid.
97. A compound of claim 1, 3-amino-4-pyrrolidino-α-methyl-phenylacetic acid.
98. A compound of claim 1, 3,α-dimethyl-4-pyrrolidino-phenylacetic acid.
99. A compound of claim 1, 3-methylsulfinyl-4-pyrrolidino-α-methyl-phenylacetic acid.
100. A compound of claim 1, 3-methylsulfonyl-4-pyrrolidino-α-methyl-phenylacetic acid.
101. A compound of claim 1, 3-chloro-4-homopiperidino-α-methyl-phenylacetic acid.
102. A compound of claim 1, 3-bromo-4-homopiperidino-α-methyl-phenylacetic acid.
103. A compound of claim 1, 3-trifluoromethyl-4-homopiperidino-α-methyl-phenylacetic acid.
104. A compound of claim 1, 3-amino-4-homopiperidino-α-methyl-phenylacetic acid.
105. A compound of claim 1, 3-methylsulfinyl-4-homopiperidino-α-methyl-phenylacetic acid.
106. A compound of claim 1, 3-methylsulfonyl-4-homopiperidino-α-methyl-phenylacetic acid.
107. A compound of claim 1, (+)-3-bromo-4-piperidino-α-methyl-phenylacetic acid.
108. A compound of claim 1, (−)-3-bromo-4-piperidino-α-methyl-phenylacetic acid.
109. A compound of claim 1, (+)-3,α-dimethyl-4-piperidino-phenylacetic acid.
110. A compound of claim 1, (−)-3α-dimethyl-4-piperidino-phenylacetic acid.
111. A compound of claim 1, (+)-3-amino-4-piperidino-α-methyl-phenylacetic acid.
112. A compound of claim 1, (−)-3-amino-4-piperidino-α-methyl-phenylacetic acid.
113. A compound of claim 1, (+)-3-trifluoromethyl-4-piperidino-α-methyl-phenylacetic acid.
114. A compound of claim 1, (−)-3-trifluoromethyl-4-piperidino-α-methyl-phenylacetic acid.
115. A compound of claim 1, (+)-3-chloro-4-pyrrolidino-α-methyl-phenylacetic acid.
116. A compound of claim 1, (−)-3-chloro-4-pyrrolidino-α-methyl-phenylacetic acid.
117. A compound of claim 1, (+)-3-chloro-4-homopiperidino-α-methyl-phenylacetic acid.
118. A compound of claim 1, (−)-3-chloro-4-homopiperidino-α-methyl-phenylacetic acid.
119. A compound of claim 1, methyl ester of 3-bromo-4-piperidino-α-methyl-phenylacetic acid.
120. A compound of claim 1, ethyl ester of 3-bromo-4-piperidino-α-methyl-phenylacetic acid.
121. A compound of claim 1, ethyl ester of 3,α-dimethyl-4-piperidino-phenylacetic acid.
122. A compound of claim 1, ethyl ester of 3-amino-4-piperidino-α-methyl-phenylacetic acid.

123. A compound of claim 1, n-propyl ester of 3-amino-4-piperidino-α-methyl-phenylacetic acid.

124. A compound of claim 1, ethyl ester of 3-fluoro-4-piperidino-α-methyl-phenylacetic acid.

125. A compound of claim 1, ethyl ester of 3-trifluoromethyl-4-piperidino-α-methyl-phenylacetic acid.

126. A compound of claim 1, 3-chloro-4-piperidino-α-methyl-naphthyl-1-acetic acid.

127. A compound of claim 1, 3-amino-4-piperidino-α-methyl-naphthyl-1-acetic acid.

128. A compound of claim 1, 3,α-dimethyl-4-piperidino-naphthyl-1-acetic acid.

129. A compound of claim 1, 2-chloro-4piperidino-α-methyl-naphthyl-1-acetic acid.

130. A compound of claim 1, 2-amino-4-piperidino-α-methyl-naphthyl-1-acetic acid.

131. A compound of claim 1, 4-pyrrolidino-α-methyl-naphthyl-1-acetic acid.

132. A compound of claim 1, 4-homopiperidino-α-methyl-naphthyl-1-acetic acid.

133. A compound of claim 1, 4-piperidino-α-methyl-5,6-dihydro-naphthyl-1-acetic acid.

134. A compound of claim 1, 4-piperidino-α-methyl-5,8-dihydro-naphthyl-1-acetic acid.

135. A compound of claim 1, 4-piperidino-α-methyl-7,8-dihydro-naphthyl-1-acetic acid.

136. A compound of claim 1, 2,3-dibromo-4-piperidino-α-methyl-phenylacetic acid.

137. A compound of claim 1, 2,3-dibromo-4-pyrrolidino-α-methyl-phenylacetic acid.

138. A compound of claim 1, 2,3-dichloro-4-homopiperidino-α-methyl-phenylacetic acid.

139. A compound of claim 1, propyl ester of 2,3-dichloro-4-piperidino-α-methyl-phenylacetic acid.

140. A compound of claim 1, methyl ester of 2,3-dichloro-4-piperidino-α-methyl-phenylacetic acid.

141. A compound of claim 1, 3,5-dichloro-4-piperidino-α-methyl-phenylacetic acid.

142. A compound of claim 1, 3-chloro-4-piperidino-5,α-dimethyl-phenylacetic acid.

143. A compound of claim 1, ethyl ester of 3,5-dichloro-4-piperidino-α-methyl-phenylacetic acid.

144. A compound of claim 1, ethyl ester of 3-chloro-4-piperidino-5,α-dimethyl-phenylacetic acid.

* * * * *